US012552991B2

(12) United States Patent
Laut et al.

(10) Patent No.: US 12,552,991 B2
(45) **Date of Patent: *Feb. 17, 2026**

(54) LIQUID-CRYSTALLINE MEDIUM

(71) Applicant: Merck Patent GmbH, Darmstadt (DE)

(72) Inventors: Sven Christian Laut, Shanghai (CN); Sabrina Pfeiffer, Darmstadt (DE); Philipp Hans Fackler, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/753,581

(22) Filed: Jun. 25, 2024

(65) Prior Publication Data

US 2024/0368471 A1 Nov. 7, 2024

Related U.S. Application Data

(62) Division of application No. 17/225,223, filed on Apr. 8, 2021, now Pat. No. 12,043,781.

(30) Foreign Application Priority Data

Apr. 9, 2020 (EP) .................................... 20168884

(51) Int. Cl.

| | |
|---|---|
| ***G02F 1/1333*** | (2006.01) |
| ***C09K 19/30*** | (2006.01) |
| ***C09K 19/34*** | (2006.01) |
| ***C09K 19/54*** | (2006.01) |
| *C09K 19/02* | (2006.01) |
| *C09K 19/04* | (2006.01) |

(52) U.S. Cl.

CPC ...... *C09K 19/3098* (2013.01); *C09K 19/3402* (2013.01); *C09K 19/3491* (2013.01); *C09K 19/542* (2013.01); *C09K 19/0208* (2013.01); *C09K 2019/0466* (2013.01); *C09K 2019/3422* (2013.01); *C09K 2019/548* (2013.01)

(58) Field of Classification Search

CPC ............ G02F 1/1333; C09K 2019/548; C09K 2019/0466; C09K 2019/3422

See application file for complete search history.

(56) References Cited

U.S. PATENT DOCUMENTS

| | | | | |
|---|---|---|---|---|
| 5,213,710 | A | 5/1993 | Reiffenrath et al. | |
| 6,689,291 | B1 | 2/2004 | Reiffenrath et al. | |
| 9,605,206 | B2 | 3/2017 | Jeong et al. | |
| 10,459,292 | B2 | 10/2019 | Park et al. | |
| 12,043,781 | B2 * | 7/2024 | Laut | C09K 19/3098 |
| 2002/0166994 | A1 | 11/2002 | Kondo et al. | |
| 2016/0200976 | A1 | 7/2016 | Jeong et al. | |
| 2016/0215214 | A1 | 7/2016 | Jeong et al. | |
| 2017/0002267 | A1 | 1/2017 | Lee et al. | |
| 2019/0185748 | A1 | 6/2019 | Liao | |
| 2020/0385636 | A1 | 12/2020 | Manabe et al. | |
| 2024/0228877 | A1 * | 7/2024 | Han | C09K 19/3003 |
| 2024/0368471 | A1 * | 11/2024 | Laut | C09K 19/542 |

FOREIGN PATENT DOCUMENTS

| | | | |
|---|---|---|---|
| CN | 1237952 | A | 12/1999 |
| CN | 105778927 | A | 7/2016 |
| CN | 105820824 | A | 8/2016 |
| CN | 106318406 | A | 1/2017 |
| CN | 109943351 | A | 6/2019 |
| CN | 113072957 | A | 7/2021 |
| CN | 113072959 | A | 7/2021 |
| CN | 113072960 | A | 7/2021 |
| DE | 4113424 | C1 | 8/1992 |
| DE | 4203719 | A1 | 8/1993 |
| DE | 4411806 | A1 | 10/1994 |
| TW | 201920617 | A | 9/2018 |
| WO | 19048444 | A1 | 3/2019 |

OTHER PUBLICATIONS

Extended EP search report in corresponding EP21166936.1 dated Sep. 21, 2021 (pp. 1-7).

Office Action issued in corresponding Taiwan Application No. 110112645 on May 22, 2024.

* cited by examiner

*Primary Examiner* — Geraldina Visconti

(74) *Attorney, Agent, or Firm* — Csaba Henter; MILLEN, WHITE, ZELANO & BRANIGAN

(57) ABSTRACT

Liquid-crystalline (LC) media having positive dielectric anisotropy and liquid-crystal displays (LCDs) containing these media, especially displays addressed by an active matrix and in particular to LC displays of the TN, PS-TN, STN, TN-TFT, OCB, IPS, PS-IPS, FFS, HB-FFS, XB-FFS, PS-FFS, SA-HB-FFS, SA-XB-FFS, polymer stabilised SA-HB-FFS, polymer stabilised SA-XB-FFS, positive VA or positive PS-VA type.

26 Claims, No Drawings

LIQUID-CRYSTALLINE MEDIUM

This application is a Divisional of copending application Ser. No. 17/225,223, filed on Apr. 8, 2021, which issued as U.S. Pat. No. 12,043,781, and which claims priority under 35 U.S.C. § 119(a) to Application No. 20168884.3, filed in Europe on Apr. 9, 2020, which is hereby expressly incorporated by reference into the present application.

Aspects of the present invention include liquid-crystalline (LC) media having positive dielectric anisotropy and to liquid-crystal displays (LCDs) containing these media, especially to displays addressed by an active matrix and in particular to LC displays of the TN, PS-TN, STN, TN-TFT, OCB, IPS, PS-IPS, FFS, HB-FFS, XB-FFS, PS-FFS, SA-HB-FFS, SA-XB-FFS, polymer stabilised SA-HB-FFS, polymer stabilised SA-XB-FFS, positive VA or positive PS-VA type.

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is generated substantially perpendicular to the substrates and the liquid-crystal layer.

Besides these modes, there are also electro-optical modes that utilise an electric field which is substantially parallel to the substrates or the liquid-crystal layer. For example, WO 91/10936 discloses a liquid-crystal display in which the electric signals are generated in such a way that the electric fields have a significant component parallel to the liquid-crystal layer, and which has since then become known as in-plane switching IPS) display. The principles of operating such a display are described, for example, by R. A. Soref in Journal of Applied Physics, Vol. 45, No. 12, pp. 5466-5468 (1974).

IPS displays contain an LC layer between two substrates with planar orientation, where the two electrodes are arranged on only one of the two substrates and preferably have interdigitated, comb-shaped structures. On application of a voltage to the electrodes an electric field with a significant component parallel to the LC layer is generated between them. This causes realignment of the LC molecules in the layer plane.

EP 0 588 568, for example, discloses various possibilities for the design of the electrodes and for addressing an IPS display. DE 198 24 137 likewise describes various embodiments of such IPS displays.

Liquid-crystalline materials for IPS displays of this type are described, for example, in DE 195 28 104.

Furthermore, so-called "fringe-field switching" (FFS) displays have been reported (see, inter alia, S. H. Jung et al., Jpn. J. Appl. Phys., Volume 43, No. 3, 2004, 1028), which contain two electrodes on the same substrate, one of which is structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

Liquid-crystal displays of the IPS and FFS electro-optical mode are in particular suitable for use in modern desktop monitors, TV sets and multi-media applications. The liquid-crystalline media according to the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

A further improvement has been achieved by the HB-FFS mode. One of the unique features of the HB-FFS mode in contrast to the traditional FFS technology is that it enables higher transmittance which allows operation of the panel with less energy consumption.

Another recently developed mode is the XB-FFS mode, wherein the liquid-crystalline medium additionally contains a polar liquid crystal compound with low dielectric anisotropy.

Liquid-crystal compositions which are suitable for LCDs and especially for FFS and IPS displays are known in prior art, for example, from JP 07-181 439 (A), EP 0 667 555, EP 0 673 986, DE 195 09 410, DE 195 28 106, DE 195 28 107, WO 96/23 851 and WO 96/28 521. However, these compositions have certain disadvantages. Amongst other deficiencies, most of them result in disadvantageously long addressing times, have inadequate values of the resistivity and/or require excessively high operating voltages. Both an improvement in the operating properties and also in the shelf life are necessary here.

FFS and IPS displays can be operated as active-matrix displays (AMD) or passive-matrix displays (PMD). In the case of active-matrix displays individual pixels are usually addressed by integrated, non-linear active elements such as, for example, thin-film transistors (TFTs), while in the case of passive-matrix displays individual pixels are usually addressed by the multiplex method as known from the prior art.

The displays according to the present invention are preferably operated by an active matrix, preferably by a matrix of TFT. However, the liquid crystals according to the invention can also advantageously be used in displays having other known addressing means.

Typical applications of in-plane switching (IPS) and fringe field switching (FFS) technologies are monitors, notebooks, televisions, mobile telephones, tablet PCs, etc.

Both the IPS and the FFS technology have certain advantages over other LCD technologies, such as, for example, the vertical alignment (VA) technology, e.g. a broad viewing angle dependency of the contrast.

The provision of further liquid-crystalline media and the use thereof in a display having high transmission, a good black state and a high contrast ratio is a central challenge for modern FFS and IPS applications. In addition, modern applications also require good low-temperature stability and fast addressing times.

The invention has an object of providing liquid-crystalline media, in particular for FFS and IPS displays, but also for TN, positive VA or STN displays, and in particular for active-matrix displays like those addressed by TFTs, which do not exhibit the disadvantages indicated above or only do so to a lesser extent and preferably have high specific resistance, low threshold voltage, high dielectric anisotropy, a good low temperature stability (LTS), fast response times and low rotational viscosities, and enable high brightness.

This was achieved by providing liquid-crystalline media as described and claimed hereinafter.

In case of FFS displays there is a need for further optimization of response time, contrast, brightness and reliability. However, it was found that the liquid-crystalline materials of the prior art do often not achieve all these requirements at the same time.

It has now been surprisingly found that liquid-crystalline media according to the present invention which contain compounds of formula I and particularly when in combination with compounds of the formulae Z show several improvements, especially when being used in FFS mode displays, like a good solubility and a low ratio of $\gamma_1/K_1$, and enable fast response times.

The liquid-crystal media according to the present invention are especially suitable for use in liquid-crystal displays of the FFS, HB-FFS, XB-FFS and IPS mode based on dielectrically positive liquid crystals, and polymer stabilised variants thereof.

The invention relates, for example, to a liquid-crystalline medium, characterised in that it has positive dielectric anisotropy and comprises one or more compounds of formula I

I

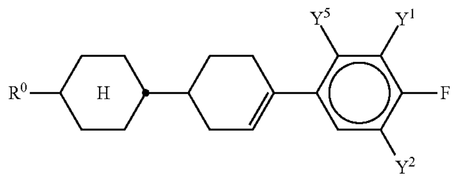

in which the individual radicals, on each occurrence identically or differently, and each, independently of one another, have the following meaning:

$R^0$ a straight chain, branched or cyclic alkyl or alkoxy radical that is unsubstituted or halogenated, preferably by F or Cl, and has 1 to 15 C atoms, where one or more $CH_2$ groups in these radicals may each be replaced, independently of one another, by

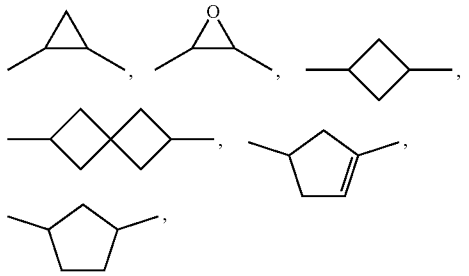

—C≡C—, —$CF_2$O—, —O$CF_2$—, —CH=CH—, —O—, —CO—O— or —O—CO— in such a way that O atoms are not linked directly to one another, $Y^1$, $Y^2$ H, F or Cl, preferably H or F, very preferably F, with at least one of $Y^1$ and $Y^2$ being different from H, $Y^5$ H or $CH_3$, preferably H.

The invention further relates to the use of a liquid-crystalline medium as described above and below for electro-optical purposes, in particular for the use in liquid-crystal displays, shutter glasses, LC windows, 3D applications, preferably in TN, PS-TN, STN, TN-TFT, OCB, IPS, PS-IPS, FFS, HB-FFS, XB-FFS, PS-HB-FFS, PS-XB-FFS, SA-HB-FFS, SA-XB-FFS, polymer stabilised SA-HB-FFS, polymer stabilised SA-XB-FFS, positive VA and positive PS-VA displays, very preferably in FFS, HB-FFS, IPS, PS-HB-FFS and PS-IPS displays.

The invention further relates to an electro-optical liquid-crystal display containing a liquid-crystalline medium as described above and below, in particular a TN, PS-TN, STN, TN-TFT, OCB, IPS, PS-IPS, FFS, HB-FFS, XB-FFS, PS-HB-FFS, PS-XB-FFS, SA-HB-FFS, SA-XB-FFS, polymer stabilised SA-HB-FFS, polymer stabilised SA-XB-FFS, positive VA or positive PS-VA display, preferably a FFS, HB-FFS, IPS, PS-HB-FFS or PS-IPS display.

In the present application, all atoms also include their isotopes. In a preferred embodiment one or more hydrogen atoms (H) are replaced by deuterium (D); a high degree of deuteration enables or simplifies analytical determination of compounds, in particular in the case of low concentrations.

In the formulae above and below, halogenated means that one or more hydrogen atoms on one or more carbon atoms are replaced by a halogen atom. The halogen atoms are preferably F or Cl.

In the formulae above and below, if $R^0$, $R^1$ or $R^2$ denotes an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy. $R^0$ preferably denotes straight-chain alkyl having 2-6 C atoms.

Oxaalkyl preferably denotes straight-chain 2-oxapropyl (=methoxymethyl), 2- (=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxa-decyl.

If $R^0$, $R^1$ or $R^2$ denotes an alkoxy or oxaalkyl group it may also contain one or more additional oxygen atoms, provided that oxygen atoms are not linked directly to one another.

In another preferred embodiment, one or more of $R^0$, $R^1$ and $R^2$ are selected from the group consisting of

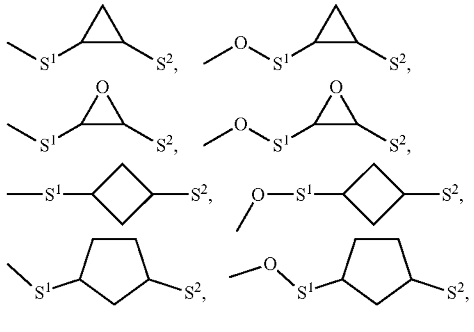

—$S^1$—F, —O—$S^1$—F, —O—$S_1$—O—$S_2$, wherein $S^1$ is $C_{1-12}$-alkylene or $C_{2-12}$-alkenylene and $S^2$ is H, $C_{1-12}$-alkyl or $C_{2-12}$-alkenyl, and very preferably one or more of $R^0$, $R^1$ and $R^2$ are selected from the group consisting of

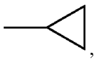

-continued

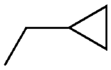

,

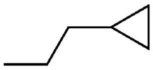

,

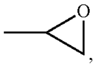

,

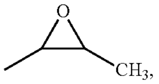

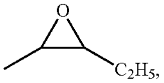

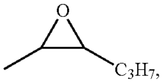

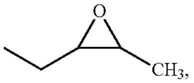

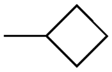

,

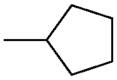

,

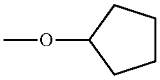

,

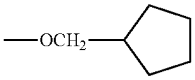

,

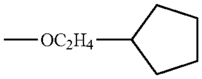

, $—OCH_2OCH_3$, $—O(CH_2)_2OCH_3$, $—O(CH_2)_3OCH_3$, $—O(CH_2)_4OCH_3$, $—O(CH_2)_2F$, $—O(CH_2)_3F$, $—O(CH_2)_4F$.

If $R^0$, $R^1$ or $R^2$ denotes an alkyl radical in which one $CH_2$ group has been replaced by —CH═CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If $R^0$, $R^1$ or $R^2$ denotes an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, $X^0$ is preferably F, Cl or a mono- or polyfluorinated alkyl or alkoxy radical having 1, 2 or 3 C atoms or a mono- or polyfluorinated alkenyl radical having 2 or 3 C atoms. $X^0$ is particularly preferably F, Ck, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$,0 $OCF_2CF_2CClF_2$, $OCClFCF_2CF_3$, $OCH═CF_2$ or $CH═CF_2$, very particularly preferably F or $OCF_3$, furthermore $CF_3$, $OCF═CF_2$, $OCHF_2$ or $OCH═CF_2$.

In the LC media according to the present invention the use of compounds of formula I together with compounds of formulae Z1 to Z3 or their subformulae enables to achieve an increased value of $\varepsilon_\perp$ and at the same time a decrease of the rotational viscosity and the ratios of $\gamma_1/K_2$ and $\gamma_1/K_1$, and thus fast response times.

In the compounds of formula I and its subformulae $R^0$ preferably denotes straight-chain alkyl or alkoxy having 1 to 6 C atoms, very preferably methyl, ethyl or propyl, most preferably n-propyl.

Preferred compounds of formula I are those wherein $Y^1$ and $Y^2$ denote F or Cl, very preferably F.

Very preferred compounds of formula I are those selected from the group consisting of the following subformulae

I1

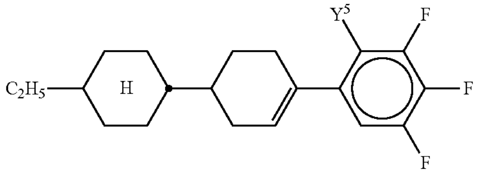

I2

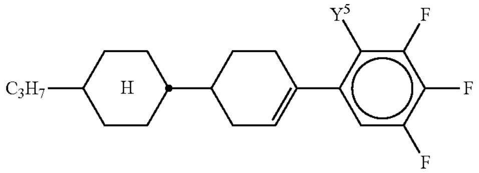

I3

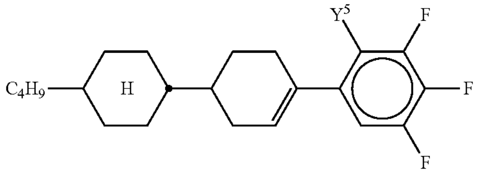

I4

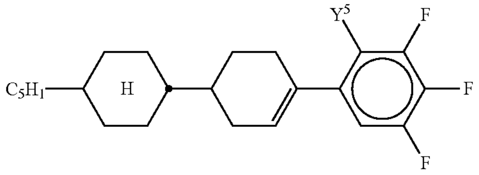

I5

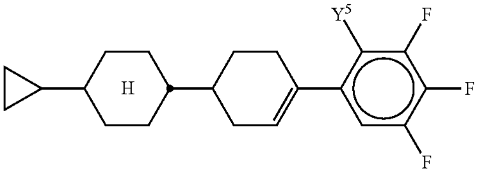

I6

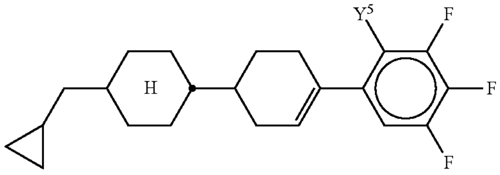

-continued

I7

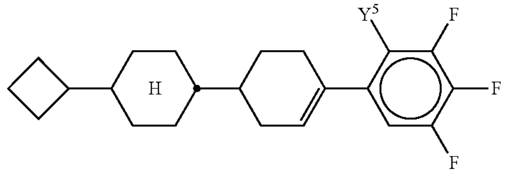

I8

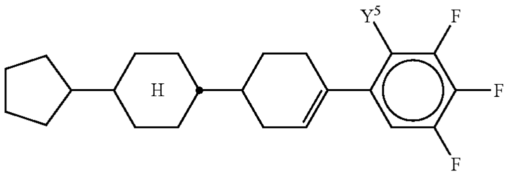

I9

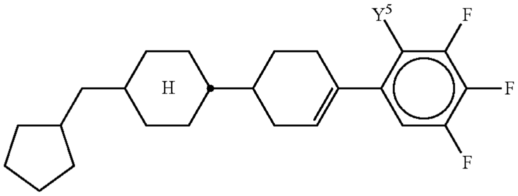

wherein $Y^5$ is H or $CH_3$, preferably H.

Very preferred are the compounds of formulae I1, I2, I3 and I4, most preferred is the compound formula I2.

The proportion of the compounds of formula I or its subformulae in the medium is preferably from 2 to 35%, very preferably from 3 to 30%, most preferably from 4 to 20% by weight.

Preferably the medium contains 1, 2 or 3 compounds of formula I or its subformulae.

Preferably the medium contains, in addition to the compounds of formula I, one or more compounds selected from the following formulae

Z1

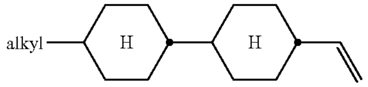

Z2

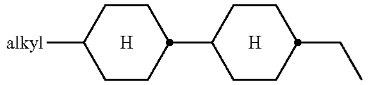

Z3

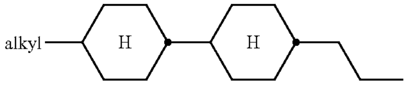

wherein "alkyl" is $C_{1-6}$-alkyl, and preferably denotes propyl, butyl or pentyl, very preferably propyl or butyl. Very preferred are compounds of formula Z1.

Preferred compounds of formula Z1, Z2 and Z3 are those selected from the following subformulae

Z1-1

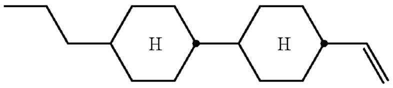

-continued

Z1-2

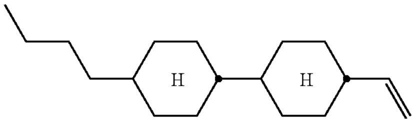

Z1-3

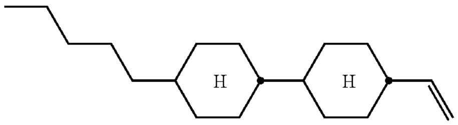

Z2-1

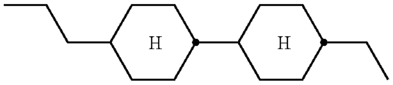

Z2-1

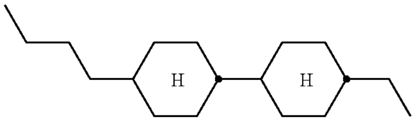

Z2-3

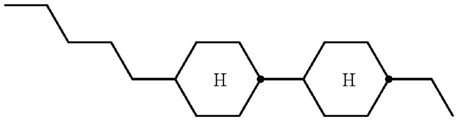

Z3-1

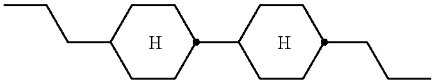

Z3-2

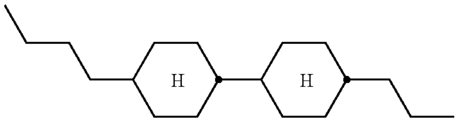

Z3-3

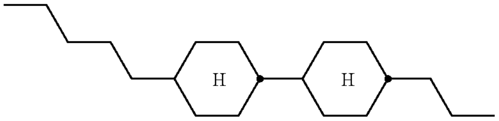

Very preferred are compounds of formula Z1-1 and Z2-1.

In another preferred embodiment the medium contains one or more compounds of formula Z1 or its preferred subformulae and one or more compounds selected from formulae Z2 and Z3 or their preferred subformulae.

Preferably the total proportion of compounds of formula Z1, Z2 and Z3 or their subformulae in the medium is from 10 to 65%, very preferably from 15 to 60%, most preferably from 20 to 55% by weight.

Preferably the medium contains 1, 2 or 3 compounds selected from the formulae Z1, Z2 and Z3 or their subformulae.

In a first preferred embodiment according to the present invention, the LC medium contains, in addition to the compounds of formula I, one or more compounds selected from the formulae Y and B

Y

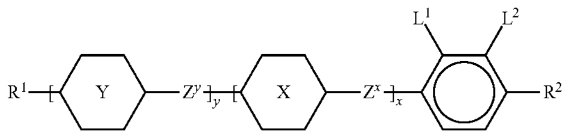

B

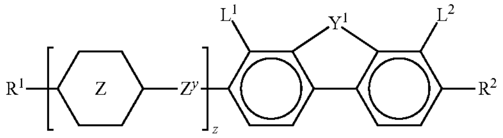

in which the individual radicals, on each occurrence identically or differently, and each, independently of one another, have the following meaning:

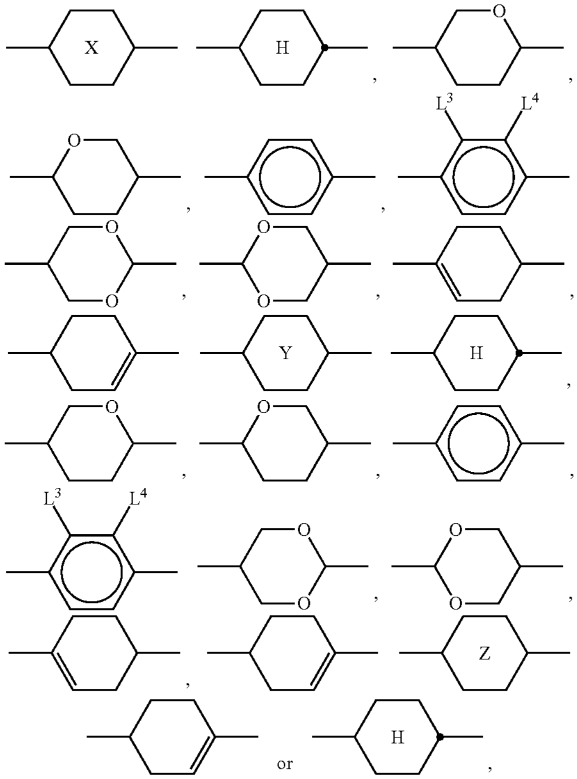

$R^1$, $R^2$ one of the meanings given for $R^0$ in formula I, $R^3$ one of the meanings given for $R^1$, or $X^1$, $X^1$ fluorinated alkyl or alkoxy with 1, 2 or 3 C atoms, preferably $CF_3$ or $OCF_3$, $Z^x$, $Z^y$ $-CH_2CH_2-$, $-CH{=}CH-$, $-CF_2O-$, $-OCF_2-$, $-CH_2O-$, $-OCH_2-$, $-CO-O-$, $-O-CO-$, $-C_2F_4-$, $-CF{=}CF-$, $-CH{=}CH-CH_2O-$, or a single bond, preferably a single bond, $Z^z$ $CH_2O$ or a single bond, $Y^1$ O or S, $L^{1-4}$ H, F or Cl, preferably H or F, very preferably F, x, y 0, 1 or 2, with $x+y \leq 3$, z 0 or 1, wherein in formula B the dibenzofuran or dibenzothiophene group may also be further substituted by a methyl or methoxy group, and wherein the compounds of formula Y contain at least one substituent $L^{1-4}$ that is F or Cl, preferably F.

Preferably the LC medium according to this first preferred embodiment contains one or more compounds of formula I, one or more compounds selected from formulae Z1, Z2 and Z3, and one or more compounds selected from formulae Y and B.

The LC media according to this first preferred embodiment are especially suitable for use in LC displays of the HB-FFS or PS-HB-FFS mode.

In a second preferred embodiment according to the present invention, the LC medium does not contain a compound of the formulae Y or B.

In the compounds of formula Y and its subformulae, $R^1$ and $R^2$ preferably denote straight-chain alkyl or alkoxy having 1 to 6 C atoms, furthermore alkenyl having 2 to 6 C atoms, in particular vinyl, 1E-propenyl, 1E-butenyl, 3-butenyl, 1E-pentenyl, 3E-pentenyl or 4-pentenyl.

In the compounds of formula Y and its subformulae, preferably both radicals $L^1$ and $L^2$ denote F. In another preferred embodiment of the present invention, in the compounds of formula Y and its subformulae one of the radicals $L^1$ and $L^2$ denotes F and the other denotes Cl.

In a preferred embodiment of the present invention the medium contains one or more compounds of formula Y selected from the following subformulae

Y1

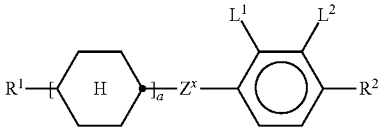

Y2

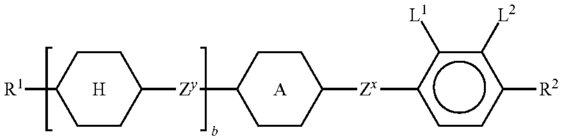

wherein $L^1$, $L^2$, $R^1$, $R^2$, $Z^x$, $Z^y$, x and y have the meanings given in formula Y or one of the preferred meanings given above and below, a denotes 1 or 2, b denotes 0 or 1,

denotes

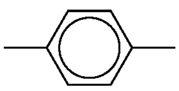

or

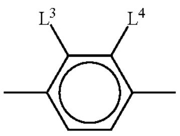

$L^3$, $L^4$ denote F or Cl, preferably F.

Preferably, in the compounds of formula $Y^1$ and $Y^2$ both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.
Preferably the medium comprises one or more compounds of the formula $Y^1$ selected from the group consisting of the following subformulae
Y1-1
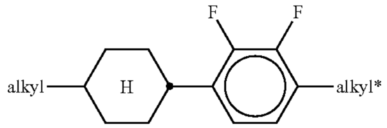
Y1-2
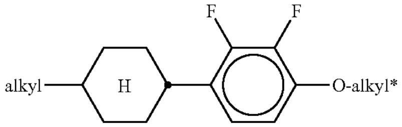
Y1-3
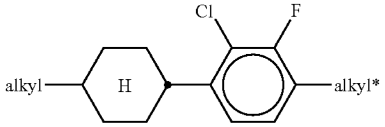
Y1-4
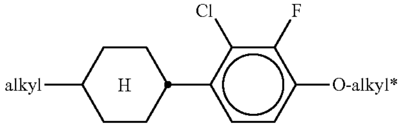
Y1-5
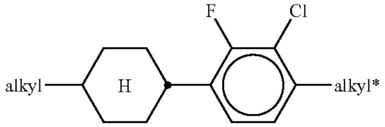
Y1-6
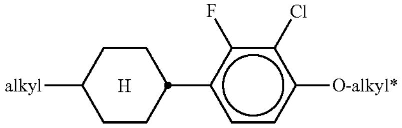
Y1-7
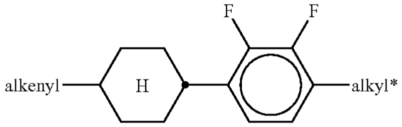
Y1-8
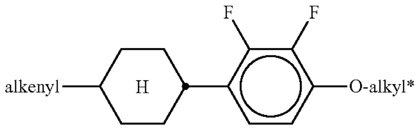
Y1-9
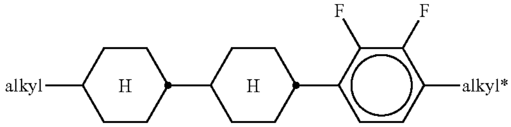
Y1-10
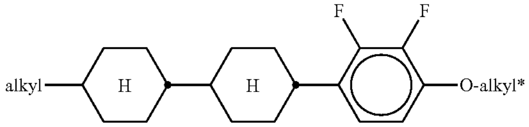
-continued
Y1-11
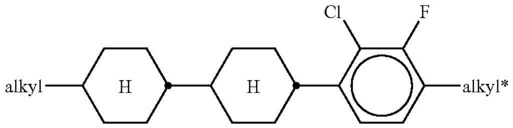
Y1-12
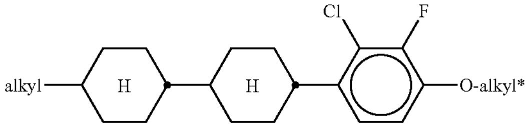
Y1-1
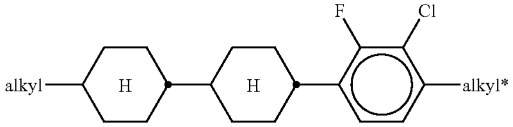
Y1-14
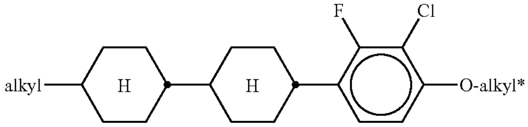
Y1-15
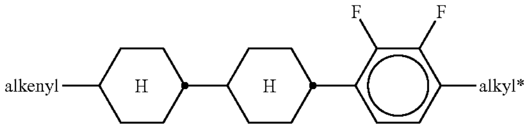
Y1-16
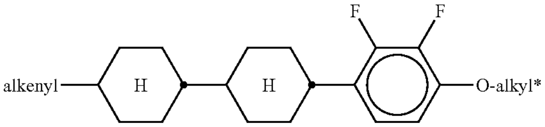
Y1-17
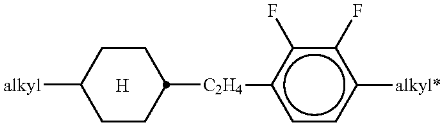
Y1-18
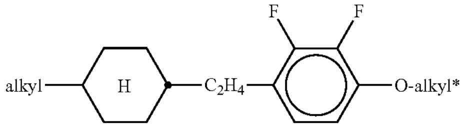
Y1-19
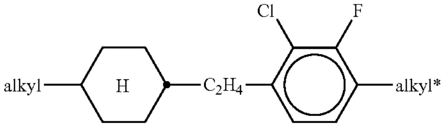
Y1-20
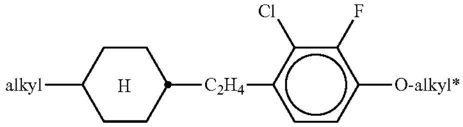

-continued
Y1-21
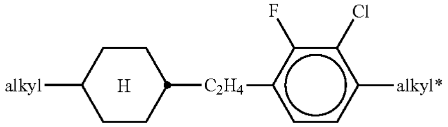
Y1-22
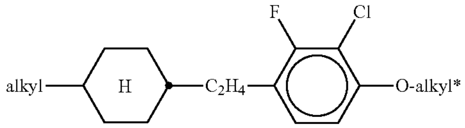
Y1-23
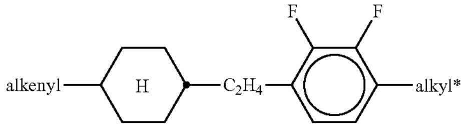
Y1-24
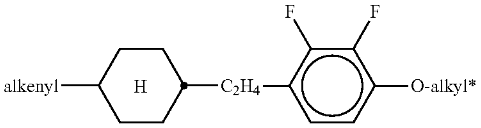
Y1-25
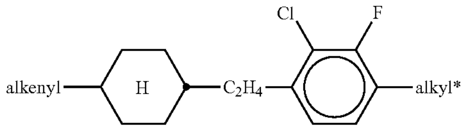
Y1-26
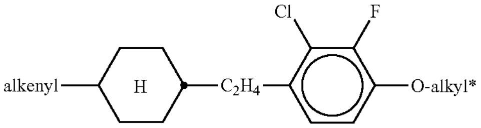
Y1-27
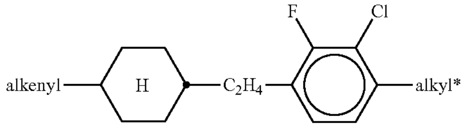
Y1-28
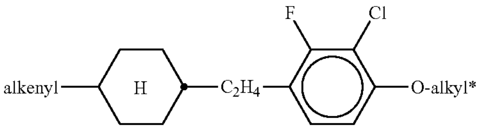
Y1-29
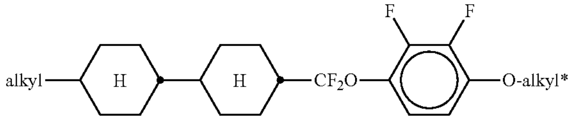
Y1-30
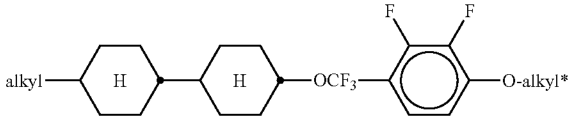
Y1-31
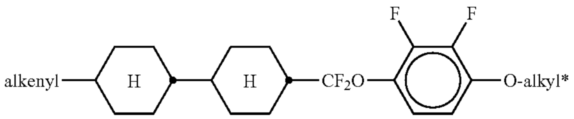
-continued
Y1-32
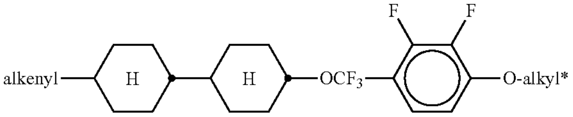
Y1-33
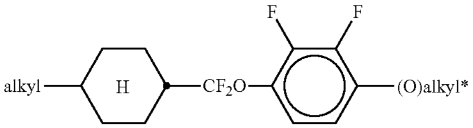
Y1-34
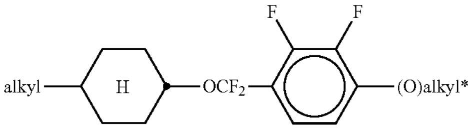
Y1-35
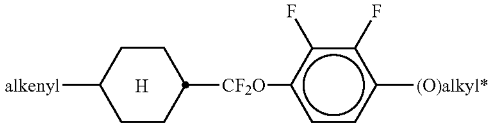
Y1-36
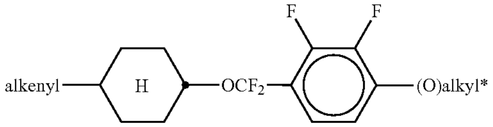
Y1-37
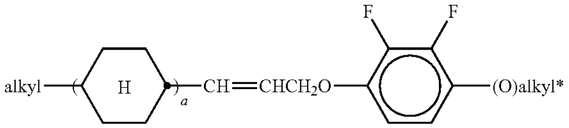
Y1-38
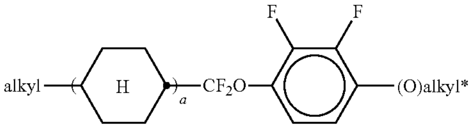
Y1-39
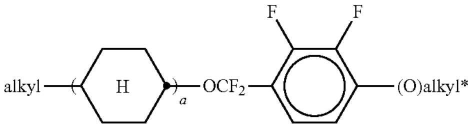
Y1-40
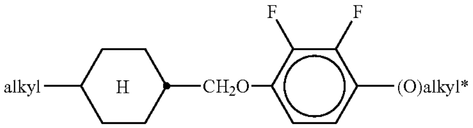
Y1-41
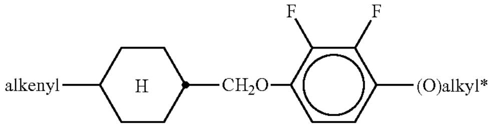

-continued

Y1-42

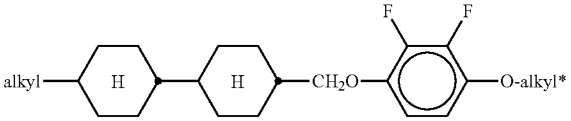

Y1-43

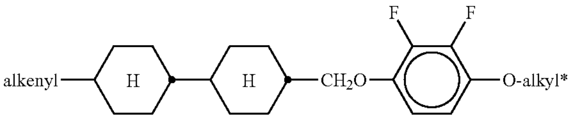

in which a denotes 1 or 2, "alkyl" and "alkyl*" each, independently of one another, denote a straight-chain alkyl radical having 1-6 C atoms, and "alkenyl" denotes a straight-chain alkenyl radical having 2-6 C atoms, and (O) denotes an oxygen atom or a single bond. "alkenyl" preferably denotes $CH_2{=}CH—$, $CH_2{=}CHCH_2CH_2—$, $CH_3—CH{=}CH—$, $CH_3—CH_2—CH{=}CH—$, $CH_3—(CH_2)_2—CH{=}CH—$, $CH_3—(CH_2)_3—CH{=}CH—$ or $CH_3—CH{=}CH—(CH_2)_2—$.

Very preferably the medium contains one or more compounds of formula $Y^1$ selected from formulae Y1-2 and Y1-10.

Further preferably the medium comprises one or more compounds of the formula Y2 selected from the group consisting of the following subformulae:

Y2-1

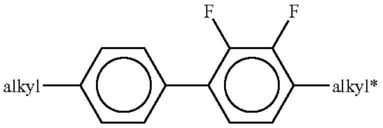

Y2-2

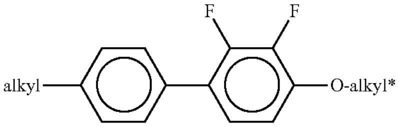

Y2-3

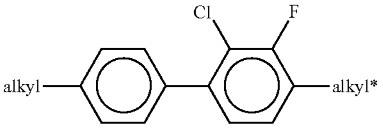

Y2-4

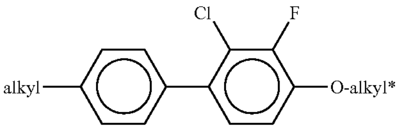

Y2-5

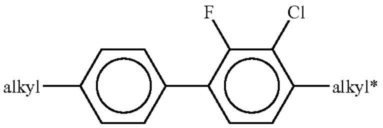

Y2-6

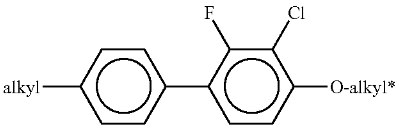

-continued

Y2-7

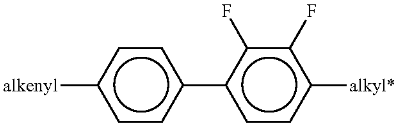

Y2-8

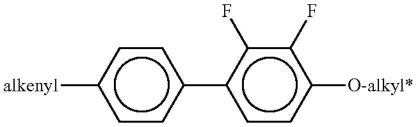

Y2-9

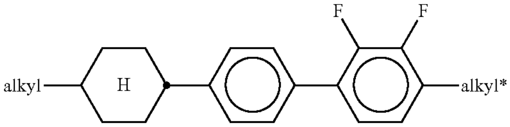

Y2-10

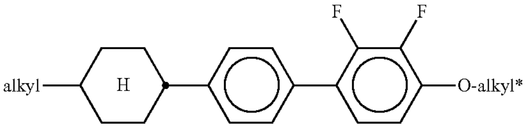

Y2-11

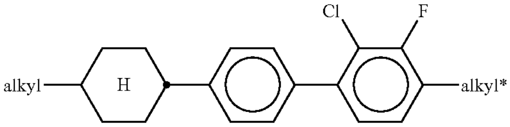

Y2-12

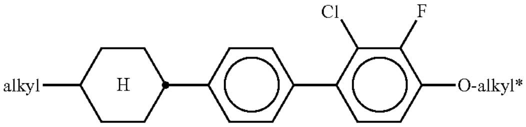

Y2-13

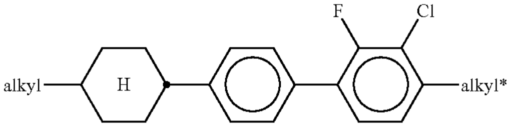

Y2-14

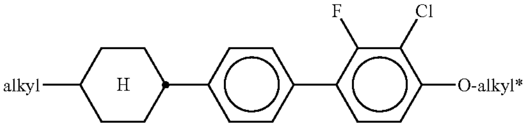

Y2-15

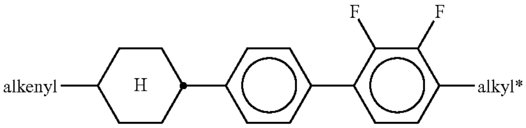

Y2-16

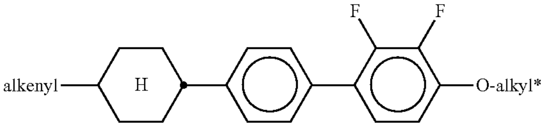

-continued

Y2-17

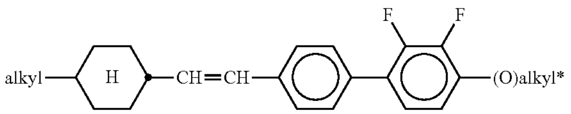

Y2-18

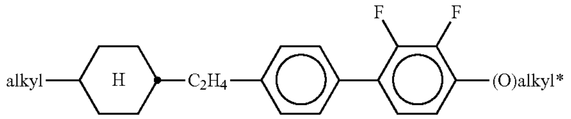

Y2-19

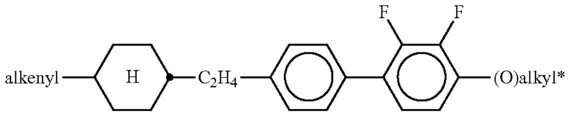

Y2-20

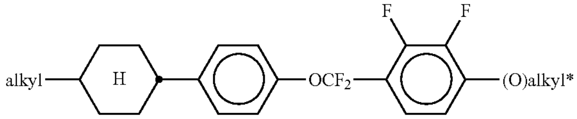

Y2-21

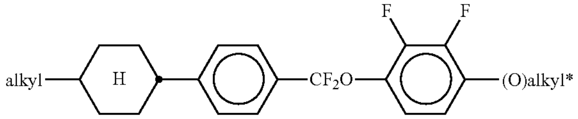

Y2-22

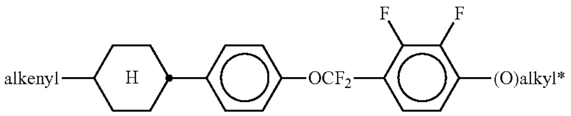

Y2-23

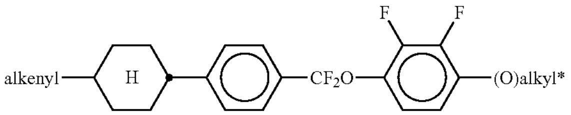

in which "alkyl" and "alkyl*" each, independently of one another, denote a straight-chain alkyl radical having 1-6 C atoms, and "alkenyl" denotes a straight-chain alkenyl radical having 2-6 C atoms, and (O) denotes an oxygen atom or a single bond. "alkenyl" preferably denotes $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Very preferably the medium contains one or more compounds of formula $Y^2$ selected from formulae Y2-2 and Y2-10.

The proportion of the compounds of formula Y1 or its subformulae in the medium is preferably from 1 to 10% by weight.

The proportion of the compounds of formula Y2 or its subformulae in the medium is preferably from 1 to 10% by weight.

The total proportion of the compounds of formula Y1 and Y2 or their subformulae in the medium is preferably from 1 to 20%, very preferably from 2 to 15% by weight.

Preferably the medium contains 1, 2 or 3 compounds of formula Y1 and Y2 or their subformulae, very preferably selected from formulae Y1-2, Y1-10, Y1-40, Y1-42, Y2-2 and Y2-10.

In another preferred embodiment of the present invention the medium contains one or more compounds of formula Y selected from the following subformula

Y3

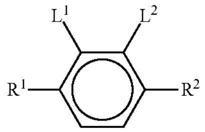

wherein $L^1$, $L^2$, $R^1$ and $R^2$ have one of the meanings given in formula Y or one of the preferred meanings as given above and below.

Preferred compounds of the formula Y3 are selected from the group consisting of the following subformulae

Y3-1

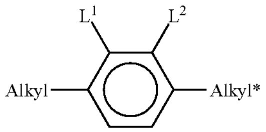

Y3-2

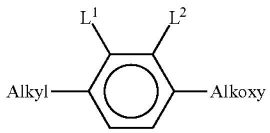

Y3-3

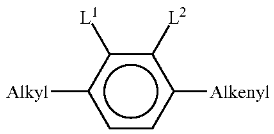

Y3-4

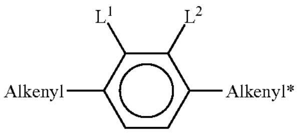

Y3-5

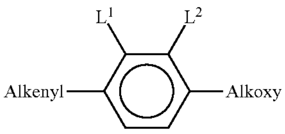

Y3-6

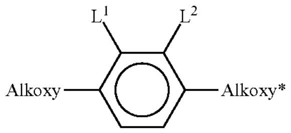

Y3-7

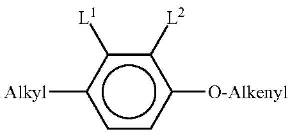

-continued

Y3-8

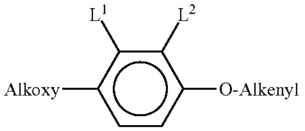

Y3-9

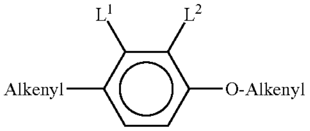

Y3-10

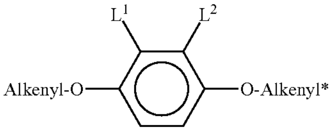

in which, "Alkyl" and "Alkyl*" each, independently of one another, denote a straight-chain alkyl radical having 1-6 C atoms, "Alkoxy" denotes a straight-chain alkoxy radical having 1-6 C atoms, "Alkenyl" and "Alkenyl*" each, independently of one another, denote a straight-chain alkenyl radical having 2-6 C atoms, and O denotes an oxygen atom or a single bond. "Alkenyl" and "Alkenyl*" preferably denote $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

Particularly preferred compounds of the formula Y3 are selected from the group consisting of following subformulae:

Y3-6A

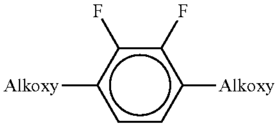

Y3-6B

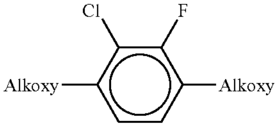

wherein "Alkoxy" preferably denotes straight-chain alkoxy with 3, 4, or 5 C atoms.

Preferably in the compounds of formula Y3 and its subformulae both $L^1$ and $L^2$ denote F. Further preferably in the compounds of formula Y3 one of the radicals $L^1$ and $L^2$ denotes F and the other denotes Cl.

The proportion of the compounds of formula Y3 or its subformulae in the medium is preferably from 1 to 10%, very preferably from 1 to 6% by weight.

Preferably the medium contains 1, 2 or 3 compounds of formula Y3 or its subformulae, preferably of formula Y3-6, very preferably of formula Y3-6A.

In another preferred embodiment the present invention the medium contains one or more compounds of formula Y selected from the subformula $Y^4$

Y4

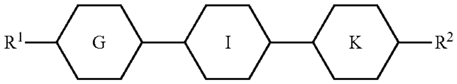

in which $R^1$ and $R^2$ each, independently of one another, have one of the meanings indicated above, and

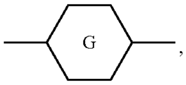, 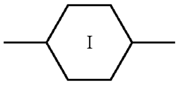 and

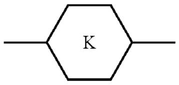

each, independently of one another, denote

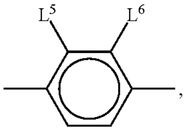, 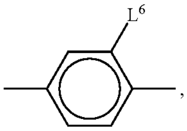,

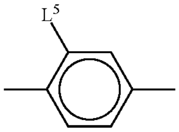 or 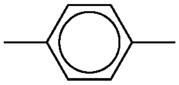

in which $L^5$ denotes F or Cl, preferably F, and $L^6$ denotes F, Cl, $OCF_3$, $CF_3$, $CH_3$, $CH_2F$ or $CHF_2$, preferably F, and preferably at least one of the rings G, I and K is different from unsubstituted benzene.

Preferred compounds of the formula Y4 are selected from the group consisting of the following sub-formulae:

Y4-1

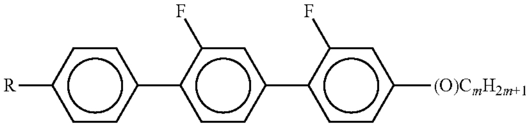

Y4-2

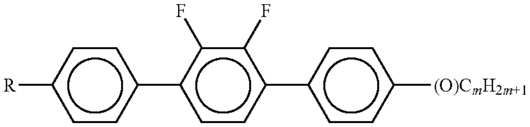

Y4-3

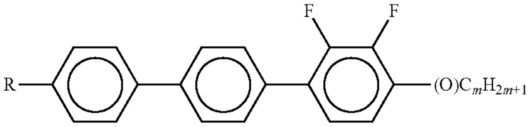

Y4-4

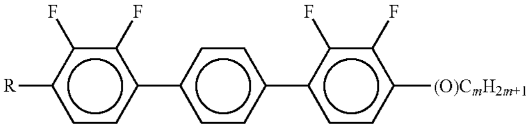

-continued
Y4-5
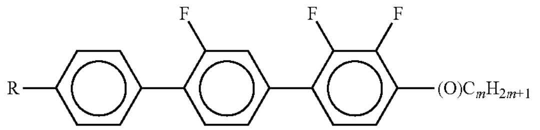
Y4-6
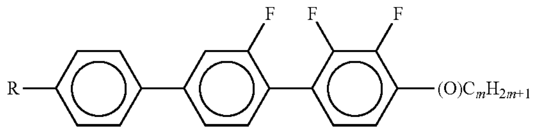
Y4-7
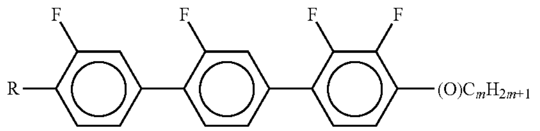
Y4-8
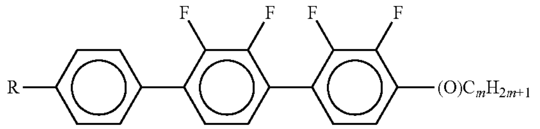
Y4-9
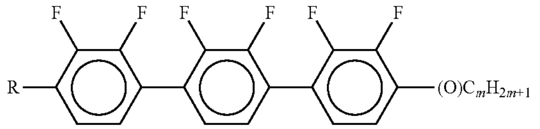
Y4-10
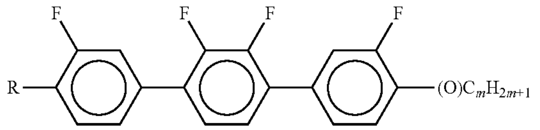
Y4-11
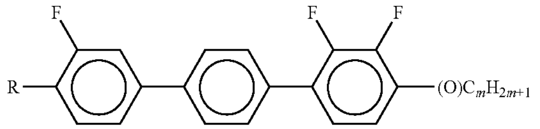
Y4-12
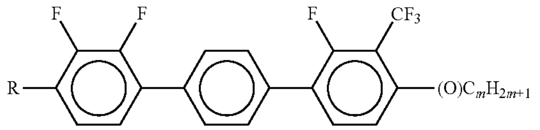
Y4-13
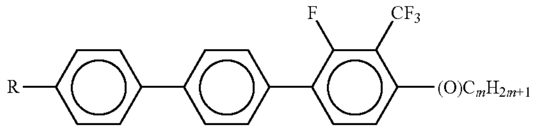
Y4-14
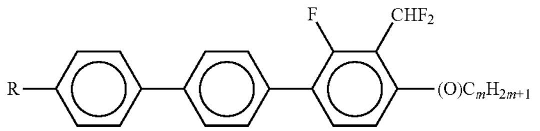
-continued
Y4-15
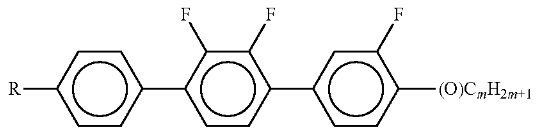
Y4-16
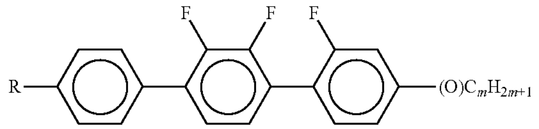
Y4-17
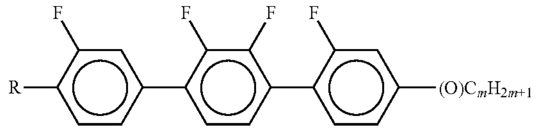
Y4-18
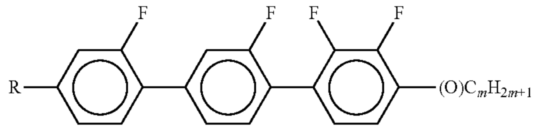
Y4-19
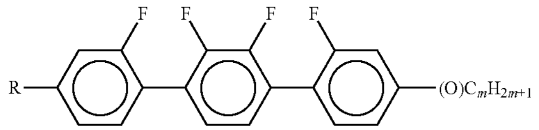
Y4-20
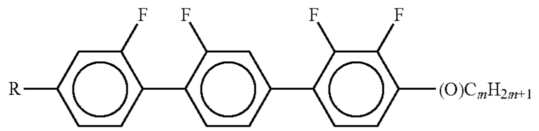
Y4-21
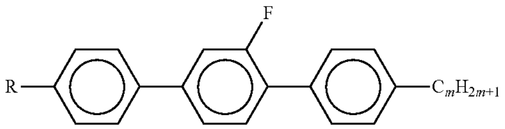
Y4-22
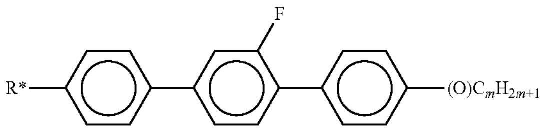
Y4-23
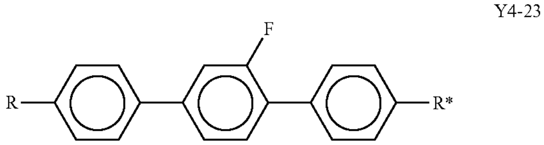
Y4-24
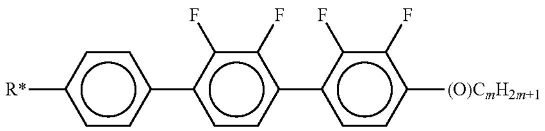
in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The proportion of the compounds of formula Y4 or its subformulae in the medium is preferably from 1 to 10%, very preferably from 1 to 6% by weight.

Preferably the medium contains 1, 2 or 3 compounds of formula Y4 or its subformulae, preferably of formula Y4-1, Y4-2, Y4-3 or Y4-21, wherein R preferably denotes alkyl, furthermore alkoxy, each having 1-5 C atoms.

In another preferred embodiment the present invention the medium contains one or more compounds of formula Y selected from the group consisting of the following subformulae

Y5

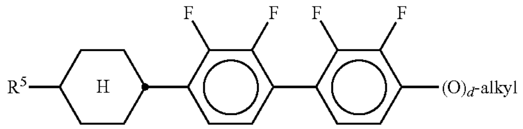

Y6

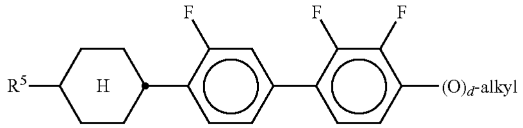

Y7

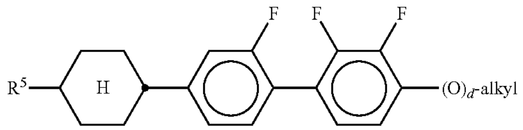

Y8

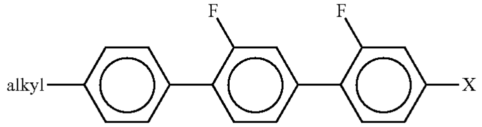

Y9

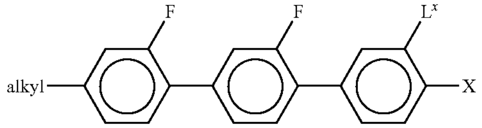

Y10

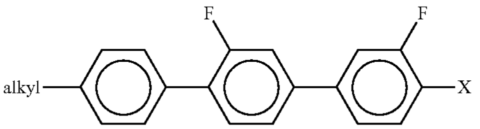

Y11

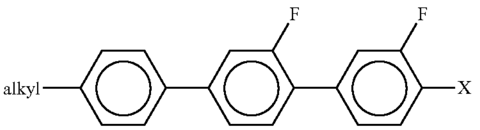

in which $R^5$ has one of the meanings indicated above for $R^1$, "alkyl" denotes a straight-chain alkyl radical having 1-6 C atoms, $L^x$ denotes H or F, X denotes F, Cl, $OCF_3$, $OCHF_2$ or $OCH=CF_2$, d denotes 0 or 1, and z and m each, independently of one another, denote an integer from 1 to 6.

$R^5$ in these compounds is particularly preferably $C_{1-6}$-alkyl or -alkoxy or $C_{2-6}$-alkenyl, d is preferably 1. X in these compounds is particularly preferably F. The LC medium according to the invention preferably comprises one or more compounds of the above-mentioned formulae in amounts of ≥5% by weight.

In the compounds of formula B and its subformulae, $R^1$ and $R^2$ preferably denote straight-chain alkyl or alkoxy having 1 to 6 C atoms, in particular methoxy, ethoxy, propoxy or butoxy, furthermore alkenyl having 2 to 6 C atoms, in particular vinyl, 1E-propenyl, 1E-butenyl, 3-butenyl, 1E-pentenyl, 3E-pentenyl or 4-pentenyl.

In a preferred embodiment of the present invention the medium contains one or more compounds of formula B selected from the following subformulae

B1

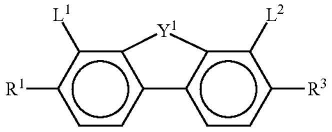

B2

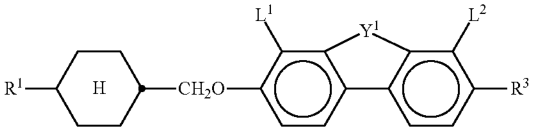

B3

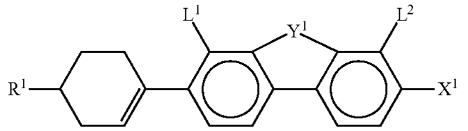

wherein $L^1$, $L^2$, $R^1$, $R^3$ and $X^1$ have the meanings given in formula B or one of the preferred meanings given above and below.

Preferred compounds of formula B1 are selected from the following subformulae:

B1-1

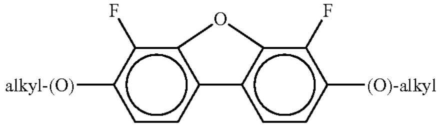

B1-2

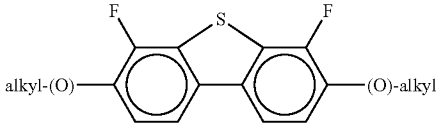

wherein "alkyl" denotes a straight-chain alkyl radical having 1-6 C atoms, and (O) denotes an oxygen atom or a single bond. Very preferred are compounds of formula B1-1 and B1-2 wherein both groups (O) denote an oxygen atom and "alkyl" is methyl, ethyl, propyl, butyl, pentyl or hexyl, which are preferably straight-chained. Very preferably one "alkyl" is ethyl and the other "alkyl" is n-pentyl.

Very preferred are compounds of formula B1-2.

The proportion of the compounds of formula B1 or its subformulae in the medium is preferably from 1 to 20%, very preferably from 1 to 15% by weight.

Preferably the medium contains 1, 2 or 3 compounds of formula B1 or its subformulae.

Preferred compounds of formula B2 are selected from the following subformulae:

B2-1

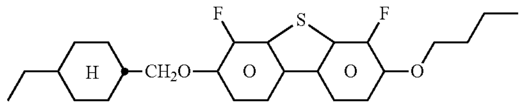

B2-2

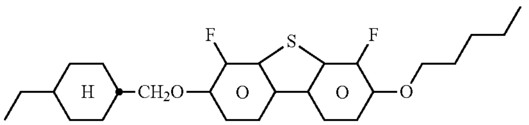

B2-3

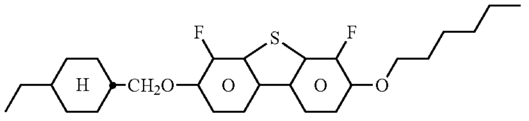

The proportion of the compounds of formula B2 or its subformulae in the medium is preferably from 1 to 20%, very preferably from 1 to 15% by weight.

Preferably the LC medium contains 1, 2 or 3 compounds of formula B2 or its subformulae.

Preferred compounds of formula B3 are selected from the following subformulae:

B3-1

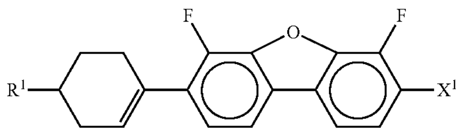

B3-2

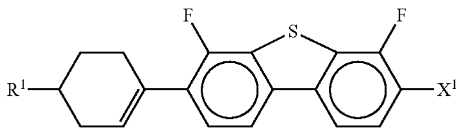

wherein $R^1$ has one of the meanings given in formula B3 and preferably denotes straight-chain alkyl having 1-6 C atoms, very preferably methyl, ethyl, propyl, butyl, pentyl or hexyl, more preferably ethyl or propyl, most preferably propyl, and $X^1$ has one of the meanings given in formula B3 and preferably denotes $CF_3$ or $OCF_3$.

Preferred compounds of formula B3 are selected from the following subformulae:

B3-1-1

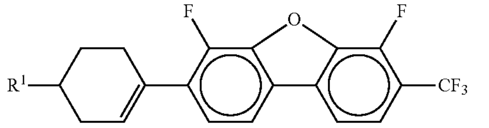

B3-1-2

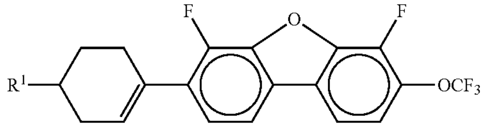

B3-2-1

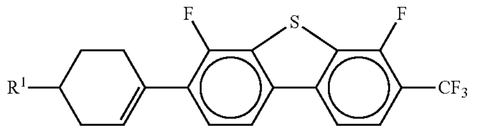

B3-2-2

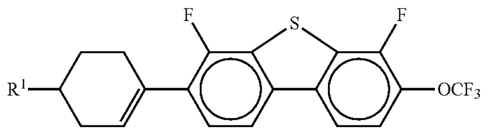

wherein $R^1$ has one of the meanings given in formula B3 and preferably denotes straight-chain alkyl having 1-6 C atoms, very preferably methyl, ethyl, propyl, butyl, pentyl or hexyl, more preferably ethyl or propyl, most preferably propyl.

Most preferred are compounds of formulae B3-1-1 and B3-2-2.

In a preferred embodiment the medium contains one or more compounds of formula B or its subformulae B1, B2, B3, B1-1, B1-2, B2-1, B2-2, B2-3, B3-1, B3-2, B3-1-1, B3-1-2, B3-2-1 and B3-2-2 wherein the dibenzofuran or dibenzothiophene group is substituted by a methyl or methoxy group, preferably by a methyl group, preferably in p-position to the substituent $L^1$ or $L^2$, very preferably in p-position to the substituent $L^2$ (i.e. in m-position to the terminal group $R^2$ or $X^1$).

The proportion of the compounds of formula B3 or its subformulae in the LC medium is preferably from 1 to 20%, very preferably from 1 to 10% by weight.

Preferably the LC medium contains 1, 2 or 3 compounds of formula B3 or its subformulae.

Preferably the total proportion of compounds of formula Y and B or their subformulae in the medium is from 2 to 25%, very preferably from 3 to 20% by weight.

Further preferred embodiments are indicated below:

The medium comprises one or more compounds of formula Y selected from the following subformula

LY

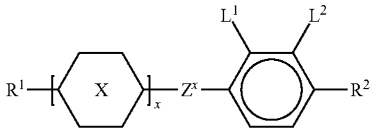

wherein $R^1$, $R^2$, $L^1$, $L^2$, X, x and $Z^x$ have the meanings given in formula Y, and wherein at least one of the rings X is cyclohexenylene.

Preferably, both radicals $L^1$ and $L^2$ denote F. Further preferably one of the radicals $L^1$ and $L^2$ denotes F and the other denotes Cl.

The compounds of the formula LY are preferably selected from the group consisting of the following sub-formulae:

LY1

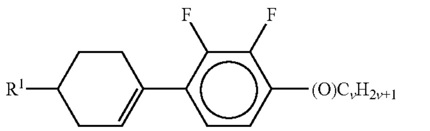

LY2

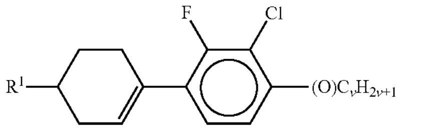

LY3

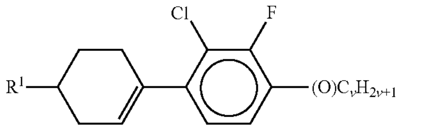

LY4

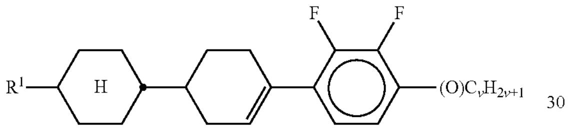

LY5

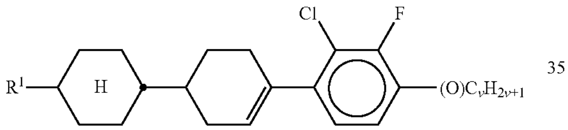

LY6

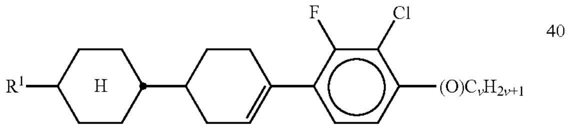

LY7

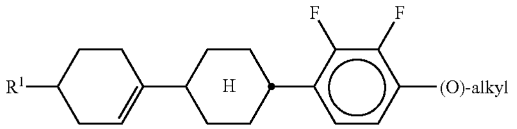

LY8

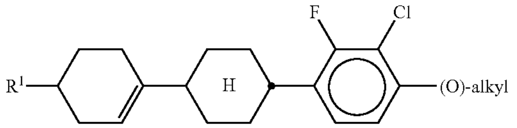

in which $R^1$ has the meaning indicated above, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$═CH—, $CH_2$═$CHCH_2CH_2$—, $CH_3$—CH═CH—, $CH_3$—$CH_2$—CH═CH—, $CH_3$—$(CH_2)_2$—CH═CH—, $CH_3$—$(CH_2)_3$—CH═CH— or $CH_3$—CH═CH—$(CH_2)_2$—.

Very preferred are compounds of formula LY4.

Preferably the medium contains 1, 2 or 3 compounds of formula LY, very preferably of formula LY4.

The proportion of the compounds of formula LY or its subformulae in the medium is preferably from 1 to 10% by weight.

The medium comprises one or more compounds of formula Y selected from the following subformula

AY

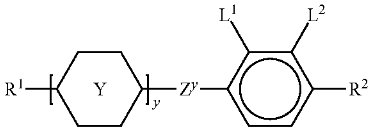

wherein $R^1$, $R^2$, $L^1$, $L^2$, Y, y and $Z^y$ have the meanings given in formula Y, and wherein at least one of the rings Y is tetrahydropyrane.

The compounds of the formula AY are preferably selected from the group consisting of the following sub-formulae:

AY1

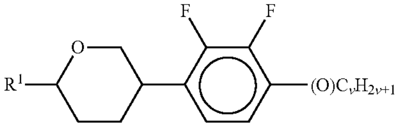

AY2

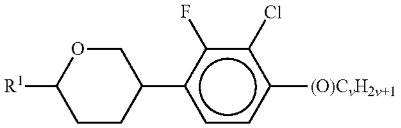

AY3

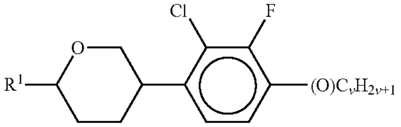

AY4

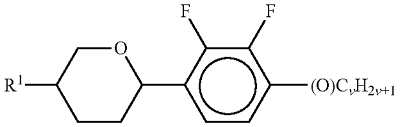

AY5

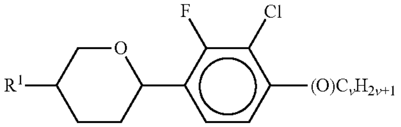

AY6

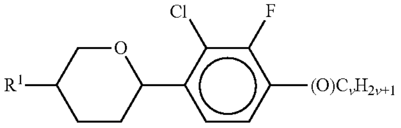

AY7

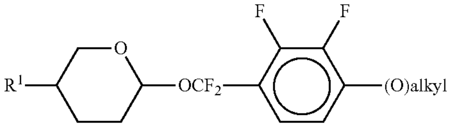

-continued

AY8

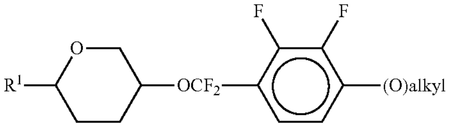

AY9

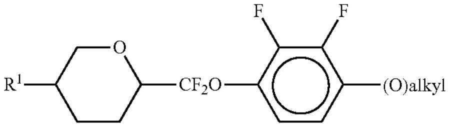

AY10

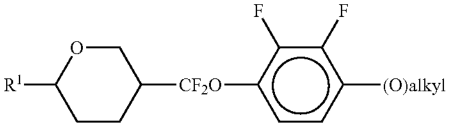

AY11

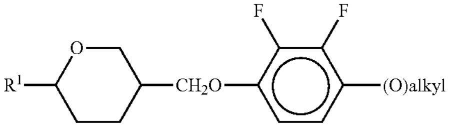

AY12

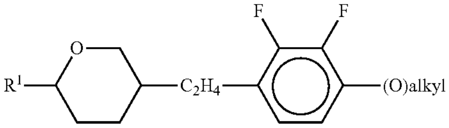

AY13

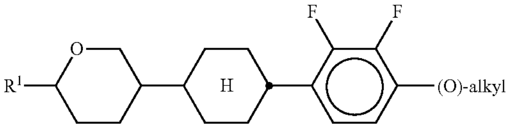

AY14

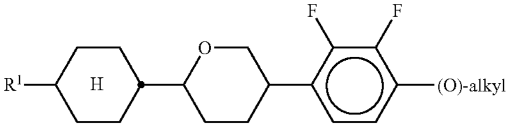

AY15

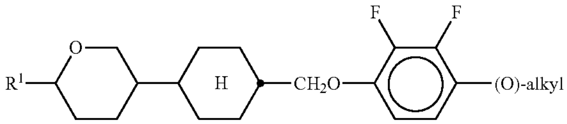

AY16

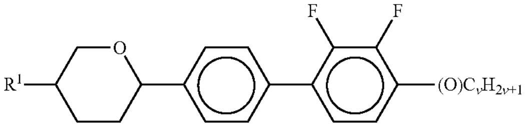

in which $R^1$ has the meaning indicated above, "alkyl" denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2{=}CH{-}$, $CH_2{=}CHCH_2CH_2{-}$, $CH_3{-}CH{=}CH{-}$, $CH_3{-}CH_2{-}CH{=}CH{-}$, $CH_3{-}(CH_2)_2{-}CH{=}CH{-}$, $CH_3{-}(CH_2)_3{-}CH{=}CH{-}$ or $CH_3{-}CH{=}CH{-}(CH_2)_2{-}$.

The medium does not contain a compound of formula Y, B, LY or AY.

The medium does not contain a compound having a 1,4-phenylene group that is substituted in 2- and 3-position with F or $C_1$.

The medium additionally comprises one or more compounds selected from the following formulae:

II

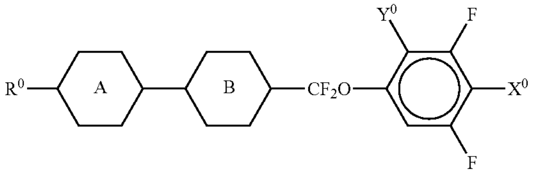

III

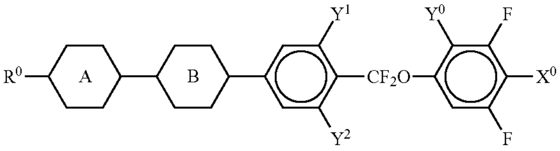

wherein the individual radicals, independently of each other and on each occurrence identically or differently, have the following meanings

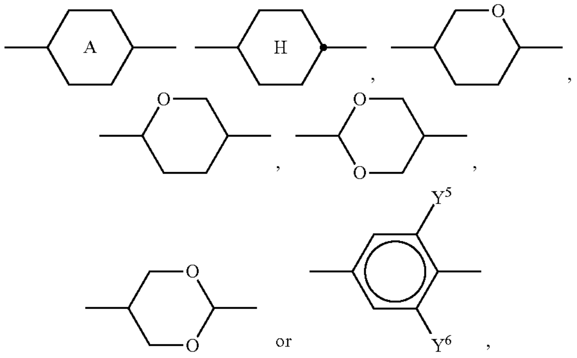

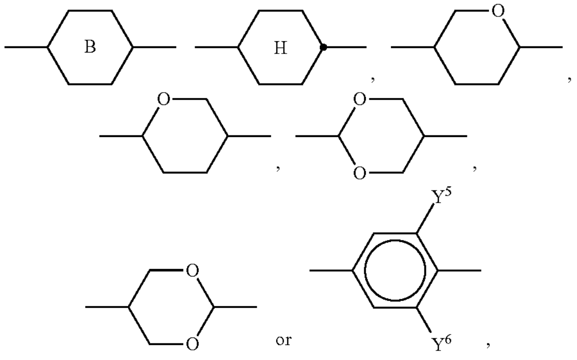

$R^0$ one of the meanings given in formula I or one of the preferred meanings as given above and below, $X^0$ F, Cl, CN, $SF_5$, SCN, NCS, a halogenated alkyl radical, a halogenated alkenyl radical, a halogenated alkoxy radical or a halogenated alkenyloxy radical having up to 6 C atoms, and $Y^{1-6}$ H or F, $Y^0$ H or $CH_3$.

Preferred compounds of formula II and III are those wherein $Y^0$ is H.

Further preferred compounds of formula II and III are those wherein $R^0$ denotes alkyl having 1 to 6 C atoms, very preferably ethyl or propyl, and $X^0$ denotes F or $OCF_3$, very preferably F.

The medium comprises one or more compounds of formula II selected from the following subformulae:

II1

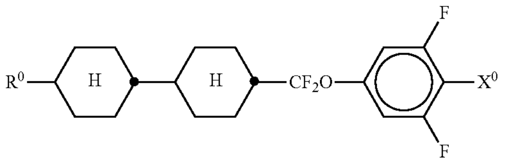

II2

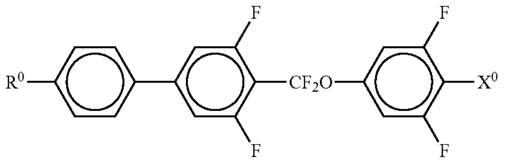

II3

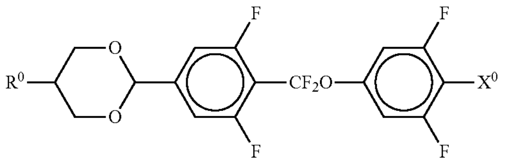

II4

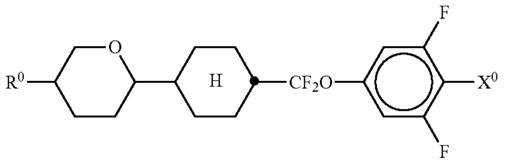

II5

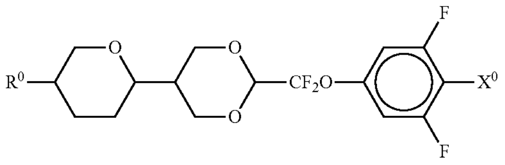

II6

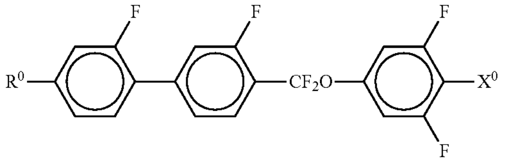

II7

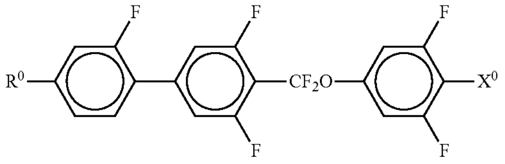

in which $R^0$ and $X^0$ have the meanings given in formula II or one of the preferred meanings given above and below.

Preferred compounds are those of formula II1, II2 and II3, very preferred those of formula II1 and II2.

In the compounds of formulae II1 to II7 $R^0$ preferably denotes alkyl having 1 to 6 C atoms, very preferably ethyl or propyl, and $X^0$ preferably denotes F or $OCF_3$, very preferably F.

The medium contains one or more compounds of formula II or their subformulae as described above and below wherein $Y^0$ is $CH_3$, Very preferably the medium according to this preferred embodiment comprises one or more compounds of formula II selected from the following subformulae:

IIA1

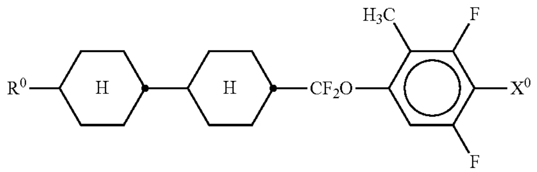

IIA2

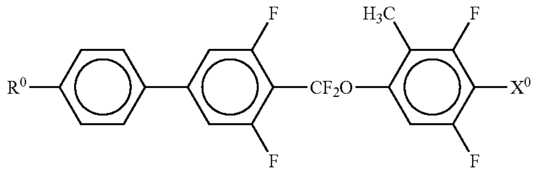

IIA3

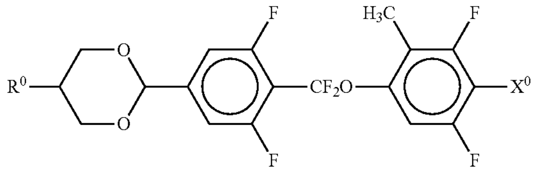

IIA4

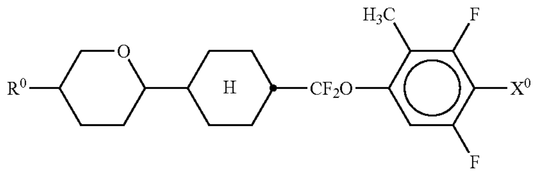

IIA5

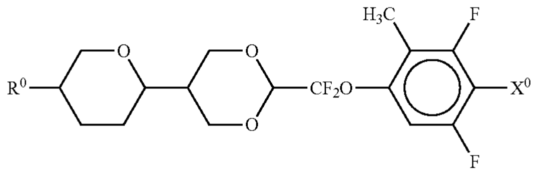

IIA6

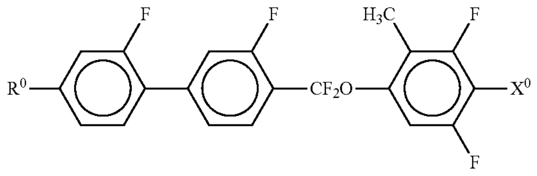

-continued

IIA7

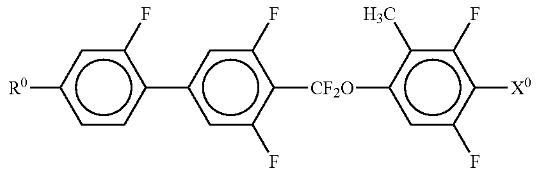

in which $R^0$ and $X^0$ have the meanings given in formula II or one of the preferred meanings given above and below.

Preferred compounds are those of formula IIA1, IIA2 and IIA3, very preferred those of formula IIA1 and IIA2.

In the compounds of formulae IIA1 to IIA7 $R^0$ preferably denotes alkyl having 1 to 6 C atoms, very preferably ethyl or propyl, and $X^0$ preferably denotes F or $OCF_3$, very preferably F.

The medium comprises one or more compounds of formula III selected from the following subformulae:

III1

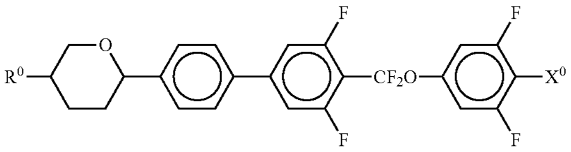

III2

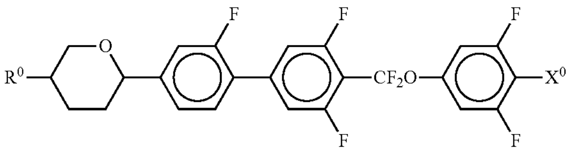

III3

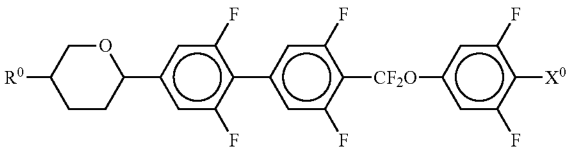

III4

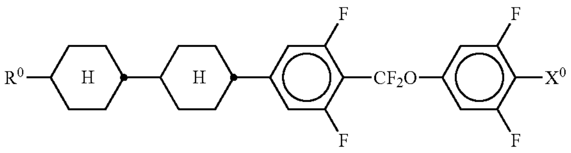

III5

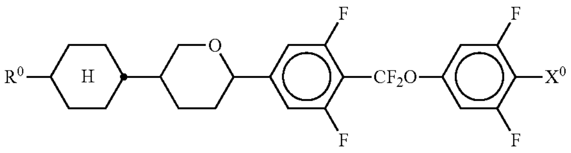

III6

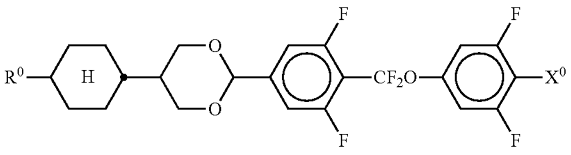

-continued

III7

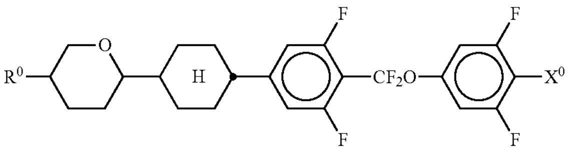

III8

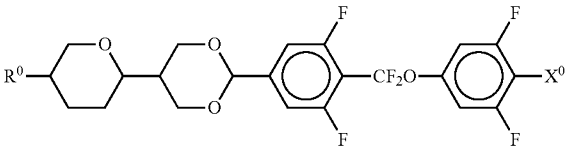

III9

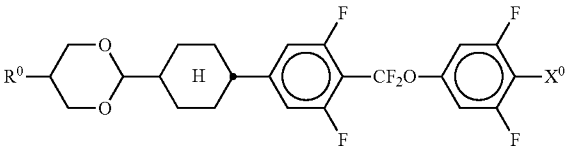

III10

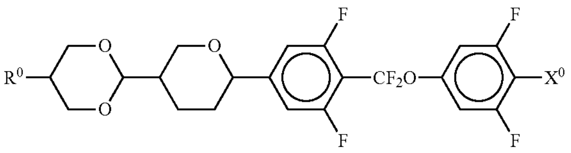

III11

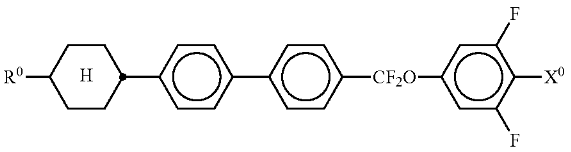

III12

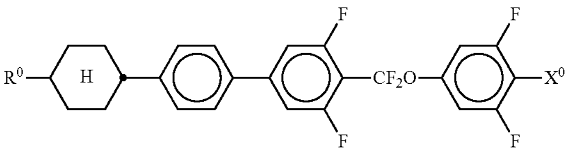

III13

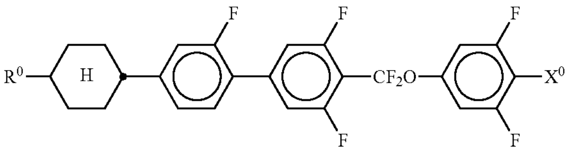

III14

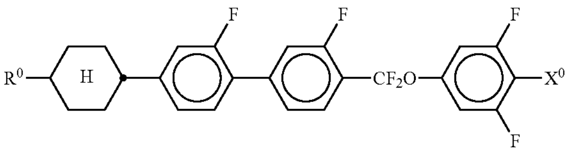

III15

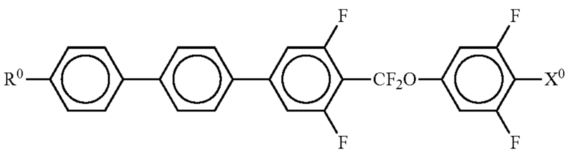

-continued

III16

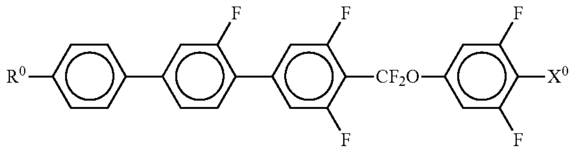

III17

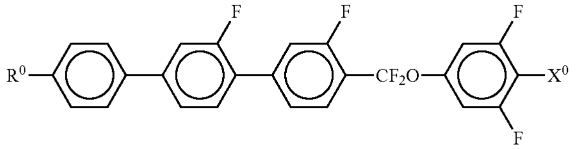

III18

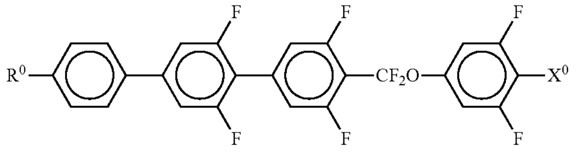

III19

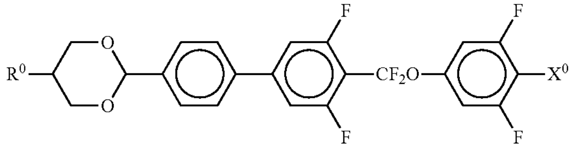

III20

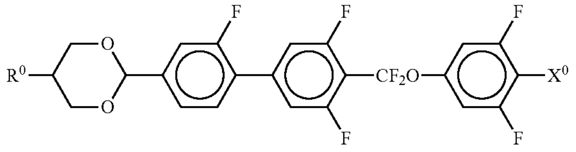

III21

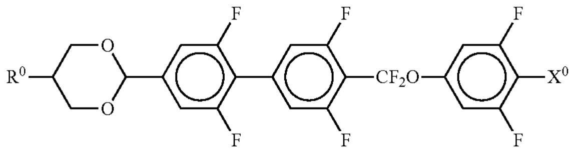

in which $R^0$ and $X^0$ have the meanings given in formula II or one of the preferred meanings given above and below.

Preferred compounds are those of formula III1, III4, III6, III16, III19 and III20.

In the compounds of formulae III1 to III21 $R^0$ preferably denotes alkyl having 1 to 6 C atoms, very preferably ethyl or propyl, $X^0$ preferably denotes F or $OCF_3$, very preferably F, and $Y^2$ preferably denotes F.

The medium contains one or more compounds of formula III or their subformulae as described above and below wherein $Y^0$ is $CH_3$, Very preferably the medium according to this preferred embodiment comprises one or more compounds of formula III selected from the following subformulae:

IIIA1

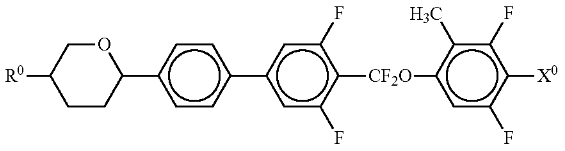

IIIA2

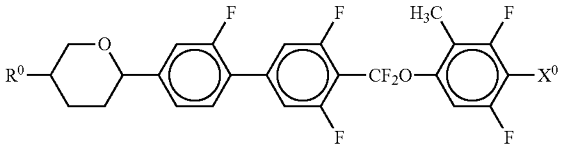

IIIA3

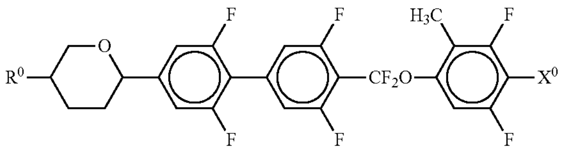

IIIA4

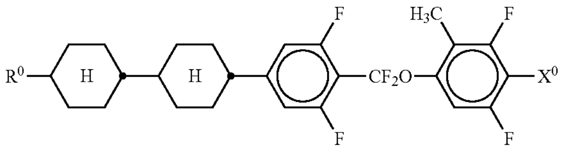

IIIA5

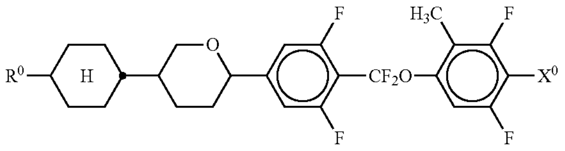

IIIA6

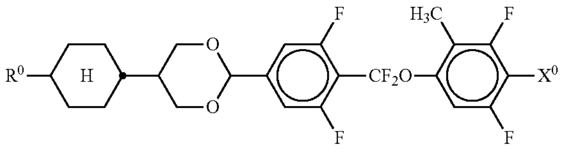

IIIA7

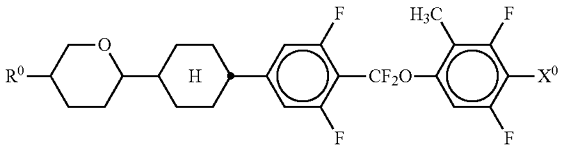

IIIA8

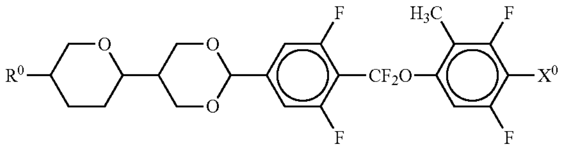

IIIA9

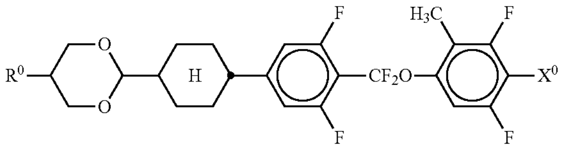

-continued

IIIA10

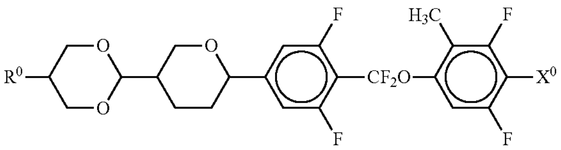

IIIA11

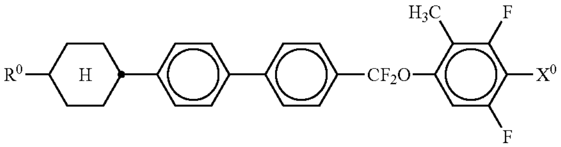

IIIA12

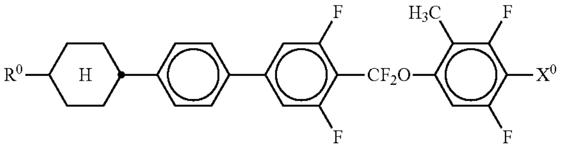

IIIA13

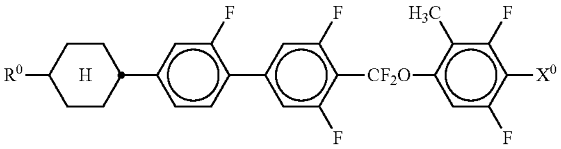

IIIA14

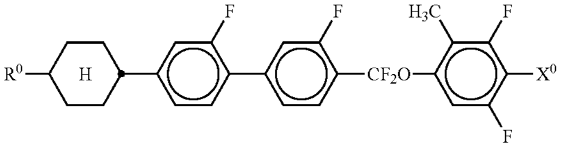

IIIA15

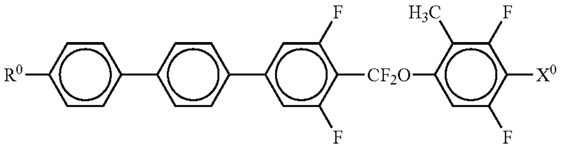

IIIA16

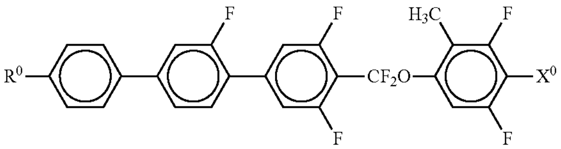

IIIA17

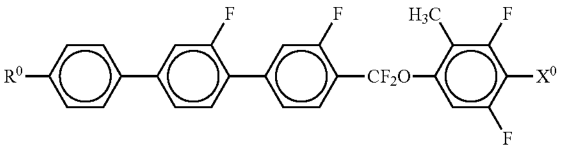

IIIA18

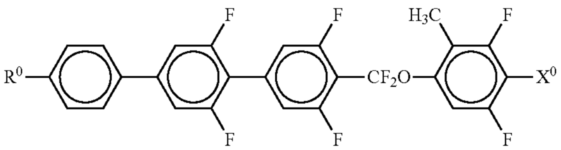

-continued

IIIA19

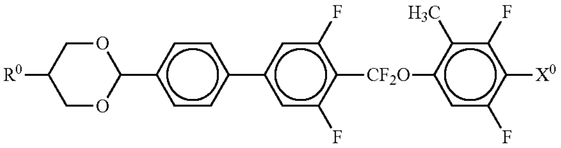

IIIA20

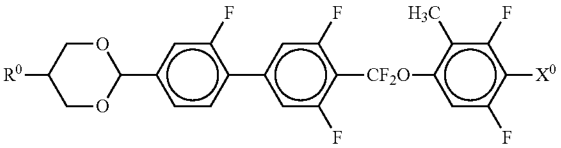

IIIA21

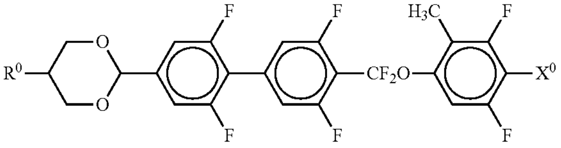

in which $R^0$ and $X^0$ have the meanings given in formula III or one of the preferred meanings given above and below.

Preferred compounds are those of formula IIIA1, IIIA4, IIIA6, IIIA16, IIIA19 and IIIA20.

In the compounds of formulae IIIA1 to IIIA21 $R^0$ preferably denotes alkyl having 1 to 6 C atoms, very preferably ethyl or propyl, $X^0$ preferably denotes F or $OCF_3$, very preferably F, and $Y^2$ preferably denotes F.

The medium additionally comprises one or more compounds selected from the following formulae:

IV

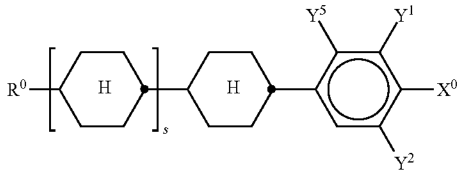

V

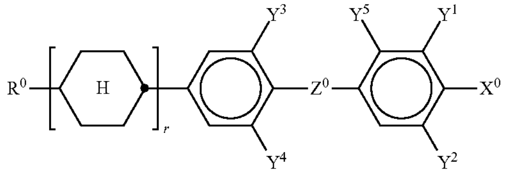

VI

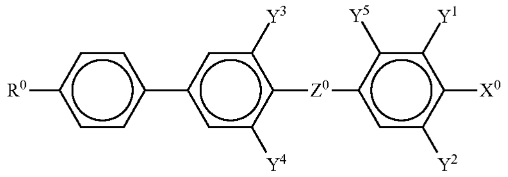

-continued

VII

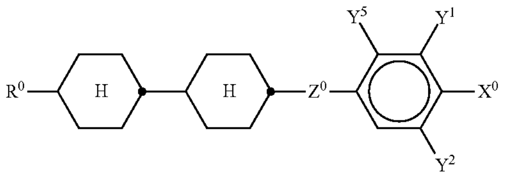

VIII

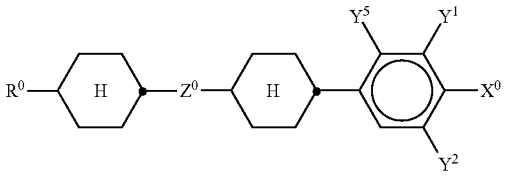

in which $R^0$, $X^0$ and $Y^{1-5}$ have the meanings indicated above, and $Z^0$ denotes $-C_2H_4-$, $-(CH_2)_4-$, $-CH{=}CH-$, $-CF{=}CF-$, $-C_2F_4-$, $-CH_2CF_2-$, $-CF_2CH_2-$, $-CH_2O-$, $-OCH_2-$, $-COO-$ or $-OCF_2-$, in formulae V and VI also a single bond, in formulae V and VIII also $-CF_2O-$, r denotes 0 or 1, and s denotes 0 or 1;

The compounds of the formula IV are preferably selected from the following formulae:

IVa

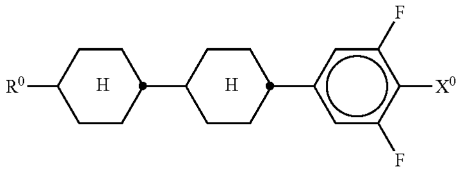

IVb

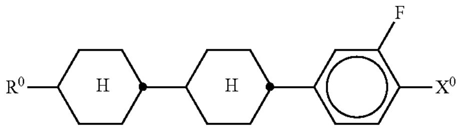

IVc

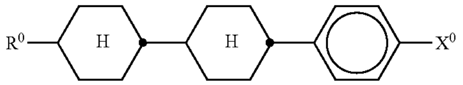

IVd

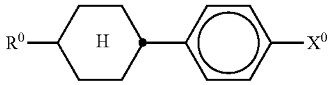

in which $R^0$ and $X^0$ have the meanings indicated above.

$R^0$ preferably denotes alkyl having 1 to 6 C atoms. $X^0$ preferably denotes F or $OCF_3$, furthermore $OCF{=}CF_2$ or $C_1$;

The compounds of the formula IVa are preferably selected from the following subformula:

IVa1

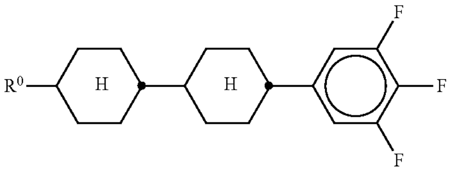

in which $R^0$ has the meanings indicated above and is preferably propyl or pentyl.

The compounds of the formula IVc are preferably selected from the following subformula:

IVc1

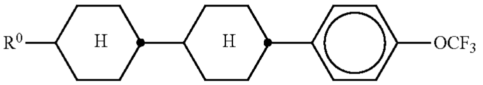

in which $R^0$ has the meanings indicated above and is preferably propyl or pentyl.

The compound(s) of the formula IVc, in particular of the formula IVc1, is (are) preferably employed in the mixtures according to the invention in amounts of 1-20% by weight, particularly preferably 2-15% by weight.

The compounds of the formula V are preferably selected from the following subformulae:

Va

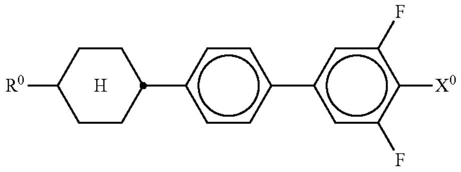

Vb

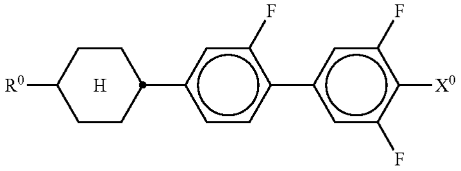

Vc

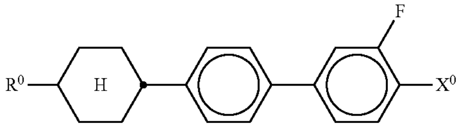

Vd

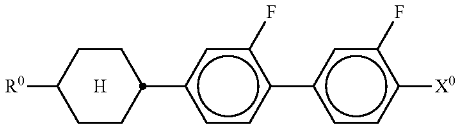

Ve

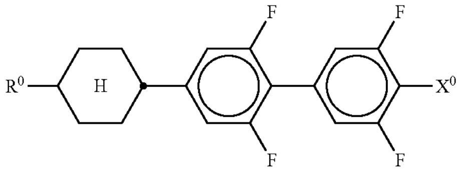

-continued

Vf

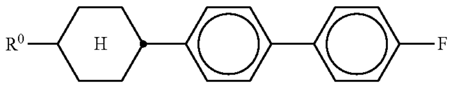

Vg

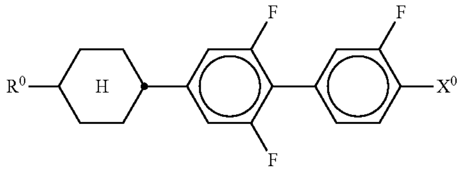

Vh

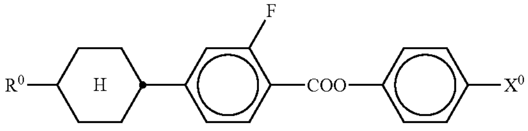

in which $R^0$ and $X^0$ have the meanings indicated above.

$R^0$ preferably denotes alkyl having 1 to 6 C atoms. $X^0$ preferably denotes F and $OCF_3$, furthermore $OCHF_2$, $CF_3$, $OCF{=}CF_2$ and $OCH{=}CF_2$;

The compounds of the formula VI are preferably selected from the following subformulae:

VIa

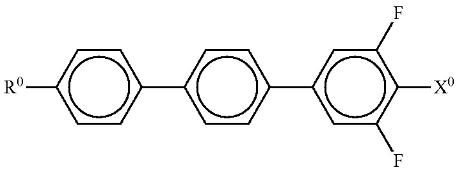

VIb

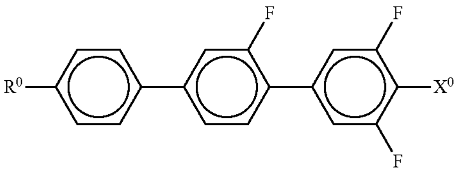

VIc

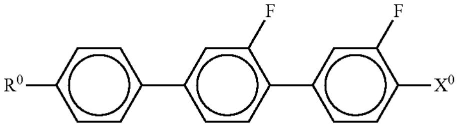

VId

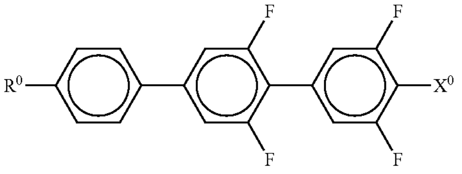

in which $R^0$ and $X^0$ have the meanings indicated above.

$R^0$ preferably denotes alkyl having 1 to 6 C atoms. $X^0$ preferably denotes F, furthermore $OCF_3$, $CF_3$, $CF{=}CF_2$, $OCHF_2$ and $OCH{=}CF_2$;

The compounds of the formula VII are preferably selected from the following subformulae:

VIIa

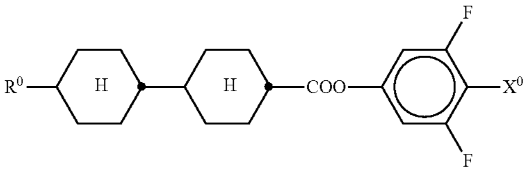

VIIb

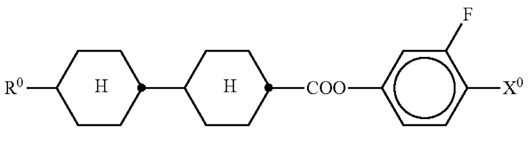

in which $R^0$ and $X^0$ have the meanings indicated above.

$R^0$ preferably denotes alkyl having 1 to 6 C atoms. $X^0$ preferably denotes F, furthermore $OCF_3$, $OCHF_2$ and $OCH{=}CF_2$.

The medium additionally comprises one or more compounds selected from the following subformulae:

IX

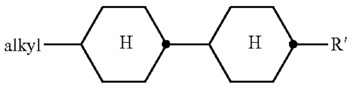

X

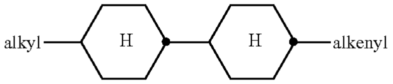

XI

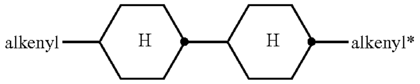

XII

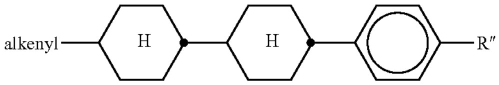

XIII

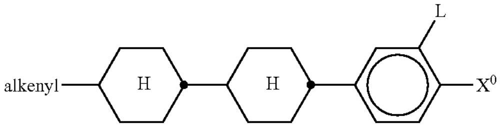

in which $X^0$ has the meanings indicated above, and

L denotes H or F,

"alkyl" denotes $C_{1-6}$-alkyl,

R' denotes methyl, $C_{4-6}$-alkyl or $C_{1-6}$-alkoxy, wherein, if R' is different from $C_{1-6}$ alkoxy, then "alkyl" in formula IX is not ethyl or propyl, R" denotes $C_{1-6}$-alkyl, $C_{1-6}$-alkoxy or $C_{2-6}$-alkenyl, and "alkenyl" and "alkenyl*" each, independently of one another, denote $C_{2-6}$-alkenyl, and in formula X "alkenyl" denotes $C_{3-6}$ alkenyl.

The compounds of the formulae IX-XIII are preferably selected from the following subformulae:

IXa

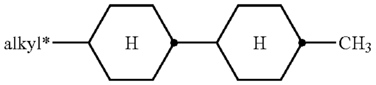

-continued

IXb

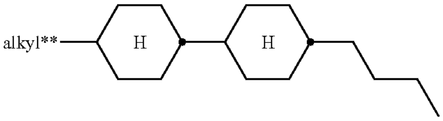

Xb

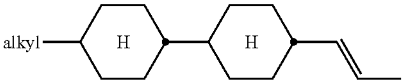

Xc

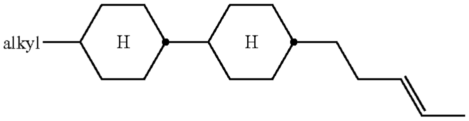

XIa

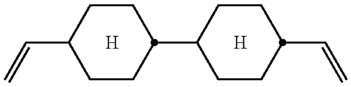

XIb

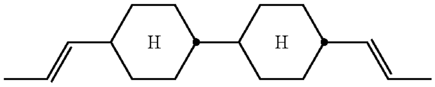

XIc

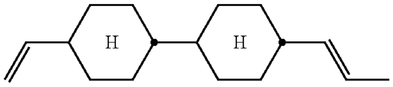

XIIa

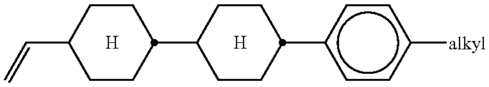

XIIb

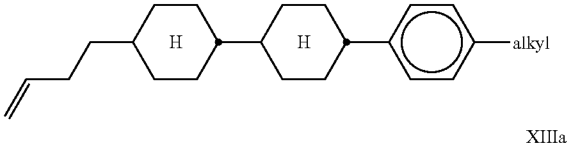

XIIIa

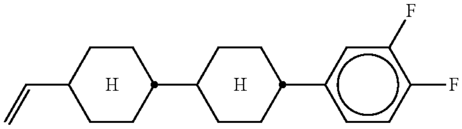

wherein "alkyl" has the meaning given in formula IX, "alkyl*" is methyl, butyl, pentyl or hexyl and "alkyl**" is butyl, pentyl or hexyl.

Particular preference is given to the compounds of the formulae IXa, Xb, Xc, XIa, XIb, XIIa and XIIIa. In the formulae IXb and IX, "alkyl" preferably, independently of one another, denotes n-$C_3H_7$, n-$C_4H_9$ or n-$C_5H_{11}$, in particular n-$C_3H_7$.

Preferred compounds are selected from the following group

Xb1

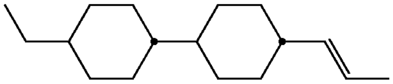

Xb2

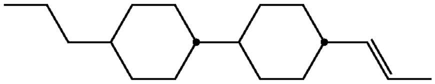

-continued

Xb3

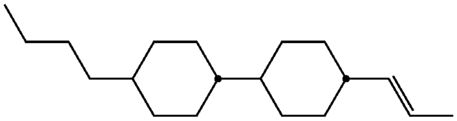

Xc1

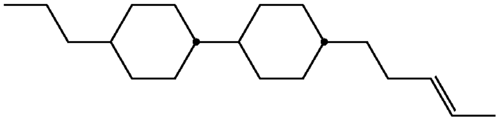

XIIa1

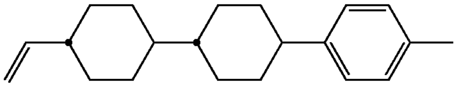

Very preferred are compounds of formula Xb2;

The medium additionally comprises one or more compounds selected from the following formulae:

XIV

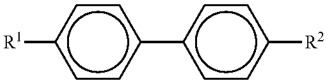

XV

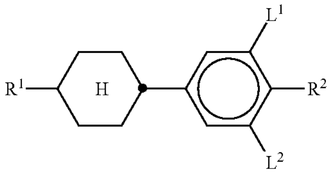

in which $L^1$ and $L^2$ have the meanings indicated above, and $R^1$ and $R^2$ each, independently of one another, denote n-alkyl, alkoxy, oxaalkyl, fluoroalkyl or alkenyl, each having up to 6 C atoms, and preferably each, independently of one another, denote alkyl having 1 to 6 C atoms, and the compounds of formula XIV are different from those of formula P; in the compound of the formula XIV, at least one of the radicals $R^1$ and $R^2$ preferably denotes alkenyl having 2 to 6 C atoms.

The medium comprises one or more compounds of the formula XIV in which at least one of the radicals $R^1$ and $R^2$ denotes alkenyl having 2 to 6 C atoms, preferably those selected from the following subformulae:

XIVa

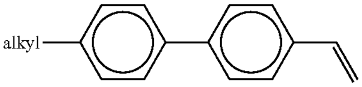

XIVb

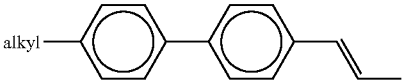

XIVc

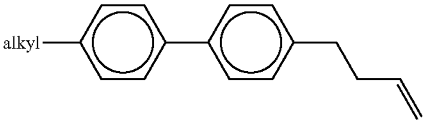

-continued

XIVd

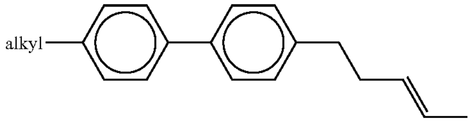

in which “alkyl” has the meaning indicated above, and preferably denotes methyl, ethyl or propyl;

The compounds of the formulae XIV are preferably selected from the following subformulae:

XIVd1

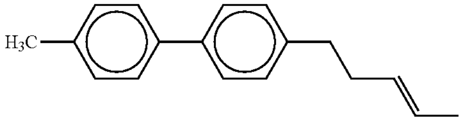

XIVd2

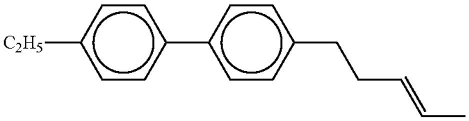

Very preferred are compounds of formula XIVd1;

The medium comprises one or more compounds of the formula XVI,

XVI

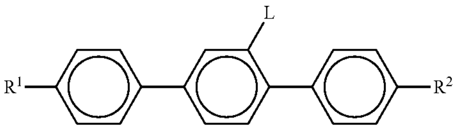

in which $R^1$ and $R^2$ have the meanings indicated above and preferably each, independently of one another, denote alkyl having 1 to 6 C atoms. L denotes H or F.

Particularly preferred compounds of the formula XVI are those of the sub-formulae XVIa

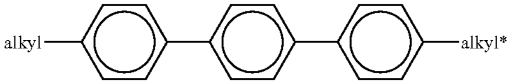

XVIb

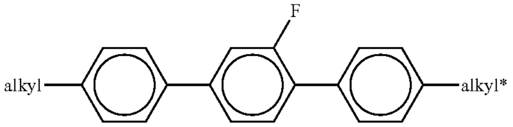

XVIc

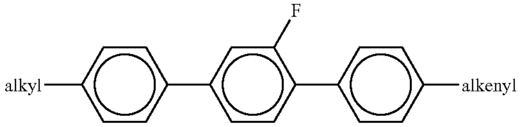

-continued

XVId

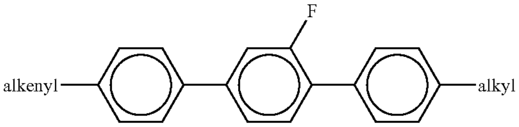

XVIe

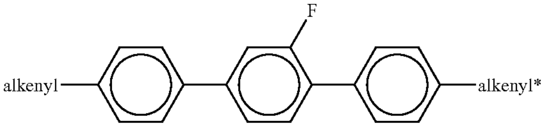

XVIf

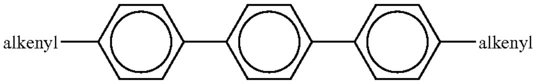

XVIg

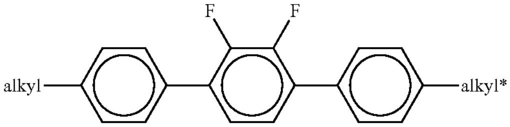

in which alkyl and alkyl* each, independently of one another, denote a straight-chain alkyl radical having 1-6 C atoms, in particular ethyl, propyl or pentyl, alkenyl and alkenyl* each, independently of one another, denote a straight-chain alkenyl radical having 2-6 C atoms, in particular $CH_2{=}CHC_2H_4$, $CH_3CH{=}CHC_2H_4$, $CH_2{=}CH$ and $CH_3CH{=}CH$.

Particular preference is given to the compounds of the formulae XVIb, XVIc and XVIg. Very particular preference is given to the compounds of the following subformulae XVIb1

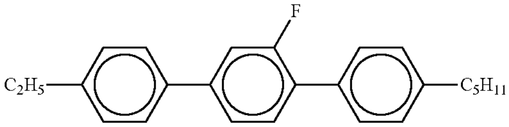

XVIb2

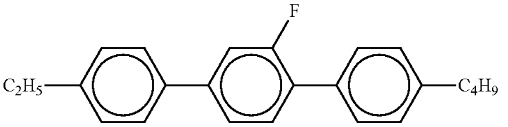

XVIb3

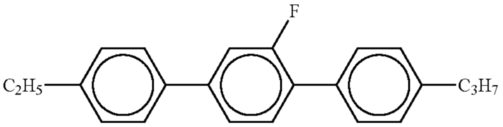

XVIc1

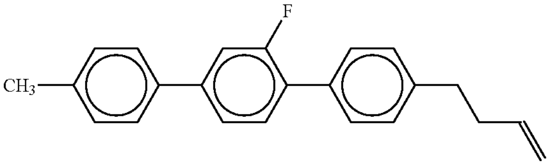

-continued

XVIc2

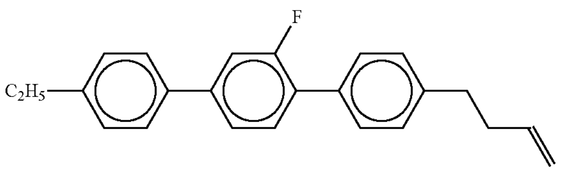

XVIc3

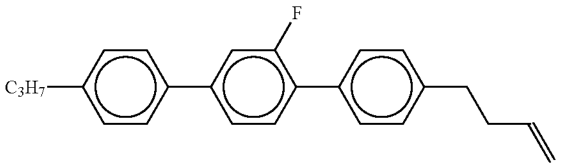

XVIg1

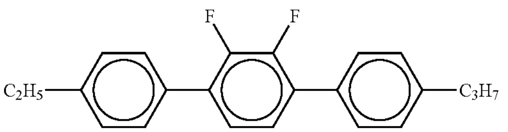

XVIg2

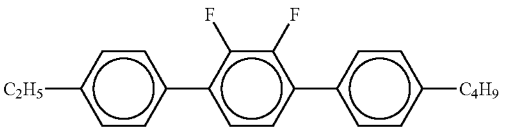

Very preferred are compounds of formula XVIc2, XVIg1 and XVIg2;

The medium comprises one or more compounds of the following formulae:

XVIIa

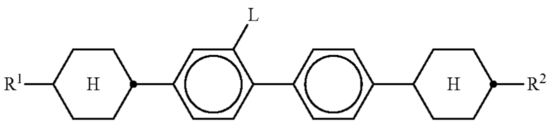

XVIIb

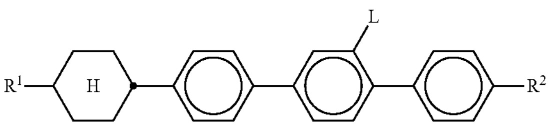

XVIIc

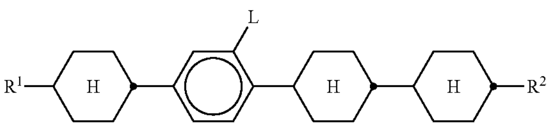

in which $R^1$ and $R^2$ have the meanings indicated above and preferably each, independently of one another, denote alkyl having 1 to 6 C atoms. L denotes H or F. Very preferred are compounds of formula XVIIa wherein L is H Very preferred are compounds of formula XVIIb wherein L is F.

The medium additionally comprises one or more compounds selected from the following formulae:

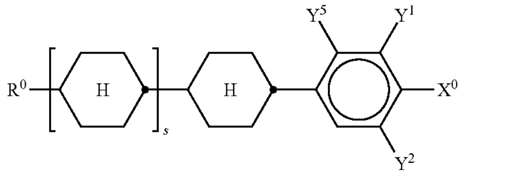

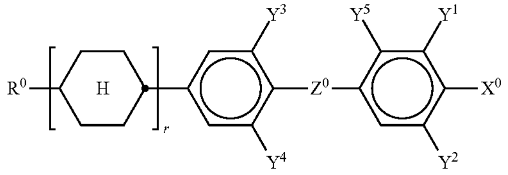

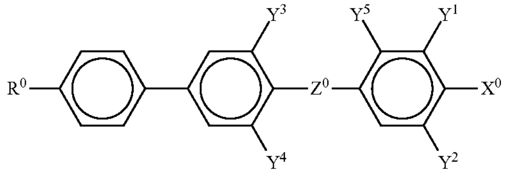

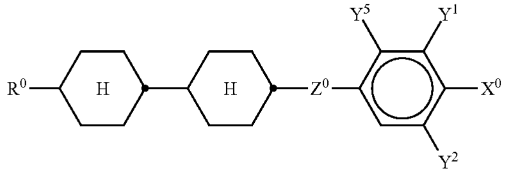

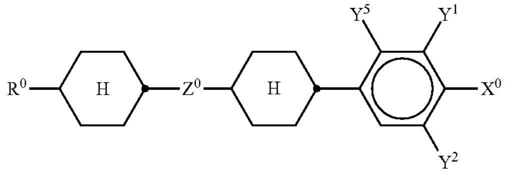

XVIII

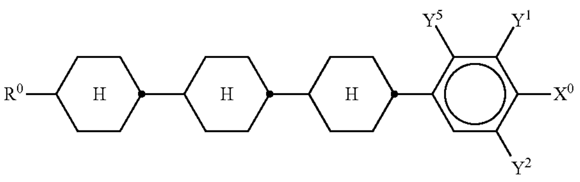

XIX

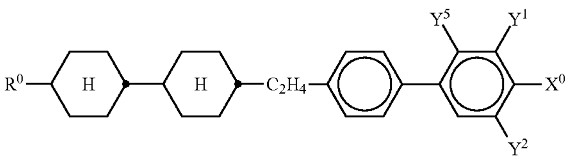

XX

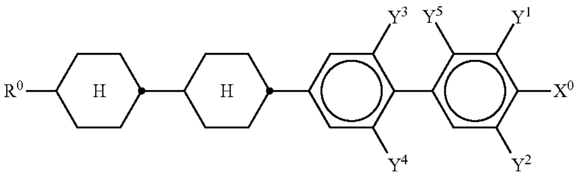

XXI

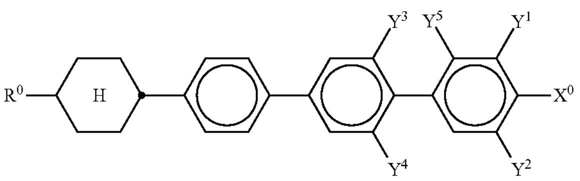

-continued

XXII

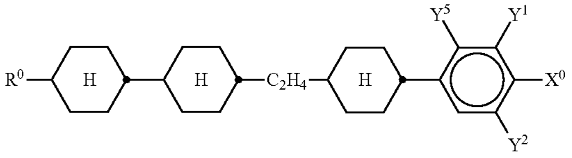

XXIII

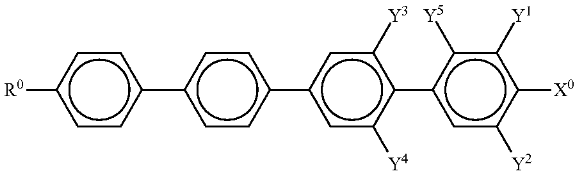

in which $R^0$ and $X^0$ each, independently of one another, have one of the meanings indicated above, and $Y^{14}$ each, independently of one another, denote H or F and $Y^5$ denotes H or $CH_3$, preferably H. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 6 C atoms.

Very preferably the medium according to the invention comprises one or more compounds of the formula XXa, XXa

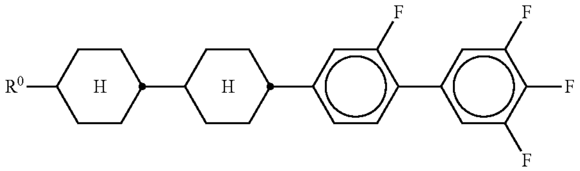

in which $R^0$ has the meanings indicated above. $R^0$ preferably denotes straight-chain alkyl, in particular ethyl, n-propyl, n-butyl or n-pentyl and very particularly preferably n-propyl.

The compound(s) of the formula XX, in particular of the formula XXa, is (are) preferably employed in the mixtures according to the invention in amounts of 1-15% by weight, particularly preferably 2-10% by weight.

Very preferably the medium according to the invention comprises one or more compounds of the formula XXIa, XXIa

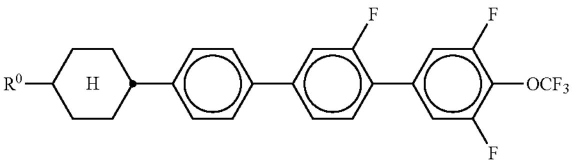

in which $R^0$ has the meanings indicated above. $R^0$ preferably denotes straight-chain alkyl, in particular ethyl, n-propyl, n-butyl or n-pentyl and very particularly preferably n-propyl.

The compound(s) of the formula XXI, in particular of the formula XXIa, is (are) preferably employed in the mixtures according to the invention in amounts of 1-15% by weight, particularly preferably 2-10% by weight.

Further preferably the medium according to the invention comprises one or more compounds of the formula XXIIIa, XXIIIa

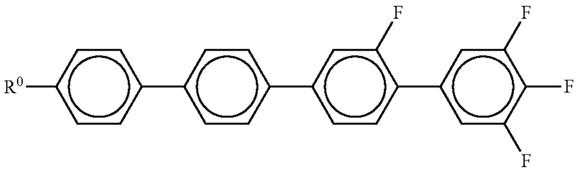

in which $R^0$ has the meanings indicated above. $R^0$ preferably denotes straight-chain alkyl, in particular ethyl, n-propyl, n-butyl or n-pentyl and very particularly preferably n-propyl.

The compound(s) of the formula XXIII, in particular of the formula XXIIIa, is (are) preferably employed in the mixtures according to the invention in amounts of 0.5-5% by weight, particularly preferably 0.5-2% by weight.

The medium additionally comprises one or more compounds of the formula XXIV,

XXIV

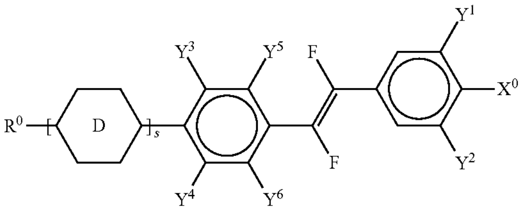

in which $R^0$, $X^0$ and $Y^{1-6}$ have the meanings indicated in formula I, s denotes 0 or 1, and

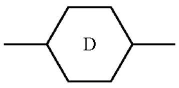

denotes

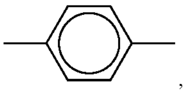 , 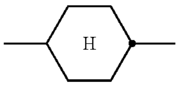 or

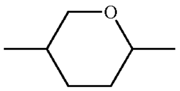 .

In the formula XXIV, $X^0$ may also denote an alkyl radical having 1-6 C atoms or an alkoxy radical having 1-6 C atoms. The alkyl or alkoxy radical is preferably straight-chain.

$R^0$ preferably denotes alkyl having 1 to 6 C atoms. $X^0$ preferably denotes F;

The compounds of the formula XXIV are preferably selected from the following subformulae:
XXIVa
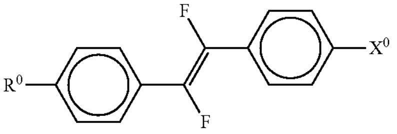
XXIVb
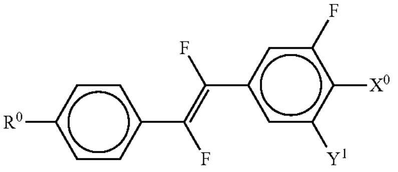
XXIVc
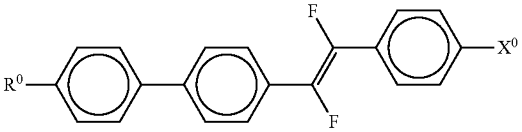
XXIVd
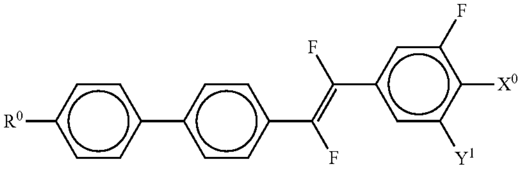
XXIVe
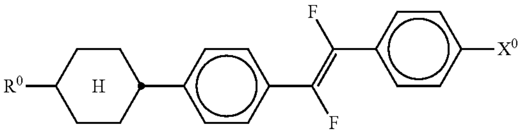
XXIVf
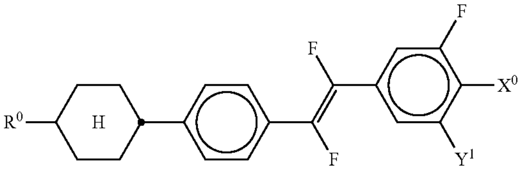
XXIVg
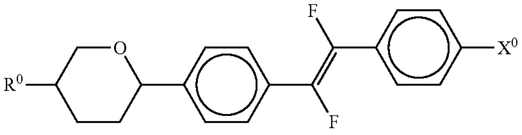
XXIVh
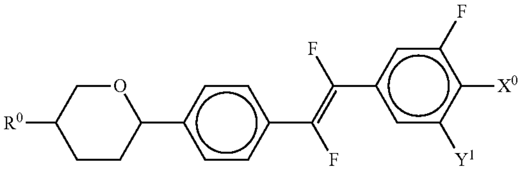
in which $R^0$, $X^0$ and $Y^1$ have the meanings indicated above. $R^0$ preferably denotes alkyl having 1 to 6 C atoms. $X^0$ preferably denotes F, and $Y^1$ is preferably F;
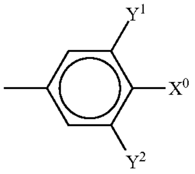
is preferably
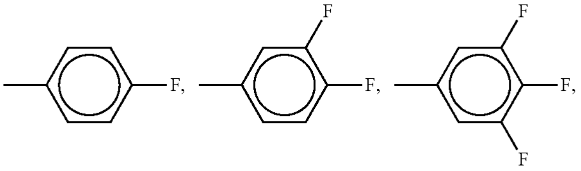
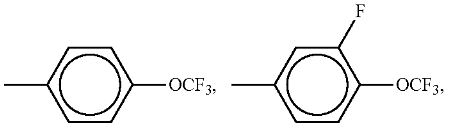
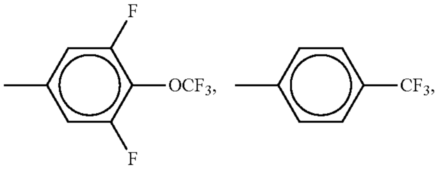
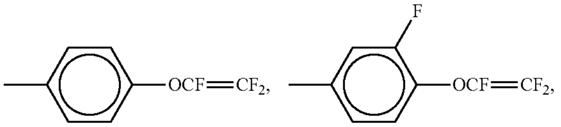
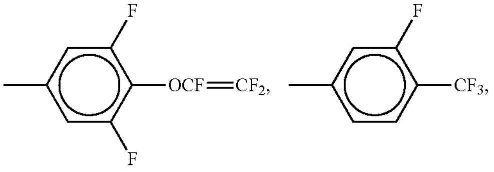
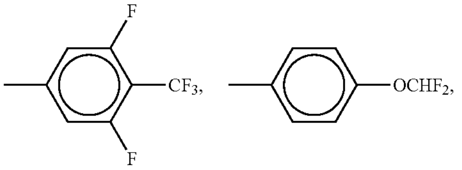
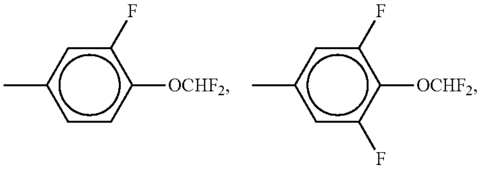
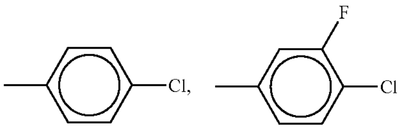 or
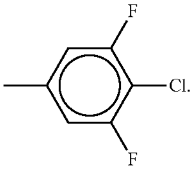

$R^0$ is straight-chain alkyl or alkenyl having 2 to 6 C atoms;

The medium comprises one or more compounds of the following formulae:

XXV

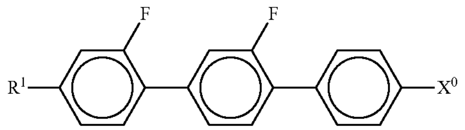

XXVI

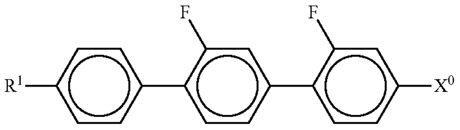

in which $R^1$ and $X^0$ have the meanings indicated above. $R^1$ preferably denotes alkyl having 1 to 6 C atoms. $X^0$ preferably denotes F or Cl. In the formula XXIV, $X^0$ very particularly preferably denotes Cl.

The medium comprises one or more compounds of the following formulae:

XXVII

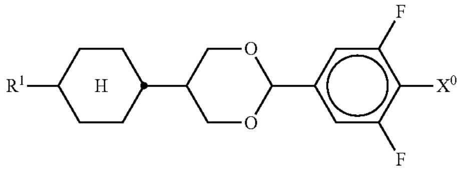

XXVIII

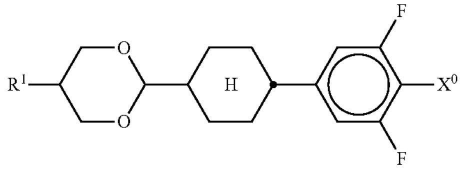

XXIX

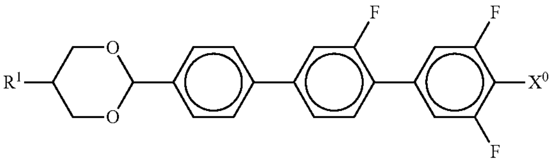

in which $R^1$ and $X^0$ have the meanings indicated above. $R^1$ preferably denotes alkyl having 1 to 6 C atoms. $X^0$ preferably denotes F. The medium according to the invention particularly preferably comprises one or more compounds of the formula XXIX in which $X^0$ preferably denotes F.

The compound(s) of the formulae XXVI-XXIX is (are) preferably employed in the mixtures according to the invention in amounts of 1-20% by weight, particularly preferably 1-15% by weight. Particularly preferred mixtures comprise at least one compound of the formula XXIX.

Very preferably the medium according to the invention comprises one or more compounds of the formula XXIXa, XXIXa

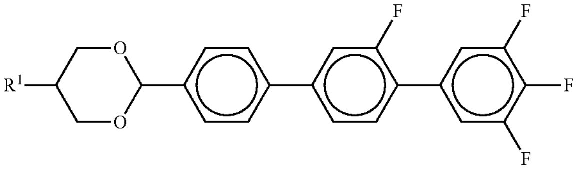

in which $R^1$ has the meanings indicated above, and preferably denotes straight-chain alkyl, in particular ethyl, n-propyl, n-butyl or n-pentyl and very particularly preferably n-propyl.

The compound(s) of the formula XXIXa is (are) preferably employed in the mixtures according to the invention in amounts of 1-15% by weight, particularly preferably 2-10% by weight.

The medium comprises one or more compounds of the following pyrimidine or pyridine compounds of the formulae

XXX1

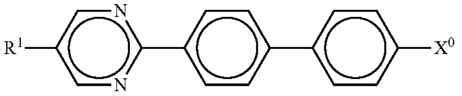

XXX2

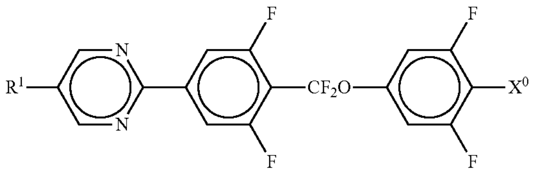

XXX3

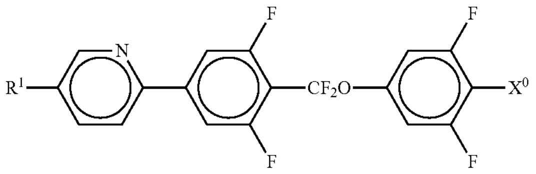

in which $R^1$ and $X^0$ have the meanings indicated above. $R^1$ preferably denotes alkyl having 1 to 6 C atoms. $X^0$ preferably denotes F. The medium according to the invention particularly preferably comprises one or more compounds of the formula XXX1, in which $X^0$ preferably denotes F. The compound(s) of the formulae XXX1 to XXX3 is (are) preferably employed in the mixtures according to the invention in amounts of 1-20% by weight, particularly preferably 1-15% by weight.

The medium additionally comprises one or more compounds of the following formula:

XXX

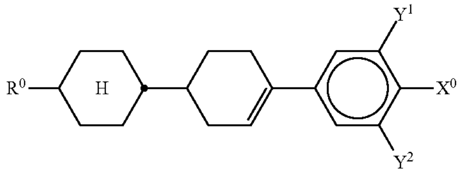

in which $R^0$ and $X^0$ and $Y^{14}$ have the meanings indicated above with $X^0$ being different from F $X^0$ is preferably Cl, $CF_3$, $OCF_3$ or $OCHF_2$. $Y^{1-4}$ each, independently of one another, preferably denote H or F. $R^0$ preferably denotes alkyl, alkoxy, oxaalkyl, fluoroalkyl or alkenyl, each having up to 6 C atoms.

Very preferably the medium according to the invention comprises one or more compounds of the formula XXXa, XXXa

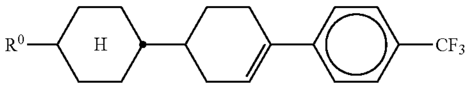

in which $R^0$ has the meanings indicated above. $R^0$ preferably denotes straight-chain alkyl, in particular ethyl, n-propyl, n-butyl or n-pentyl and very particularly preferably n-propyl.

The compound(s) of the formula XXX, in particular of the formula XXXa, is (are) preferably employed in the mixtures according to the invention in amounts of 1-15% by weight, particularly preferably 2-10% by weight.

The medium additionally comprises one or more compounds of the following formula:

XXXI

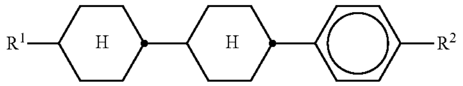

XXXII

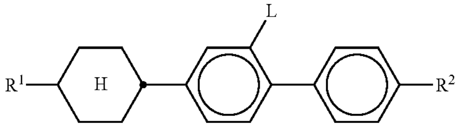

XXXIII

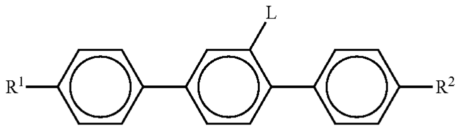

XXXIV

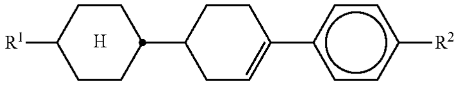

in which L, $R^1$ and $R^2$ have the meanings indicated above. $R^1$ and $R^2$ preferably denote alkyl, alkoxy, oxaalkyl, fluoroalkyl or alkenyl, each having up to 6 C atoms.

Very preferably the medium according to the invention comprises one or more compounds of the formula XXXIVa, XXXIVa

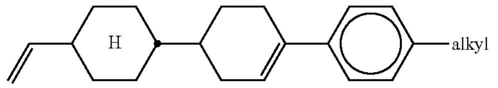

in which "alkyl" denotes a straight-chain alkyl radical having 1-6 C atoms, in particular ethyl, propyl or pentyl.

The compound(s) of the formula XXXIV, in particular of the formula XXXIVa, is (are) preferably employed in the mixtures according to the invention in amounts of 0.5-10% by weight, particularly preferably 1-5% by weight.

Further preferred LC media are selected from the following preferred embodiments, including any combination thereof:

The medium comprises one or more compounds of formula I or its subformulae and one or more compounds selected from the group consisting of formulae Z1, Z2, Z3, Y, B, LY, AY, II, III, IV, V, VI, VII, VIII, IX, X, XI, XII, XIII, XIV, XV, XVI, XVIIa, XVIIb, XVIIc, XVIII, XIX, XX, XXI, XII, XXIII, XXIV, XXV, XXVI, XXVII, XXVIII, XXIX, XXX, XXX1, XXX2, XXX3, XXXI, XXXII, XXXIII and XXXIV and their subformulae.

The medium comprises one or more compounds of formula I or its subformulae and one or more compounds selected from the group consisting of formulae Z1, Z2, Z3, Y, B, II, III, IV, VI, IX, X, XIV, XVI, XVIIa, XVIIb, XVIIc, XX, XII, XXIII, XXIX, XXXI and XXXIV and their subformulae.

The medium does not contain a compound of formula Y, B, AY or LY.

The medium comprises one or more compounds of the formula II, preferably selected from the group consisting of formula II1, II2 and II3, very preferably from formula II1 and II2. The individual concentration of each of these compounds is preferably from 2 to 15% by weight. The total concentration of these compounds is preferably from 5 to 25% by weight.

The medium comprises one or more compounds of the formula III, preferably selected from the group consisting of formula III1, III4, III6, III16, III19 and III20, very preferably from the group consisting of formula III1, III6, III16 and III20. The individual concentration of each of these compounds is preferably from 2 to 15% by weight. The total concentration of these compounds is preferably from 5 to 30% by weight.

The medium comprises one or more compounds of the formula IV, preferably selected from formula IVa or IVc, very preferably from formula IVa1 or IVc1, most preferably of formula IVc1. The individual concentration of each of these compounds is preferably from 2 to 15% by weight. The total concentration of these compounds is preferably from 5 to 20% by weight.

The medium comprises one or more compounds of the formula VI, preferably selected from formula VIb. The individual concentration of each of these compounds is preferably from 1 to 20% by weight. The total concentration of these compounds is preferably from 5 to 20% by weight.

The medium comprises one or more compounds of the formula IX, preferably selected from formula IXa. The total concentration of these compounds is preferably from 1 to 25% by weight.

The medium comprises one or more compounds of the formula X, preferably selected from formulae Xb and Xc, very preferably from formulae Xb2 and Xc1. The total concentration of these compounds is preferably from 2 to 35%, very preferably from 3 to 25% by weight.

The medium comprises from 5 to 20% by weight of compounds of formula Xb, preferably of formula Xb2.

The medium comprises from 5 to 20% by weight of compounds of formula Xc, preferably of formula Xc1.

- The medium comprises from 10 to 65%, very preferably from 20 to 60% by weight of compounds of formula XIb.
- The medium comprises one or more compounds of the formula XII, preferably of the formula XIIa or XIIb, very preferably of formula XIIa, most preferably of formula XIIa1. The concentration of these compounds is preferably from 2 to 15% by weight.
- The medium comprises from 1 to 15% by weight of compounds of formula XIIb.
- The medium comprises one or more compounds of the formula XIV, preferably of the formula XIVd, very preferably of formula XIVd1. The concentration of these compounds is preferably from 2 to 10% by weight.
- The medium comprises one or more compounds of the formula XVIb, preferably of formula XVIb1, XVIb2 and/or XVI3. The concentration of these compounds is preferably from 2 to 15% by weight.
- The medium comprises one or more compounds of the formula XVIc, preferably of formula XVIc1, XVIc2 and/or XVIc3. The concentration of these compounds is preferably from 2 to 20% by weight.
- The medium comprises one or more compounds of the formula XVIg, preferably of the formula XVIg1 and/or XVIg2. The total concentration of these compounds is preferably from 5 to 25% by weight.
- The medium comprises one or more compounds selected from the group consisting of the formulae XVIIa, XVIIb and XVIIc, very preferably of formula XVIIa wherein L is H and of formula XVIIb wherein L is F. The total concentration of these compounds is preferably from 0.5 to 5% by weight.
- The medium comprises one or more compounds of the formula XX, preferably of the formula XXa. The concentration of these compounds is preferably from 2 to 10% by weight.
- The medium comprises one or more compounds of the formula XXI, preferably of the formula XXIa. The concentration of these compounds is preferably from 2 to 10% by weight.
- The medium comprises one or more compounds of the formula XXIII, preferably of the formula XXIIIa. The concentration of these compounds is preferably from 0.5 to 5% by weight.
- The medium comprises one or more compounds of the formula XXIX, preferably of the formula XXIXa. The concentration of these compounds is preferably from 2 to 10% by weight.
- The medium comprises one or more compounds of the formula XXX, preferably of the formula XXXa. The concentration of these compounds is preferably from 2 to 10% by weight.
- The medium comprises one or more compounds of the formula XXXI. The concentration of these compounds is preferably from 2 to 10% by weight.
- The medium comprises one or more compounds of the formula XXXI. The concentration of these compounds is preferably from 2 to 10% by weight.
- The medium comprises one or more compounds of the formula XXXIV, preferably of the formula XXXIVa. The concentration of these compounds is preferably from 1 to 5% by weight.
- The medium comprises one or more compounds of formula I, preferably of formula I1, one or more compounds selected from the group consisting of the formulae Z1, Z2 and Z3 or their subformulae, one or more compounds selected from the group consisting of formulae IX, X and XIV or their subformulae, one or more compounds selected from the group consisting of formulae II, III, IV, VI, XX, XXIII and XXIX or their subformulae, and one or more compounds selected from the group consisting of the formulae XII, XVI, XVIIa, XVIIb, XVIIc, XXXI and XXXIV or their subformulae.
- The medium comprises one or more compounds of formula I, preferably of formula I1, one or more compounds selected from the group consisting of the formulae Z1, Z2 and Z3 or their subformulae, one or more compounds selected from the group consisting of formulae IXa, Xb, XIb and XIVd or their subformulae, one or more compounds selected from the group consisting of formulae II, III, IVc, VIb, XXa, XXIIIa and XXIXa or their subformulae, and one or more compounds selected from the group consisting of the formulae XIIb, XVIb, XVIc, XVIIa, XVIIb, XVIIc, XXXI and XXXIVa or their subformulae.
- The medium comprises one or more compounds of formula I, preferably of formula I1, one or more compounds selected from the group consisting of the formulae Z1, Z2 and Z3 or their subformulae, one or more compounds of formula Y, preferably selected from the group consisting of the formulae Y1 and Y2, one or more compounds selected from the group consisting of formulae IX, X and XIV or their subformulae, one or more compounds selected from the group consisting of formulae II, III, IV, VI, XX, XXIII and XXIX or their subformulae, and one or more compounds selected from the group consisting of the formulae XII, XVI, XVIIa, XVIIb, XVIIc, XXXI and XXXIV or their subformulae.
- The medium comprises one or more compounds of formula I, preferably of formula II, one or more compounds selected from the group consisting of the formulae Z1, Z2 and Z3 or their subformulae, one or more compounds of formula B, preferably selected from the group consisting of the formulae B1, B2 and B3, one or more compounds selected from the group consisting of formulae IXa, Xb, XIb and XIVd or their subformulae, one or more compounds selected from the group consisting of formulae II, III, IVc, VIb, XXa, XXIIIa and XXIXa or their subformulae, and one or more compounds selected from the group consisting of the formulae XIIb, XVIb, XVIc, XVIIa, XVIIb, XVIIc, XXXI and XXXIVa or their subformulae.
- Besides the compounds of the formulae I, the medium comprises further compounds selected from the group of the compounds of the formula Z1, Z2, Z3, Y, B, IV, IX, X, XII, XIV, XVI, XVIIa, XVIIb, XVIIc, XXI, XXIII, XXIX, XXX, XXXI and XXIV or their subformulae.
- Besides the compounds of the formulae I, the medium comprises further compounds selected from the group of the compounds of the formula Z1, Z2, Z3, IV, IX, X, XII, XIV, XVI, XVIIa, XVIIb, XVIIc, XXI, XXIII, XXIX, XXX, XXXI and XXIV or their subformulae.
- The proportion of compounds of formula I or its subformulae in the medium is from 1 to 30%, very preferably from 2 to 25%, most preferably from 2 to 20% by weight.
- The proportion of compounds of the formula Z1, Z2 and Z3 or their subformulae in the mixture as a whole is from 10 to 65%, very preferably from 20 to 60%.

The proportion of compounds of the formula Y or its subformulae in the mixture as a whole is from 1 to 20%, very preferably from 2 to 15%.

The proportion of compounds of the formula B or its subformulae in the mixture as a whole is from 1 to 20%, very preferably from 2 to 18%.

The proportion of compounds of the formulae II, III, IV-VIII, XVIII-XXIII and XXVII-XXX in the mixture as a whole is 30 to 60% by weight.

The proportion of compounds of the formulae IX-XV in the mixture as a whole is 40 to 70% by weight.

The proportion of compounds of the formulae XIV, XVIIa-c and XXXI-XXXIV in the mixture as a whole is 0.5 to 15% by weight.

The term "alkyl" or "alkyl*" in this application encompasses straight-chain and branched alkyl groups having 1-6 carbon atoms, in particular the straight-chain groups methyl, ethyl, propyl, butyl, pentyl and hexyl. Groups having 2-5 carbon atoms are generally preferred.

The term "alkenyl" or "alkenyl*" encompasses straight-chain and branched alkenyl groups having 2-6 carbon atoms, in particular the straight-chain groups. Preferred alkenyl groups are $C_2$-$C_7$-1E-alkenyl, $C_4$-$C_6$-3E-alkenyl, in particular $C_2$-$C_6$-1E-alkenyl. Examples of particularly preferred alkenyl groups are vinyl, 1E-propenyl, 1E-butenyl, 1E-pentenyl, 1E-hexenyl, 3-butenyl, 3E-pentenyl, 3E-hexenyl, 4-pentenyl, 4Z-hexenyl, 4E-hexenyl and 5-hexenyl. Groups having up to 5 carbon atoms are generally preferred, in particular $CH_2$=CH, $CH_3CH$=CH.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3. Further preferably the alkoxy or oxaalkyl group can also contain one or more further O atoms such that oxygen atoms are not directly linked to one another.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high As values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the liquid-crystalline media according to the invention is not crucial. The mixtures can therefore comprise one or more further components for the purposes of optimisation of various properties. However, the observed effect on the desired improvement in the properties of the medium is generally greater, the higher the total concentration of compounds of the above-mentioned formulae.

In a particularly preferred embodiment, the liquid-crystalline media according to the invention comprise compounds of the formulae IV to VIII (preferably IV and V) in which $X^0$ denotes F, $OCF_3$, $OCHF_2$, OCH=$CF_2$, OCF=$CF_2$ or $OCF_2$—$CF_2H$. A favourable synergistic action with the compounds of the formulae I, II and III results in particularly advantageous properties. In particular, mixtures comprising compounds of the formulae I, II and III are distinguished by their low threshold voltage.

The individual compounds of the above-mentioned formulae and the subformulae thereof which can be used in the liquid-crystalline media according to the invention are either known or can be prepared analogously to the known compounds.

The invention also relates to a process for the preparation of a liquid-crystalline medium as described above and below, by mixing one or more compounds of the formula I with one or more compounds of the formulae $Y^1$, $Y^2$ or $Y^3$, one or more compounds of formula B, and one or more compounds selected from the group consisting of formulae II, III, IV, VI, IX, X, XIV, XII, XVI, XVIIa, XVIIb, XVIIc, XX, XXIII, XXIX, XXXI and XXXIV.

In another preferred embodiment of the present invention the liquid-crystalline medium additionally comprises one or more polymerisable compounds. The polymerisable compounds are preferably selected from formula M $$R^a—B^1—(Z^b—B^2)_m—R^b \qquad M$$

in which the individual radicals, on each occurrence identically or differently, and each, independently of one another, have the following meaning:

$R^a$ and $R^b$ P, P-Sp-, H, F, Cl, Br, I, —CN, —$NO_2$, —NCO, —NCS, —OCN, —SCN, $SF_5$ or straight-chain or branched alkyl having 1 to 25 C atoms, in which, in addition, one or more non-adjacent $CH_2$ groups may each be replaced, independently of one another, by —C($R^0$)=C($R^{00}$)—, —C≡C—, —N($R^{00}$)—, —O—, —S—, —CO—, —CO—O—, —O—CO—, —O—CO—O— in such a way that O and/or S atoms are not linked directly to one another, and in which, in addition, one or more H atoms may be replaced by F, C, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerisable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —$OCH_2$—, —$CH_2O$—, —$SCH_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —C≡C—, —CH=CH—COO—, —OCO—CH=CH—, $CR^0R^{00}$ or a single bond, $R^0$ and $R^{00}$ each, independently of one another, denote H or alkyl having 1 to 12 C atoms, m denotes 0, 1, 2, 3 or 4, n1 denotes 1, 2, 3 or 4, L P, P-Sp-, OH, $CH_2OH$, F, Cl, Br, I, —CN, —$NO_2$, —NCO, —NCS, —OCN, —SCN, —C(═O)N($R^x$)$_2$, —C(═O)$Y^1$, —C(═O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, C, P or P-Sp-, P and Sp have the meanings indicated above, $Y^1$ denotes halogen, $R^x$ denotes P, P-Sp-, H, halogen, straight-chain, branched or cyclic alkyl having 1 to 25 C atoms, in which, in addition, one or more non-adjacent $CH_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, C, P or P-Sp-, an optionally substituted aryl or aryloxy group having 6 to 40 C atoms, or an optionally substituted heteroaryl or heteroaryloxy group having 2 to 40 C atoms.

Particularly preferred compounds of the formula I are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent $CH_2$ groups may be replaced by O and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula M are those in which $B^1$ and $B^2$ each, independently of one another, denote 1,4-phenylene, 1,3-phenylene, naphthalene-1,4-diyl or naphthalene-2,6-diyl, Very preferred compounds of formula M are selected from the following formulae:

M1

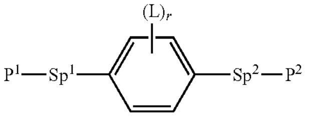

M2

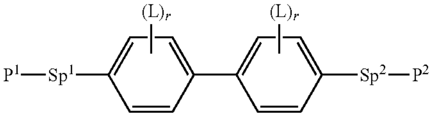

M3

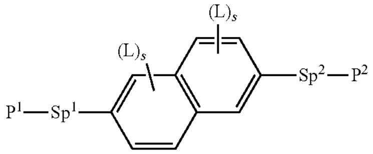

-continued

M4

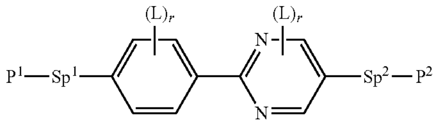

M5

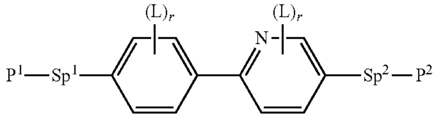

M6

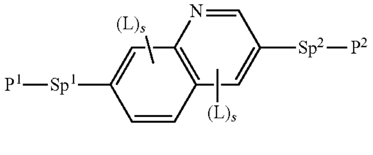

M7

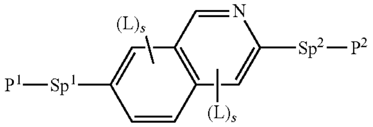

M8

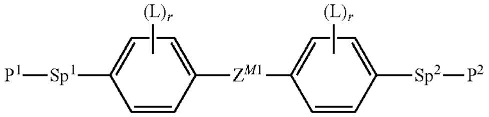

M9

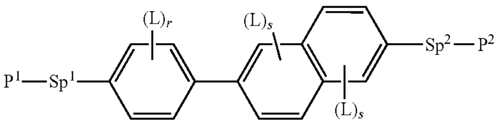

M10

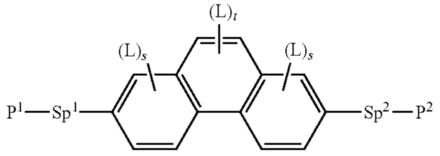

M11

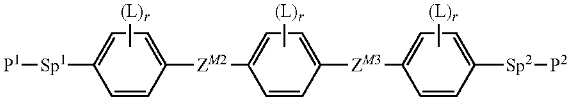

M12

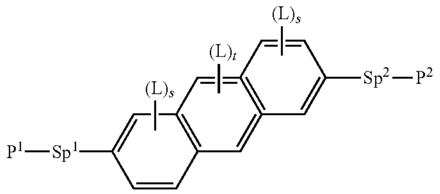

M13

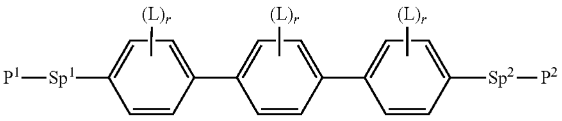

-continued
M14
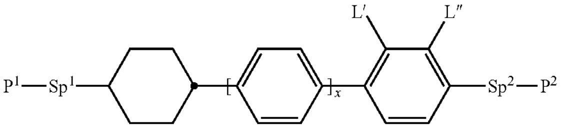
M15
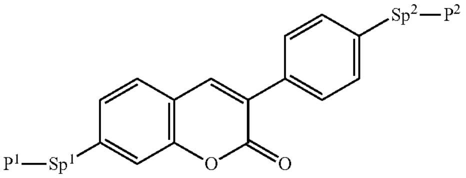
M16
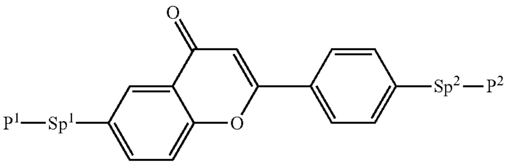
M17
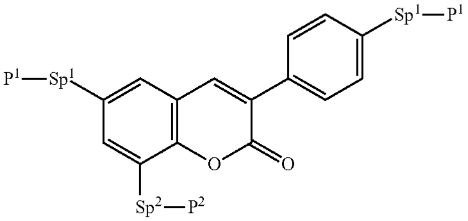
M18
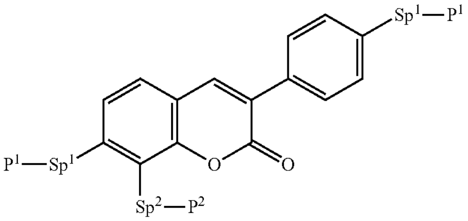
M19
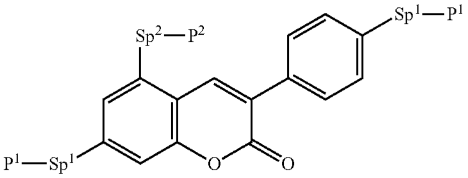
M20
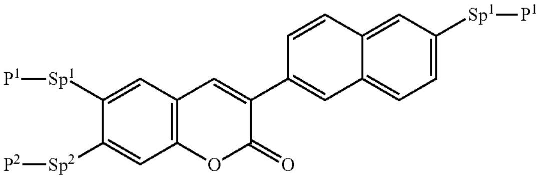
-continued
M21
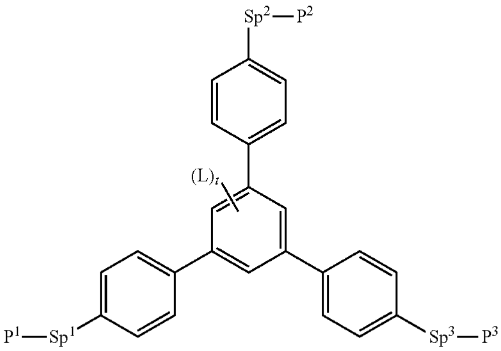
M22
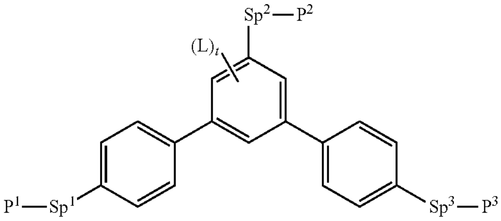
M23
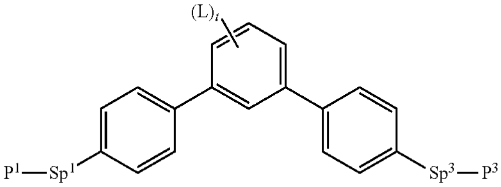
M24
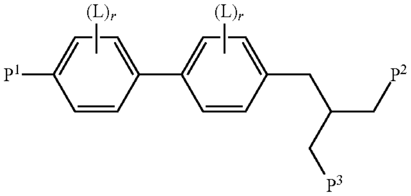
M25
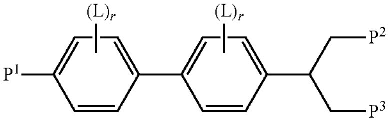
M26
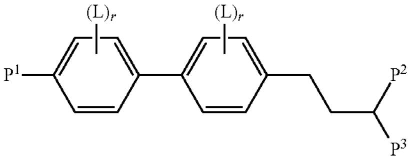
M27
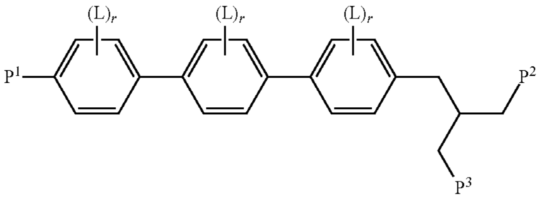

-continued

M28

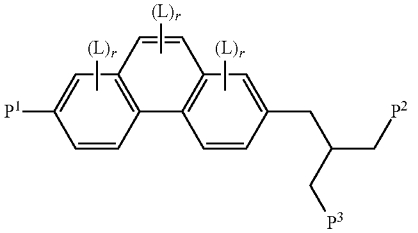

M29

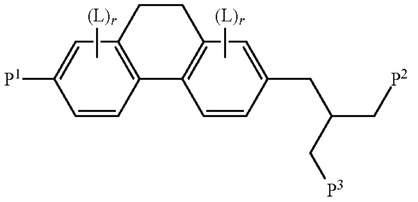

M30

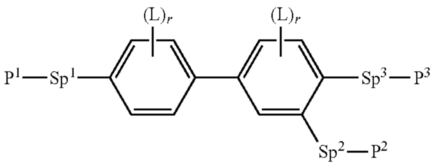

M31

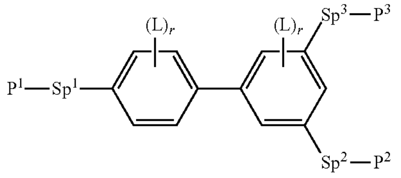

in which the individual radicals, on each occurrence identically or differently, and each, independently of one another, have the following meaning:

$P^1$, $P^2$, $P^3$ a polymerisable group, preferably selected from vinyloxy, acrylate, methacrylate, fluoroacrylate, chloroacrylate, oxetane and epoxy, $Sp^1$, $Sp^2$, $Sp^3$ a single bond or a spacer group where, in addition, one or more of the radicals $P^1$-$Sp^1$-, $P^1$—$Sp^2$- and $P^3$—$Sp^3$- may denote $R^{aa}$, with the proviso that at least one of the radicals $P^1$-$Sp^1$-, $P^2$—$Sp^2$ and $P^3$—$Sp^3$- present is different from $R^{aa}$, preferably $—(CH_2)_{p1}—$, $—(CH_2)_{p1}—O—$, $—(CH_2)_{p1}—CO—O—$ or $—(CH_2)_{p1}—O—CO—O—$, wherein p1 is an integer from 1 to 12, $R^{aa}$ H, F, Cl, CN or straight-chain or branched alkyl having 1 to 25 C atoms, in which, in addition, one or more non-adjacent $CH_2$ groups may each be replaced, independently of one another, by $—C(R^0)=C(R^{00})—$, —C≡C—, $—N(R^0)—$, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ H or alkyl having 1 to 12 C atoms, $R^y$ and $R^z$ H, F, $CH_3$ or $CF_3$, $X^1$, $X^2$, $X^3$ —CO—O—, —O—CO— or a single bond, $Z^{M1}$ —O—, —CO—, $—C(R^yR^z)—$ or $—CF_2CF_2—$, $Z^{M2}$, $Z^{M3}$ —CO—O—, —O—CO—, $—CH_2O—$, $—OCH_2—$, $—CF_2O—$, $—OCF_2—$ or $—(CH_2)_n—$, where n is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L" H, F or Cl, r 0, 1, 2, 3 or 4, s 0, 1, 2 or 3, t 0, 1 or 2, x 0 or 1.

Especially preferred are compounds of formulae M2 and M13.

Further preferred are trireactive compounds M15 to M31, in particular M17, M18, M19, M22, M23, M24, M25, M30 and M31.

In the compounds of formulae M1 to M31 the group

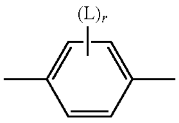

is preferably

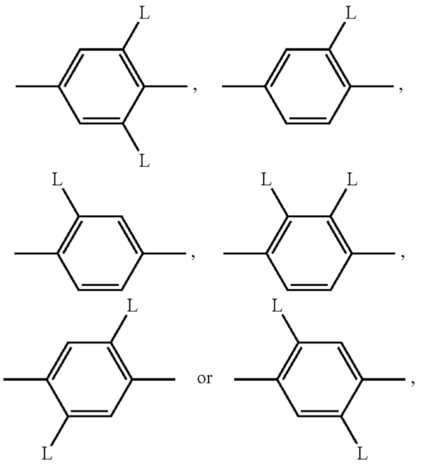

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, very preferably F, Cl, CN, $CH_3$, $C_2H_5$, $OCH_3$, $COCH_3$, $OCF_3$ or P-Sp-, more preferably F, Cl, $CH_3$, $OCH_3$, $COCH_3$ or $OCF_3$, especially F or $CH_3$.

Preferred compounds of formulae M1 to M31 are those wherein $P^1$, $P^2$ and $P^3$ denote an acrylate, methacrylate, oxetane or epoxy group, very preferably an acrylate or methacrylate group.

Further preferred compounds of formulae M1 to M31 are those wherein $Sp^1$, $Sp^2$ and $Sp^3$ are a single bond.

Further preferred compounds of formulae M1 to M31 are those wherein one of $Sp^1$, $Sp^2$ and $Sp^3$ is a single bond and another one of $Sp^1$, $Sp^2$ and $Sp^3$ is different from a single bond.

Further preferred compounds of formulae M1 to M31 are those wherein those groups $Sp^1$, $Sp^2$ and $Sp^3$ that are different from a single bond denote $—(CH_2)_{s1}—X''—$, wherein s1 is an integer from 1 to 6, preferably 2, 3, 4 or 5, and X" is X" is the linkage to the benzene ring and is —O—, —O—CO—, —CO—O—, —O—CO—O— or a single bond.

Particular preference is given to liquid-crystalline media comprising one, two or three polymerisable compounds of formula M, preferably selected from formulae M1 to M31.

Further preferably the liquid-crystalline media according to the present invention comprise one or more polymerisable compounds selected from Table E below.

Preferably the proportion of polymerisable compounds in the liquid-crystalline medium, preferably selected from formula M and Table E, is from 0.01 to 5%, very preferably from 0.05 to 1%, most preferably from 0.1 to 0.5%.

It was observed that the addition of one or more polymerisable compounds to the liquid-crystalline medium, like those selected from formula M and Table E, leads to advantageous properties like fast response times. Such a liquid-crystalline medium is especially suitable for use in PSA displays where it shows low image sticking, a quick and complete polymerisation, the quick generation of a low pretilt angle which is stable after UV exposure, a high reliability, high VHR value after UV exposure, and a high birefringence. By appropriate selection of the polymerisable compounds it is possible to increase the absorption of the liquid-crystalline medium at longer UV wavelengths, so that it is possible to use such longer UV wavelengths for polymerisation, which is advantageous for the display manufacturing process.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P are selected from the group consisting of $CH_2═CW^1—CO—O—$, $CH_2═CW^1—CO—$,

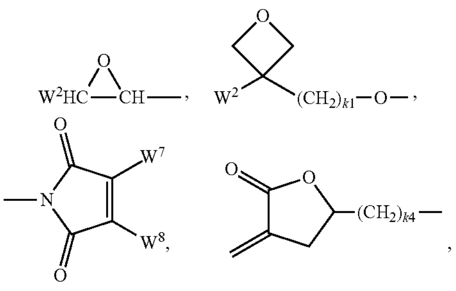

$CH_2═CW^2—(O)_{k3}—$, $CW^1═CH—CO—(O)_{k3}—$, $CW^1═CH—CO—NH—$, $CH_2═CW^1—CO—NH—$, $CH_3—CH═CH—O—$, $(CH_2═CH)_2CH—OCO—$, $(CH_2═CHCH_2)_2CH—OCO—$, $(CH_2═CH)_2CH—O—$, $(CH_2═CH—CH_2)_2N—$, $(CH_2═CH—CH_2)_2NCO—$, $HO—CW^2W^3—$, $HS—CW^2W^3—$, $HW^2N—$, $HO—CW^2W^3—NH—$, $CH_2═CW^1—CONH—$, $CH_2═CH—(COO)_{k1}$-Phe-$(O)_{k2}—$, $CH_2═CH—(CO)_{k1}$-Phe-$(O)_{k2}—$, Phe-CH═CH—, HOOC—, OCN— and $W^4W^5W^6Si—$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2═CW^1—CO—O—$, $CH_2═CW^1—CO—$,

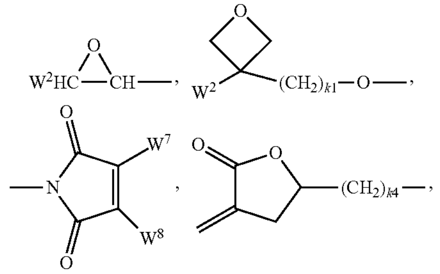

$CH_2═CW^2—O—$, $CH_2═CW^2—$, $CW^1═CH—CO—(O)_{k3}—$, $CW^1═CH—CO—NH—$, $CH_2═CW^1—CO—NH—$, $(CH_2═CH)_2CH—OCO—$, $(CH_2═CH—CH_2)_2CH—OCO—$, $(CH_2═CH)_2CH—O—$, $(CH_2═CH—CH_2)_2N—$, $(CH_2═CH—CH_2)_2N—CO—$, $CH_2═CW^1—CONH—$, $CH_2═CH—(COO)_{k1}$-Phe-$(O)_{k2}—$, $CH_2═CH—(CO)_{k1}$-Phe-$(O)_{k2}—$, Phe-CH═CH— and $W^4W^5W^6Si—$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2═CW^1—CO—O—$, in particular $CH_2═CH—CO—O—$, $CH_2═C(CH_3)—CO—O—$ and $CH_2═CF—CO—O—$, furthermore $CH_2═CH—O—$, $(CH_2═CH)_2CH—O—CO—$, $(CH_2═CH)_2CH—O—$,

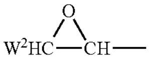

and

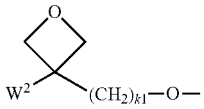

Further preferred polymerisable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"-X", so that the respective radical P-Sp- conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH═CH— or —C≡C— in such a way that O and/or S atoms are not linked directly to one another, X" denotes —O—, —S—, —CO—, —CO—O—, —O—CO—, —O—CO—O—, —CO—N($R^0$)—, —N($R^0$)—CO—, —N($R^0$)—CO—N($R^{00}$)—, —$OCH_2$—, —$CH_2O$—, —$SCH_2$—, —$CH_2S$, —$CF_2O$—, —$OCF_2$—, —$CF_2S$—, —$SCF_2$—, —$CF_2CH_2$—, —$CH_2CF_2$—, —$CF_2CF_2$—, —CH═N—, —N═CH—, —N═N—, —CH═$CR^0$—, —$CY^2$═$CY^3$—, —C≡C—, —CH═CH—CO—O—, —O—CO—CH═CH— or a single bond, $R^0$ and $R^{00}$ each, independently of one another, denote H or alkyl having 1 to 20 C atoms, and $Y^2$ and $Y^3$ each, independently of one another, denote H, F, $C_1$ or CN.

X" is preferably —O—, —S—, —CO—, —COO—, —OCO—, —O—COO—, —CO—$NR^0$—, —$NR^0$—CO—, —$NR^0$—CO—$NR^{00}$— or a single bond.

Typical spacer groups Sp and -Sp"-X"— are, for example, —$(CH_2)_{p1}$—, —$(CH_2CH_2O)_{q1}$—$CH_2CH_2$—, —$CH_2CH_2$—S—$CH_2CH_2$—, —$CH_2CH_2$—NH—$CH_2CH_2$— or —($SiR^0R^{00}$—O$)_{p1}$—, in which p1 is an integer from 1 to 12, q1 is an integer from 1 to 3, and $R^0$ and $R^{00}$ have the meanings indicated above.

Particularly preferred groups Sp and -Sp"-X"— are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

For the production of PSA displays, the polymerisable compounds contained in the liquid-crystalline medium are polymerised or crosslinked (if one compound contains two or more polymerisable groups) by in-situ polymerisation in the liquid-crystalline medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

The combination of compounds of the preferred embodiments mentioned above with the polymerised compounds described above causes low threshold voltages, low rotational viscosities and very good low-temperature stabilities in the liquid-crystalline media according to the invention at the same time as constantly high clearing points and high VHR values.

The use of liquid-crystalline media containing polymerisable compounds allows the rapid establishment of a particularly low pretilt angle in PSA displays. In particular, the liquid-crystalline media exhibit significantly shortened response times, in particular also the grey-shade response times, in PSA displays compared with the media from the prior art.

Preference is generally given to liquid-crystalline media which have a nematic liquid-crystalline phase, and preferably have no chiral liquid crystal phase.

The invention also relates to the use of a liquid-crystalline medium according to the present invention as described above and below for electro-optical purposes, in particular for the use is in shutter glasses, for 3D applications, in TN, PS-TN, STN, TN-TFT, OCB, IPS, PS-IPS, FFS, HB-FFS, XB-FFS, PS-FFS, positive VA and positive PS-VA displays, and to electro-optical displays, in particular of the aforementioned types, containing a liquid-crystalline medium according to the present invention as described above and below, in particular a TN, PS-TN, STN, TN-TFT, OCB, IPS, PS-IPS, FFS, HB-FFS, XB-FFS, PS-FFS, positive VA (vertically aligned) or positive PS-VA display.

The invention also relates to electro-optical displays, such as, for example, STN or MLC displays, having two plane-parallel outer plates, which, together with a frame, form a cell, integrated non-linear elements for switching individual pixels on the outer plates, and a nematic liquid-crystal medium having positive dielectric anisotropy and high specific resistance located in the cell, wherein the a nematic liquid-crystal medium is a liquid-crystalline medium according to the present invention as described above and below.

The liquid-crystalline media according to the invention enable a significant broadening of the available parameter latitude. The achievable combinations of clearing point, viscosity at low temperature, thermal and UV stability and high optical anisotropy are far superior to previous materials from the prior art.

In particular, the combination of compounds of formula I with compounds of formula Y and/or B, and additionally with compounds selected from formulae II-XXXIV or their subformulae, leads to liquid-crystalline media which show a moderate positive dielectric anisotropy and at the same time an increased dielectric constant $\varepsilon_\perp$ perpendicular to the longitudinal axes of the liquid-crystalline molecules, while maintaining a low rotational viscosity and a low value of the ratio $\gamma_1/K_1$. This enables liquid-crystalline displays, especially of the FFS, HB-FFS, XB-FFS and IPS mode, with high brightness and transmission and low response times.

The liquid-crystalline media according to the invention are suitable for mobile applications and TFT applications, such as, for example, mobile telephones and PDAs. Furthermore, the liquid-crystalline media according to the invention are particularly suitably for use in FFS, HB-FFS, XB-FFS and IPS displays based on dielectrically positive liquid crystals.

The liquid-crystalline media according to the invention, while retaining the nematic phase down to −20° C. and preferably down to −30° C., particularly preferably down to −40° C., and the clearing point ≥75° C., preferably ≥80° C., at the same time allow rotational viscosities $\gamma_1$ of ≤110 mPa·s, particularly preferably 100 mPa·s, to be achieved, enabling excellent MLC displays having fast response times to be achieved. The rotational viscosities are determined at 20° C.

The dielectric anisotropy As of the liquid-crystalline media according to the invention at 20° C. and 1 kHz is preferably ≥+1.5, very preferably from +2 to +3.

The birefringence Δn of the liquid-crystalline media according to the invention at 20° C. is preferably from 0.08 to 0.12, very preferably from 0.09 to 0.11.

The rotational viscosity $\gamma_1$ of the liquid-crystalline media according to the invention is preferably ≤80 mPa·s, more preferably ≤70 mPa·s, very preferably ≤60 mPa·s.

The ratio $\gamma_1/K_1$ (wherein $\gamma_1$ is the rotational viscosity $\gamma_1$ and $K_1$ is the elastic constant for splay deformation) of the liquid-crystalline media according to the invention is preferably 4.6 mPa·s/pN, very preferably 4.2 mPa·s/pN, most preferably 4.0 mPa·s/pN.

The nematic phase range of the liquid-crystalline media according to the invention preferably has a width of at least 90°, more preferably of at least 100° C., in particular at least 110°. This range preferably extends at least from −25° to +80° C.

Through a suitable choice of the components of the liquid-crystalline media according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain liquid-crystalline media having a higher As and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of liquid-crystalline media comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that liquid-crystalline media according to the invention comprising compounds of the formulae ST-1, ST-2, RV, IA and IB exhibit a significantly smaller decrease in the HR on UV exposure than analogous mixtures comprising cyanophenylcyclohexanes of the formula

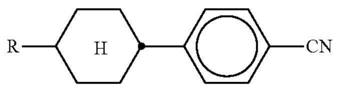

or esters of the formula

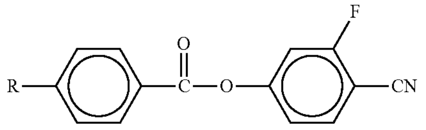

instead of the compounds of the formulae I ST-1, ST-2, RV, IA and IB.

The light stability and UV stability of the liquid-crystalline media according to the invention are considerably better, i.e. they exhibit a significantly smaller decrease in the HR on exposure to light, heat or UV.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystalline media which can be used in accordance with the invention are prepared in a manner conventional per se, for example by mixing one or more compounds of Claim 1 with one or more compounds of the formulae II-XXXIV or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The LC media may also comprise further additives known to the person skilled in the art and described in the literature, such as, for example, polymerisation initiators, inhibitors, surface-active substances, light stabilisers, antioxidants, e.g. BHT, TEMPOL, microparticles, free-radical scavengers, nanoparticles, etc. For example, 0-15% of pleochroic dyes or chiral dopants or initiators like Irgacure651@ or Irgacure907@ can be added. Suitable stabilisers and dopants are mentioned below in Tables C and D.

In a preferred embodiment of the present invention the LC media contain one or more further stabilisers, preferably selected from the group consisting of the following formulae

S1

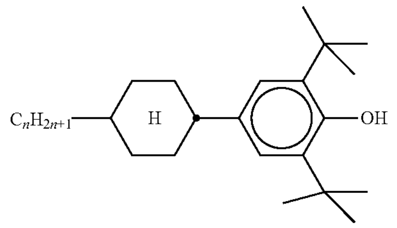

-continued

S2

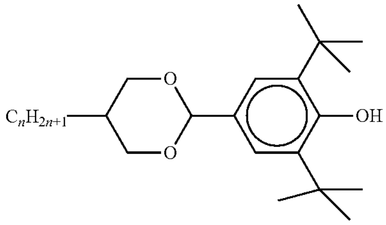

S3

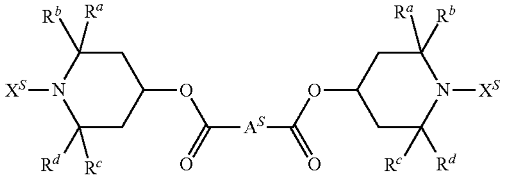

wherein the individual radicals, independently of each other and on each occurrence identically or differently, have the following meanings $R^{a-d}$ straight-chain or branched alkyl with 1 to 10, preferably 1 to 6, very preferably 1 to 4 C atoms, most preferably methyl, $X^S$ H, $CH_3$, OH or O·, $A^S$ straight-chain, branched or cyclic alkylene with 1 to 20 C atoms which is optionally substituted, n an integer from 1 to 6, preferably 3.

Preferred stabilisers of formula S3 are selected from formula S3A

S3A

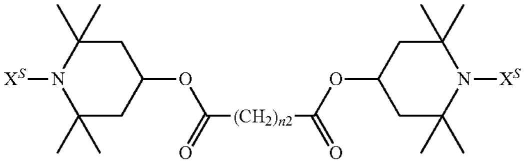

wherein n2 is an integer from 1 to 12, and wherein one or more H atoms in the group $(CH_2)_{n2}$ are optionally replaced by methyl, ethyl, propyl, butyl, pentyl or hexyl.

Very preferred stabilisers are selected from the group consisting of the following formulae

S1-1

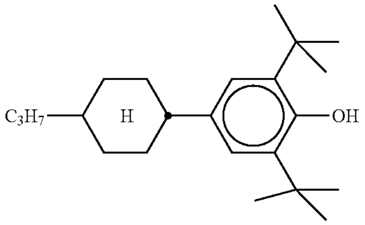

-continued

S2-1

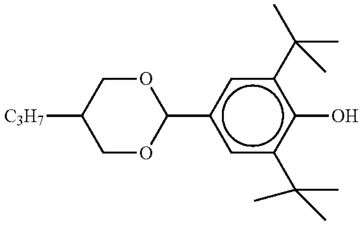

S3-1

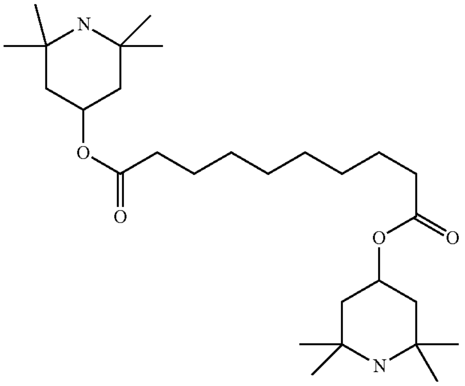

S3-2

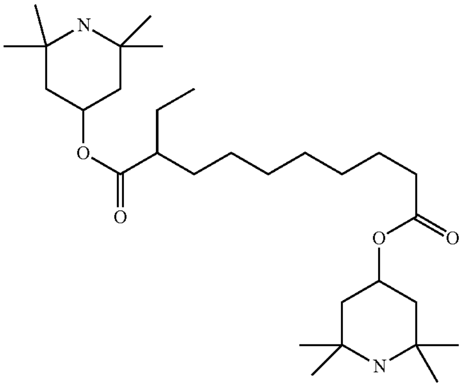

S3-3

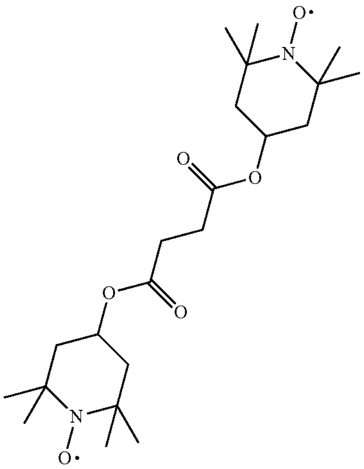

-continued

S3-4

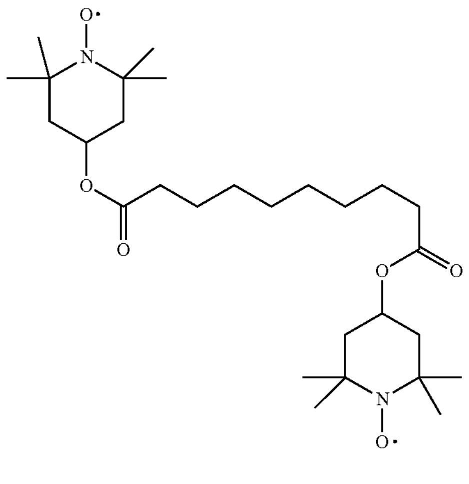

S3-5

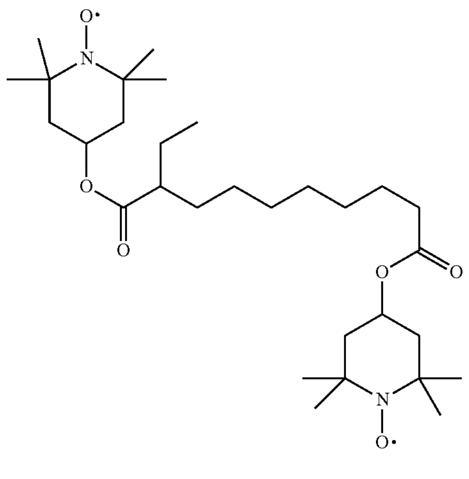

S3-6

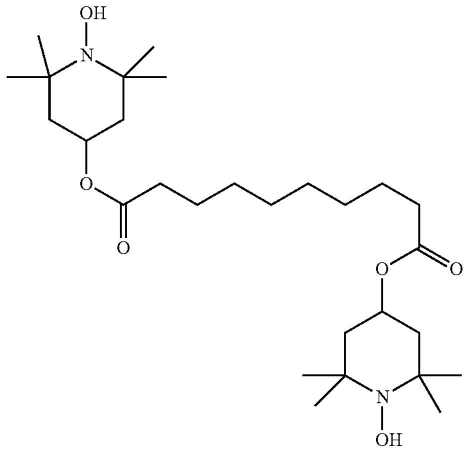

-continued

S3-7

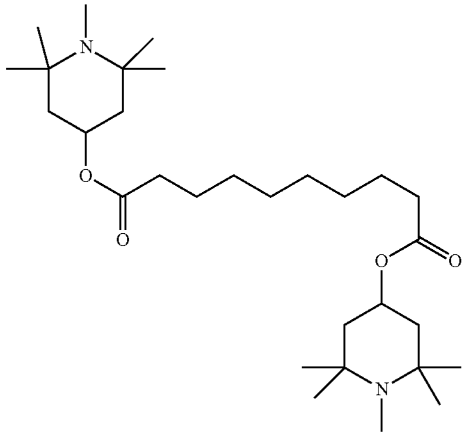

In a preferred embodiment the LC medium comprises one or more stabilisers selected from the group consisting of formulae S1-1, S2-1, S3-1, S3-1 and S3-3.

In a preferred embodiment the LC medium comprises one or more stabilisers selected from Table D.

Preferably the proportion of stabilisers, like those of formula S1-S3, in the LC medium is from 10 to 2000 ppm, very preferably from 30 to 1000 ppm.

In another preferred embodiment the LC medium according to the present invention contains a self-aligning (SA) additive, preferably in a concentration of 0.1 to 2.5%. An LC medium according to this preferred embodiment is especially suitable for use in polymer stabilised SA-FFS, SA-HB-FFS or SA-XB-FFS displays.

In a preferred embodiment the SA-FFS, SA-HB-FFS or SA-XB-FFS display according to the present invention does not contain a polyimide alignment layer. In another preferred embodiment the SA-FFS, SA-HB-FFS or SA-XB-FFS display according to preferred embodiment contains a polyimide alignment layer.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerisable groups which are attached, optionally via spacer groups, to the mesogenic group. These polymerisable SA additives can be polymerised in the LC medium under similar conditions as applied for the RMs in the PSA process.

Suitable SA additives to induce homeotropic alignment, especially for use in SA-VA mode displays, are disclosed for example in US 2013/0182202 A1, US 2014/0838581 A1, US 2015/0166890 A1 and US 2015/0252265 A1.

In another preferred embodiment an LC medium or a polymer stabilised SA-FFS, SA-HB-FFS or SA-XB-FFS display according to the present invention contains one or more self-aligning additives selected from Table F below.

Furthermore, it is possible to add to the liquid-crystalline media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

In the present application and in the examples below, the structures of the liquid-crystal compounds are indicated by means of acronyms, the transformation into chemical formulae taking place in accordance with Table A. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{28}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| $nOCF_3$ | $C_nH_{2n+1}$ | $OCF_3$ | H | H |
| $nOCF_3.F$ | $C_nH_{2n+1}$ | $OCF_3$ | F | H |
| n-Vm | $C_nH_{2n+1}$ | $—CH{=}CH—C_mH_{2m+1}$ | H | H |
| nV-Vm | $C_nH_{2n+1}—CH{=}CH—$ | $—CH{=}CH—C_mH_{2m+1}$ | H | H |

Preferred mixture components are shown in Tables A and B.

TABLE A

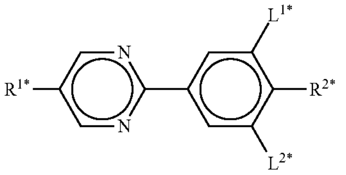

PYP

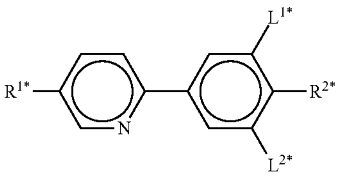

PYRP

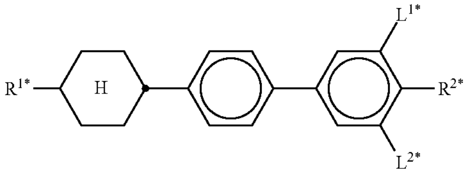

BCH

TABLE A-continued

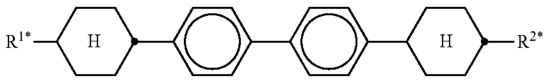

CBC

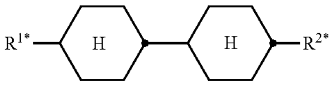

CCH

TABLE A-continued

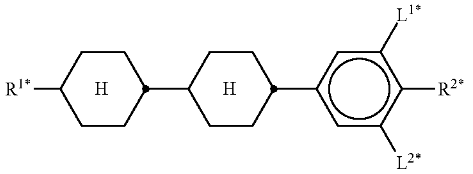

CCP

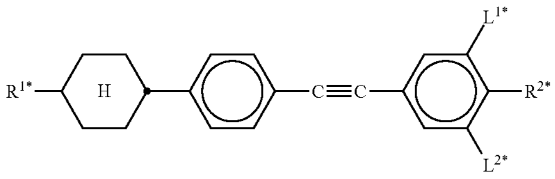

CPTP

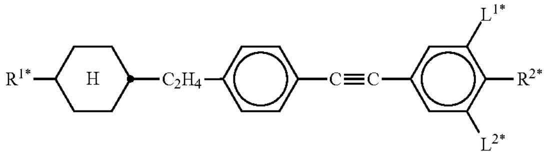

CEPTP

TABLE A-continued
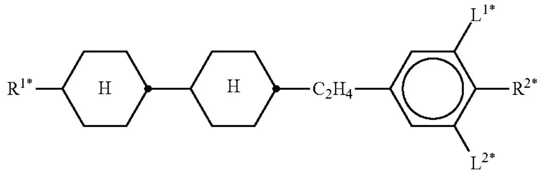
ECCP
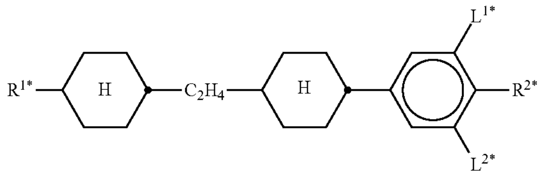
CECP
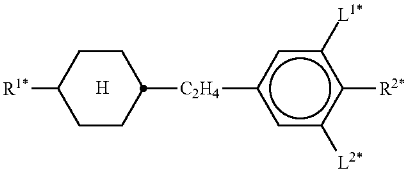
EPCH
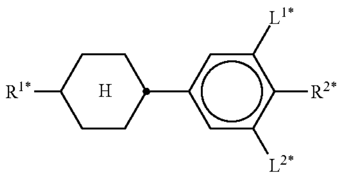
PCH
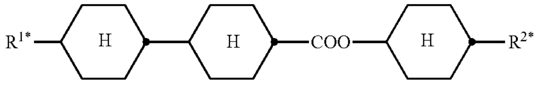
CH
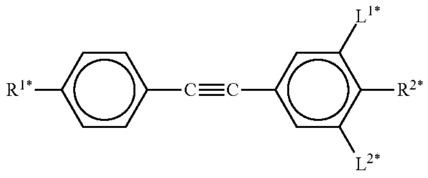
PTP
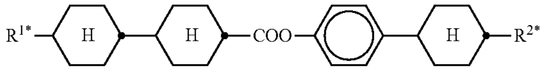
CCPC
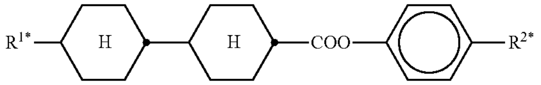
CP
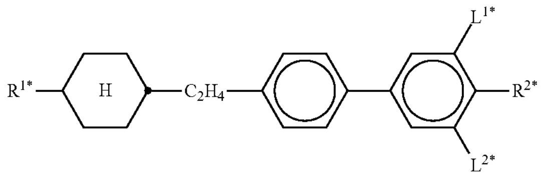
BECH
TABLE A-continued
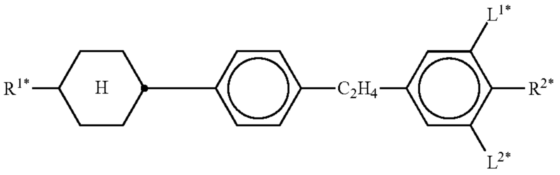
EBCH
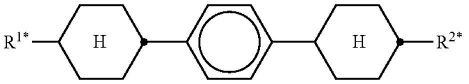
CPC
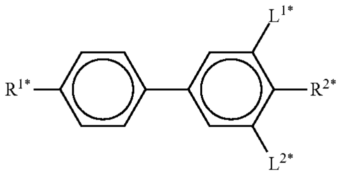
B
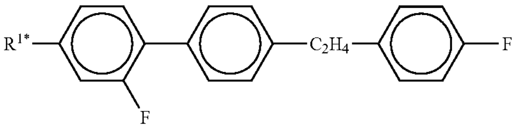
FET-nF
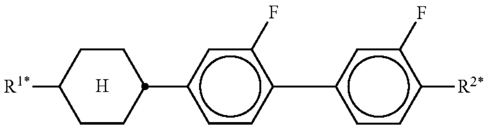
CGG
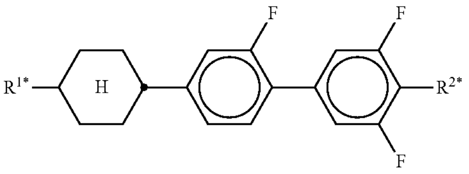
CGU
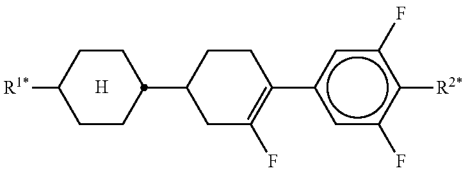
CFU TABLE B
| In the following formulae, n and m each, independently of one another, denote 0, 1, 2, 3, 4, 5, 6, 7, 8, 9, 10, 11, 12, in particular 2, 3, 5, furthermore 0, 4, 6. |
| --- |
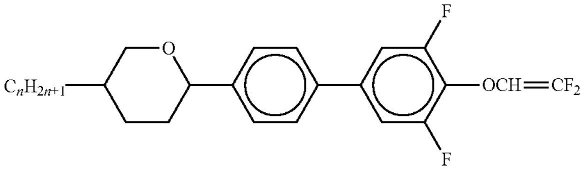
APU-n-OXF
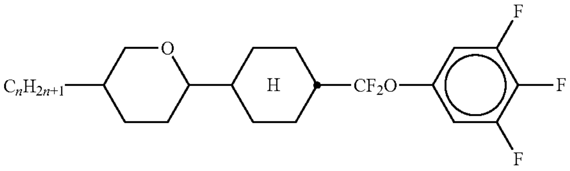
ACQU-n-F
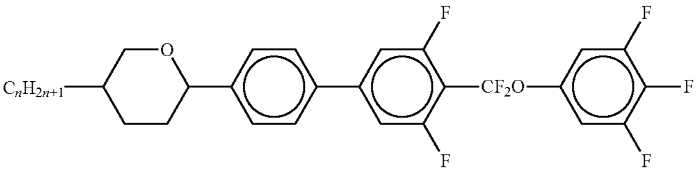
APUQU-n-F
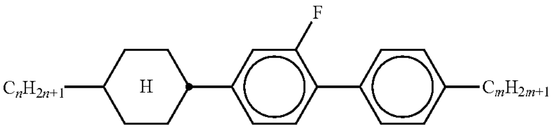
BCH-n.Fm
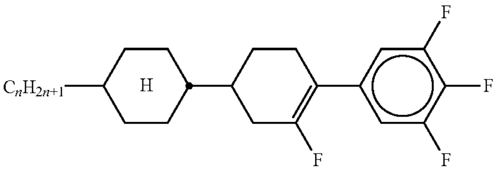
CFU-n-F
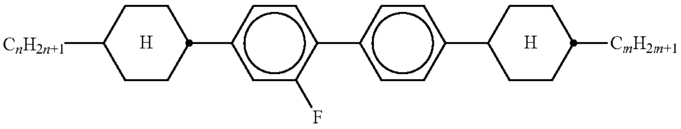
CBC-nmF
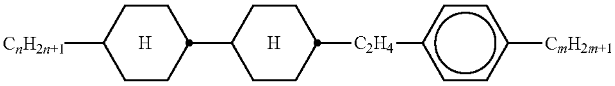
ECCP-nm
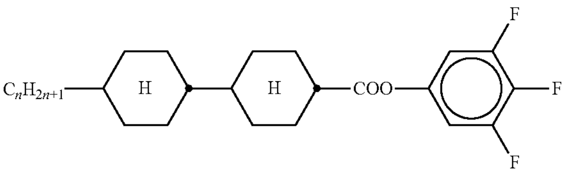
CCZU-n-F TABLE B-continued
| In the following formulae, n and m each, independently of one another, denote 0, 1, 2, 3, 4, 5, 6, 7, 8, 9, 10, 11, 12, in particular 2, 3, 5, furthermore 0, 4, 6. |
|---|
| 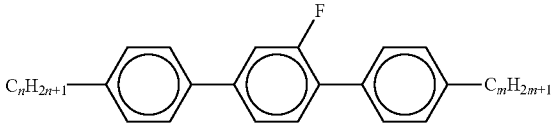 |
| PGP-n-m |
| 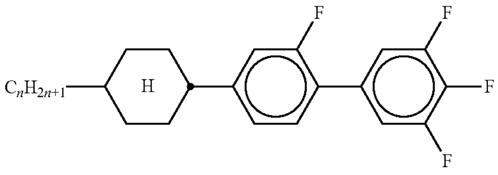 |
| CGU-n-F |
| 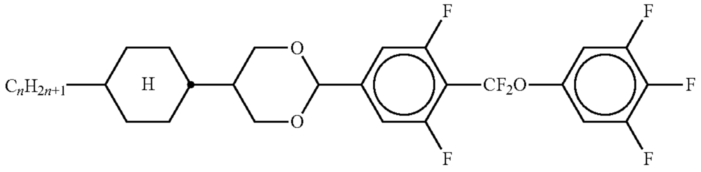 |
| CDUQU-n-F |
| 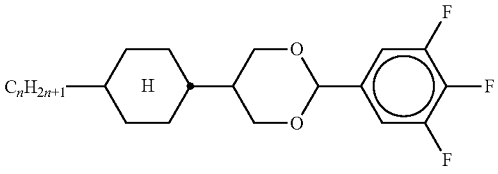 |
| CDU-n-F |
| 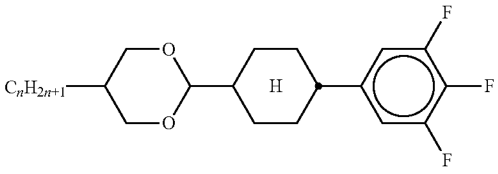 |
| DCU-n-F |
| 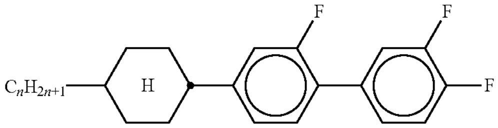 |
| CGG-n-F |
| 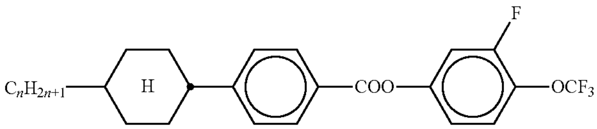 |
| CPZG-n-OT |
| 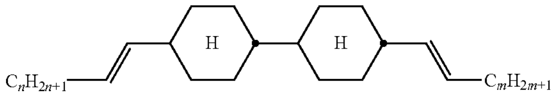 |
| CC-nV-Vm |

TABLE B-continued
In the following formulae, n and m each, independently of one another, denote 0, 1, 2, 3, 4, 5, 6, 7, 8, 9, 10, 11, 12, in particular 2, 3, 5, furthermore 0, 4, 6.
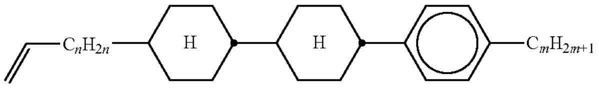
CCP-Vn-m
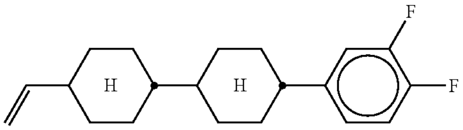
CCG-V-F
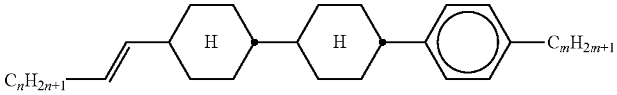
CCP-nV-m
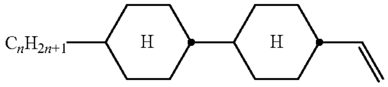
CC-n-V
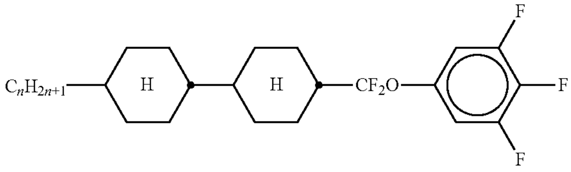
CCQU-n-F
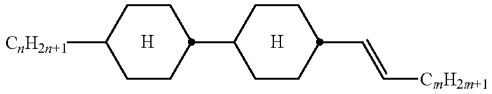
CC-n-Vm
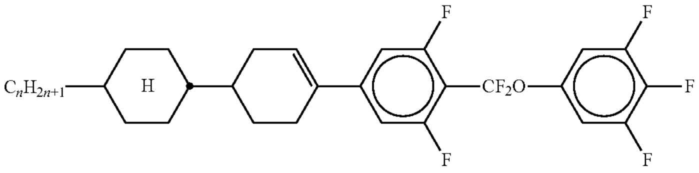
CLUQU-n-F
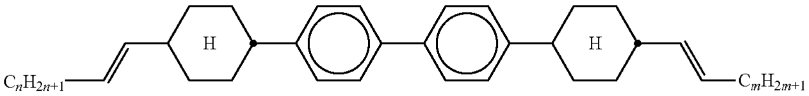
CPPC-nV-Vm
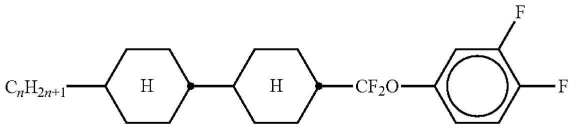
CCQG-n-F TABLE B-continued
In the following formulae, n and m each, independently of one another, denote 0, 1, 2, 3, 4, 5, 6, 7, 8, 9, 10, 11, 12, in particular 2, 3, 5, furthermore 0, 4, 6.
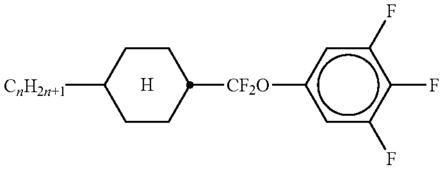
CQU-n-F
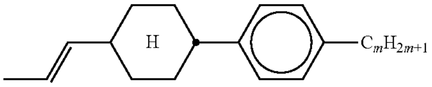
CP-1V-m
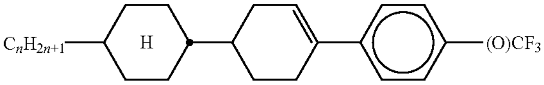
CLP-n-(O)T
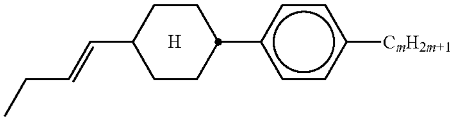
CP-2V-m
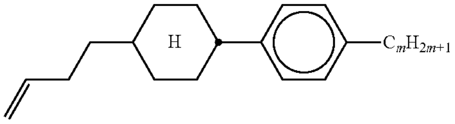
CP-V2-m
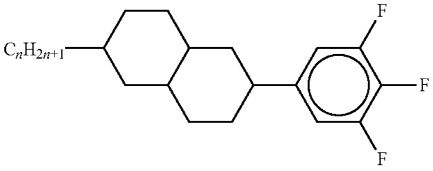
Dec-U-n-F
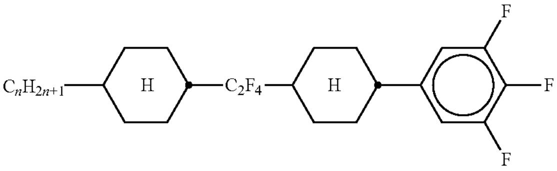
CWCU-n-F
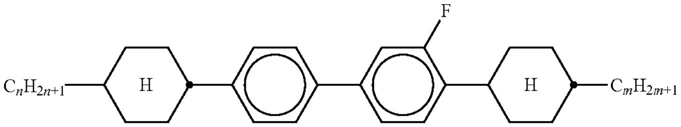
CPGP-n-m TABLE B-continued
| In the following formulae, n and m each, independently of one another, denote 0, 1, 2, 3, 4, 5, 6, 7, 8, 9, 10, 11, 12, in particular 2, 3, 5, furthermore 0, 4, 6. |
|---|
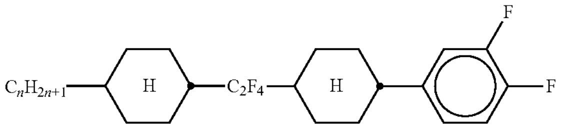
CWCG-n-F
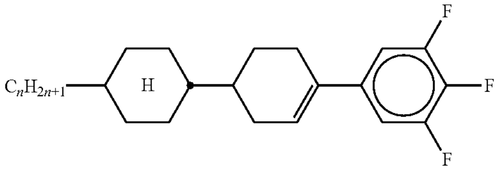
CLU-n-F
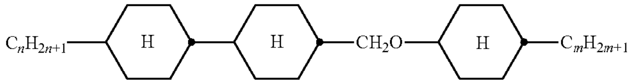
CCOC-n-m
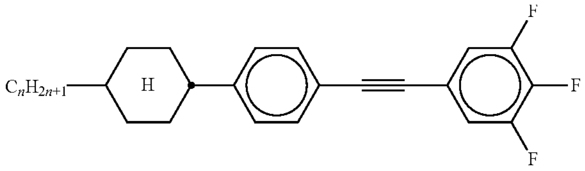
CPTU-n-F
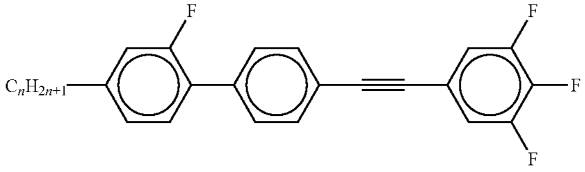
GPTU-n-F
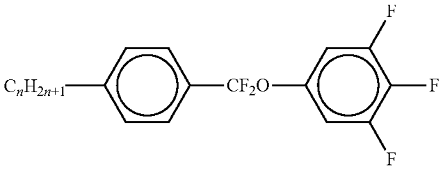
PQU-n-F
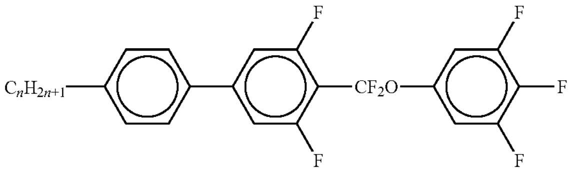
PUQU-n-F TABLE B-continued
| In the following formulae, n and m each, independently of one another, denote 0, 1, 2, 3, 4, 5, 6, 7, 8, 9, 10, 11, 12, in particular 2, 3, 5, furthermore 0, 4, 6. |
|---|
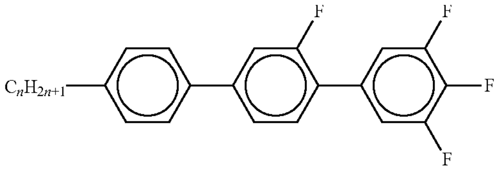
PGU-n-F
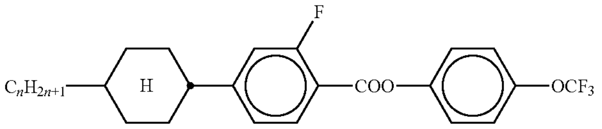
CGZP-n-OT
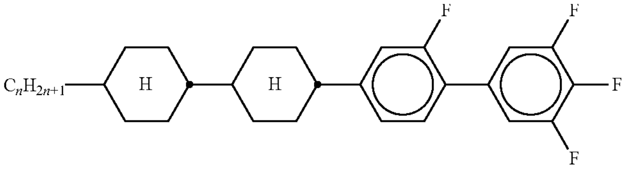
CCGU-n-F
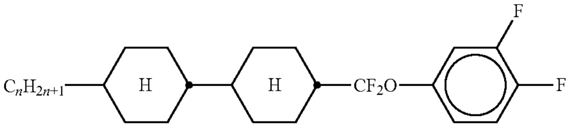
CCQG-n-F
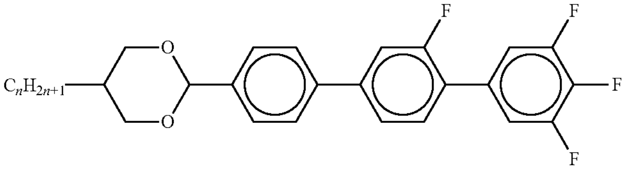
DPGU-n-F
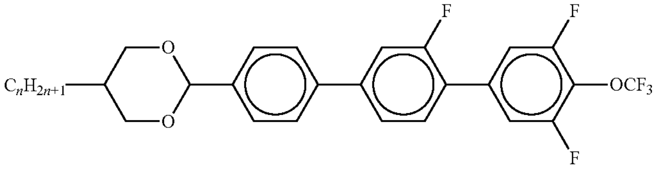
DPGU-n-OT
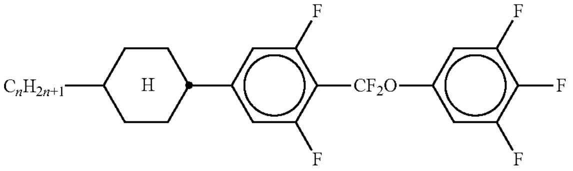
CUQU-n-F TABLE B-continued
In the following formulae, n and m each, independently of one another, denote 0, 1, 2, 3, 4, 5, 6, 7, 8, 9, 10, 11, 12, in particular 2, 3, 5, furthermore 0, 4, 6.
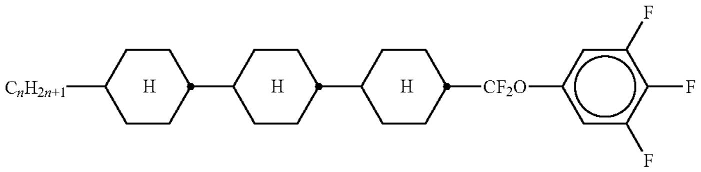
CCCQU-n-F
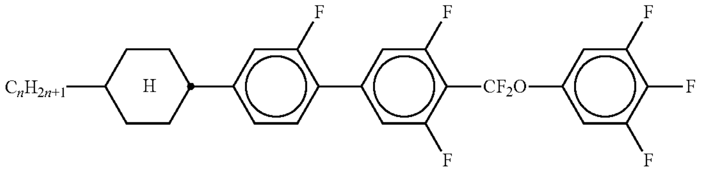
CGUQU-n-F
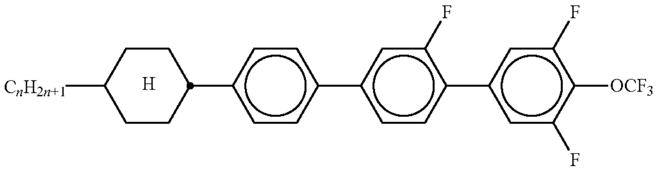
CPGU-n-OT
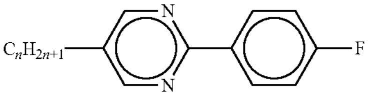
PYP-nF
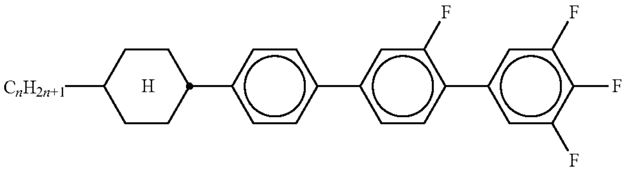
CPGU-n-F
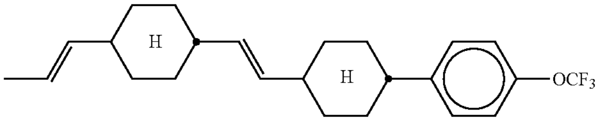
CVCP-1V-OT
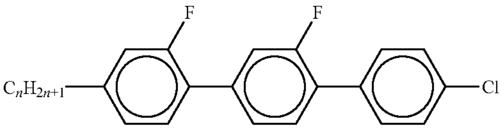
GGP-n-Cl
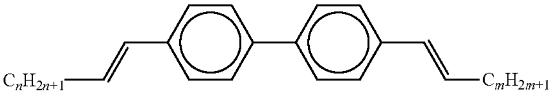
PP-nV-Vm TABLE B-continued
| In the following formulae, n and m each, independently of one another, denote 0, 1, 2, 3, 4, 5, 6, 7, 8, 9, 10, 11, 12, in particular 2, 3, 5, furthermore 0, 4, 6. |
| --- |
| 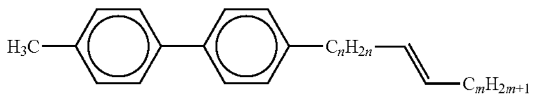 |
| PP-1-nVm |
| 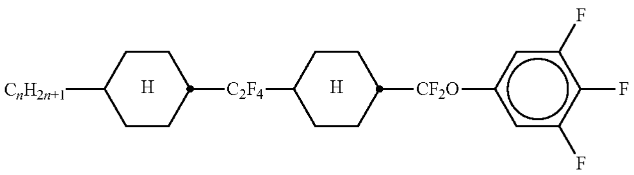 |
| CWCQU-n-F |
| 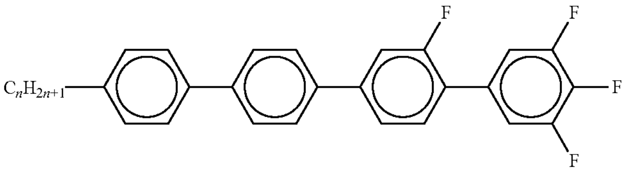 |
| PPGU-n-F |
| 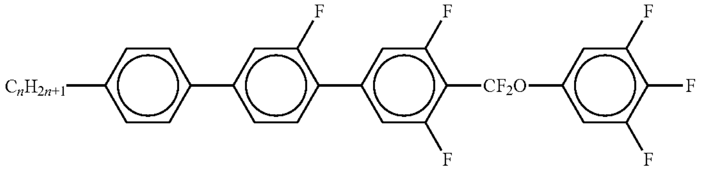 |
| PGUQU-n-F |
| 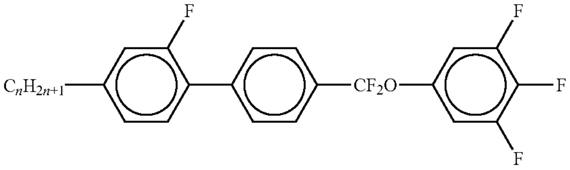 |
| GPQU-n-F |
| 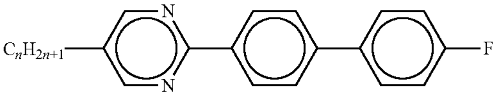 |
| MPP-n-F |
| 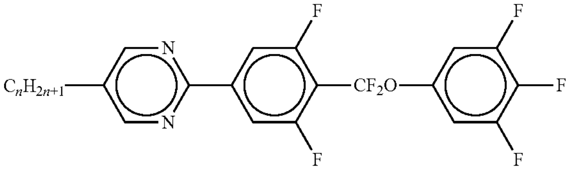 |
| MUQU-n-F |

TABLE B-continued
In the following formulae, n and m each, independently of one another, denote 0, 1, 2, 3, 4, 5, 6, 7, 8, 9, 10, 11, 12, in particular 2, 3, 5, furthermore 0, 4, 6.
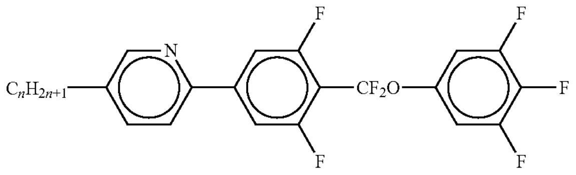
NUQU-n-F
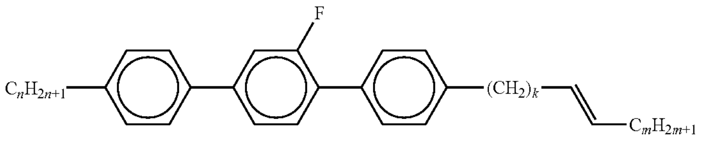
PGP-n-kVm
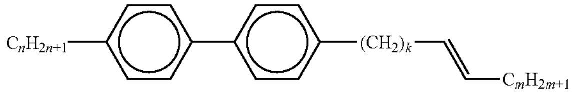
PP-n-kVm
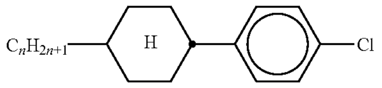
PCH-nCl
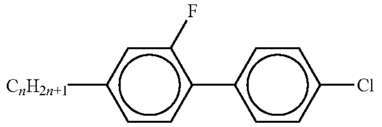
GP-n-Cl
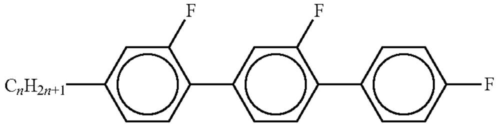
GGP-n-F
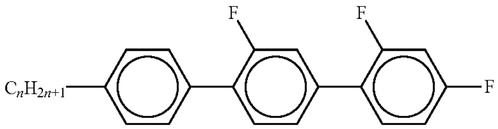
PGIGI-n-F
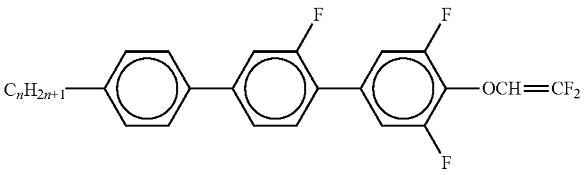
PGU-n-OXF TABLE B-continued
In the following formulae, n and m each, independently of one another, denote 0, 1, 2, 3, 4, 5, 6, 7, 8, 9, 10, 11, 12, in particular 2, 3, 5, furthermore 0, 4, 6.
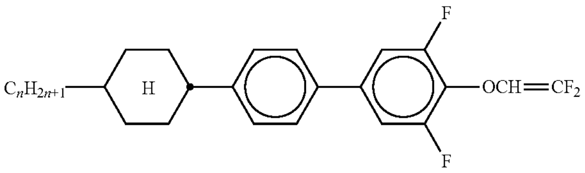
CPU-n-OXF
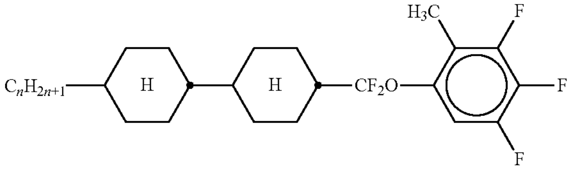
CCQU-n-F(1)
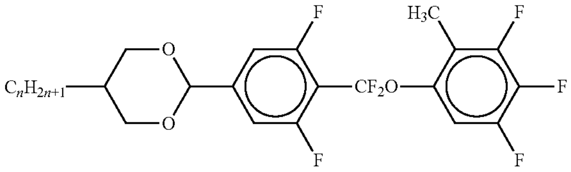
DUQU-n-F(1)
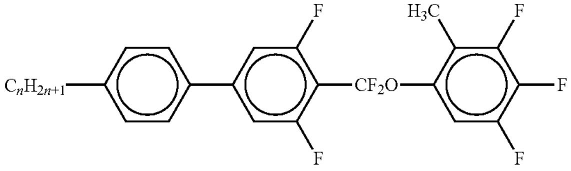
PUQU-n-F(1)
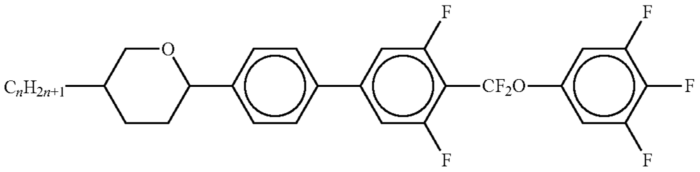
APUQU-n-F(1)
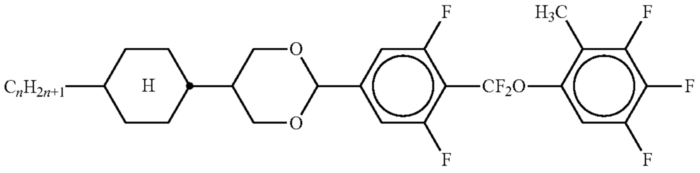
CDUQU-n-F(1)
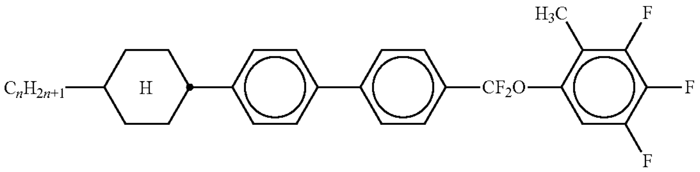
CPPQU-n-F(1)

TABLE B-continued

In the following formulae, n and m each, independently of one another, denote 0, 1, 2, 3, 4, 5, 6, 7, 8, 9, 10, 11, 12, in particular 2, 3, 5, furthermore 0, 4, 6.

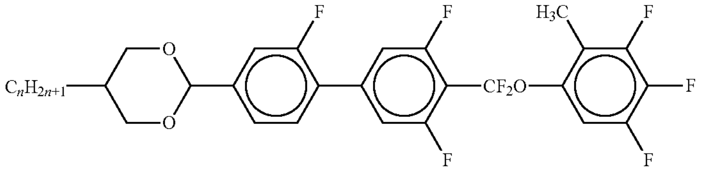

DGUQU-n-F(1)

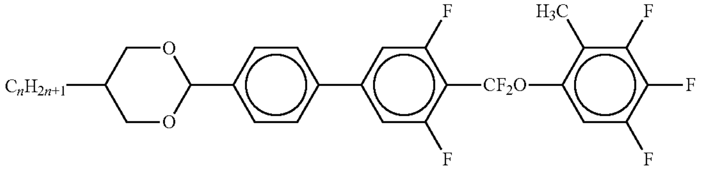

DPUQU-n-F(1)

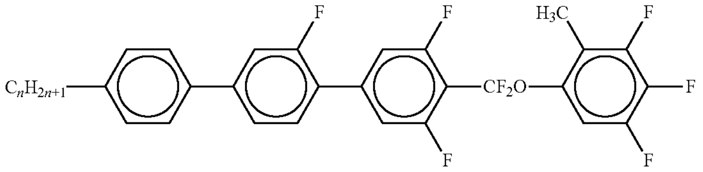

PGUQU-n-F(1)

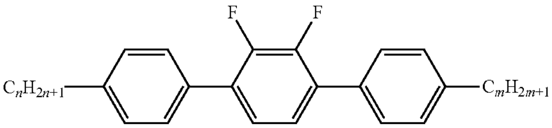

PYP-n-m

Particular preference is given to liquid-crystalline media which, besides the compounds of the formulae IA, IIA, IB and IIB, comprise at least one, two, three, four or more compounds from Table B.

TABLE C

Table C indicates possible dopants which are generally added to the liquid-crystalline media according to the invention. The liquid-crystalline media preferably comprise 0-10% by weight, in particular 0.01-5% by weight and particularly preferably 0.01-3% by weight of dpoants.

C 15

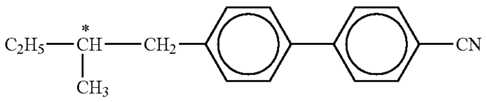

CB 15

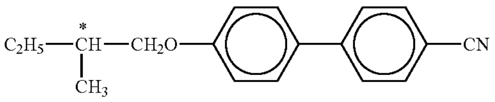

CM 21

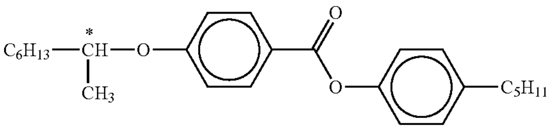

TABLE C-continued
| Table C indicates possible dopants which are generally added to the liquid-crystalline media according to the invention. The liquid-crystalline media preferably comprise 0-10% by weight, in particular 0.01-5% by weight and particularly preferably 0.01-3% by weight of dpoants. | |
|---|---|
| 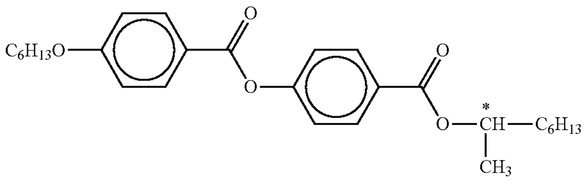 | R/S-811 |
| 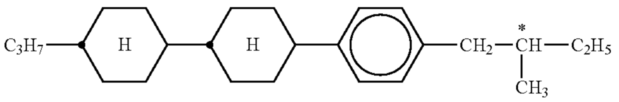 | CM 44 |
| 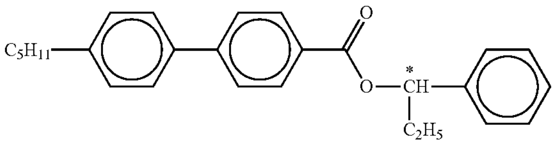 | CM 45 |
| 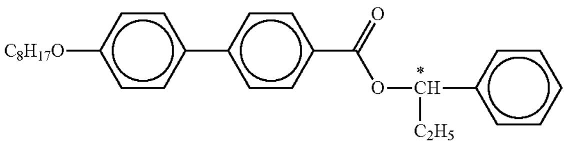 | CM 47 |
| 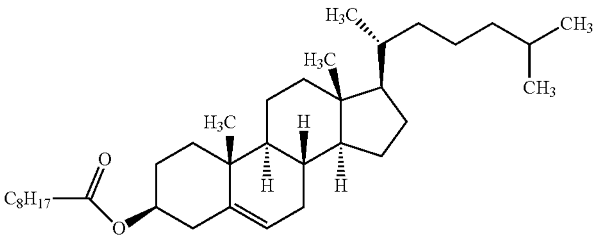 | CN |
| 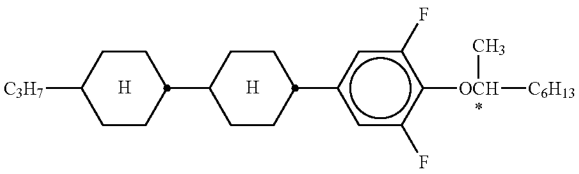 | R/S-2011 |
| 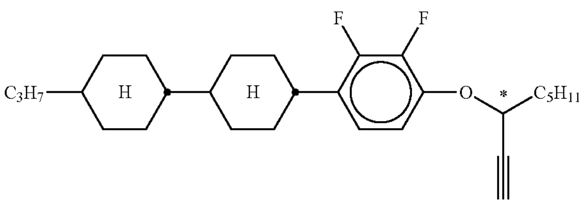 | R/S-3011 |
| 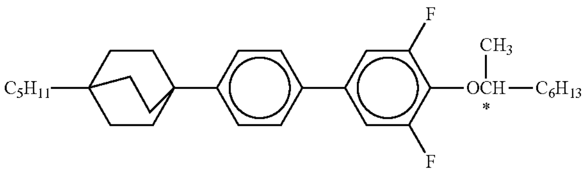 | R/S-4011 |

TABLE C-continued

Table C indicates possible dopants which are generally added to the liquid-crystalline media according to the invention. The liquid-crystalline media preferably comprise 0-10% by weight, in particular 0.01-5% by weight and particularly preferably 0.01-3% by weight of dpoants.

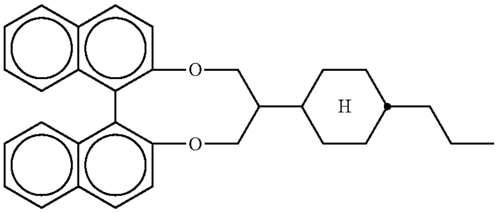

R/S-5011

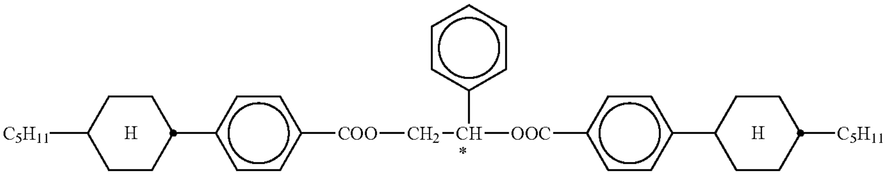

R/S-1011

TABLE D

Stabilisers, which can additionally be added, for example, to the liquid-crystalline media according to the invention in amounts of 0-10% by weight, are mentioned below.

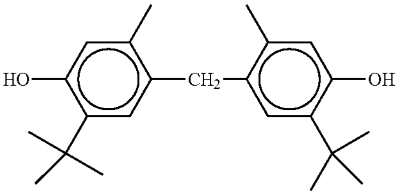

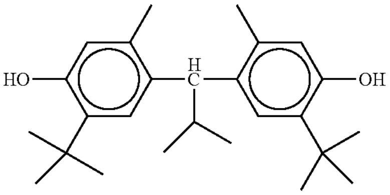

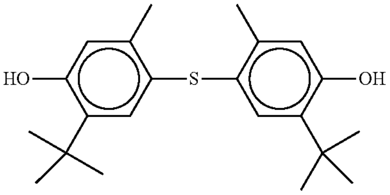

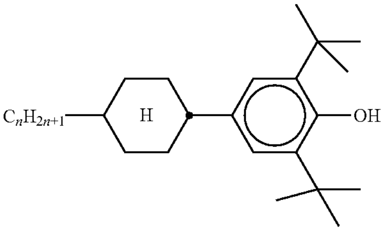

n = 1, 2, 3, 4, 5, 6 or 7

TABLE D-continued

Stabilisers, which can additionally be added, for example, to the liquid-crystalline media according to the invention in amounts of 0-10% by weight, are mentioned below.

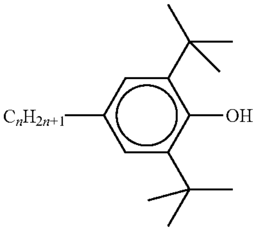

n = 1, 2, 3, 4, 5, 6 or 7

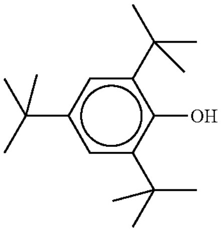

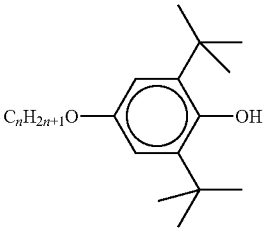

n = 1, 2, 3, 4, 5, 6 or 7

TABLE D-continued

| Stabilisers, which can additionally be added, for example, to the liquid-crystalline media according to the invention in amounts of 0-10% by weight, are mentioned below. |
|---|
| 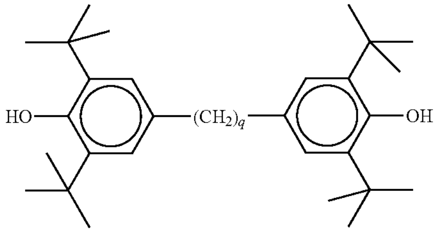 |
| q = 1, 2, 3, 4, 5, 6 or 7 |
| 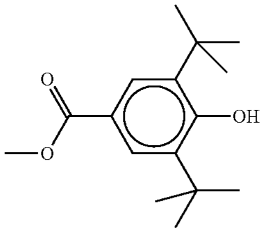 |
| 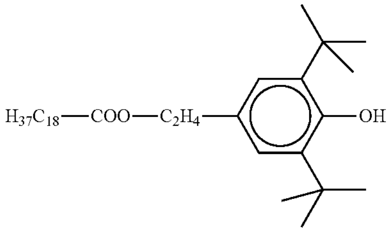 |
| 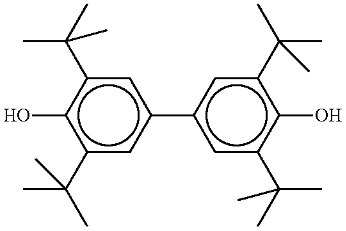 |
| 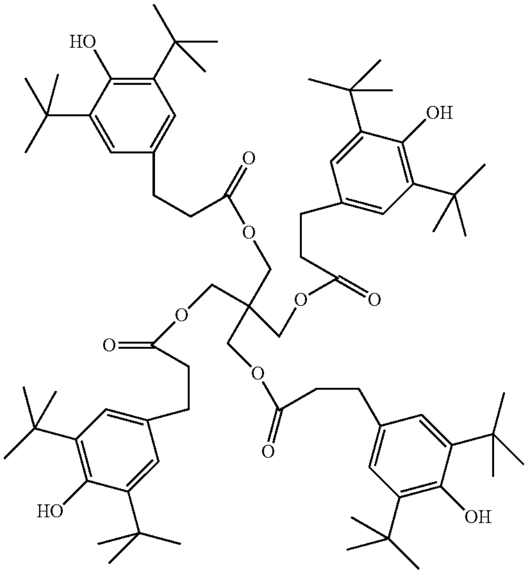 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O] |

TABLE D-continued

| Stabilisers, which can additionally be added, for example, to the liquid-crystalline media according to the invention in amounts of 0-10% by weight, are mentioned below. |
|---|
| 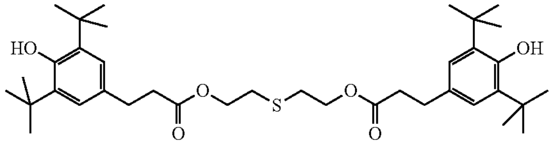 [SMILES: CC(C)(C)c1cc(CCC(=O)OCCSCCOC(=O)CCc2cc(C(C)(C)C)c(O)c(C(C)(C)C)c2)cc(C(C)(C)C)c1O] |
| 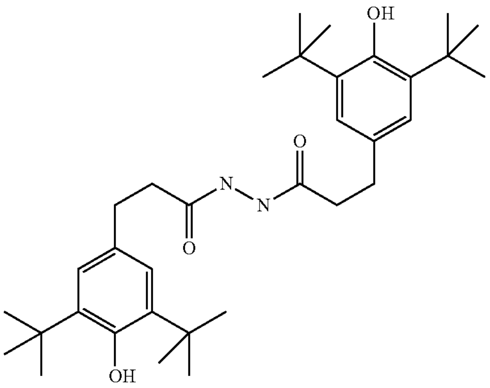 |
| 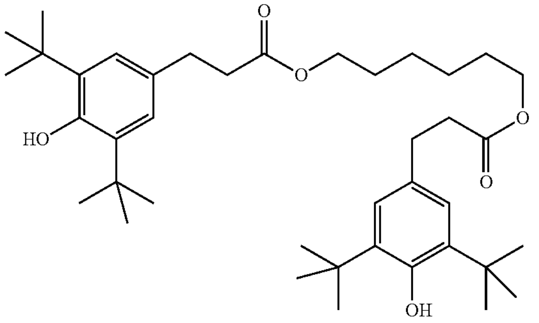 [SMILES: CC(C)(C)c1cc(CCC(=O)OCCCCCCOC(=O)CCc2cc(C(C)(C)C)c(O)c(C(C)(C)C)c2)cc(C(C)(C)C)c1O] |
| 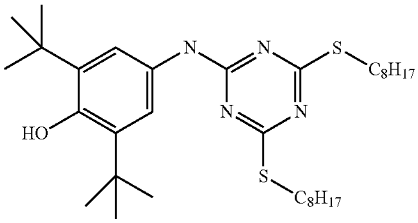 |

TABLE D-continued

Stabilisers, which can additionally be added, for example, to the liquid-crystalline media according to the invention in amounts of 0-10% by weight, are mentioned below.

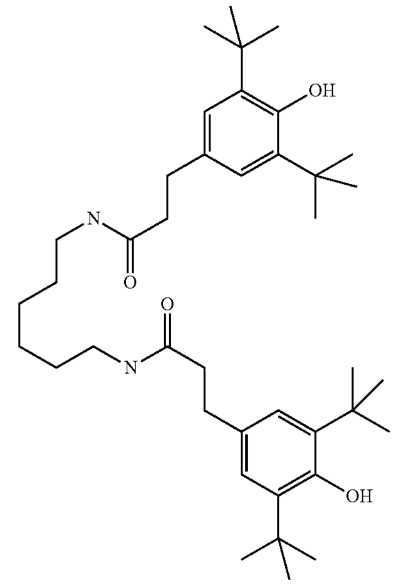

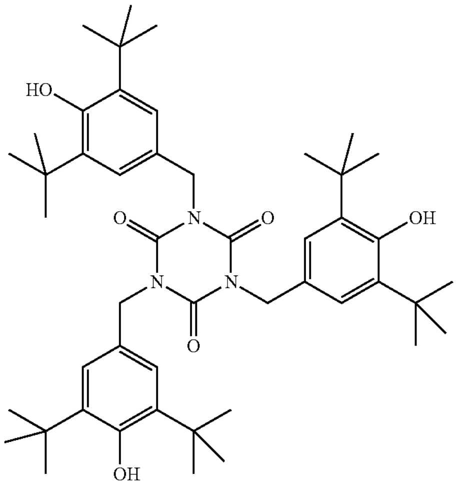 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

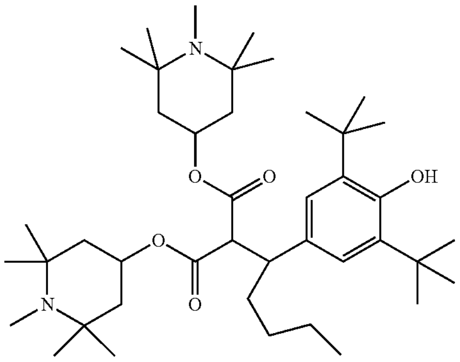 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE D-continued

Stabilisers, which can additionally be added, for example, to the liquid-crystalline media according to the invention in amounts of 0-10% by weight, are mentioned below.

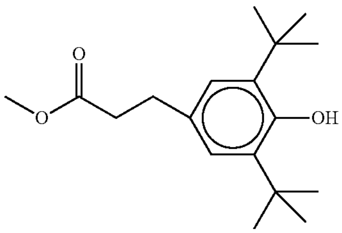

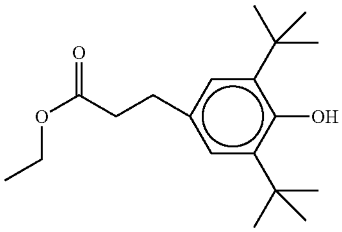

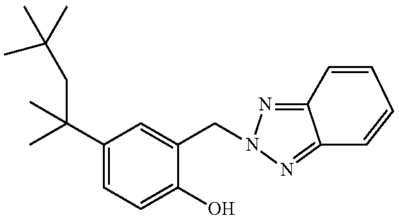 [SMILES: CC(C)(C)CC(C)(C)c1ccc(O)c(Cn2nc3ccccc3n2)c1]

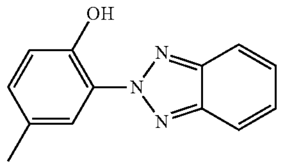

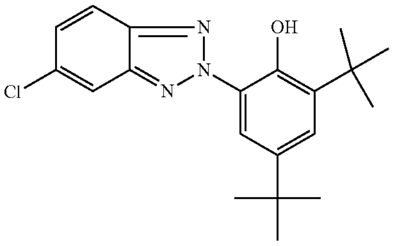 [SMILES: CC(C)(C)c1cc(-n2nc3ccc(Cl)cc3n2)c(O)c(C(C)(C)C)c1]

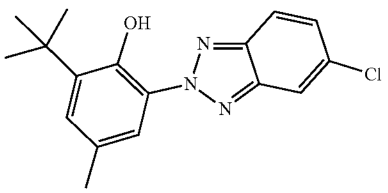 [SMILES: Cc1cc(-n2nc3ccc(Cl)cc3n2)c(O)c(C(C)(C)C)c1]

TABLE D-continued

| Stabilisers, which can additionally be added, for example, to the liquid-crystalline media according to the invention in amounts of 0-10% by weight, are mentioned below. |
| --- |
| 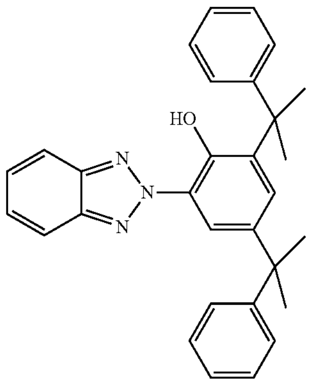 [SMILES: CC(C)(c1ccccc1)c1cc(-n2nc3ccccc3n2)c(O)c(C(C)(C)c2ccccc2)c1] |
| 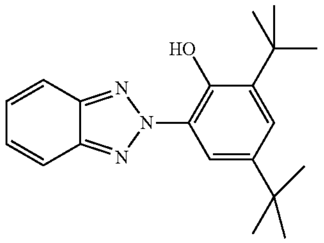 [SMILES: CC(C)(C)c1cc(-n2nc3ccccc3n2)c(O)c(C(C)(C)C)c1] |
| 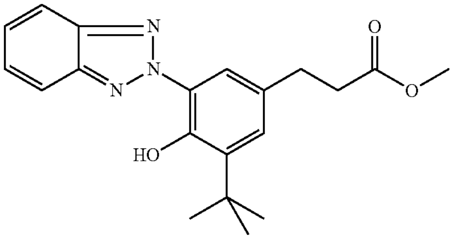 [SMILES: COC(=O)CCc1cc(-n2nc3ccccc3n2)c(O)c(C(C)(C)C)c1] |
| 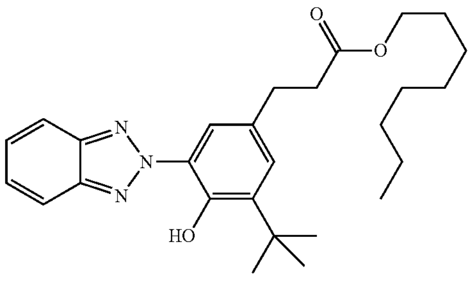 [SMILES: CCCCCCCCOC(=O)CCc1cc(-n2nc3ccccc3n2)c(O)c(C(C)(C)C)c1] |

TABLE D-continued

| Stabilisers, which can additionally be added, for example, to the liquid-crystalline media according to the invention in amounts of 0-10% by weight, are mentioned below. |
| --- |
| 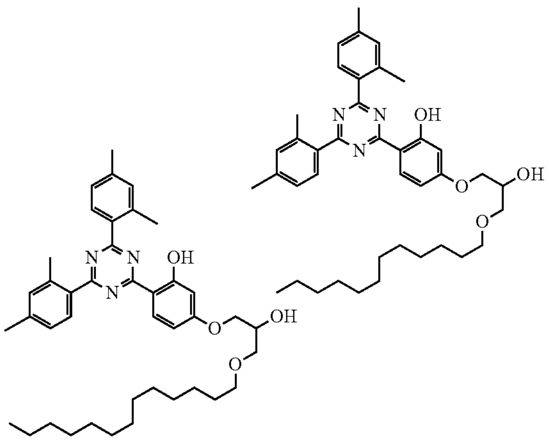 |
| 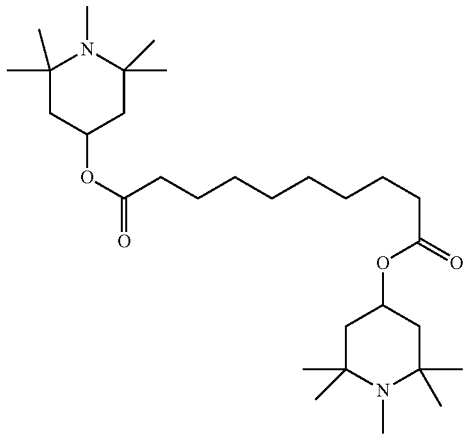 |
| 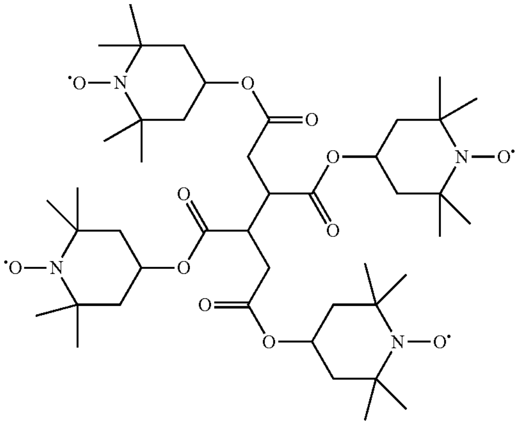 |

TABLE D-continued

| Stabilisers, which can additionally be added, for example, to the liquid-crystalline media according to the invention in amounts of 0-10% by weight, are mentioned below. |
|---|
| 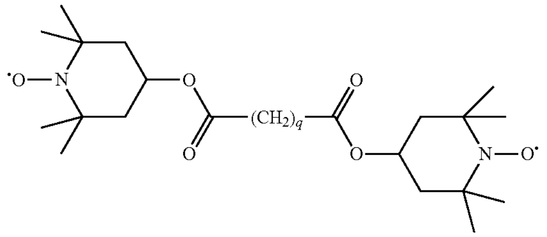 q = 1, 2, 3, 4, 5, 6, 7, 8, 9 or 10 |

TABLE E

| Table E shows illustrative reactive mesogenic compounds (RMs) which can be used in the liquid-crystalline media in accordance with the present invention. | |
|---|---|
| 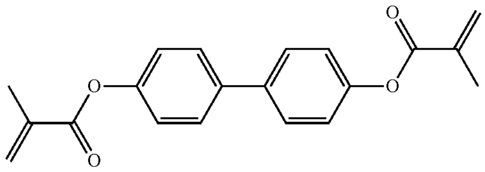 [SMILES: C=C(C)C(=O)Oc1ccc(-c2ccc(OC(=O)C(=C)C)cc2)cc1] | RM-1 |
| 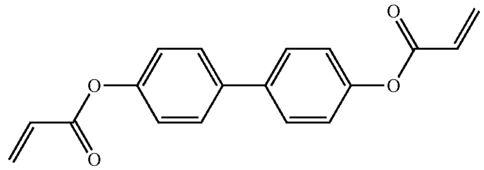 [SMILES: C=CC(=O)Oc1ccc(-c2ccc(OC(=O)C=C)cc2)cc1] | RM-2 |
| 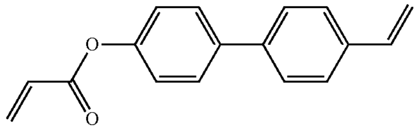 [SMILES: C=CC(=O)Oc1ccc(-c2ccc(C=C)cc2)cc1] | RM-3 |
| 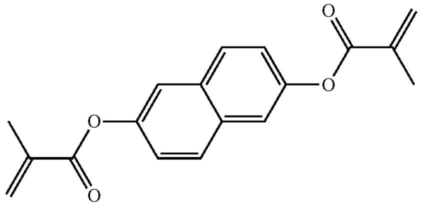 [SMILES: C=C(C)C(=O)Oc1ccc2cc(OC(=O)C(=C)C)ccc2c1] | RM-4 |
| 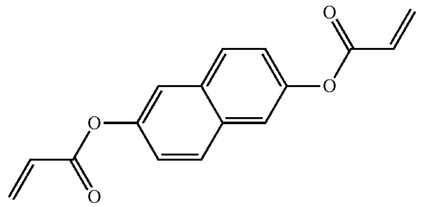 [SMILES: C=CC(=O)Oc1ccc2cc(OC(=O)C=C)ccc2c1] | RM-5 |
| 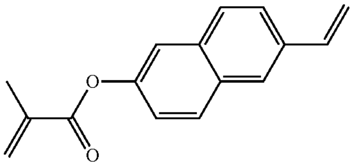 [SMILES: C=Cc1ccc2cc(OC(=O)C(=C)C)ccc2c1] | RM-6 |

TABLE E-continued
Table E shows illustrative reactive mesogenic compounds (RMs) which can be used in the liquid-crystalline media in accordance with the present invention.
RM-7
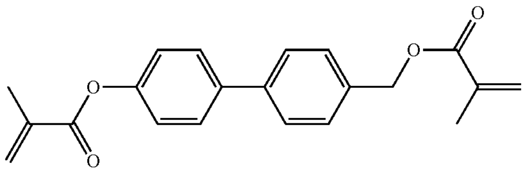 [SMILES: C=C(C)C(=O)OCc1ccc(-c2ccc(OC(=O)C(=C)C)cc2)cc1]
RM-8
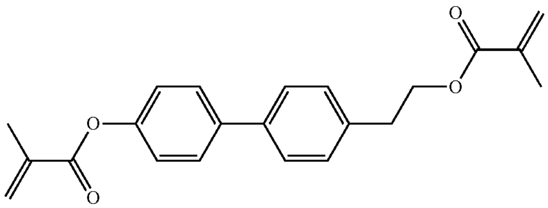 [SMILES: C=C(C)C(=O)OCCc1ccc(-c2ccc(OC(=O)C(=C)C)cc2)cc1]
RM-9
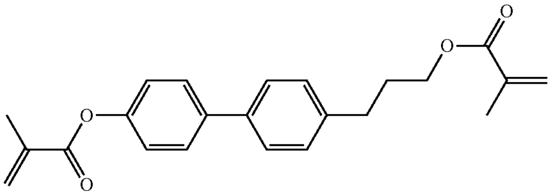 [SMILES: C=C(C)C(=O)OCCCc1ccc(-c2ccc(OC(=O)C(=C)C)cc2)cc1]
RM-10
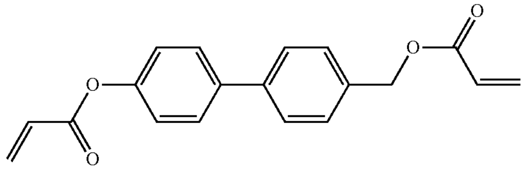 [SMILES: C=CC(=O)OCc1ccc(-c2ccc(OC(=O)C=C)cc2)cc1]
RM-11
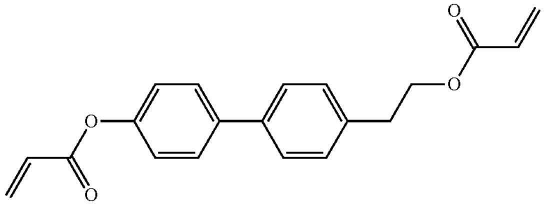 [SMILES: C=CC(=O)OCCc1ccc(-c2ccc(OC(=O)C=C)cc2)cc1]
RM-12
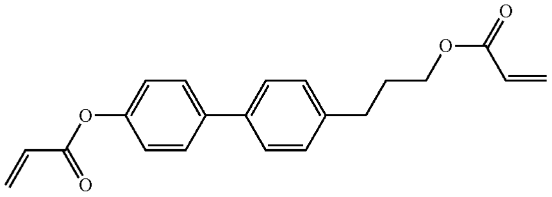 [SMILES: C=CC(=O)OCCCc1ccc(-c2ccc(OC(=O)C=C)cc2)cc1]
RM-13
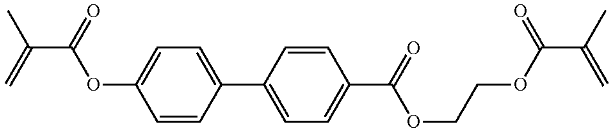 [SMILES: C=C(C)C(=O)OCCOC(=O)c1ccc(-c2ccc(OC(=O)C(=C)C)cc2)cc1]
RM-14
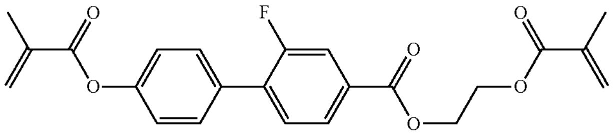 [SMILES: C=C(C)C(=O)OCCOC(=O)c1ccc(-c2ccc(OC(=O)C(=C)C)cc2)c(F)c1]

TABLE E-continued
| Table E shows illustrative reactive mesogenic compounds (RMs) which can be used in the liquid-crystalline media in accordance with the present invention. | |
|---|---|
| 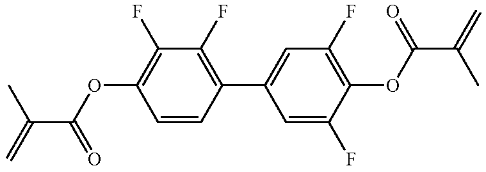 | RM-15 |
| 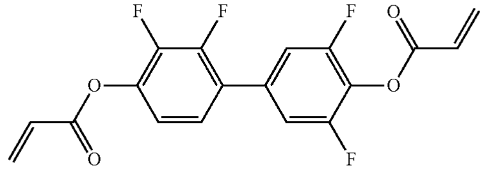 [SMILES: C=CC(=O)Oc1ccc(-c2cc(F)c(OC(=O)C=C)c(F)c2)c(F)c1F] | RM-16 |
| 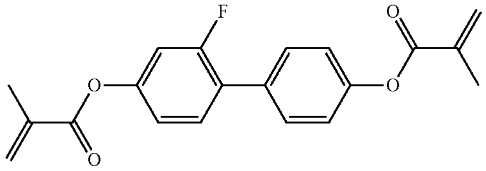 [SMILES: C=C(C)C(=O)Oc1ccc(-c2ccc(OC(=O)C(=C)C)cc2F)cc1] | RM-17 |
| 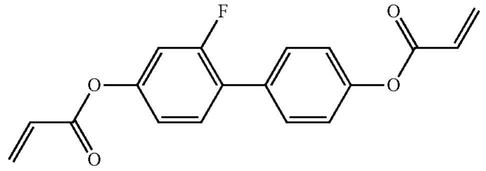 [SMILES: C=CC(=O)Oc1ccc(-c2ccc(OC(=O)C=C)cc2F)cc1] | RM-18 |
| 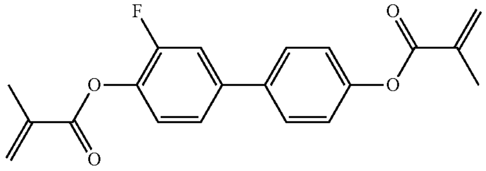 [SMILES: C=C(C)C(=O)Oc1ccc(-c2ccc(OC(=O)C(=C)C)c(F)c2)cc1] | RM-19 |
| 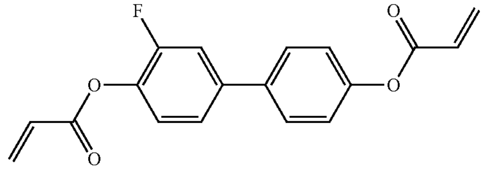 [SMILES: C=CC(=O)Oc1ccc(-c2ccc(OC(=O)C=C)c(F)c2)cc1] | RM-20 |
| 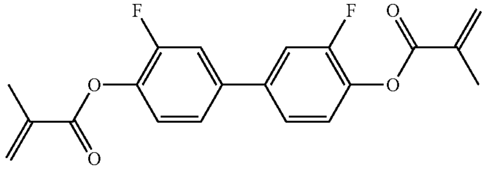 [SMILES: C=C(C)C(=O)Oc1ccc(-c2ccc(OC(=O)C(=C)C)c(F)c2)cc1F] | RM-21 |
| 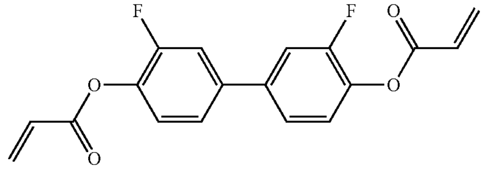 | RM-22 |

TABLE E-continued
Table E shows illustrative reactive mesogenic compounds (RMs) which can be used in the liquid-crystalline media in accordance with the present invention.
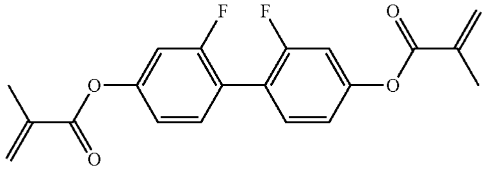
RM-23
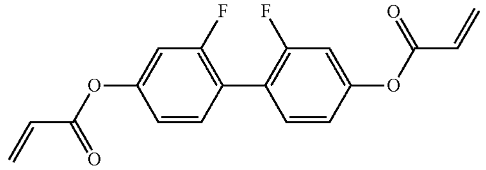
RM-24
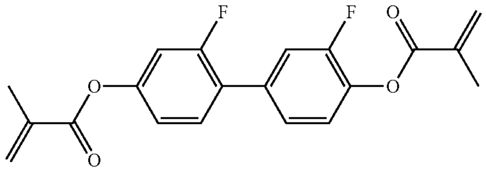 [SMILES: C=C(C)C(=O)Oc1ccc(-c2ccc(OC(=O)C(=C)C)c(F)c2)c(F)c1]
RM-25
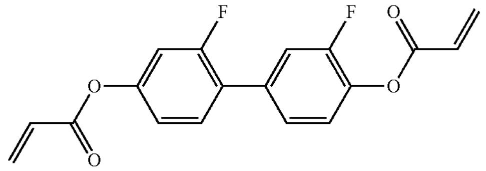 [SMILES: C=CC(=O)Oc1ccc(-c2ccc(OC(=O)C=C)c(F)c2)c(F)c1]
RM-26
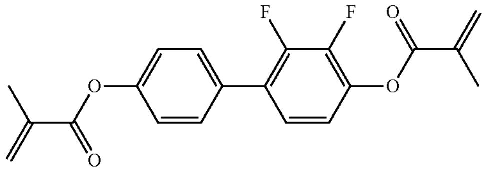 [SMILES: C=C(C)C(=O)Oc1ccc(-c2ccc(OC(=O)C(=C)C)c(F)c2F)cc1]
RM-27
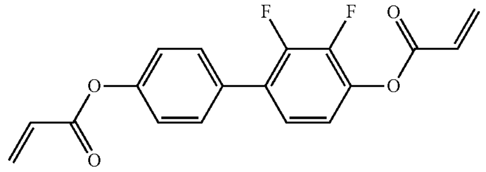 [SMILES: C=CC(=O)Oc1ccc(-c2ccc(OC(=O)C=C)c(F)c2F)cc1]
RM-28
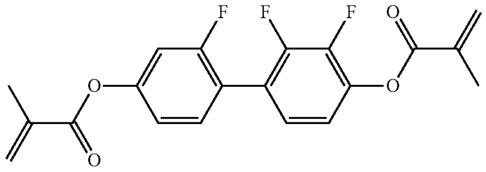 [SMILES: C=C(C)C(=O)Oc1ccc(-c2ccc(OC(=O)C(=C)C)c(F)c2F)c(F)c1]
RM-29
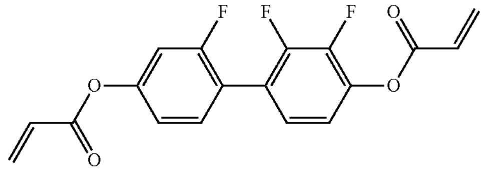 [SMILES: C=CC(=O)Oc1ccc(-c2ccc(OC(=O)C=C)c(F)c2F)c(F)c1]
RM-30

TABLE E-continued
| Table E shows illustrative reactive mesogenic compounds (RMs) which can be used in the liquid-crystalline media in accordance with the present invention. |
| --- |
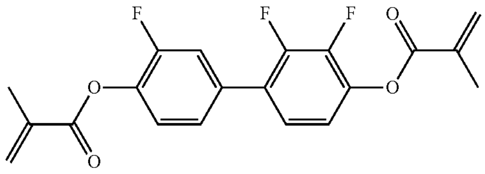 [SMILES: C=C(C)C(=O)Oc1ccc(-c2ccc(OC(=O)C(=C)C)c(F)c2F)cc1F]
RM-31
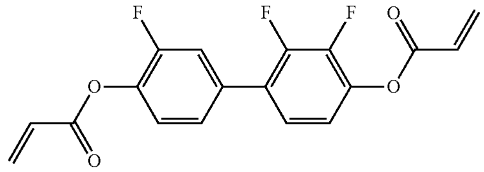 [SMILES: C=CC(=O)Oc1ccc(-c2ccc(OC(=O)C=C)c(F)c2F)cc1F]
RM-32
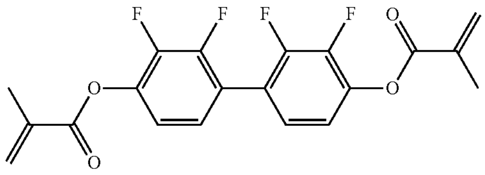 [SMILES: C=C(C)C(=O)Oc1ccc(-c2ccc(OC(=O)C(=C)C)c(F)c2F)c(F)c1F]
RM-33
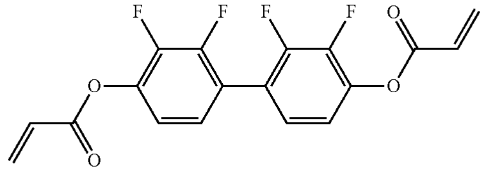 [SMILES: C=CC(=O)Oc1ccc(-c2ccc(OC(=O)C=C)c(F)c2F)c(F)c1F]
RM-34
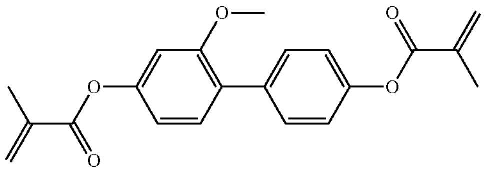 [SMILES: C=C(C)C(=O)Oc1ccc(-c2ccc(OC(=O)C(=C)C)cc2OC)cc1]
RM-35
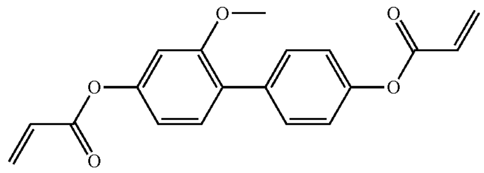 [SMILES: C=CC(=O)Oc1ccc(-c2ccc(OC(=O)C=C)cc2OC)cc1]
RM-36
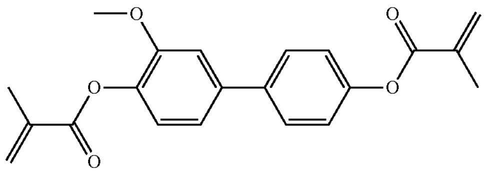 [SMILES: C=C(C)C(=O)Oc1ccc(-c2ccc(OC(=O)C(=C)C)c(OC)c2)cc1]
RM-37
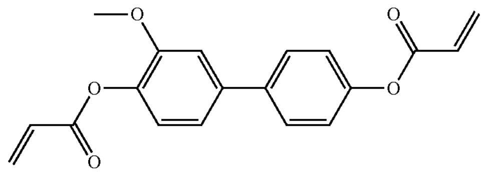 [SMILES: C=CC(=O)Oc1ccc(-c2ccc(OC(=O)C=C)c(OC)c2)cc1]
RM-38

TABLE E-continued
Table E shows illustrative reactive mesogenic compounds (RMs) which can be used in the liquid-crystalline media in accordance with the present invention.
RM-39
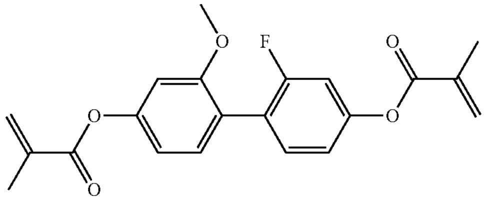 [SMILES: C=C(C)C(=O)Oc1ccc(-c2ccc(OC(=O)C(=C)C)cc2OC)c(F)c1]
RM-40
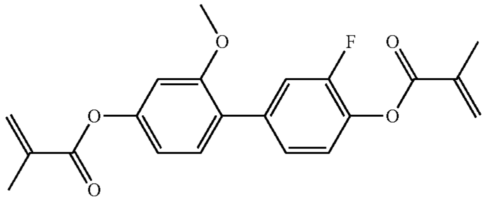 [SMILES: C=C(C)C(=O)Oc1ccc(-c2ccc(OC(=O)C(=C)C)c(F)c2)c(OC)c1]
RM-41
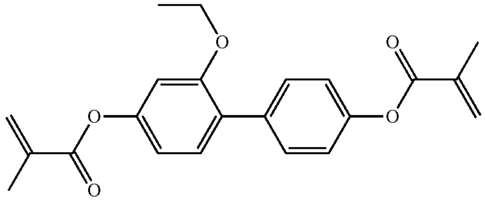 [SMILES: C=C(C)C(=O)Oc1ccc(-c2ccc(OC(=O)C(=C)C)cc2OCC)cc1]
RM-42
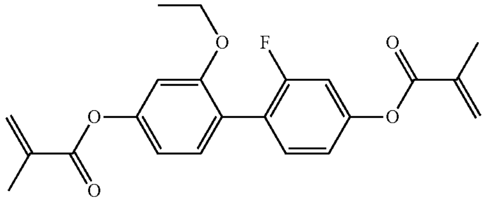 [SMILES: C=C(C)C(=O)Oc1ccc(-c2ccc(OC(=O)C(=C)C)cc2OCC)c(F)c1]
RM-43
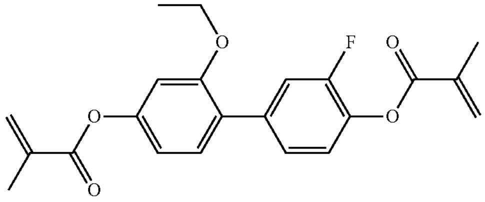 [SMILES: C=C(C)C(=O)Oc1ccc(-c2ccc(OC(=O)C(=C)C)c(F)c2)c(OCC)c1]
RM-44
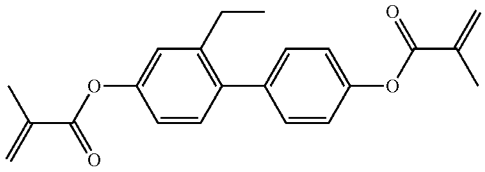
RM-45
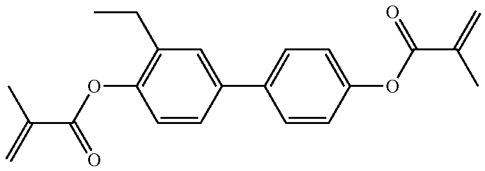
RM-46
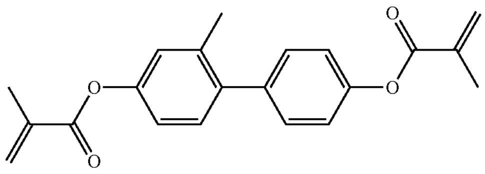 [SMILES: C=C(C)C(=O)Oc1ccc(-c2ccc(OC(=O)C(=C)C)cc2C)cc1]

TABLE E-continued
Table E shows illustrative reactive mesogenic compounds (RMs) which can be used in the liquid-crystalline media in accordance with the present invention.
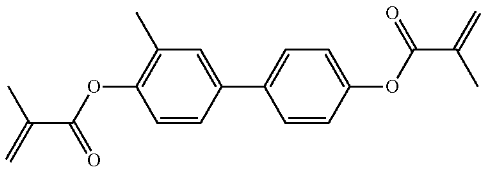 [SMILES: C=C(C)C(=O)Oc1ccc(-c2ccc(OC(=O)C(=C)C)c(C)c2)cc1]
RM-47
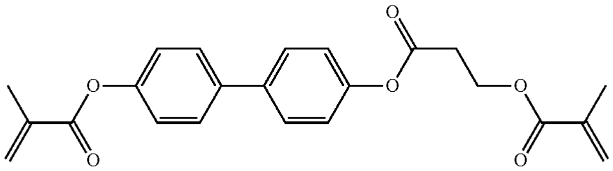 [SMILES: C=C(C)C(=O)OCCC(=O)Oc1ccc(-c2ccc(OC(=O)C(=C)C)cc2)cc1]
RM-48
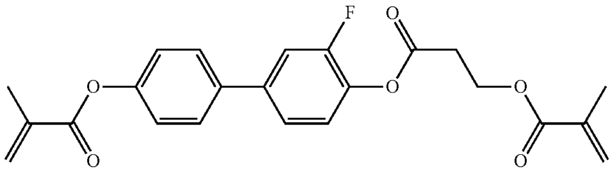 [SMILES: C=C(C)C(=O)OCCC(=O)Oc1ccc(-c2ccc(OC(=O)C(=C)C)cc2)cc1F]
RM-49
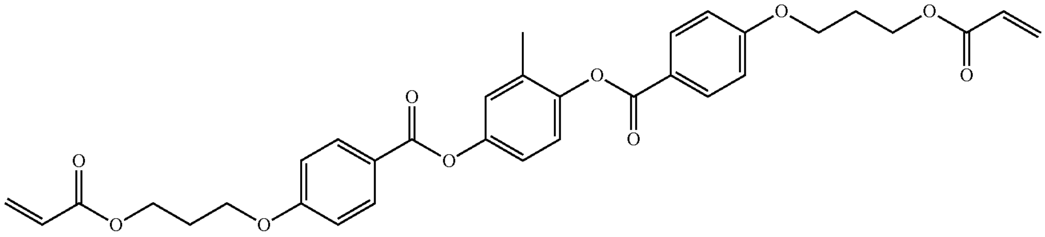 [SMILES: C=CC(=O)OCCCOc1ccc(C(=O)Oc2ccc(OC(=O)c3ccc(OCCCOC(=O)C=C)cc3)c(C)c2)cc1]
RM-50
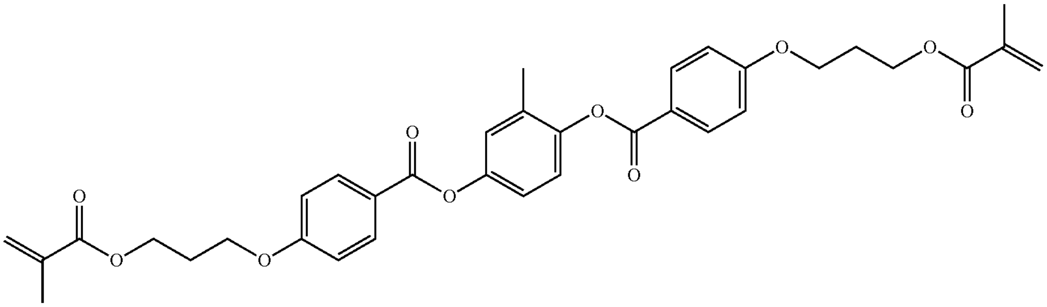 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-51
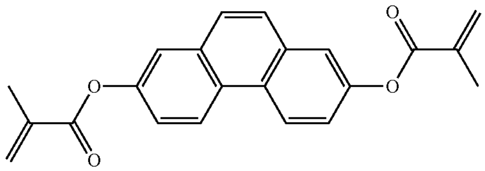 [SMILES: C=C(C)C(=O)Oc1ccc2c(ccc3cc(OC(=O)C(=C)C)ccc32)c1]
RM-52
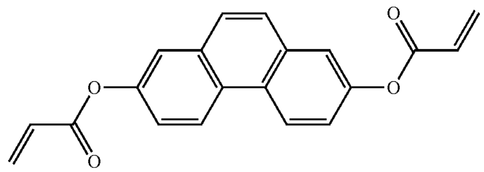 [SMILES: C=CC(=O)Oc1ccc2c(ccc3cc(OC(=O)C=C)ccc32)c1]
RM-53

TABLE E-continued
Table E shows illustrative reactive mesogenic compounds (RMs) which can be used in the liquid-crystalline media in accordance with the present invention.
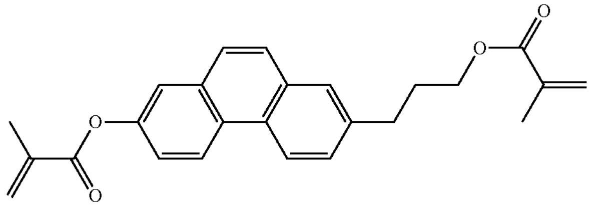 [SMILES: C=C(C)C(=O)OCCCc1ccc2c(ccc3cc(OC(=O)C(=C)C)ccc32)c1]
RM-54
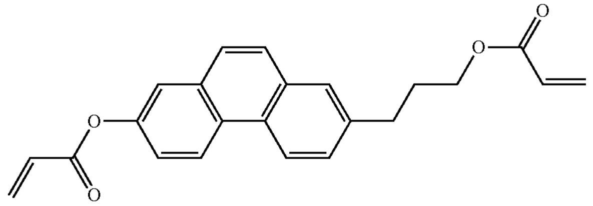 [SMILES: C=CC(=O)OCCCc1ccc2c(ccc3cc(OC(=O)C=C)ccc32)c1]
RM-55
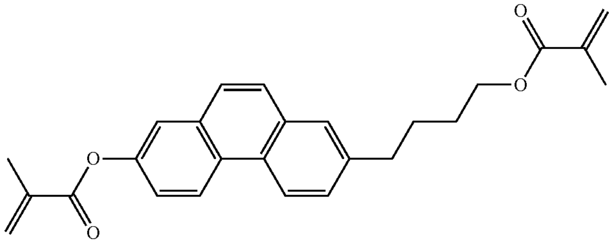 [SMILES: C=C(C)C(=O)OCCCCc1ccc2c(ccc3cc(OC(=O)C(=C)C)ccc32)c1]
RM-56
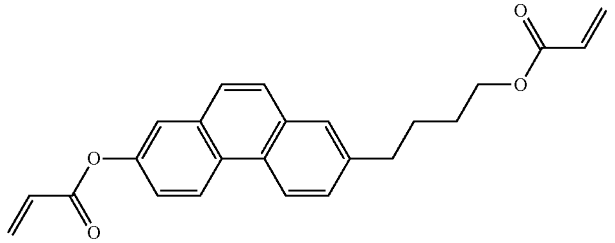 [SMILES: C=CC(=O)OCCCCc1ccc2c(ccc3cc(OC(=O)C=C)ccc32)c1]
RM-57
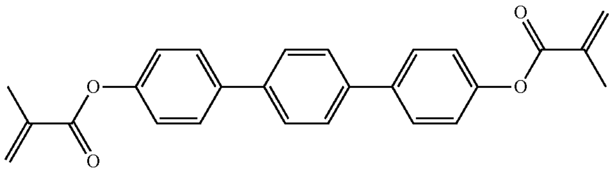 [SMILES: C=C(C)C(=O)Oc1ccc(-c2ccc(-c3ccc(OC(=O)C(=C)C)cc3)cc2)cc1]
RM-58
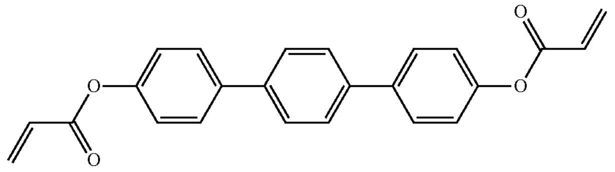
RM-59
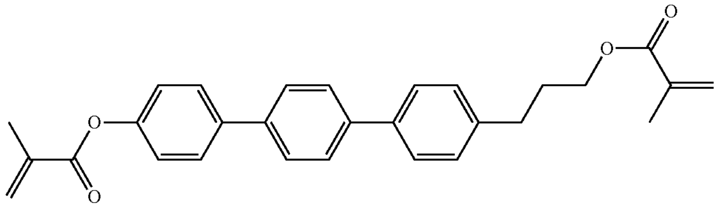 [SMILES: C=C(C)C(=O)OCCCc1ccc(-c2ccc(-c3ccc(OC(=O)C(=C)C)cc3)cc2)cc1]
RM-60

TABLE E-continued
Table E shows illustrative reactive mesogenic compounds (RMs) which can be used in the liquid-crystalline media in accordance with the present invention.
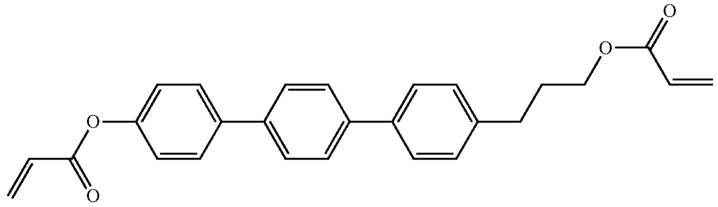 [SMILES: C=CC(=O)OCCCc1ccc(-c2ccc(-c3ccc(OC(=O)C=C)cc3)cc2)cc1]
RM-61
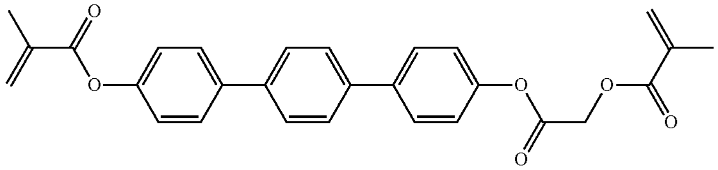 [SMILES: C=C(C)C(=O)OCC(=O)Oc1ccc(-c2ccc(-c3ccc(OC(=O)C(=C)C)cc3)cc2)cc1]
RM-62
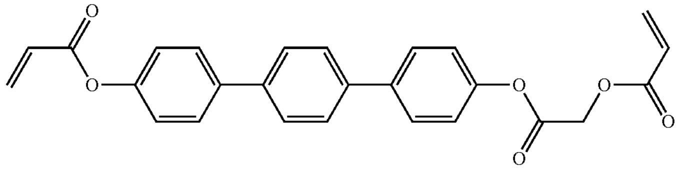 [SMILES: C=CC(=O)OCC(=O)Oc1ccc(-c2ccc(-c3ccc(OC(=O)C=C)cc3)cc2)cc1]
RM-63
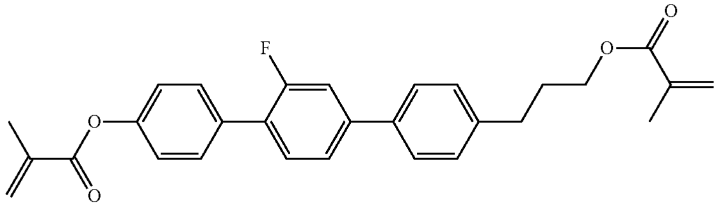 [SMILES: C=C(C)C(=O)OCCCc1ccc(-c2ccc(-c3ccc(OC(=O)C(=C)C)cc3)c(F)c2)cc1]
RM-64
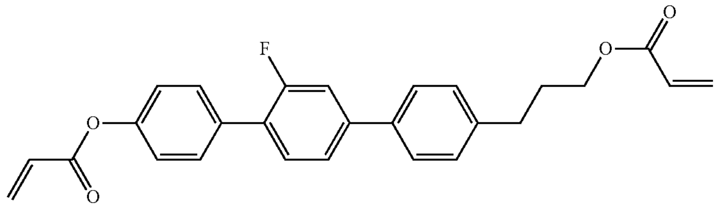 [SMILES: C=CC(=O)OCCCc1ccc(-c2ccc(-c3ccc(OC(=O)C=C)cc3)c(F)c2)cc1]
RM-65
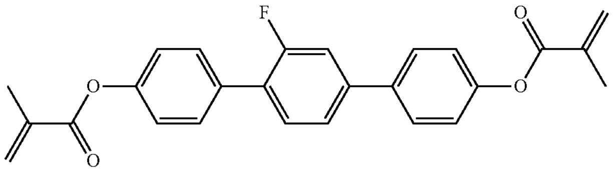 [SMILES: C=C(C)C(=O)Oc1ccc(-c2ccc(-c3ccc(OC(=O)C(=C)C)cc3)c(F)c2)cc1]
RM-66
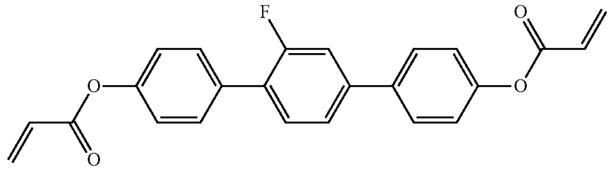 [SMILES: C=CC(=O)Oc1ccc(-c2ccc(-c3ccc(OC(=O)C=C)cc3)c(F)c2)cc1]
RM-67
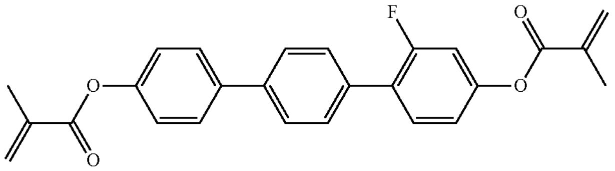 [SMILES: C=C(C)C(=O)Oc1ccc(-c2ccc(-c3ccc(OC(=O)C(=C)C)cc3F)cc2)cc1]
RM-68

TABLE E-continued
Table E shows illustrative reactive mesogenic compounds (RMs) which can be used in the liquid-crystalline media in accordance with the present invention.
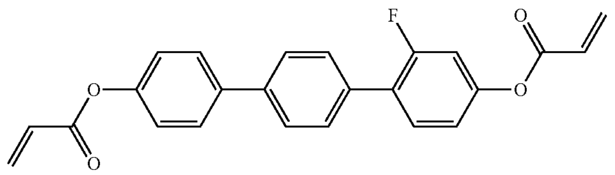 [SMILES: C=CC(=O)Oc1ccc(-c2ccc(-c3ccc(OC(=O)C=C)cc3F)cc2)cc1]
RM-69
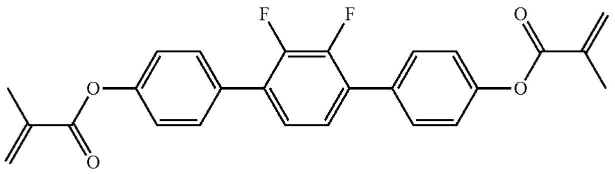 [SMILES: C=C(C)C(=O)Oc1ccc(-c2ccc(-c3ccc(OC(=O)C(=C)C)cc3)c(F)c2F)cc1]
RM-70
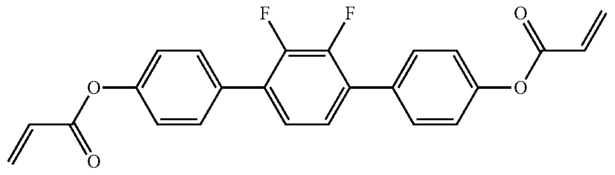 [SMILES: C=CC(=O)Oc1ccc(-c2ccc(-c3ccc(OC(=O)C=C)cc3)c(F)c2F)cc1]
RM-71
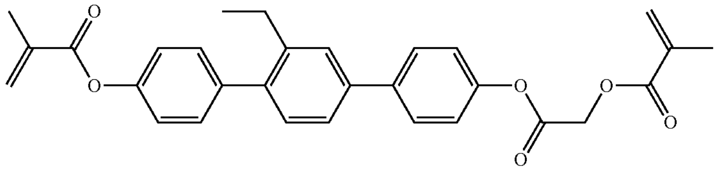
RM-72
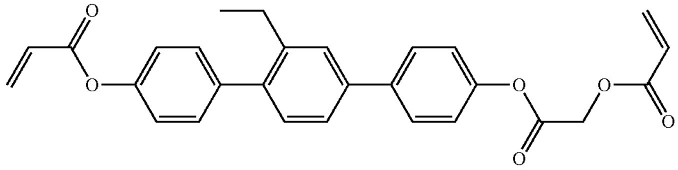 [SMILES: C=CC(=O)OCC(=O)Oc1ccc(-c2ccc(-c3ccc(OC(=O)C=C)cc3)c(CC)c2)cc1]
RM-73
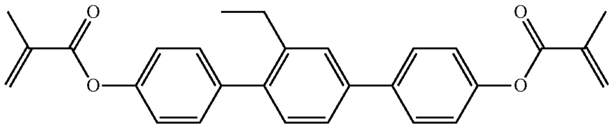 [SMILES: C=C(C)C(=O)Oc1ccc(-c2ccc(-c3ccc(OC(=O)C(=C)C)cc3)c(CC)c2)cc1]
RM-74
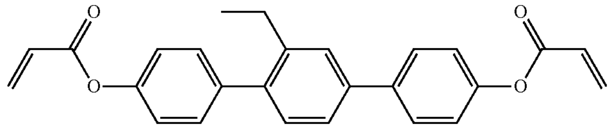 [SMILES: C=CC(=O)Oc1ccc(-c2ccc(-c3ccc(OC(=O)C=C)cc3)c(CC)c2)cc1]
RM-75
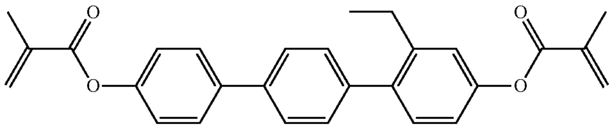 [SMILES: C=C(C)C(=O)Oc1ccc(-c2ccc(-c3ccc(OC(=O)C(=C)C)cc3CC)cc2)cc1]
RM-76
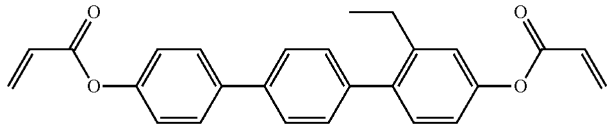 [SMILES: C=CC(=O)Oc1ccc(-c2ccc(-c3ccc(OC(=O)C=C)cc3CC)cc2)cc1]
RM-77

TABLE E-continued
| Table E shows illustrative reactive mesogenic compounds (RMs) which can be used in the liquid-crystalline media in accordance with the present invention. |
|---|
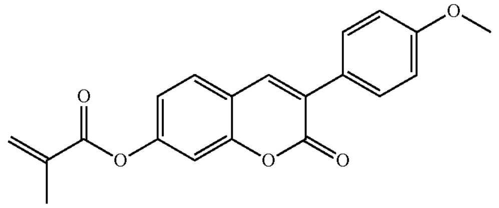 [SMILES: C=C(C)C(=O)Oc1ccc2cc(-c3ccc(OC)cc3)c(=O)oc2c1]
RM-78
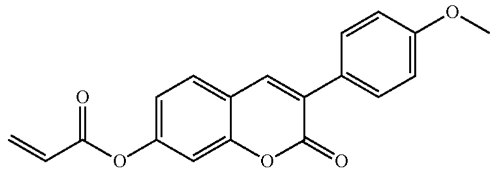 [SMILES: C=CC(=O)Oc1ccc2cc(-c3ccc(OC)cc3)c(=O)oc2c1]
RM-79
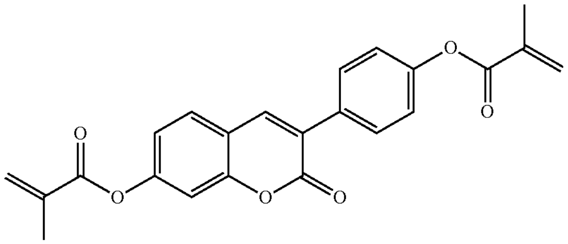 [SMILES: C=C(C)C(=O)Oc1ccc(-c2cc3ccc(OC(=O)C(=C)C)cc3oc2=O)cc1]
RM-80
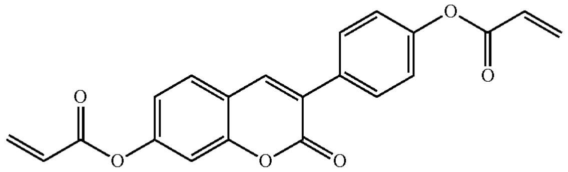 [SMILES: C=CC(=O)Oc1ccc(-c2cc3ccc(OC(=O)C=C)cc3oc2=O)cc1]
RM-81
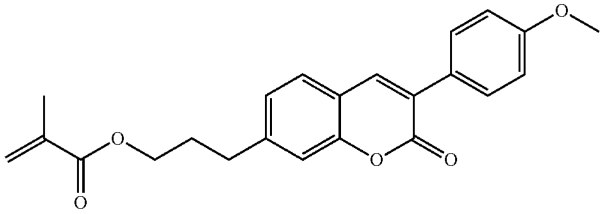 [SMILES: C=C(C)C(=O)OCCCc1ccc2cc(-c3ccc(OC)cc3)c(=O)oc2c1]
RM-82
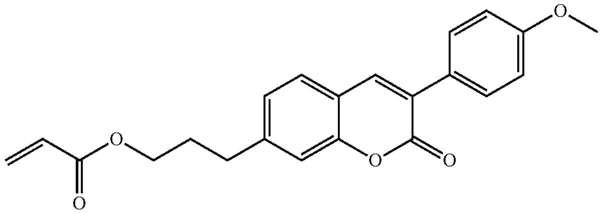 [SMILES: C=CC(=O)OCCCc1ccc2cc(-c3ccc(OC)cc3)c(=O)oc2c1]
RM-83
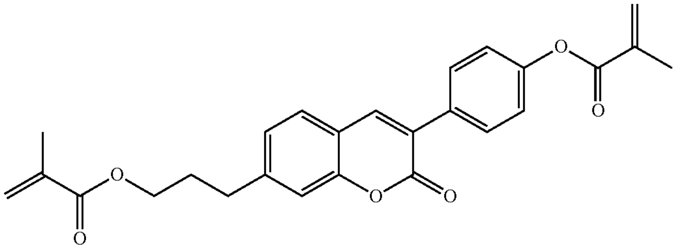 [SMILES: C=C(C)C(=O)OCCCc1ccc2cc(-c3ccc(OC(=O)C(=C)C)cc3)c(=O)oc2c1]
RM-84

TABLE E-continued
Table E shows illustrative reactive mesogenic compounds (RMs) which can be used in the liquid-crystalline media in accordance with the present invention.
RM-85
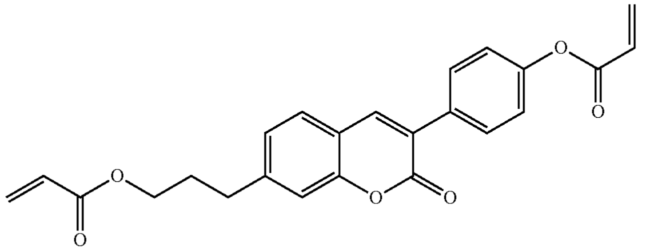 [SMILES: C=CC(=O)OCCCc1ccc2cc(-c3ccc(OC(=O)C=C)cc3)c(=O)oc2c1]
RM-86
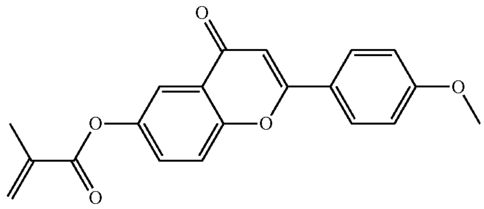 [SMILES: C=C(C)C(=O)Oc1ccc2oc(-c3ccc(OC)cc3)cc(=O)c2c1]
RM-87
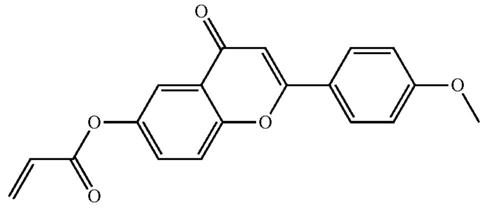 [SMILES: C=CC(=O)Oc1ccc2oc(-c3ccc(OC)cc3)cc(=O)c2c1]
RM-88
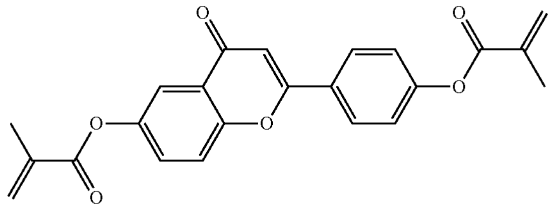 [SMILES: C=C(C)C(=O)Oc1ccc(-c2cc(=O)c3cc(OC(=O)C(=C)C)ccc3o2)cc1]
RM-89
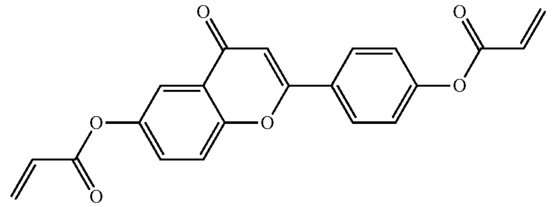 [SMILES: C=CC(=O)Oc1ccc(-c2cc(=O)c3cc(OC(=O)C=C)ccc3o2)cc1]
RM-90
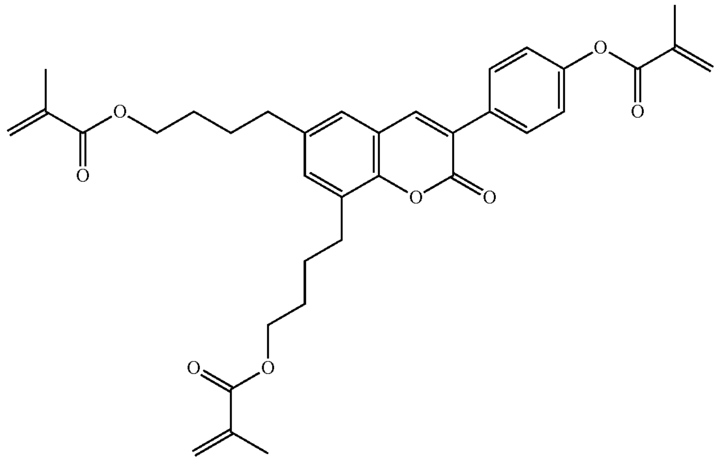 [SMILES: C=C(C)C(=O)OCCCCc1cc(CCCCOC(=O)C(=C)C)c2oc(=O)c(-c3ccc(OC(=O)C(=C)C)cc3)cc2c1]

TABLE E-continued
Table E shows illustrative reactive mesogenic compounds (RMs) which can be used in the liquid-crystalline media in accordance with the present invention.
RM-91
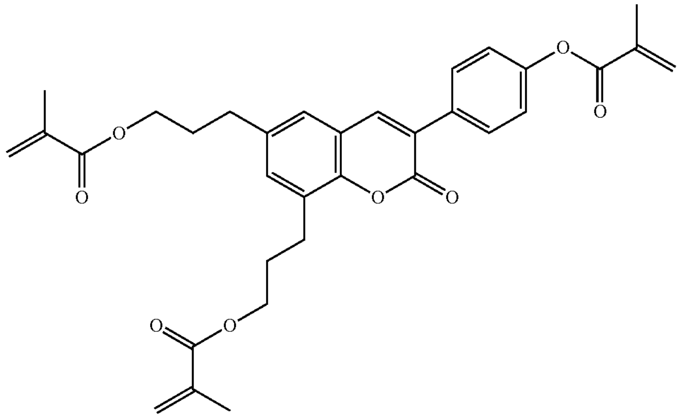 [SMILES: C=C(C)C(=O)OCCCc1cc(CCCOC(=O)C(=C)C)c2oc(=O)c(-c3ccc(OC(=O)C(=C)C)cc3)cc2c1]
RM-92
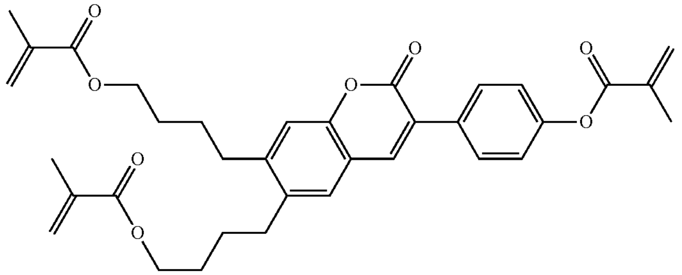 [SMILES: C=C(C)C(=O)OCCCCc1cc2cc(-c3ccc(OC(=O)C(=C)C)cc3)c(=O)oc2cc1CCCCOC(=O)C(=C)C]
RM-93
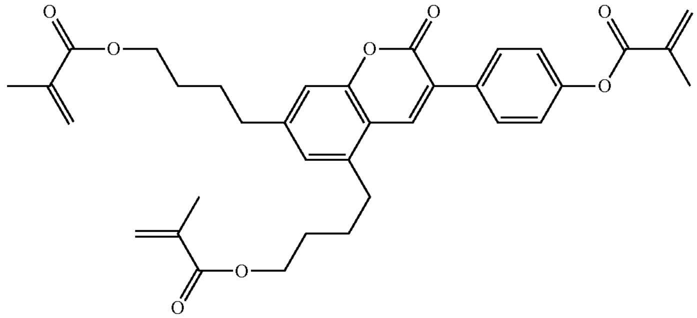 [SMILES: C=C(C)C(=O)OCCCCc1cc(CCCCOC(=O)C(=C)C)c2cc(-c3ccc(OC(=O)C(=C)C)cc3)c(=O)oc2c1]
RM-94
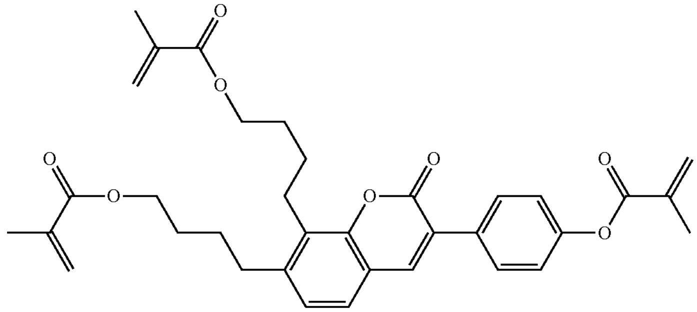 [SMILES: C=C(C)C(=O)OCCCCc1ccc2cc(-c3ccc(OC(=O)C(=C)C)cc3)c(=O)oc2c1CCCCOC(=O)C(=C)C]
RM-95
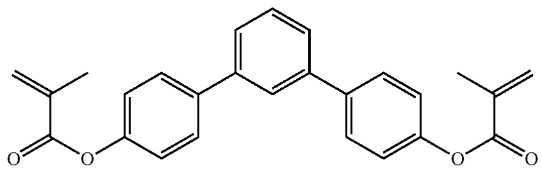 [SMILES: C=C(C)C(=O)Oc1ccc(-c2cccc(-c3ccc(OC(=O)C(=C)C)cc3)c2)cc1]

TABLE E-continued
Table E shows illustrative reactive mesogenic compounds (RMs) which can be used in the liquid-crystalline media in accordance with the present invention.
RM-96
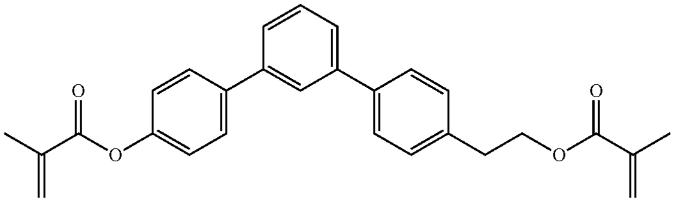 [SMILES: C=C(C)C(=O)OCCc1ccc(-c2cccc(-c3ccc(OC(=O)C(=C)C)cc3)c2)cc1]
RM-97
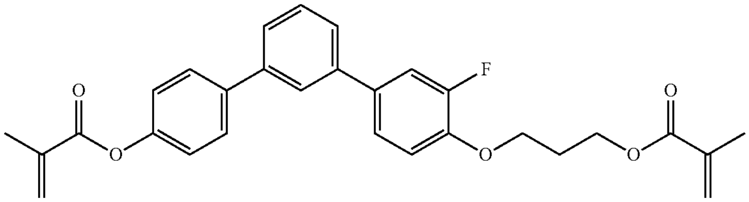 [SMILES: C=C(C)C(=O)OCCCOc1ccc(-c2cccc(-c3ccc(OC(=O)C(=C)C)cc3)c2)cc1F]
RM-98
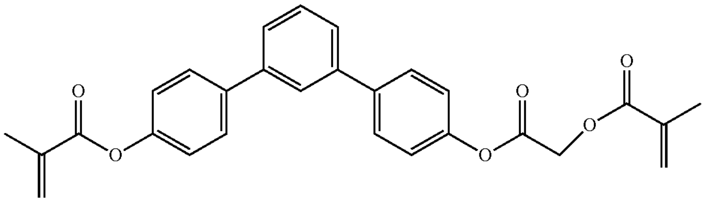 [SMILES: C=C(C)C(=O)OCC(=O)Oc1ccc(-c2cccc(-c3ccc(OC(=O)C(=C)C)cc3)c2)cc1]
RM-99
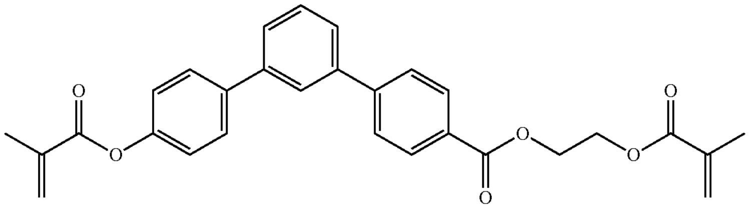 [SMILES: C=C(C)C(=O)OCCOC(=O)c1ccc(-c2cccc(-c3ccc(OC(=O)C(=C)C)cc3)c2)cc1]
RM-100
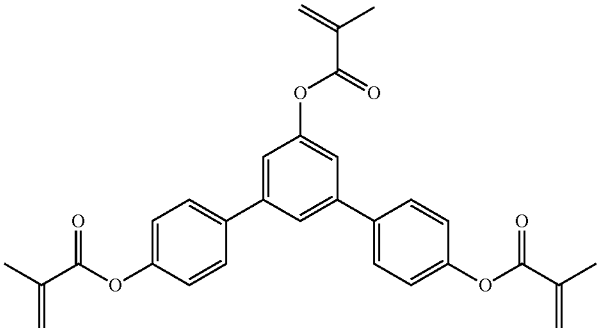 [SMILES: C=C(C)C(=O)Oc1ccc(-c2cc(OC(=O)C(=C)C)cc(-c3ccc(OC(=O)C(=C)C)cc3)c2)cc1]
RM-101
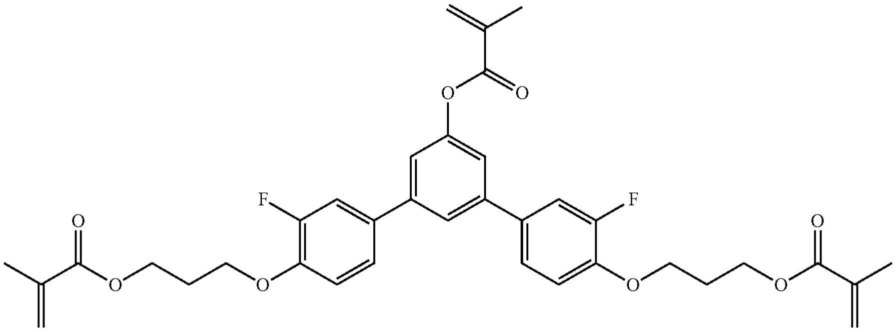 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]

TABLE E-continued
Table E shows illustrative reactive mesogenic compounds (RMs) which can be used in the liquid-crystalline media in accordance with the present invention.
RM-102
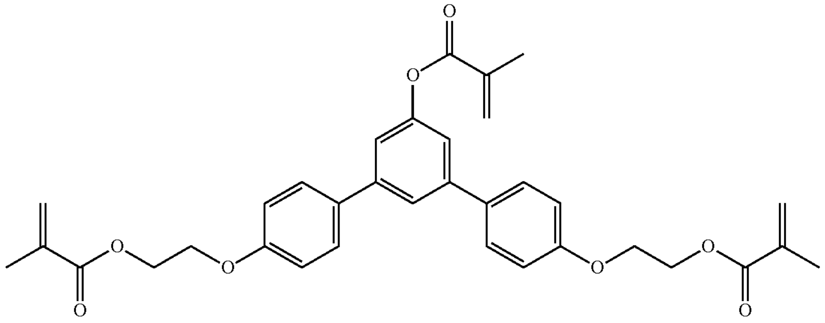 [SMILES: C=C(C)C(=O)OCCOc1ccc(-c2cc(OC(=O)C(=C)C)cc(-c3ccc(OCCOC(=O)C(=C)C)cc3)c2)cc1]
RM-103
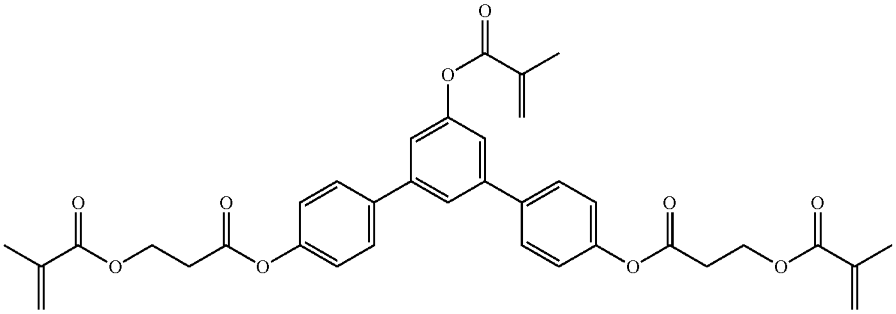 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-104
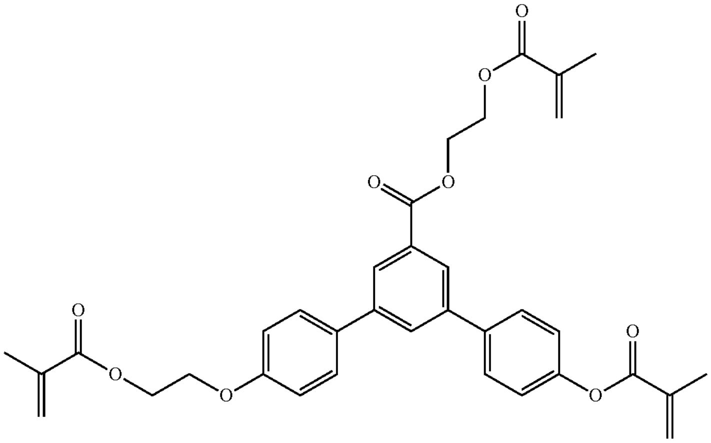 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-105
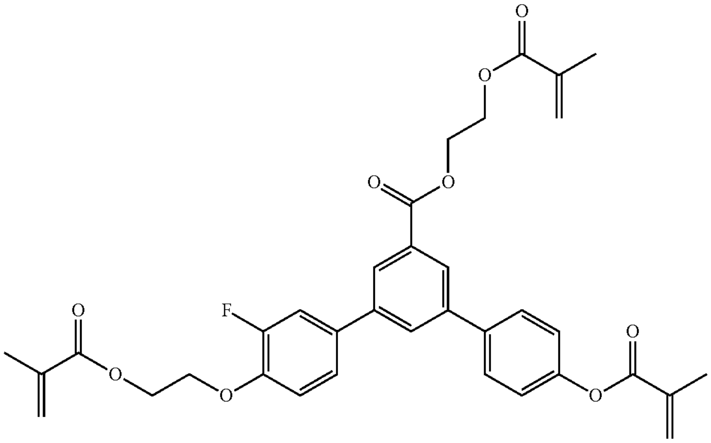 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]

TABLE E-continued
Table E shows illustrative reactive mesogenic compounds (RMs) which can be used in the liquid-crystalline media in accordance with the present invention.
RM-106
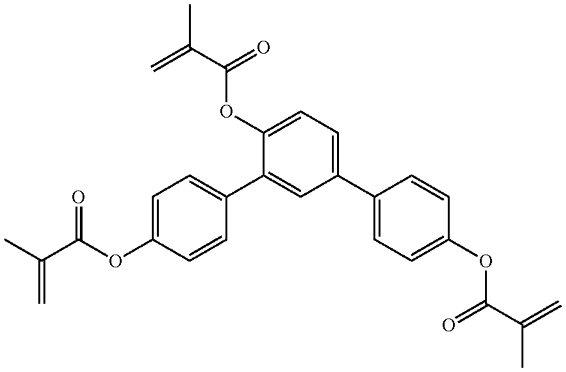 [SMILES: C=C(C)C(=O)Oc1ccc(-c2ccc(OC(=O)C(=C)C)c(-c3ccc(OC(=O)C(=C)C)cc3)c2)cc1]
RM-107
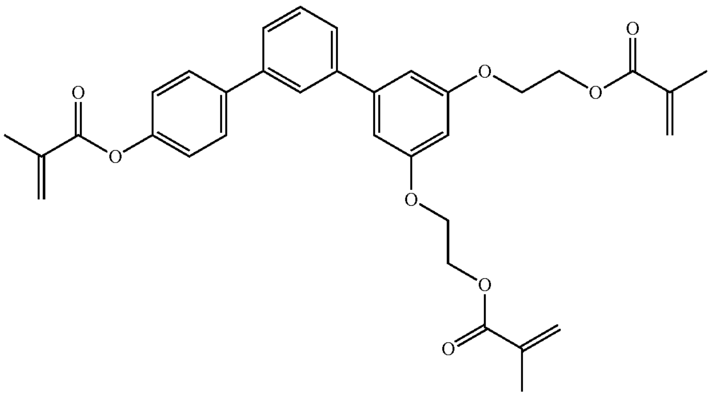 [SMILES: C=C(C)C(=O)OCCOc1cc(OCCOC(=O)C(=C)C)cc(-c2cccc(-c3ccc(OC(=O)C(=C)C)cc3)c2)c1]
RM-108
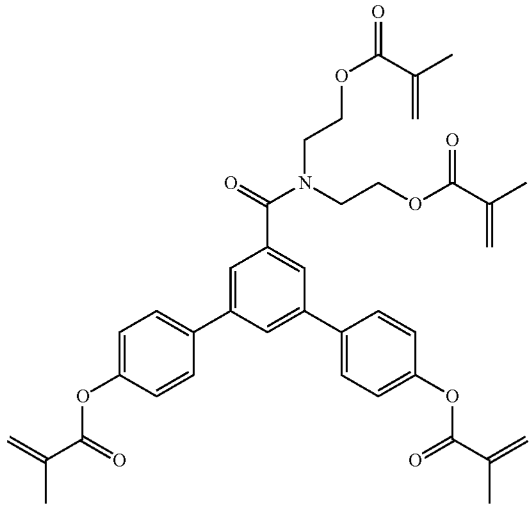 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-109
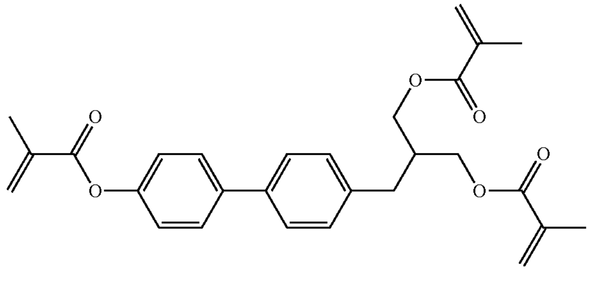 [SMILES: C=C(C)C(=O)OCC(COC(=O)C(=C)C)Cc1ccc(-c2ccc(OC(=O)C(=C)C)cc2)cc1]

TABLE E-continued
Table E shows illustrative reactive mesogenic compounds (RMs) which can be used in the liquid-crystalline media in accordance with the present invention.
RM-110
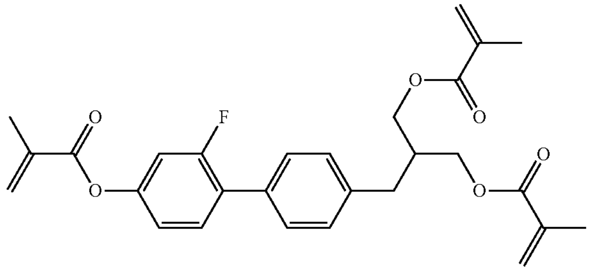 [SMILES: C=C(C)C(=O)OCC(COC(=O)C(=C)C)Cc1ccc(-c2ccc(OC(=O)C(=C)C)cc2F)cc1]
RM-111
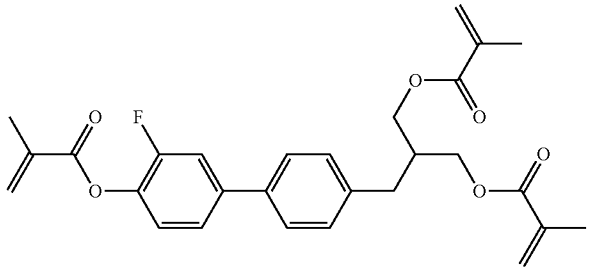 [SMILES: C=C(C)C(=O)OCC(COC(=O)C(=C)C)Cc1ccc(-c2ccc(OC(=O)C(=C)C)c(F)c2)cc1]
RM-112
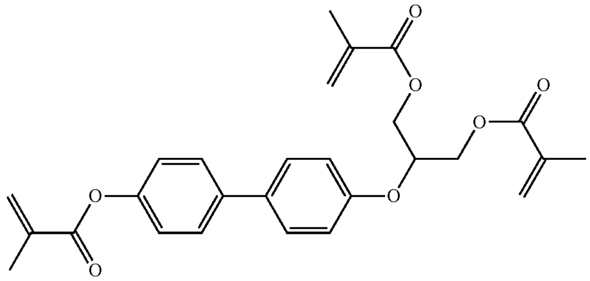 [SMILES: C=C(C)C(=O)OCC(COC(=O)C(=C)C)Oc1ccc(-c2ccc(OC(=O)C(=C)C)cc2)cc1]
RM-113
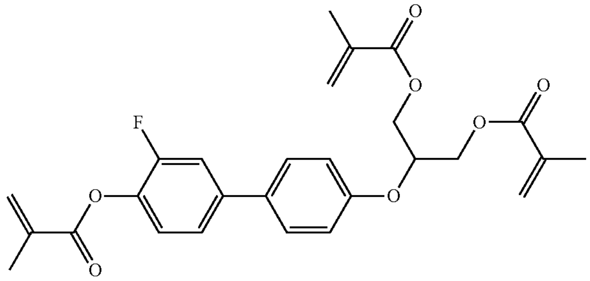 [SMILES: C=C(C)C(=O)OCC(COC(=O)C(=C)C)Oc1ccc(-c2ccc(OC(=O)C(=C)C)c(F)c2)cc1]
RM-114
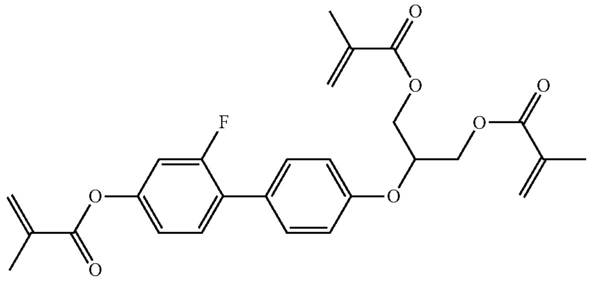 [SMILES: C=C(C)C(=O)OCC(COC(=O)C(=C)C)Oc1ccc(-c2ccc(OC(=O)C(=C)C)cc2F)cc1]

TABLE E-continued
Table E shows illustrative reactive mesogenic compounds (RMs) which can be used in the liquid-crystalline media in accordance with the present invention.
RM-115
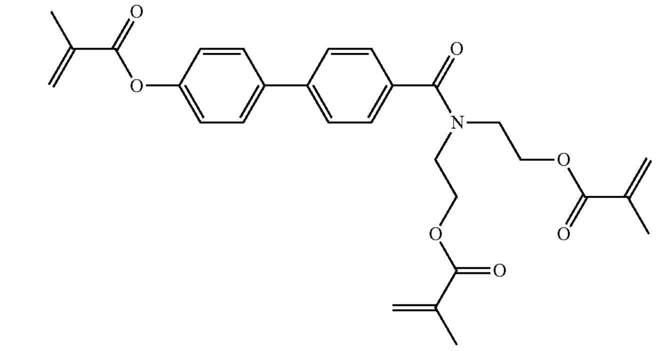 [SMILES: C=C(C)C(=O)OCCN(CCOC(=O)C(=C)C)C(=O)c1ccc(-c2ccc(OC(=O)C(=C)C)cc2)cc1]
RM-116
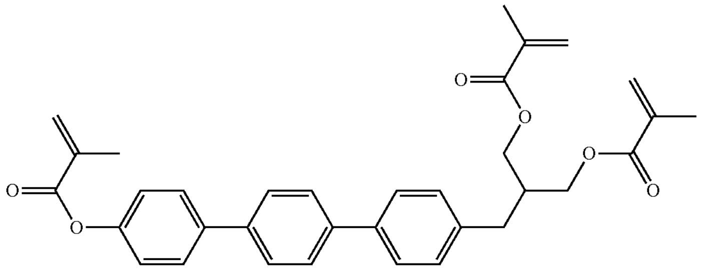 [SMILES: C=C(C)C(=O)OCC(COC(=O)C(=C)C)Cc1ccc(-c2ccc(-c3ccc(OC(=O)C(=C)C)cc3)cc2)cc1]
RM-117
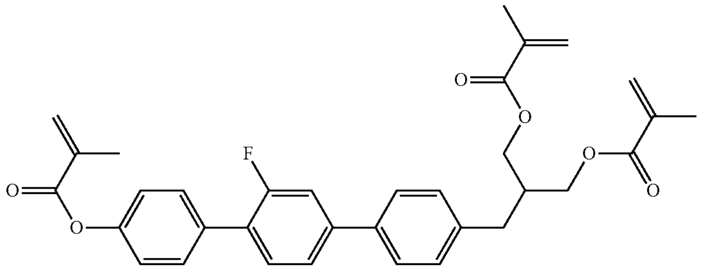 [SMILES: C=C(C)C(=O)OCC(COC(=O)C(=C)C)Cc1ccc(-c2ccc(-c3ccc(OC(=O)C(=C)C)cc3)c(F)c2)cc1]
RM-118
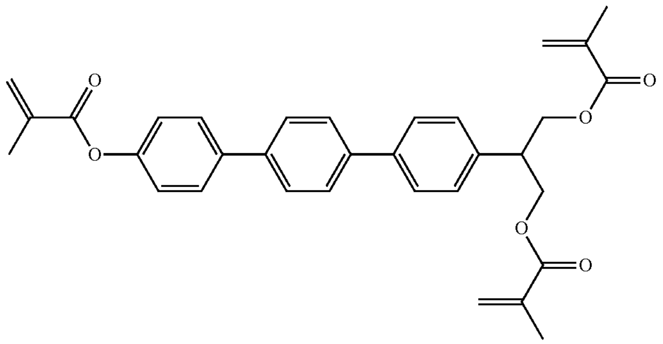 [SMILES: C=C(C)C(=O)OCC(COC(=O)C(=C)C)c1ccc(-c2ccc(-c3ccc(OC(=O)C(=C)C)cc3)cc2)cc1]
RM-119
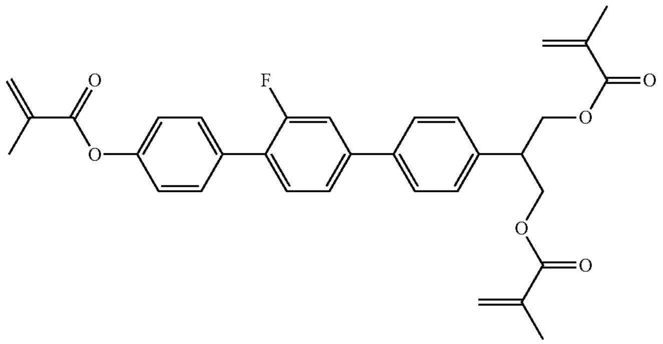 [SMILES: C=C(C)C(=O)OCC(COC(=O)C(=C)C)c1ccc(-c2ccc(-c3ccc(OC(=O)C(=C)C)cc3)c(F)c2)cc1]

TABLE E-continued
Table E shows illustrative reactive mesogenic compounds (RMs) which can be used in the liquid-crystalline media in accordance with the present invention.
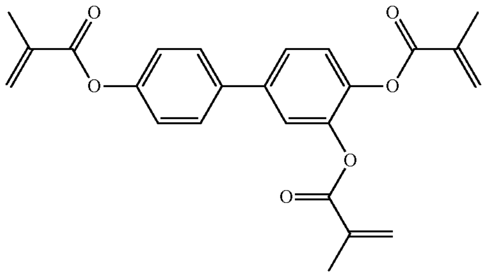 [SMILES: C=C(C)C(=O)Oc1ccc(-c2ccc(OC(=O)C(=C)C)c(OC(=O)C(=C)C)c2)cc1]
RM-120
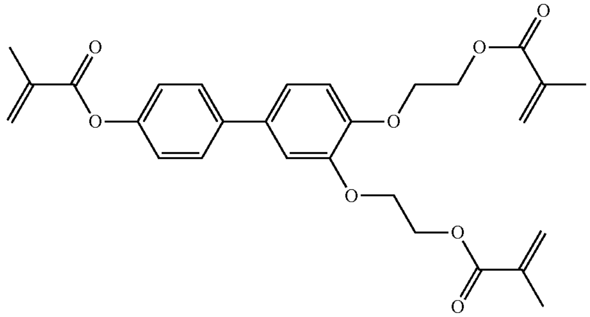 [SMILES: C=C(C)C(=O)OCCOc1ccc(-c2ccc(OC(=O)C(=C)C)cc2)cc1OCCOC(=O)C(=C)C]
RM-121
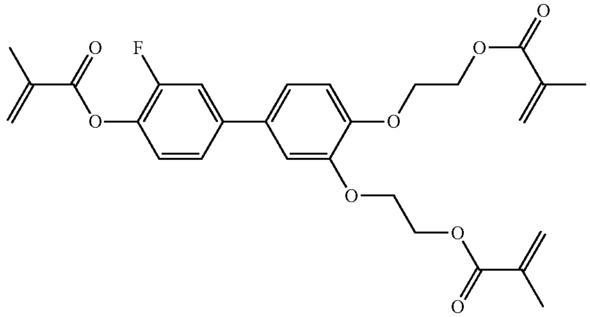 [SMILES: C=C(C)C(=O)OCCOc1ccc(-c2ccc(OC(=O)C(=C)C)c(F)c2)cc1OCCOC(=O)C(=C)C]
RM-122
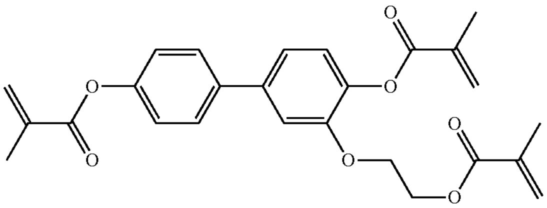 [SMILES: C=C(C)C(=O)OCCOc1cc(-c2ccc(OC(=O)C(=C)C)cc2)ccc1OC(=O)C(=C)C]
RM-123
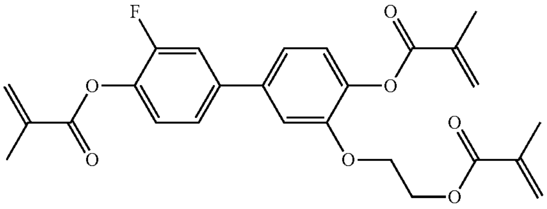
RM-124

TABLE E-continued
Table E shows illustrative reactive mesogenic compounds (RMs) which can be used in the liquid-crystalline media in accordance with the present invention.
RM-125
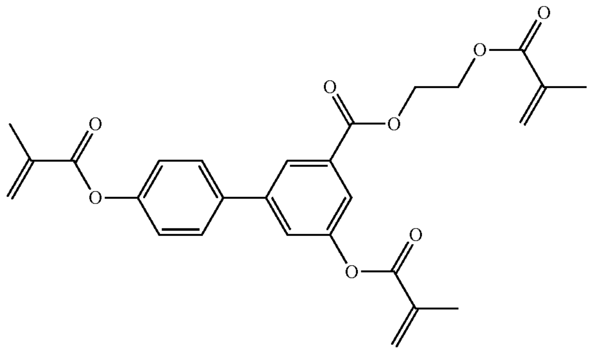 [SMILES: C=C(C)C(=O)OCCOC(=O)c1cc(OC(=O)C(=C)C)cc(-c2ccc(OC(=O)C(=C)C)cc2)c1]
RM-126
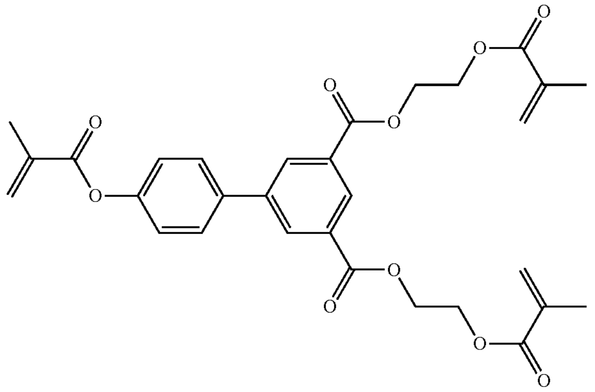 [SMILES: C=C(C)C(=O)OCCOC(=O)c1cc(C(=O)OCCOC(=O)C(=C)C)cc(-c2ccc(OC(=O)C(=C)C)cc2)c1]
RM-127
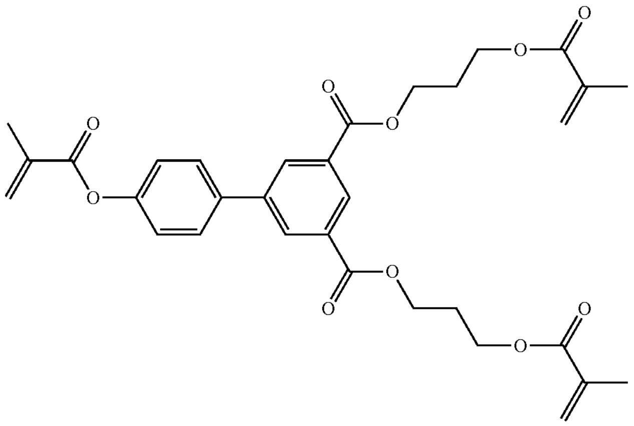 [SMILES: C=C(C)C(=O)OCCCOC(=O)c1cc(C(=O)OCCCOC(=O)C(=C)C)cc(-c2ccc(OC(=O)C(=C)C)cc2)c1]
RM-128
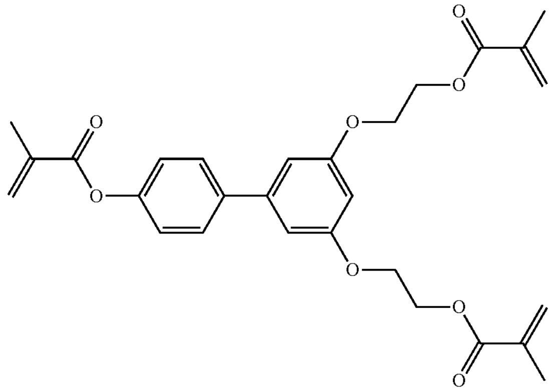 [SMILES: C=C(C)C(=O)OCCOc1cc(OCCOC(=O)C(=C)C)cc(-c2ccc(OC(=O)C(=C)C)cc2)c1]

TABLE E-continued
Table E shows illustrative reactive mesogenic compounds (RMs) which can be used in the liquid-crystalline media in accordance with the present invention.
RM-129
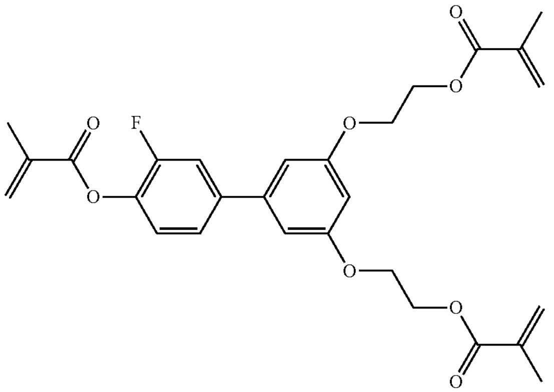 [SMILES: C=C(C)C(=O)OCCOc1cc(OCCOC(=O)C(=C)C)cc(-c2ccc(OC(=O)C(=C)C)c(F)c2)c1]
RM-130
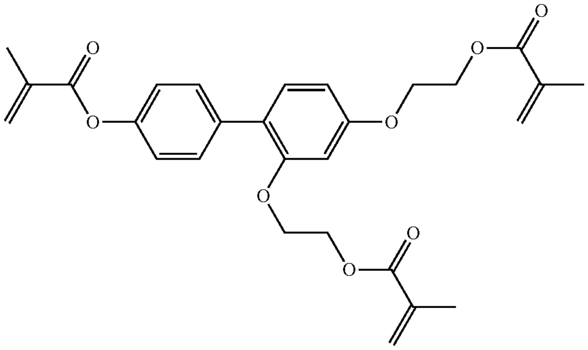 [SMILES: C=C(C)C(=O)OCCOc1ccc(-c2ccc(OC(=O)C(=C)C)cc2)c(OCCOC(=O)C(=C)C)c1]
RM-131
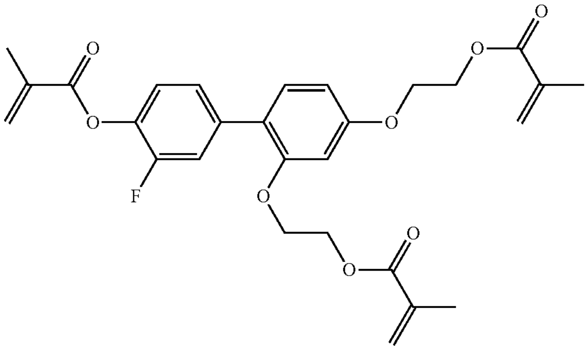 [SMILES: C=C(C)C(=O)OCCOc1ccc(-c2ccc(OC(=O)C(=C)C)c(F)c2)c(OCCOC(=O)C(=C)C)c1]
RM-132
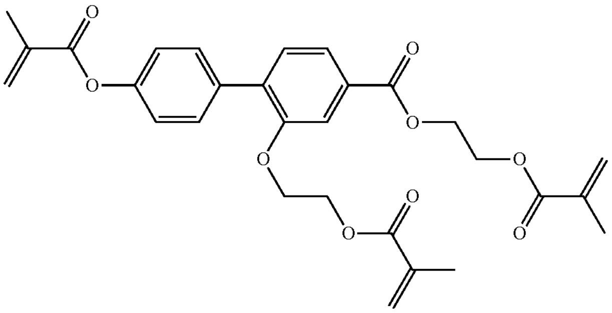 [SMILES: C=C(C)C(=O)OCCOC(=O)c1ccc(-c2ccc(OC(=O)C(=C)C)cc2)c(OCCOC(=O)C(=C)C)c1]

TABLE E-continued
Table E shows illustrative reactive mesogenic compounds (RMs) which can be used in the liquid-crystalline media in accordance with the present invention.
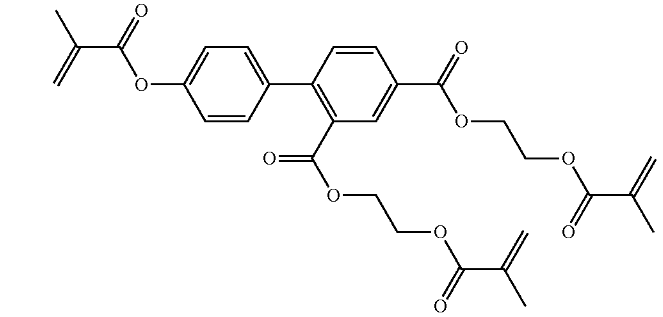 [SMILES: C=C(C)C(=O)OCCOC(=O)c1ccc(-c2ccc(OC(=O)C(=C)C)cc2)c(C(=O)OCCOC(=O)C(=C)C)c1]
RM-133
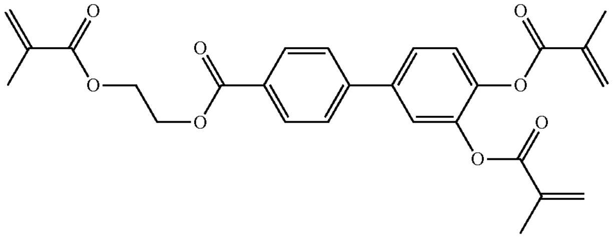 [SMILES: C=C(C)C(=O)OCCOC(=O)c1ccc(-c2ccc(OC(=O)C(=C)C)c(OC(=O)C(=C)C)c2)cc1]
RM-134
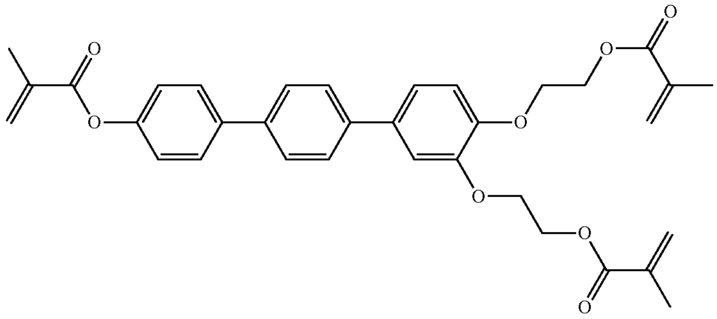 [SMILES: C=C(C)C(=O)OCCOc1ccc(-c2ccc(-c3ccc(OC(=O)C(=C)C)cc3)cc2)cc1OCCOC(=O)C(=C)C]
RM-135
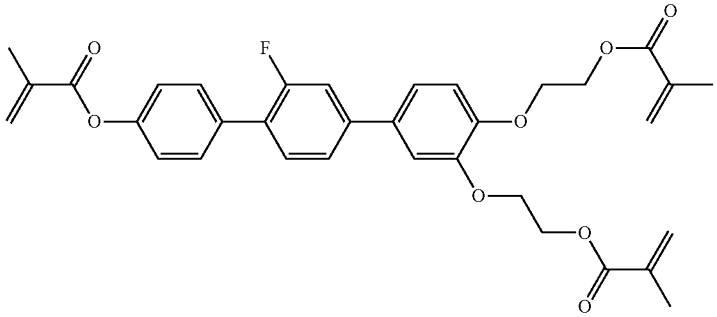 [SMILES: C=C(C)C(=O)OCCOc1ccc(-c2ccc(-c3ccc(OC(=O)C(=C)C)cc3)c(F)c2)cc1OCCOC(=O)C(=C)C]
RM-136
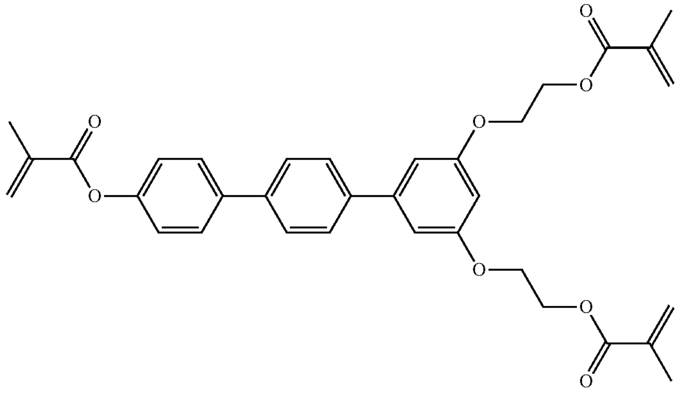 [SMILES: C=C(C)C(=O)OCCOc1cc(OCCOC(=O)C(=C)C)cc(-c2ccc(-c3ccc(OC(=O)C(=C)C)cc3)cc2)c1]
RM-137

TABLE E-continued
Table E shows illustrative reactive mesogenic compounds (RMs) which can be used in the liquid-crystalline media in accordance with the present invention.
RM-138
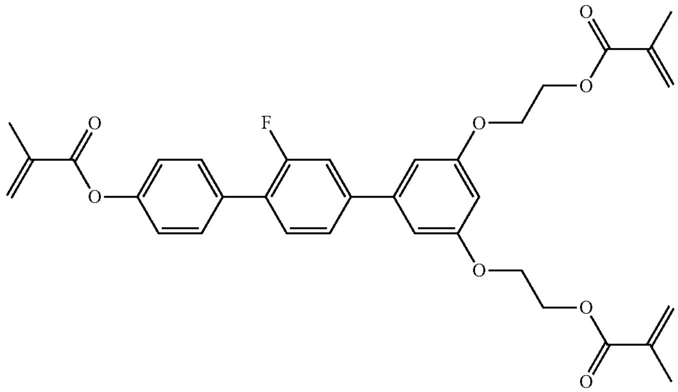 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-139
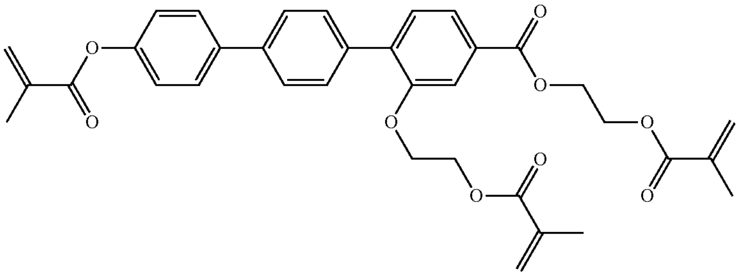 [SMILES: C=C(C)C(=O)OCCOC(=O)c1ccc(-c2ccc(-c3ccc(OC(=O)C(=C)C)cc3)cc2)c(OCCOC(=O)C(=C)C)c1]
RM-140
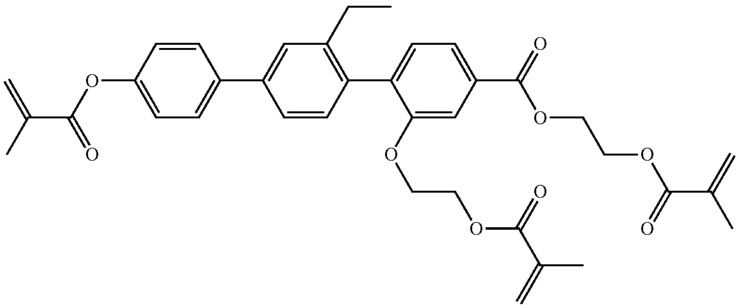 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-141
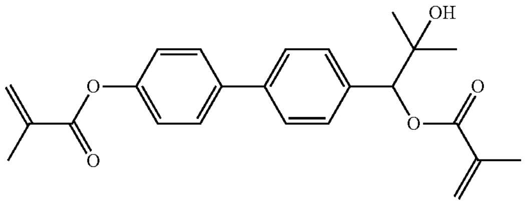 [SMILES: C=C(C)C(=O)Oc1ccc(-c2ccc(C(OC(=O)C(=C)C)C(C)(C)O)cc2)cc1]
RM-142
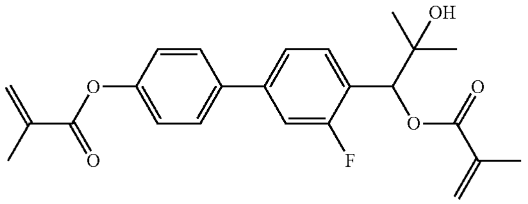 [SMILES: C=C(C)C(=O)Oc1ccc(-c2ccc(C(OC(=O)C(=C)C)C(C)(C)O)c(F)c2)cc1]

TABLE E-continued

| Table E shows illustrative reactive mesogenic compounds (RMs) which can be used in the liquid-crystalline media in accordance with the present invention. | |
|---|---|
| 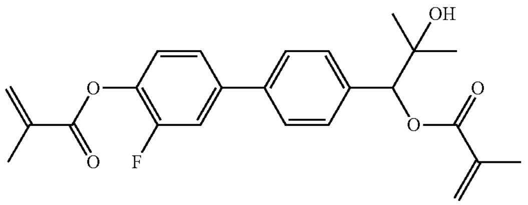 [SMILES: C=C(C)C(=O)Oc1ccc(-c2ccc(C(OC(=O)C(=C)C)C(C)(C)O)cc2)cc1F] | RM-143 |

In a preferred embodiment, the liquid-crystalline media according to the invention comprise one or more polymerisable compounds, preferably selected from the polymerisable compounds of the formulae RM-1 to RM-143. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121 and RM-122 are particularly preferred.

TABLE E

| Table E shows self-alignment additives for vertical alignment which can be used in LC media for SA-FFS, SA-HB-FFS and SA-XB-FFS displays according to the present invention, optionally together with the polymerizable compounds of formula I: | |
|---|---|
| 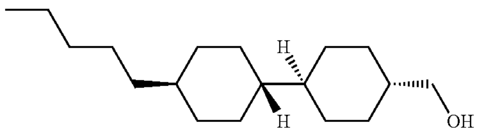 [SMILES: CCCCC[C@H]1CC[C@H]([C@H]2CC[C@H](CO)CC2)CC1] | SA-1 |
| 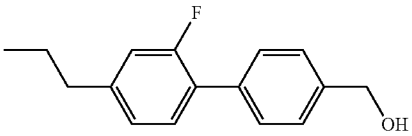 [SMILES: CCCc1ccc(-c2ccc(CO)cc2)c(F)c1] | SA-2 |
| 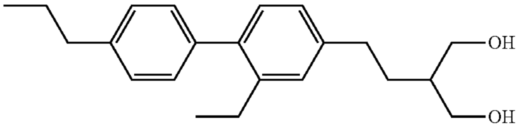 [SMILES: CCCc1ccc(-c2ccc(CCC(CO)CO)cc2CC)cc1] | SA-3 |
| 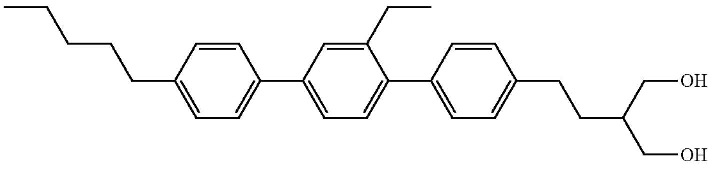 [SMILES: CCCCCc1ccc(-c2ccc(-c3ccc(CCC(CO)CO)cc3)c(CC)c2)cc1] | SA-4 |
| 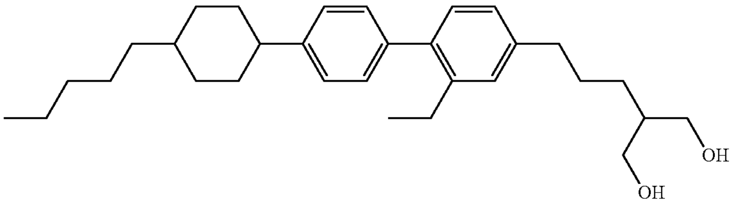 [SMILES: CCCCCC1CCC(c2ccc(-c3ccc(CCCC(CO)CO)cc3CC)cc2)CC1] | SA-5 |
| 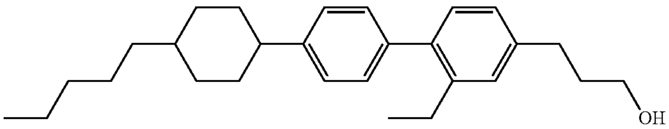 [SMILES: CCCCCC1CCC(c2ccc(-c3ccc(CCCO)cc3CC)cc2)CC1] | SA-6 |

TABLE E-continued
| |
|---|
| Table E shows self-alignment additives for vertical alignment which can be used in LC media for SA-FFS, SA-HB-FFS and SA-XB-FFS displays according to the present invention, optionally together with the polymerizable compounds of formula I: |
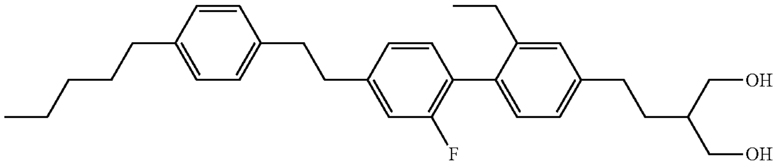 [SMILES: CCCCCc1ccc(CCc2ccc(-c3ccc(CCC(CO)CO)cc3CC)c(F)c2)cc1]
SA-7
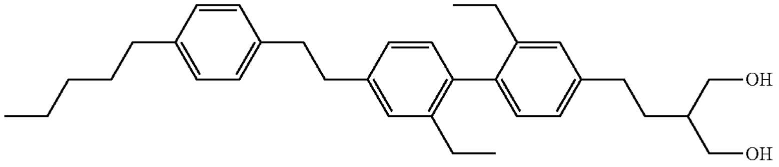 [SMILES: CCCCCc1ccc(CCc2ccc(-c3ccc(CCC(CO)CO)cc3CC)c(CC)c2)cc1]
SA-8
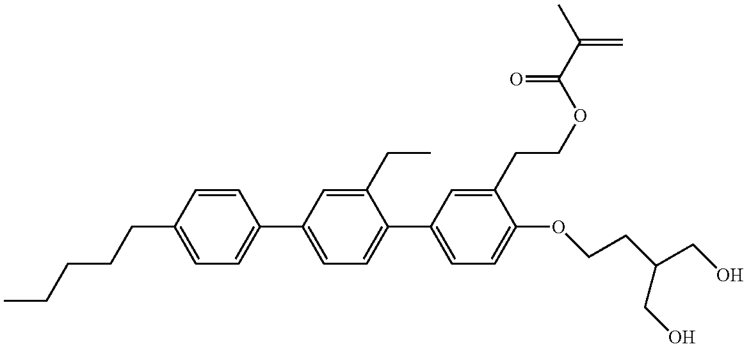 [SMILES: C=C(C)C(=O)OCCc1cc(-c2ccc(-c3ccc(CCCCC)cc3)cc2CC)ccc1OCCC(CO)CO]
SA-9
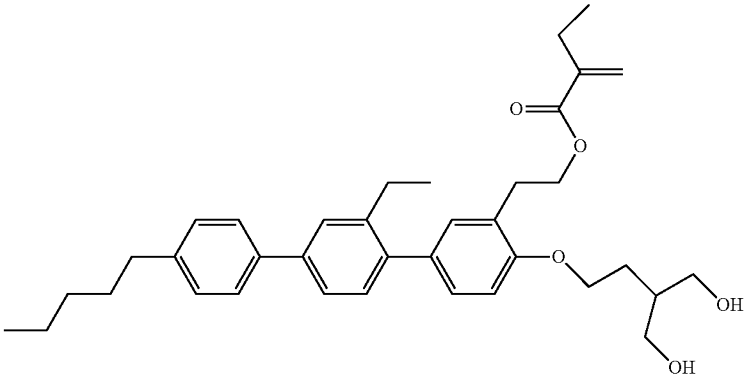 [SMILES: C=C(CC)C(=O)OCCc1cc(-c2ccc(-c3ccc(CCCCC)cc3)cc2CC)ccc1OCCC(CO)CO]
SA-10
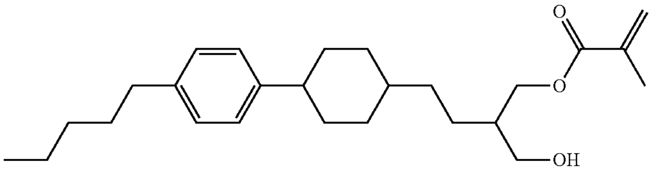 [SMILES: C=C(C)C(=O)OCC(CO)CCC1CCC(c2ccc(CCCCC)cc2)CC1]
SA-11
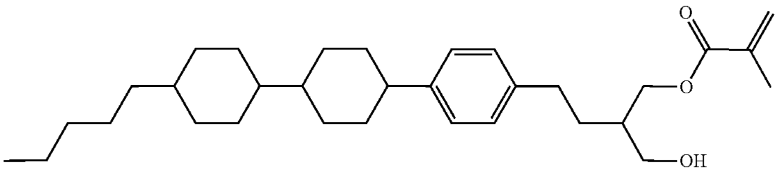 [SMILES: C=C(C)C(=O)OCC(CO)CCc1ccc(C2CCC(C3CCC(CCCCC)CC3)CC2)cc1]
SA-12

TABLE E-continued
Table E shows self-alignment additives for vertical alignment which can be used in LC media for SA-FFS, SA-HB-FFS and SA-XB-FFS displays according to the present invention, optionally together with the polymerizable compounds of formula I:
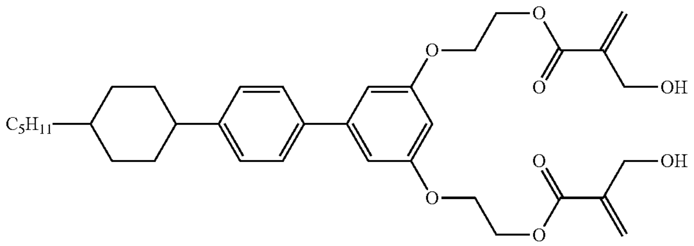
SA-13
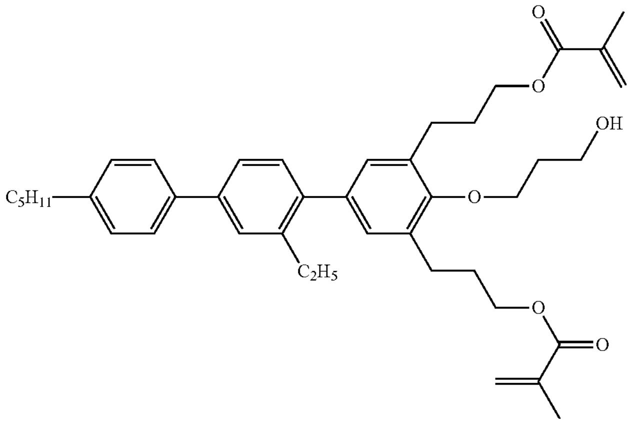
SA-14
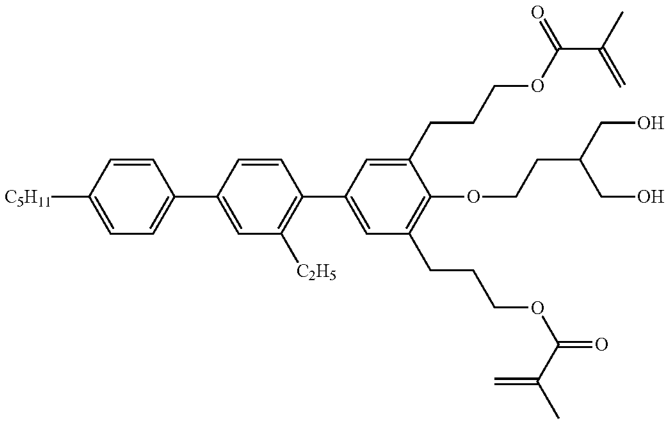
SA-15
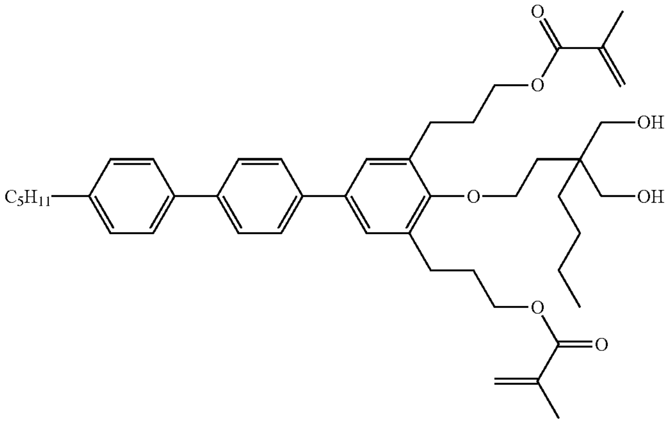
SA-16

TABLE E-continued
| Table E shows self-alignment additives for vertical alignment which can be used in LC media for SA-FFS, SA-HB-FFS and SA-XB-FFS displays according to the present invention, optionally together with the polymerizable compounds of formula I: |
|---|
| 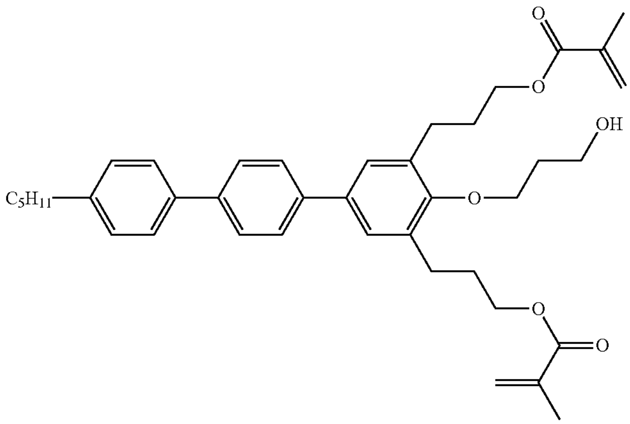 SA-17 |
| 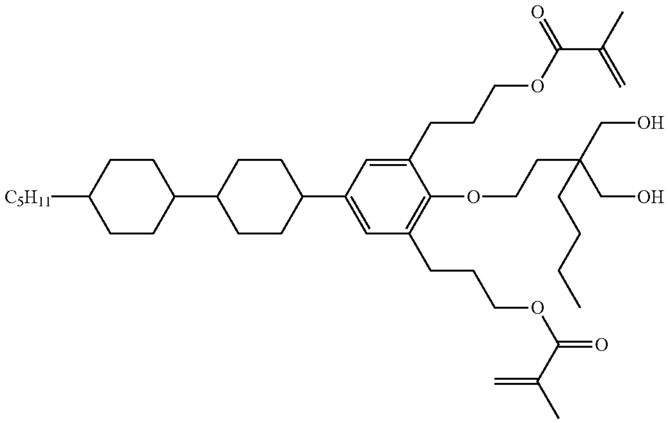 SA-18 |
| 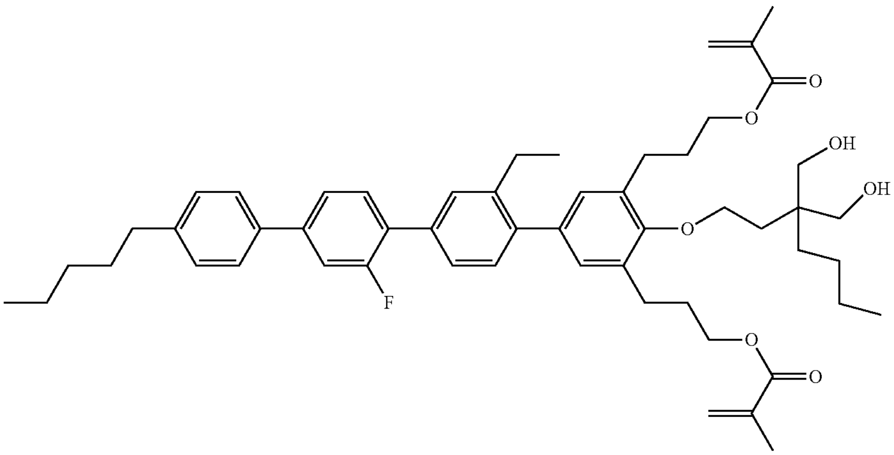 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC] SA-19 |

TABLE E-continued
| Table E shows self-alignment additives for vertical alignment which can be used in LC media for SA-FFS, SA-HB-FFS and SA-XB-FFS displays according to the present invention, optionally together with the polymerizable compounds of formula I: |
|---|
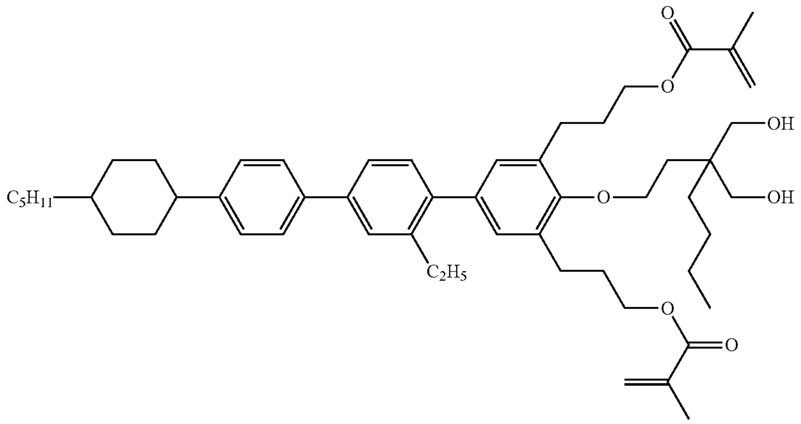
SA-20
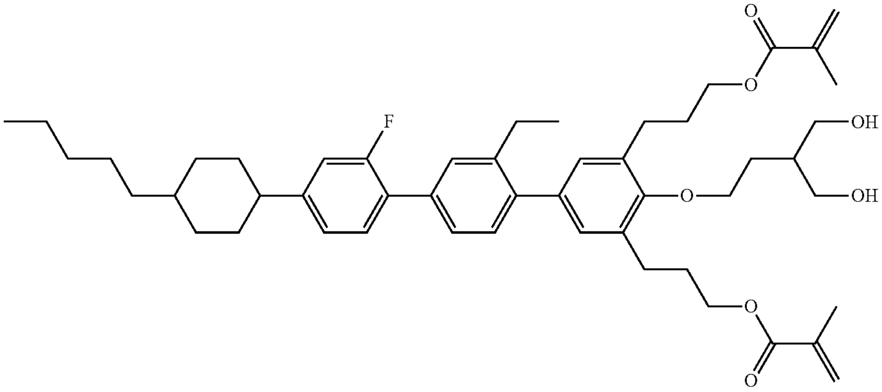 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)CO]
SA-21
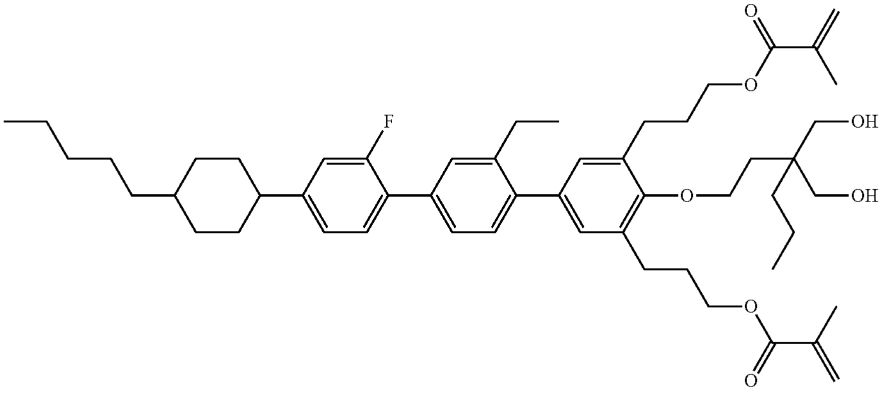 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCC]
SA-22

TABLE E-continued
| Table E shows self-alignment additives for vertical alignment which can be used in LC media for SA-FFS, SA-HB-FFS and SA-XB-FFS displays according to the present invention, optionally together with the polymerizable compounds of formula I: |
| --- |
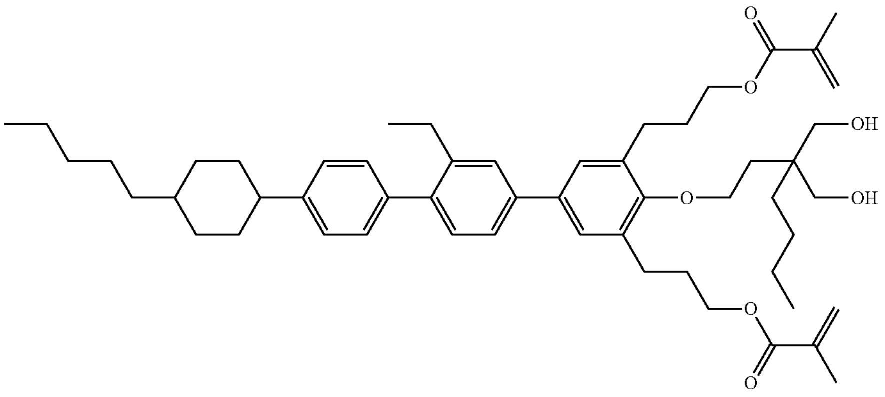 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-23
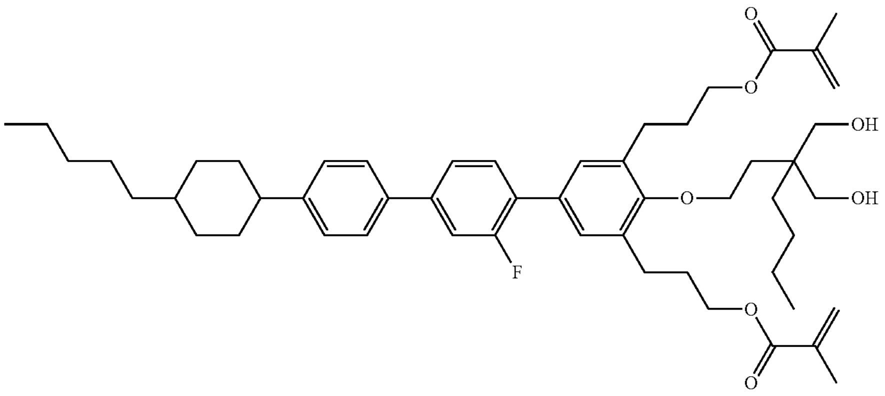 [SMILES: C=C(C)C(=O)OCCCc1cc(-c2ccc(-c3ccc(C4CCC(CCCCC)CC4)cc3)cc2F)cc(CCCOC(=O)C(=C)C)c1OCCC(CO)(CO)CCCC]
SA-24
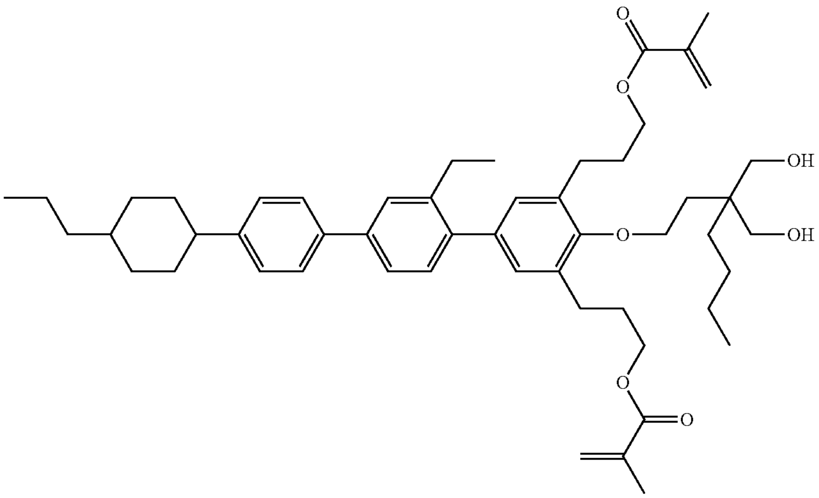 [SMILES: C=C(C)C(=O)OCCCc1cc(-c2ccc(-c3ccc(C4CCC(CCC)CC4)cc3)cc2CC)cc(CCCOC(=O)C(=C)C)c1OCCC(CO)(CO)CCCC]
SA-25

TABLE E-continued
| Table E shows self-alignment additives for vertical alignment which can be used in LC media for SA-FFS, SA-HB-FFS and SA-XB-FFS displays according to the present invention, optionally together with the polymerizable compounds of formula I: |
|---|
SA-26
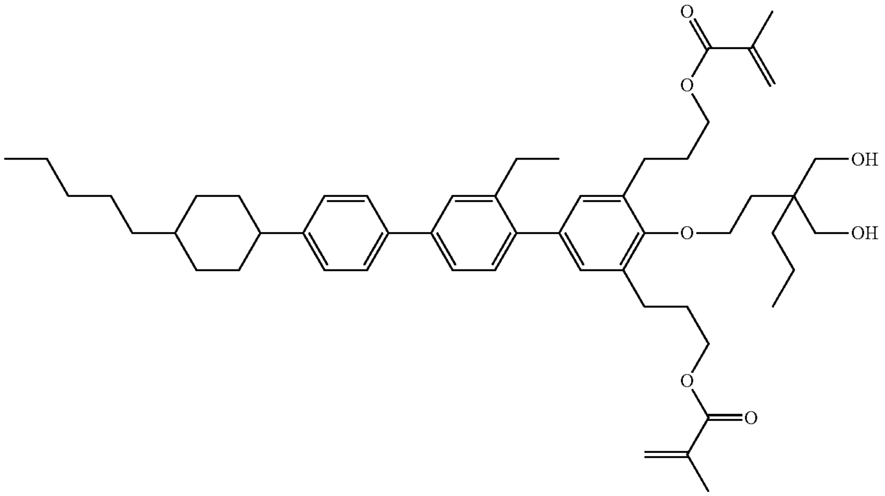 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCC]
SA-27
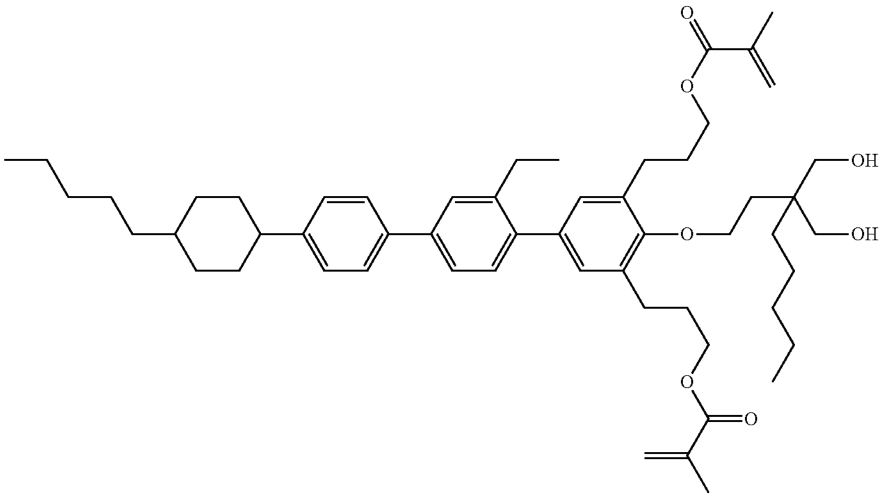 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCCC]
SA-28
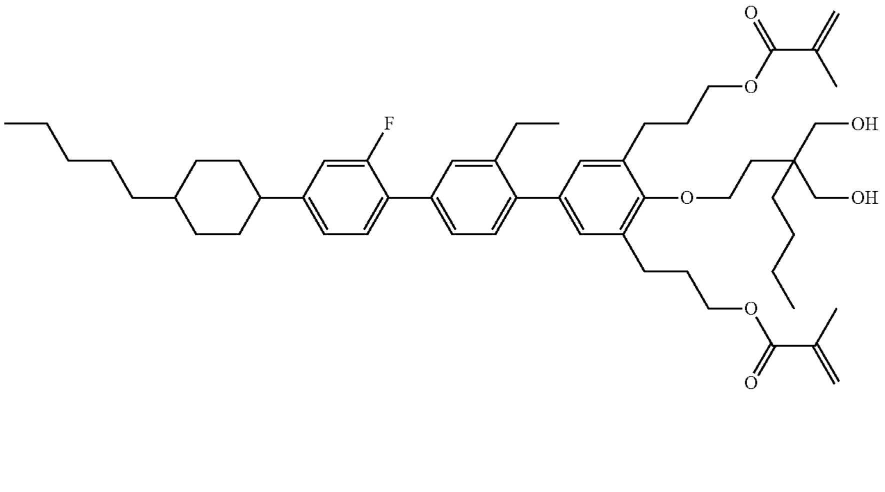 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCCC(CO)(CO)CCCC]

TABLE E-continued
Table E shows self-alignment additives for vertical alignment which can be used in LC media for SA-FFS, SA-HB-FFS and SA-XB-FFS displays according to the present invention, optionally together with the polymerizable compounds of formula I:
SA-29
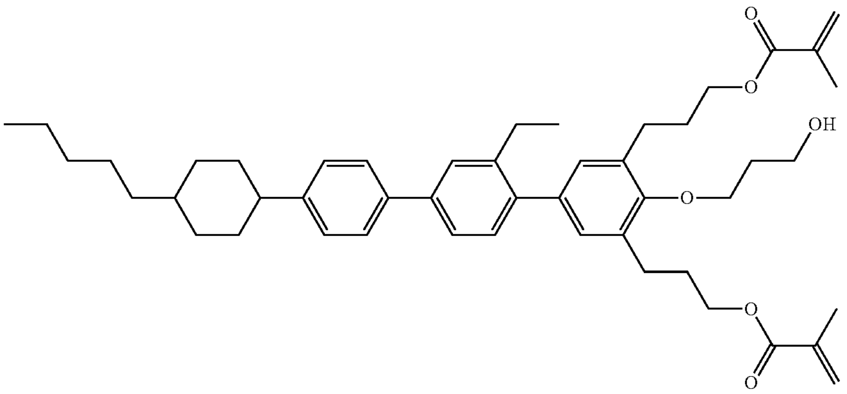 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCCO]
SA-30
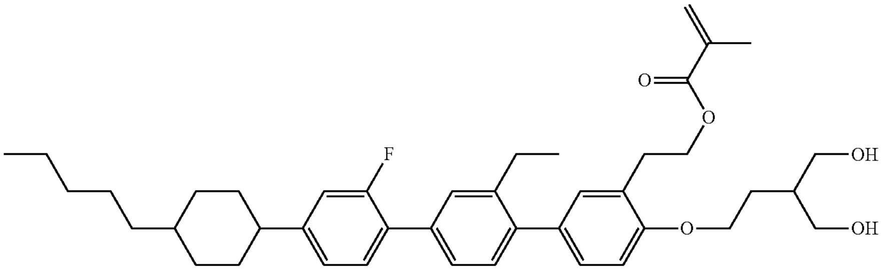 [SMILES: C=C(C)C(=O)OCCc1cc(-c2ccc(-c3ccc(C4CCC(CCCCC)CC4)cc3F)cc2CC)ccc1OCCC(CO)CO]
SA-31
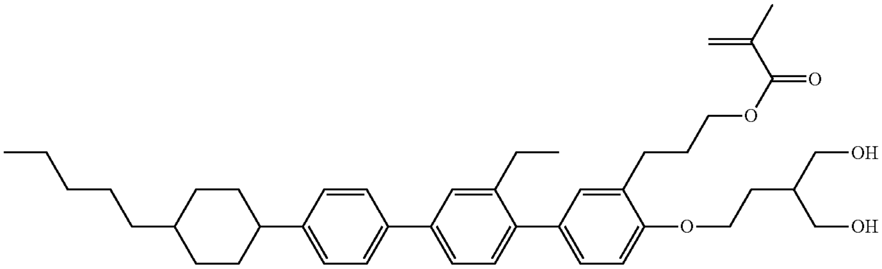 [SMILES: C=C(C)C(=O)OCCCc1cc(-c2ccc(-c3ccc(C4CCC(CCCCC)CC4)cc3)cc2CC)ccc1OCCC(CO)CO]
SA-32
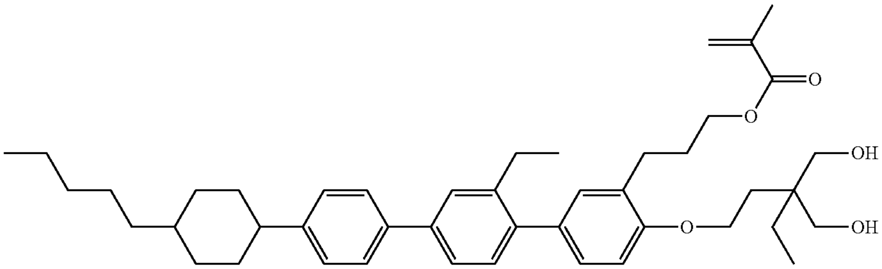 [SMILES: C=C(C)C(=O)OCCCc1cc(-c2ccc(-c3ccc(C4CCC(CCCCC)CC4)cc3)cc2CC)ccc1OCCC(CC)(CO)CO]

TABLE E-continued

Table E shows self-alignment additives for vertical alignment which can be used in LC media for SA-FFS, SA-HB-FFS and SA-XB-FFS displays according to the present invention, optionally together with the polymerizable compounds of formula I:

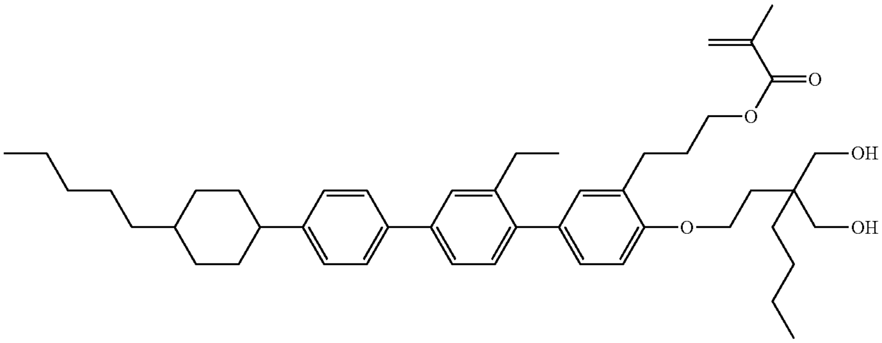 [SMILES: C=C(C)C(=O)OCCCc1cc(-c2ccc(-c3ccc(C4CCC(CCCCC)CC4)cc3)cc2CC)ccc1OCCC(CO)(CO)CCCC]

SA-33

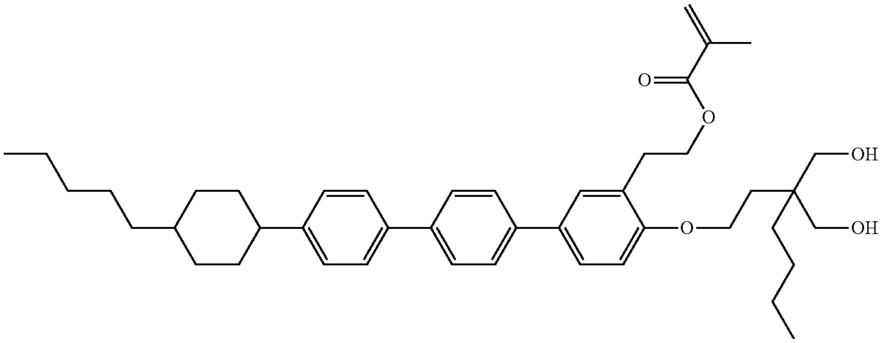 [SMILES: C=C(C)C(=O)OCCc1cc(-c2ccc(-c3ccc(C4CCC(CCCCC)CC4)cc3)cc2)ccc1OCCC(CO)(CO)CCCC]

SA-34

In a preferred embodiment, the LC media, SA-FFS, SA-HB-FFS and SA-XB-FFS displays according to the present invention comprise one or more SA additives selected from formulae SA-1 to SA-34, preferably from formulae SA-14 to SA-34, very preferably from formulae SA-20 to SA-28, most preferably of formula SA-20, in combination with one or more RMs of formula I. Very preferred is a combination of polymerizable compound 1, 2 or 3 of Example 1 below, very preferably of polymerizable compound 3 of Example 1, with an SA additive of formula SA-20 to SA-28, very preferably of formula SA-20.

The following mixture examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, the following symbols are used $V_0$ Freedericks threshold voltage, capacitive [V] at 20° C., $V_{10}$ voltage [V] for 10% transmission, $n_e$ extraordinary refractive index measured at 20° C. and 589 nm, $n_o$ ordinary refractive index measured at 20° C. and 589 nm, $\Delta n$ optical anisotropy measured at 20° C. and 589 nm, $\varepsilon_\perp$ dielectric susceptibility (or "dielectric constant") perpendicular to the to the longitudinal axes of the molecules at 20° C. and 1 kHz, $\varepsilon_\parallel$ dielectric susceptibility (or "dielectric constant") parallel to the to the longitudinal axes of the molecules at 20° C. and 1 kHz, $\Delta\varepsilon$ dielectric anisotropy at 20° C. and 1 kHz, cl.p. or T(N,I) clearing point [° C.], $\nu$ flow viscosity measured at 20° C. [$mm^2 \cdot s^{-1}$], $\gamma_1$ rotational viscosity measured at 20° C. [mPa·s], $K_1$ elastic constant, "splay" deformation at 20° C. [pN], $K_2$ elastic constant, "twist" deformation at 20° C. [pN], $K_3$ elastic constant, "bend" deformation at 20° C. [pN], and LTS low-temperature stability of the phase [h] in bulk VHR voltage holding ratio.

All physical properties are determined in accordance with "Merck Liquid Crystals, Physical Properties of Liquid Crystals", status November 1997, Merck KGaA, Germany, and apply for a temperature of 20° C., unless explicitly indicated otherwise.

COMPARISON EXAMPLE 1

The following liquid-crystalline medium is formulated:

| | | | |
|---|---|---|---|
| PGUQU-3-F | 2.0% | cl.p. | 81.0 |
| BCH-3F.F.F | 14.5% | $\Delta n$ | 0.0997 |
| PPGU-3-F | 0.5% | $n_e$ | 1.5887 |
| CC-3-V | 48.0% | $n_o$ | 1.4890 |
| CC-4-V | 5.5% | $\Delta\varepsilon$ | 2.4 |
| CCP-3-1 | 3.0% | $\varepsilon_\parallel$ | 5.0 |
| CCP-V-1 | 12.5% | $\varepsilon_\perp$ | 2.6 |
| CBC-33F | 3.0% | $\gamma_1$ | 53 |
| PGP-2-3 | 8.0% | $K_1$ | 13.1 |
| PGP-2-4 | 3.0% | $K_3$ | 14.2 |
| | | $\gamma_1/K_1$ | 4.0 mPas/pN |
| | | LTS bulk | 1000 |

The medium does not contain a compound of formula I.

COMPARISON EXAMPLE 2

The following liquid-crystalline medium is formulated:

| | | | |
|---|---|---|---|
| CBC-33F | 3.0% | cl.p. | 78.5 |
| PPGU-3-F | 0.5% | Δn | 0.1000 |
| BCH-32 | 4.5% | $n_e$ | 1.5881 |
| BCH-3F.F.F | 12.0% | $n_o$ | 1.4881 |
| CCP-3-1 | 3.0% | Δε | 2.5 |
| CCP-V-1 | 6.5% | $ε_{\|\|}$ | 5.1 |
| PGP-2-3 | 3.0% | $ε_⊥$ | 2.6 |
| PGP-2-4 | 5.0% | $γ_1$ | 51 |
| PGU-3-F | 5.5% | $K_1$ | 13.5 |
| CC-3-V | 49.0% | $K_3$ | 14.1 |
| CC-3-V1 | 8.0% | $γ_1/K_1$ | 3.8 mPas/pN |
| | | LTS | 1000 |

The medium does not contain a compound of formula I.

EXAMPLE 1

The following liquid-crystalline medium is formulated:

| | | | |
|---|---|---|---|
| CBC-33F | 3.0% | cl.p. | 79.5 |
| PPGU-3-F | 0.5% | Δn | 0.0980 |
| BCH-32 | 6.5% | $n_e$ | 1.5852 |
| PGP-2-3 | 6.0% | $n_o$ | 1.4872 |
| PGP-2-4 | 6.0% | Δε | 2.4 |
| CC-3-V | 49.0% | $ε_{\|\|}$ | 5.1 |
| CC-3-V1 | 8.0% | $ε_⊥$ | 2.7 |
| CLU-3-F | 20.0% | $γ_1$ | 51 |
| BCH-5F.F.F | 1.0% | $K_1$ | 14.5 |
| | | $K_3$ | 14.0 |
| | | $γ_1/K_1$ | 3.5 mPas/pN |
| | | LTS | 1000 |

The medium contains compound CLU-3-F of formula I and shows a lower value of $γ_1/K_1$ than the medium of Comparison Example 1 or 2.

EXAMPLE 2

The following liquid-crystalline medium is formulated:

| | | | |
|---|---|---|---|
| CDUQU-3-F | 8.0% | cl.p. | 103.5 |
| CPGP-5-2 | 2.5% | Δn | 0.1114 |
| DGUQU-4-F | 6.0% | $n_e$ | 1.5990 |
| DPGU-4-F | 4.0% | $n_o$ | 1.4876 |
| PGUQU-3-F | 2.0% | Δε | 6.7 |
| CCP-V-1 | 11.0% | $ε_{\|\|}$ | 9.7 |
| CCP-V2-1 | 9.0% | $ε_⊥$ | 3.0 |
| PGP-2-2V | 6.0% | $γ_1$ | 95 |
| CC-3-2V1 | 8.0% | $K_1$ | 18.5 |
| CC-3-V | 23.5% | $K_3$ | 19.4 |
| CC-3-V1 | 10.0% | LTS | 1000 |
| PP-1-2V1 | 5.0% | | |
| CLU-3-F | 5.0% | | |

EXAMPLE 3

The following liquid-crystalline medium is formulated:

| | | | |
|---|---|---|---|
| APUQU-3-F | 3.0% | cl.p. | 81.0 |
| CBC-33F | 3.0% | Δn | 0.0938 |
| PGUQU-3-F | 5.5% | $n_e$ | 1.5778 |
| PPGU-3-F | 0.5% | $n_o$ | 1.4840 |
| BCH-32 | 6.5% | Δε | 2.7 |
| CCP-3-1 | 5.0% | $ε_{\|\|}$ | 5.3 |
| PGP-2-3 | 5.5% | $ε_⊥$ | 2.6 |
| PGP-2-4 | 3.0% | $γ_1$ | 55 |
| CC-3-V | 48.5% | $K_1$ | 14.8 |
| CCH-23 | 5.0% | $K_3$ | 14.3 |
| CCH-34 | 4.5% | | |
| CCH-35 | 5.0% | | |
| CLU-3-F | 5.0% | | |

The following liquid-crystalline medium is formulated:

| | | | |
|---|---|---|---|
| CBC-33F | 3.0% | cl.p. | 80.5 |
| PPGU-3-F | 0.5% | Δn | 0.0992 |
| BCH-32 | 4.5% | $n_e$ | 1.5883 |
| BCH-3F.F.F | 12.0% | $n_o$ | 1.4891 |
| CCP-3-1 | 3.0% | Δε | 2.5 |
| CCP-V-1 | 6.5% | $ε_{\|\|}$ | 5.2 |
| PGP-2-3 | 3.0% | $ε_⊥$ | 2.6 |
| PGP-2-4 | 6.0% | $γ_1$ | 54 |
| PGU-3-F | 2.5% | $K_1$ | 13.7 |
| CC-3-V | 49.0% | $K_3$ | 14.2 |
| CC-3-V1 | 5.0% | LTS | 1000 |
| CLU-3-F | 5.0% | | |

EXAMPLE 5

The following liquid-crystalline medium is formulated:

| | | | |
|---|---|---|---|
| CBC-33F | 3.0% | cl.p. | 80.0 |
| PPGU-3-F | 0.5% | Δn | 0.1006 |
| BCH-32 | 5.5% | $n_e$ | 1.5900 |
| CCP-3-1 | 3.0% | $n_o$ | 1.4894 |
| CCP-V-1 | 4.5% | Δε | 2.5 |
| PGP-2-3 | 4.0% | $ε_{\|\|}$ | 5.2 |
| PGP-2-4 | 8.0% | $ε_⊥$ | 2.7 |
| PGU-3-F | 4.5% | $γ_1$ | 55 |
| CC-3-V | 49.0% | $K_1$ | 13.7 |
| CC-3-V1 | 3.0% | $K_3$ | 13.8 |
| CLU-3-F | 7.0% | | |
| CCP-2F.F.F | 8.0% | | |

EXAMPLE 6

The following liquid-crystalline medium is formulated:

| | | | |
|---|---|---|---|
| CBC-33F | 3.0% | cl.p. | 80.0 |
| PPGU-3-F | 0.5% | Δn | 0.1000 |
| BCH-32 | 5.5% | $n_e$ | 1.5877 |
| CCP-3-1 | 3.0% | $n_o$ | 1.4877 |
| CCP-V-1 | 4.5% | Δε | 2.5 |
| PGP-2-3 | 4.0% | $ε_{\|\|}$ | 5.2 |
| PGP-2-4 | 5.0% | $ε_⊥$ | 2.6 |
| PGU-3-F | 4.0% | $γ_1$ | 54 |
| CC-3-V | 49.0% | $K_1$ | 13.9 |
| CC-3-V1 | 6.5% | $K_3$ | 14.3 |
| CLU-3-F | 7.0% | LTS | 1000 |
| BCH-3F.F.F | 8.0% | | |

EXAMPLE 7

The following liquid-crystalline medium is formulated:

| | | | |
|---|---|---|---|
| CBC-33F | 3.0% | cl.p. | 79.0 |
| PPGU-3-F | 0.5% | Δn | 0.1007 |

-continued

| | | | |
|---|---|---|---|
| BCH-32 | 5.5% | $n_e$ | 1.5887 |
| CCP-3-1 | 3.0% | $n_o$ | 1.4880 |
| CCP-V-1 | 3.0% | Δε | 2.6 |
| PGP-2-3 | 4.0% | $ε_{\|\|}$ | 5.2 |
| PGP-2-4 | 5.0% | $ε_⊥$ | 2.6 |
| PGU-3-F | 6.0% | $γ_1$ | 55 |
| CC-3-V | 49.0% | $K_1$ | 14.0 |
| CC-3-V1 | 8.0% | $K_3$ | 14.2 |
| CLU-3-F | 7.0% | LTS | 1000 |
| BCH-5F.F.F | 6.0% | | |

EXAMPLE 8

The following liquid-crystalline medium is formulated:

| | | | |
|---|---|---|---|
| CBC-33F | 3.0% | cl.p. | 80.0 |
| PPGU-3-F | 0.5% | Δn | 0.0992 |
| BCH-32 | 5.5% | $n_e$ | 1.5867 |
| CCP-3-1 | 3.0% | $n_o$ | 1.4875 |
| CCP-V-1 | 3.0% | Δε | 2.5 |
| PGP-2-3 | 4.0% | $ε_{\|\|}$ | 5.2 |
| PGP-2-4 | 5.0% | $ε_⊥$ | 2.6 |
| PGU-3-F | 5.0% | $γ_1$ | 54 |
| CC-3-V | 49.0% | $K_1$ | 14.2 |
| CC-3-V1 | 8.0% | $K_3$ | 14.3 |
| CLU-3-F | 10.0% | LTS | 1000 |
| BCH-5F.F.F | 4.0% | | |

COMPARISON EXAMPLE 3

The following liquid-crystalline medium is formulated:

| | | | |
|---|---|---|---|
| CC-3-V | 48.5% | cl.p. | 79.5 |
| CC-3-V1 | 3.0% | Δn | 0.1005 |
| CCP-V-1 | 12.0% | $n_e$ | 1.5865 |
| PGP-2-2V | 7.5% | $n_o$ | 1.4865 |
| APUQU-3-F | 6.0% | Δε | 2.7 |
| PGUQU-4-F | 5.0% | $ε_{\|\|}$ | 6.2 |
| DPGU-4-F | 2.0% | $ε_⊥$ | 3.5 |
| PPGU-3-F | 0.5% | $γ_1$ | 61 |
| CY-5-O2 | 6.0% | $K_1$ | 13.1 |
| CCY-5-O2 | 3.5% | $K_3$ | 15.1 |
| CPY-3-O2 | 3.5% | LTS | 216 |
| PP-1-2V1 | 2.5% | $γ_1/K_1$ | 4.7 mPas/pN |

The medium does not contain a compound of formula I.

EXAMPLE 9

The following liquid-crystalline medium is formulated:

| | | | |
|---|---|---|---|
| CC-3-V | 48.5% | cl.p. | 78.5 |
| CC-3-V1 | 1.0% | Δn | 0.1000 |
| CCP-V-1 | 9.0% | $n_e$ | 1.5865 |
| PGP-2-2V | 8.0% | $n_o$ | 1.4860 |
| APUQU-3-F | 1.0% | Δε | 2.6 |
| PGUQU-4-F | 5.0% | $ε_{\|\|}$ | 6.0 |
| DPGU-4-F | 1.5% | $ε_⊥$ | 3.5 |
| PPGU-3-F | 0.5% | $γ_1$ | 61 |
| CY-5-O2 | 5.0% | $K_1$ | 13.3 |
| CCY-5-O2 | 4.0% | $K_3$ | 14.7 |
| CPY-3-O2 | 4.0% | LTS | 1000 |
| PP-1-2V1 | 2.5% | $γ_1/K_1$ | 4.6 mPas/pN |
| CLU-3-F | 10.0% | | |

The medium contains compound CLU-3-F of formula I and shows a lower value of $γ_1/K_1$ and a higher LTS than the medium of Comparison Example 3.

EXAMPLE 10

The following liquid-crystalline medium is formulated:

| | | | |
|---|---|---|---|
| CC-3-V | 48.0% | cl.p. | 79 |
| CCP-V-1 | 10.0% | Δn | 0.0996 |
| PGP-2-2V | 2.0% | $n_e$ | 1.5851 |
| APUQU-3-F | 2.5% | $n_o$ | 1.4855 |
| PGUQU-4-F | 5.5% | Δε | 2.5 |
| CY-5-O2 | 2.0% | $ε_{\|\|}$ | 6.1 |
| CCY-5-O2 | 2.5% | $ε_⊥$ | 3.6 |
| CPY-3-O2 | 11.5% | $γ_1$ | 62 |
| PP-1-2V1 | 6.0% | $K_1$ | 13.7 |
| CLU-3-F | 10.0% | $K_3$ | 15.6 |

EXAMPLE 11

The following liquid-crystalline medium is formulated:

| | | | |
|---|---|---|---|
| CC-3-V | 25.0% | cl.p. | 101.5 |
| CCP-V-1 | 10.5% | Δn | 0.1120 |
| BCH-32 | 9.0% | $n_e$ | 1.5992 |
| CCP-30CF3 | 8.0% | $n_o$ | 1.4872 |
| CC-3-V1 | 8.0% | Δε | 5.8 |
| PGUQU-3-F | 7.0% | $ε_{\|\|}$ | 8.6 |
| CLU-3-F | 6.0% | $ε_⊥$ | 2.8 |
| PGUQU-4-F | 5.0% | $γ_1$ | 86 |
| CCP-50CF3 | 5.0% | $K_1$ | 17.6 |
| CCP-3-1 | 5.0% | $K_3$ | 18.3 |
| BCH-3F.F | 5.0% | | |
| PP-1-2V1 | 3.0% | | |
| PGUQU-5-F | 2.0% | | |
| PCH-302 | 1.5% | | |

EXAMPLE 12

The following liquid-crystalline medium is formulated:

| | | | |
|---|---|---|---|
| CC-3-V | 47.82% | cl.p. | 75 |
| BCH-32 | 8.99% | Δn | 0.1013 |
| PGU-2-F | 7.99% | $n_e$ | 1.5881 |
| CCP-30CF3 | 7.99% | $n_o$ | 1.4868 |
| CLP-3-T | 5.0% | Δε | 3.4 |
| CCP-3-1 | 4.99% | $ε_{\|\|}$ | 6.0 |
| CLU-3-F | 4.83% | $ε_⊥$ | 2.7 |
| PGP-2-3 | 3.92% | $γ_1$ | 49 |
| PP-1-3 | 3.81% | $K_1$ | 15.0 |
| CC-3-V1 | 2.37% | $K_3$ | 13.6 |
| PGU-3-F | 2.29% | | |

EXAMPLE 13

The following liquid-crystalline medium is formulated:

| | | | |
|---|---|---|---|
| CC-3-V | 38.28% | cl.p. | 76.5 |
| CLU-3-F | 15.16% | Δn | 0.1013 |
| PCH-302 | 12.19% | $n_e$ | 1.5890 |
| BCH-32 | 8.99% | $n_o$ | 1.4877 |
| CCP-30CF3 | 7.99% | Δε | 3.2 |
| PGP-2-3 | 6.61% | $ε_{\|\|}$ | 6.0 |
| PGU-2-F | 5.79% | $ε_⊥$ | 2.8 |
| CCP-3-1 | 4.99% | $γ_1$ | 56 |
| | | $K_1$ | 14.2 |
| | | $K_3$ | 13.6 |

EXAMPLE 14

The following liquid-crystalline medium is formulated:

| | | | |
|---|---|---|---|
| CC-3-V | 38.23% | cl.p. | 77 |
| CLU-3-F | 13.26% | Δn | 0.1004 |
| PCH-302 | 11.49% | $n_e$ | 1.5883 |
| BCH-32 | 8.99% | $n_o$ | 1.4879 |
| CCP-30CF3 | 8.00% | Δε | 3.2 |
| PGU-2-F | 5.12% | $ε_{\|\|}$ | 6.1 |
| CCP-3-1 | 5.00% | $ε_⊥$ | 2.8 |
| BCH-3F.F | 5.00% | $γ_1$ | 58 |
| PGP-2-3 | 4.91% | $K_1$ | 14.0 |
| | | $K_3$ | 14.0 |

EXAMPLE 15

The following liquid-crystalline medium is formulated:

| | | | |
|---|---|---|---|
| CC-3-V | 30.0% | cl.p. | 77 |
| CC-3-V1 | 5.0% | Δn | 0.0995 |
| CCP-V-1 | 8.0% | $n_e$ | 1.5868 |
| CCP-3-1 | 4.0% | $n_o$ | 1.4873 |
| PP-1-2V1 | 8.0% | Δε | 2.7 |
| PGUQU-3-F | 6.0% | $ε_{\|\|}$ | 5.4 |
| PCH-302 | 16.0% | $ε_⊥$ | 2.7 |
| BCH-32 | 7.0% | $γ_1$ | 58 |
| CCP-30CF3 | 6.0% | $K_1$ | 14.7 |
| CCP-50CF3 | 4.0% | $K_3$ | 16.0 |
| CLU-3-F | 6.0% | | |

EXAMPLE 16

The following liquid-crystalline medium is formulated:

| | | | |
|---|---|---|---|
| CC-3-V | 35.0% | cl.p. | 98 |
| CC-3-V1 | 5.0% | Δn | 0.1108 |
| CCP-30CF3 | 8.0% | $n_e$ | 1.5975 |
| CCP-40CF3 | 2.0% | $n_o$ | 1.4867 |
| CCP-V-1 | 20.0% | Δε | 6.0 |
| CCP-V2-1 | 2.0% | $ε_{\|\|}$ | 8.9 |
| CPGP-5-2 | 2.5% | $ε_⊥$ | 2.9 |
| PGP-2-2V | 2.0% | $γ_1$ | 77 |
| PGU-3-F | 6.5% | $K_1$ | 15.0 |
| PGUQU-3-F | 8.0% | $K_3$ | 17.5 |
| PGUQU-4-F | 6.0% | | |
| CLU-3-F | 3.0% | | |

EXAMPLE 17

The following liquid-crystalline medium is formulated:

| | | | |
|---|---|---|---|
| APUQU-3-F | 1.0% | cl.p. | 99 |
| BCH-32 | 9.0% | Δn | 0.1094 |
| BCH-3F.F | 5.5% | $n_e$ | 1.5985 |
| CC-3-V | 23.5% | $n_o$ | 1.4891 |
| CCH-34 | 5.0% | Δε | 5.8 |
| CCH-35 | 2.5% | $ε_{\|\|}$ | 8.8 |
| CCP-3-1 | 5.0% | $ε_⊥$ | 3.0 |
| CCP-3-3 | 5.0% | $γ_1$ | 102 |
| CCP-V-1 | 4.5% | $K_1$ | 17.2 |
| CCPC-33 | 2.0% | $K_3$ | 16.7 |
| CCPC-34 | 2.0% | | |
| CLP-3-T | 2.0% | | |
| CLU-3-F | 10.0% | | |
| PCH-302 | 9.0% | | |
| PGU-2-F | 2.0% | | |

-continued

| | |
|---|---|
| PGUQU-3-F | 5.0% |
| PGUQU-4-F | 7.0% |

EXAMPLE 18

The following liquid-crystalline medium is formulated:

| | | | |
|---|---|---|---|
| BCH-32 | 6.5% | cl.p. | 100.7 |
| CC-3-V | 25.5% | Δn | 0.1083 |
| CC-3-V1 | 2.5% | $n_e$ | 1.5979 |
| CCP-3-1 | 5.0% | $n_o$ | 1.4896 |
| CCP-3-3 | 5.0% | Δε | 5.6 |
| CCP-V-1 | 13.0% | $ε_{\|\|}$ | 8.5 |
| CCPC-33 | 2.0% | $ε_⊥$ | 2.9 |
| CLP-3-T | 6.5% | $γ_1$ | 100 |
| CLU-3-F | 10.0% | $K_1$ | 17.5 |
| PCH-302 | 10.0% | $K_3$ | 18.6 |
| PGUQU-3-F | 7.5% | | |
| PGUQU-4-F | 6.5% | | |

EXAMPLE 19

The following liquid-crystalline medium is formulated:

| | | | |
|---|---|---|---|
| BCH-32 | 9.0% | cl.p. | 91.8 |
| CC-3-V | 43.5% | Δn | 0.1019 |
| CC-3-V1 | 2.5% | $n_e$ | 1.5896 |
| CCP-3-1 | 2.0% | $n_o$ | 1.4877 |
| CCP-3-3 | 5.0% | Δε | 4.8 |
| CCP-V-1 | 12.5% | $ε_{\|\|}$ | 7.5 |
| CLU-3-F | 10.0% | $ε_⊥$ | 2.7 |
| DPGU-4-F | 0.5% | $γ_1$ | 67 |
| PGP-2-4 | 1.0% | $K_1$ | 15.0 |
| PGUQU-3-F | 6.0% | $K_3$ | 16.3 |
| PGUQU-4-F | 7.0% | | |
| PPGU-3-F | 1.0% | | |

EXAMPLE 20

The following liquid-crystalline medium is formulated:

| | | | |
|---|---|---|---|
| APUQU-3-F | 3.0% | cl.p. | 99.9 |
| BCH-32 | 6.5% | Δn | 0.1106 |
| CC-3-V | 21.0% | $n_e$ | 1.5991 |
| CC-3-V1 | 8.0% | $n_o$ | 1.4885 |
| CCP-3-1 | 6.0% | Δε | 6.0 |
| CCP-3-3 | 5.0% | $ε_{\|\|}$ | 8.9 |
| CCP-V-1 | 10.0% | $ε_⊥$ | 2.9 |
| CCPC-33 | 1.5% | $γ_1$ | 102 |
| CLP-3-T | 8.0% | $K_1$ | 18.3 |
| CLU-3-F | 3.5% | $K_3$ | 19.0 |
| PCH-302 | 13.0% | | |
| PGUQU-3-F | 7.5% | | |
| PGUQU-4-F | 7.0% | | |

EXAMPLE 21

The following liquid-crystalline medium is formulated:

| | | | |
|---|---|---|---|
| BCH-32 | 6.5% | cl.p. | 99.7 |
| CC-3-V | 27.5% | Δn | 0.1090 |
| CC-3-V1 | 3.0% | $n_e$ | 1.5972 |
| CCP-3-1 | 6.0% | $n_o$ | 1.4882 |
| CCP-3-3 | 5.0% | Δε | 5.9 |

-continued

| | | | |
|---|---|---|---|
| CCP-3F.F.F | 1.0% | $\varepsilon_{\parallel}$ | 8.7 |
| CCP-V-1 | 10.0% | $\varepsilon_{\perp}$ | 2.9 |
| CCPC-33 | 2.0% | $\gamma_1$ | 99 |
| CLP-3-T | 8.0% | $K_1$ | 17.5 |
| CLU-3-F | 5.0% | $K_3$ | 18.4 |
| PCH-302 | 10.0% | | |
| PGUQU-3-F | 7.0% | | |
| PGUQU-4-F | 7.0% | | |
| PGUQU-5-F | 2.0% | | |

EXAMPLE 22

The following liquid-crystalline medium is formulated:

| | | | |
|---|---|---|---|
| BCH-32 | 3.0% | cl.p. | 99.9 |
| BCH-3F.F | 8.0% | $\Delta n$ | 0.1092 |
| CC-3-V | 25.0% | $n_e$ | 1.5987 |
| CCP-3-1 | 6.0% | $n_o$ | 1.4895 |
| CCP-3-3 | 5.0% | $\Delta\varepsilon$ | 5.7 |
| CCP-V-1 | 7.5% | $\varepsilon_{\parallel}$ | 8.7 |
| CCPC-33 | 2.0% | $\varepsilon_{\perp}$ | 3.0 |
| CCPC-34 | 2.0% | $\gamma_1$ | 112 |
| CLP-3-T | 8.0% | $K_1$ | 17.5 |
| CLU-3-F | 11.5% | $K_3$ | 18.5 |
| PCH-302 | 10.0% | | |
| PGUQU-3-F | 7.5% | | |
| PGUQU-4-F | 3.0% | | |
| PP-1-2V1 | 1.5% | | |

EXAMPLE 23

The following liquid-crystalline medium is formulated:

| | | | |
|---|---|---|---|
| BCH-32 | 4.5% | cl.p. | 100.9 |
| BCH-3F.F | 10.0% | $\Delta n$ | 0.1104 |
| CC-3-V | 24.0% | $n_e$ | 1.5992 |
| CCH-35 | 4.0% | $n_o$ | 1.4888 |
| CCP-3-1 | 6.0% | $\Delta\varepsilon$ | 5.9 |
| CCP-3-3 | 5.0% | $\varepsilon_{\parallel}$ | 8.9 |
| CCP-V-1 | 5.0% | $\varepsilon_{\perp}$ | 3.0 |
| CCPC-33 | 2.0% | $\gamma_1$ | 111 |
| CCPC-34 | 2.0% | $K_1$ | 18.1 |
| CLP-3-T | 8.0% | $K_3$ | 18.4 |
| CLU-3-F | 6.0% | | |
| PCH-302 | 10.0% | | |
| PGUQU-3-F | 7.5% | | |
| PGUQU-4-F | 5.5% | | |
| PP-1-2V1 | 0.5% | | |

EXAMPLE 24

The following liquid-crystalline medium is formulated:

| | | | |
|---|---|---|---|
| APUQU-3-F | 5.0% | cl.p. | 78.1 |
| CC-3-V | 39.5% | $\Delta n$ | 0.1082 |
| CCP-3-1 | 7.0% | $n_e$ | 1.5919 |
| CCP-3-3 | 5.0% | $n_o$ | 1.4837 |
| CCPC-33 | 3.0% | $\Delta\varepsilon$ | 11.4 |
| CCPC-34 | 1.5% | $\varepsilon_{\parallel}$ | 15.0 |
| CLU-3-F | 4.5% | $\varepsilon_{\perp}$ | 3.6 |
| PGU-2-F | 4.5% | $\gamma_1$ | 80 |
| PGUQU-3-F | 5.0% | $K_1$ | 12.0 |
| PGUQU-4-F | 7.0% | $K_3$ | 13.1 |
| PGUQU-5-F | 2.5% | | |
| PUQU-3-F | 15.5% | | |

EXAMPLE 25

The following liquid-crystalline medium is formulated:

| | | | |
|---|---|---|---|
| APUQU-3-F | 5.0% | cl.p. | 78.3 |
| CC-3-V | 40.0% | $\Delta n$ | 0.1091 |
| CCP-3-1 | 7.5% | $n_e$ | 1.5928 |
| CCP-3-3 | 5.0% | $n_o$ | 1.4837 |
| CCPC-33 | 3.0% | $\Delta\varepsilon$ | 11.6 |
| CLU-3-F | 5.5% | $\varepsilon_{\parallel}$ | 15.2 |
| DGUQU-4-F | 0.5% | $\varepsilon_{\perp}$ | 3.6 |
| PGU-2-F | 4.5% | $\gamma_1$ | 80 |
| PGUQU-3-F | 5.0% | $K_1$ | 12.1 |
| PGUQU-4-F | 7.0% | $K_3$ | 13.4 |
| PGUQU-5-F | 4.5% | | |
| PUQU-3-F | 12.5% | | |

EXAMPLE 26

The following liquid-crystalline medium is formulated:

| | | | |
|---|---|---|---|
| APUQU-3-F | 5.0% | cl.p. | 76.5 |
| BCH-2F.F | 3.0% | $\Delta n$ | 0.1087 |
| BCH-3F.F | 3.0% | $n_e$ | 1.5935 |
| CC-3-V | 38.5% | $n_o$ | 1.4848 |
| CCP-3-1 | 7.0% | $\Delta\varepsilon$ | 11.3 |
| CCP-3-3 | 5.0% | $\varepsilon_{\parallel}$ | 14.9 |
| CCPC-33 | 1.0% | $\varepsilon_{\perp}$ | 3.6 |
| CLU-3-F | 8.0% | $\gamma_1$ | 78 |
| DGUQU-4-F | 3.0% | $K_1$ | 11.8 |
| PGU-2-F | 4.5% | $K_3$ | 12.9 |
| PGUQU-3-F | 5.0% | | |
| PGUQU-4-F | 7.0% | | |
| PGUQU-5-F | 2.0% | | |
| PUQU-3-F | 8.0% | | |

EXAMPLE 27

The following liquid-crystalline medium is formulated:

| | | | |
|---|---|---|---|
| BCH-2F.F | 1.5% | cl.p. | 74.2 |
| BCH-3F.F | 5.0% | $\Delta n$ | 0.1073 |
| CC-3-V | 34.5% | $n_e$ | 1.5915 |
| CC-3-V1 | 3.5% | $n_o$ | 1.4842 |
| CCP-3-1 | 7.0% | $\Delta\varepsilon$ | 11.2 |
| CCP-3-3 | 3.0% | $\varepsilon_{\parallel}$ | 14.8 |
| CCPC-33 | 1.5% | $\varepsilon_{\perp}$ | 3.6 |
| CLU-3-F | 10.5% | $\gamma_1$ | 78 |
| DGUQU-4-F | 1.0% | $K_1$ | 11.6 |
| PGUQU-3-F | 5.0% | $K_3$ | 13.0 |
| PGUQU-4-F | 7.0% | | |
| PGUQU-5-F | 6.0% | | |
| PUQU-3-F | 14.5% | | |

EXAMPLE 28

The following liquid-crystalline medium is formulated:

| | | | |
|---|---|---|---|
| BCH-2F.F | 1.5% | cl.p. | 74.8 |
| BCH-3F.F | 5.0% | $\Delta n$ | 0.1102 |
| CC-3-V | 30.0% | $n_e$ | 1.5951 |
| CC-3-V1 | 5.5% | $n_o$ | 1.4849 |
| CCP-3-1 | 7.0% | $\Delta\varepsilon$ | 11.8 |
| CCP-3-3 | 5.0% | $\varepsilon_{\parallel}$ | 15.4 |
| CCP-V-1 | 1.0% | $\varepsilon_{\perp}$ | 3.7 |
| CLU-3-F | 11.0% | $\gamma_1$ | 81 |
| DGUQU-4-F | 1.0% | $K_1$ | 11.9 |
| PGU-2-F | 0.5% | $K_3$ | 13.1 |

-continued

| | |
|---|---|
| PGUQU-3-F | 5.0% |
| PGUQU-4-F | 7.0% |
| PGUQU-5-F | 6.0% |
| PUQU-3-F | 14.5% |

EXAMPLE 29

The following liquid-crystalline medium is formulated:

| | | | |
|---|---|---|---|
| CC-3-V | 32.5% | cl.p. | 75.8 |
| CCP-3-1 | 7.0% | Δn | 0.1096 |
| CCP-3-3 | 5.0% | $n_e$ | 1.5949 |
| CCP-3F.F.F | 3.0% | $n_o$ | 1.4853 |
| CCP-V-1 | 4.0% | Δε | 11.6 |
| CLP-3-T | 3.5% | $ε_{\|\|}$ | 15.1 |
| CLU-3-F | 11.0% | $ε_⊥$ | 3.6 |
| PGU-2-F | 3.5% | $γ_1$ | 81 |
| PGUQU-3-F | 6.0% | $K_1$ | 12.1 |
| PGUQU-4-F | 7.0% | $K_3$ | 13.2 |
| PGUQU-5-F | 3.0% | | |
| PUQU-3-F | 14.5% | | |

EXAMPLE 30

The following liquid-crystalline medium is formulated:

| | | | |
|---|---|---|---|
| BCH-32 | 7.0% | cl.p. | 100.2 |
| CC-3-V | 22.0% | Δn | 0.1115 |
| CC-3-V1 | 8.0% | $n_e$ | 1.6004 |
| CCP-3-1 | 7.0% | $n_o$ | 1.4889 |
| CCP-3-3 | 5.0% | Δε | 5.8 |
| CCP-V-1 | 13.0% | $ε_{\|\|}$ | 8.7 |
| CLP-3-T | 6.0% | $ε_⊥$ | 2.9 |
| CLU-3-F | 5.0% | $γ_1$ | 97 |
| PCH-302 | 10.0% | $K_1$ | 17.9 |
| PGUQU-3-F | 6.0% | $K_3$ | 18.8 |
| PGUQU-4-F | 7.0% | | |
| PGUQU-5-F | 4.0% | | |

EXAMPLE 31

The following liquid-crystalline medium is formulated:

| | | | |
|---|---|---|---|
| BCH-32 | 7.0% | cl.p. | 100.4 |
| CC-3-V | 26.5% | Δn | 0.1112 |
| CC-3-V1 | 1.0% | $n_e$ | 1.6004 |
| CCP-3-1 | 7.0% | $n_o$ | 1.4892 |
| CCP-3-3 | 5.0% | Δε | 5.9 |
| CCP-V-1 | 13.0% | $ε_{\|\|}$ | 8.7 |
| CCPC-33 | 0.5% | $ε_⊥$ | 2.9 |
| CLP-3-T | 8.0% | $γ_1$ | 99 |
| CLU-3-F | 6.0% | $K_1$ | 17.8 |
| PCH-302 | 10.0% | $K_3$ | 18.7 |
| PGUQU-3-F | 5.0% | | |
| PGUQU-4-F | 7.0% | | |
| PGUQU-5-F | 4.0% | | |

EXAMPLE 32

The following liquid-crystalline medium is formulated:

| | | | |
|---|---|---|---|
| BCH-32 | 8.0% | cl.p. | 100 |
| CC-3-V | 25.5% | Δn | 0.1101 |
| CC-3-V1 | 4.5% | $n_e$ | 1.5992 |
| CCP-3-1 | 7.5% | $n_o$ | 1.4891 |
| CCP-3-3 | 4.5% | Δε | 5.9 |
| CCP-V-1 | 9.0% | $ε_{\|\|}$ | 8.7 |
| CCPC-33 | 1.5% | $ε_⊥$ | 2.9 |
| CLP-3-T | 6.0% | $γ_1$ | 98 |
| CLU-3-F | 7.5% | $K_1$ | 17.7 |
| PCH-302 | 10.0% | $K_3$ | 18.6 |
| PGUQU-3-F | 5.5% | | |
| PGUQU-4-F | 7.0% | | |
| PGUQU-5-F | 3.5% | | |

EXAMPLE 33

The following liquid-crystalline medium is formulated:

| | | | |
|---|---|---|---|
| BCH-32 | 6.5% | cl.p. | 101 |
| CC-3-V | 26.5% | Δn | 0.1097 |
| CC-3-V1 | 3.0% | $n_e$ | 1.5981 |
| CCP-3-1 | 6.0% | $n_o$ | 1.4884 |
| CCP-3-3 | 5.0% | Δε | 5.9 |
| CCP-3F.F.F | 1.0% | $ε_{\|\|}$ | 8.7 |
| CCP-V-1 | 11.0% | $ε_⊥$ | 2.9 |
| CCPC-33 | 2.0% | $γ_1$ | 99 |
| CLP-3-T | 8.0% | $K_1$ | 17.8 |
| CLU-3-F | 5.0% | $K_3$ | 18.9 |
| PCH-302 | 10.0% | | |
| PGUQU-3-F | 7.0% | | |
| PGUQU-4-F | 7.0% | | |
| PGUQU-5-F | 2.0% | | |

EXAMPLE 34

The following liquid-crystalline medium is formulated:

| | | | |
|---|---|---|---|
| BCH-32 | 7.0% | cl.p. | 100.4 |
| CC-3-V | 28.5% | Δn | 0.1109 |
| CC-3-V1 | 0.5% | $n_e$ | 1.5995 |
| CCP-3-1 | 7.0% | $n_o$ | 1.4886 |
| CCP-3-3 | 5.0% | Δε | 5.9 |
| CCP-V-1 | 10.5% | $ε_{\|\|}$ | 8.8 |
| CCPC-33 | 2.0% | $ε_⊥$ | 2.9 |
| CLP-3-T | 7.0% | $γ_1$ | 98 |
| CLU-3-F | 5.0% | $K_1$ | 18.0 |
| PCH-302 | 10.5% | $K_3$ | 18.6 |
| PGUQU-3-F | 5.0% | | |
| PGUQU-4-F | 7.0% | | |
| PGUQU-5-F | 5.0% | | |

EXAMPLE 35

The following liquid-crystalline medium is formulated:

| | | | |
|---|---|---|---|
| APUQU-3-F | 2.0% | cl.p. | 101.1 |
| BCH-32 | 8.0% | Δn | 0.1110 |
| CC-3-V | 25.0% | $n_e$ | 1.5996 |
| CCP-3-1 | 6.0% | $n_o$ | 1.4886 |
| CCP-3-3 | 5.0% | Δε | 5.8 |
| CCP-30CF3 | 5.5% | $ε_{\|\|}$ | 8.7 |
| CCP-V-1 | 12.5% | $ε_⊥$ | 2.9 |
| CLP-3-T | 6.5% | $γ_1$ | 97 |
| CLU-3-F | 3.5% | $K_1$ | 18.0 |
| PCH-302 | 11.5% | $K_3$ | 18.6 |
| PGUQU-3-F | 3.0% | | |
| PGUQU-4-F | 6.0% | | |
| PGUQU-5-F | 5.5% | | |

EXAMPLE 36

The following liquid-crystalline medium is formulated:

| | | | |
|---|---|---|---|
| BCH-32 | 8.5% | cl.p. | 101.4 |
| CC-3-V | 25.0% | Δn | 0.1108 |
| CC-3-V1 | 0.5% | $n_e$ | 1.5995 |
| CCP-3-1 | 7.0% | $n_o$ | 1.4887 |
| CCP-3-3 | 2.0% | Δε | 5.8 |
| CCP-30CF3 | 5.5% | $\varepsilon_{\parallel}$ | 8.7 |
| CCP-V-1 | 14.0% | $\varepsilon_{\perp}$ | 2.9 |
| CLP-3-T | 6.5% | $\gamma_1$ | 97 |
| CLU-3-F | 5.0% | $K_1$ | 17.8 |
| DGUQU-4-F | 1.0% | $K_3$ | 18.5 |
| PCH-302 | 10.5% | | |
| PGUQU-3-F | 3.0% | | |
| PGUQU-4-F | 6.0% | | |
| PGUQU-5-F | 5.5% | | |

EXAMPLE 37

The following liquid-crystalline medium is formulated:

| | | | |
|---|---|---|---|
| CC-3-V | 24.0% | cl.p. | 100.4 |
| CCP-3-1 | 7.0% | Δn | 0.1110 |
| CCP-3-3 | 3.0% | $n_e$ | 1.5982 |
| CCP-30CF3 | 8.0% | $n_o$ | 1.4872 |
| CCP-3F.F.F | 3.0% | Δε | 5.9 |
| CCP-50CF3 | 1.5% | $\varepsilon_{\parallel}$ | 8.8 |
| CCP-V-1 | 13.5% | $\varepsilon_{\perp}$ | 2.9 |
| CLP-3-T | 7.5% | $\gamma_1$ | 98 |
| CLU-3-F | 3.0% | $K_1$ | 17.5 |
| PCH-302 | 11.0% | $K_3$ | 18.7 |
| PGP-2-3 | 4.5% | | |
| PGUQU-3-F | 8.0% | | |
| PGUQU-4-F | 6.0% | | |

EXAMPLE 38

The following liquid-crystalline medium is formulated:

| | | | |
|---|---|---|---|
| BCH-32 | 4.0% | cl.p. | 100.5 |
| CC-3-V | 26.0% | Δn | 0.1109 |
| CC-3-V1 | 4.5% | $n_e$ | 1.5992 |
| CCP-3-1 | 4.5% | $n_o$ | 1.4883 |
| CCP-3-3 | 5.0% | Δε | 5.8 |
| CCP-3F.F.F | 3.0% | $\varepsilon_{\parallel}$ | 8.7 |
| CCP-V-1 | 11.0% | $\varepsilon_{\perp}$ | 2.9 |
| CCPC-33 | 3.0% | $\gamma_1$ | 99 |
| CLP-3-T | 6.0% | $K_1$ | 17.3 |
| CLU-3-F | 4.5% | $K_3$ | 18.5 |
| PCH-302 | 10.0% | | |
| PGP-2-3 | 2.5% | | |
| PGUQU-3-F | 7.0% | | |
| PGUQU-4-F | 7.0% | | |
| PGUQU-5-F | 2.0% | | |

EXAMPLE 39

The following liquid-crystalline medium is formulated:

| | | | |
|---|---|---|---|
| APUQU-3-F | 2.5% | cl.p. | 100.3 |
| BCH-32 | 8.0% | Δn | 0.1105 |
| CC-3-V | 19.5% | $n_e$ | 1.5993 |
| CC-3-V1 | 8.0% | $n_o$ | 1.4888 |
| CCP-3-1 | 6.0% | Δε | 5.8 |
| CCP-3-3 | 5.0% | $\varepsilon_{\parallel}$ | 8.7 |
| CCP-3F.F.F | 3.5% | $\varepsilon_{\perp}$ | 2.9 |

-continued

| | | | |
|---|---|---|---|
| CCP-V-1 | 13.0% | $\gamma_1$ | 98 |
| CLP-3-T | 4.5% | $K_1$ | 17.7 |
| CLU-3-F | 5.0% | $K_3$ | 18.7 |
| PCH-302 | 11.0% | | |
| PGP-2-3 | 0.5% | | |
| PGUQU-3-F | 5.5% | | |
| PGUQU-4-F | 6.0% | | |
| PGUQU-5-F | 2.0% | | |

EXAMPLE 40

The following liquid-crystalline medium is formulated:

| | | | |
|---|---|---|---|
| APUQU-3-F | 2.0% | cl.p. | 100.7 |
| BCH-32 | 7.0% | Δn | 0.1097 |
| CC-3-V | 26.5% | $n_e$ | 1.5983 |
| CC-3-V1 | 1.0% | $n_o$ | 1.4886 |
| CCP-3-1 | 7.0% | Δε | 5.8 |
| CCP-3-3 | 5.0% | $\varepsilon_{\parallel}$ | 8.7 |
| CCP-V-1 | 13.0% | $\varepsilon_{\perp}$ | 2.9 |
| CCPC-33 | 0.5% | $\gamma_1$ | 100 |
| CLP-3-T | 8.0% | $K_1$ | 18.0 |
| CLU-3-F | 6.0% | $K_3$ | 18.7 |
| PCH-302 | 10.0% | | |
| PGUQU-3-F | 3.0% | | |
| PGUQU-4-F | 5.0% | | |
| PGUQU-5-F | 6.0% | | |

EXAMPLE 41

The following liquid-crystalline medium is formulated:

| | | | |
|---|---|---|---|
| APUQU-3-F | 2.0% | cl.p. | 100.4 |
| BCH-32 | 4.0% | Δn | 0.1113 |
| CC-3-V | 18.5% | $n_e$ | 1.6014 |
| CC-3-V1 | 8.5% | $n_o$ | 1.4901 |
| CCP-3-1 | 5.0% | Δε | 5.7 |
| CCP-3-3 | 5.0% | $\varepsilon_{\parallel}$ | 8.6 |
| CCP-V-1 | 20.0% | $\varepsilon_{\perp}$ | 2.9 |
| CCPC-33 | 0.5% | $\gamma_1$ | 99 |
| CLP-3-T | 1.5% | $K_1$ | 16.8 |
| CLU-3-F | 9.0% | $K_3$ | 18.8 |
| PCH-302 | 10.0% | | |
| PGU-3-F | 4.0% | | |
| PGUQU-3-F | 2.0% | | |
| PGUQU-4-F | 4.0% | | |
| PGUQU-5-F | 6.0% | | |

EXAMPLE 42

The following liquid-crystalline medium is formulated:

| | | | |
|---|---|---|---|
| APUQU-3-F | 2.0% | cl.p. | 101.2 |
| BCH-32 | 9.0% | Δn | 0.1106 |
| CC-3-V | 25.5% | $n_e$ | 1.5999 |
| CC-3-V1 | 3.5% | $n_o$ | 1.4893 |
| CCP-3-1 | 5.5% | Δε | 5.8 |
| CCP-V-1 | 14.5% | $\varepsilon_{\parallel}$ | 8.7 |
| CCPC-33 | 2.0% | $\varepsilon_{\perp}$ | 2.9 |
| CLP-3-T | 7.0% | $\gamma_1$ | 99 |
| CLU-3-F | 7.0% | $K_1$ | 17.6 |
| PCH-302 | 10.0% | $K_3$ | 18.6 |
| PGUQU-3-F | 3.0% | | |
| PGUQU-4-F | 5.0% | | |
| PGUQU-5-F | 6.0% | | |

EXAMPLE 43

The following liquid-crystalline medium is formulated:

| | | | |
|---|---|---|---|
| APUQU-3-F | 2.0% | cl.p. | 101.3 |
| BCH-32 | 9.0% | Δε | 5.8 |
| CC-3-V | 19.5% | $\varepsilon_{\parallel}$ | 8.7 |
| CC-3-V1 | 8.5% | $\varepsilon_{\perp}$ | 2.9 |
| CCP-3-1 | 7.0% | $\gamma_1$ | 100 |
| CCP-3-3 | 1.5% | $K_1$ | 18.1 |
| CCP-3F.F.F | 4.0% | $K_3$ | 19.0 |
| CCP-V-1 | 14.0% | | |
| CLP-3-T | 6.5% | | |
| CLU-3-F | 4.5% | | |
| PCH-302 | 10.0% | | |
| PGUQU-3-F | 3.0% | | |
| PGUQU-4-F | 5.0% | | |
| PGUQU-5-F | 5.5% | | |

EXAMPLE 44

The following liquid-crystalline medium is formulated:

| | | | |
|---|---|---|---|
| APUQU-3-F | 2.0% | cl.p. | 101 |
| BCH-32 | 5.0% | Δn | 0.1114 |
| CC-3-V | 21.5% | $n_e$ | 1.6006 |
| CC-3-V1 | 8.0% | $n_o$ | 1.4892 |
| CCP-3-1 | 7.0% | Δε | 5.8 |
| CCP-3-3 | 4.5% | $\varepsilon_{\parallel}$ | 8.7 |
| CCP-V-1 | 13.5% | $\varepsilon_{\perp}$ | 2.9 |
| CCPC-33 | 1.5% | $\gamma_1$ | 100 |
| CLP-3-T | 6.5% | $K_1$ | 18.0 |
| CLU-3-F | 4.0% | $K_3$ | 18.9 |
| PCH-302 | 10.0% | | |
| PGU-3-F | 4.0% | | |
| PGUQU-3-F | 3.0% | | |
| PGUQU-4-F | 5.0% | | |
| PGUQU-5-F | 4.5% | | |

EXAMPLE 45

The following liquid-crystalline medium is formulated:

| | | | |
|---|---|---|---|
| APUQU-3-F | 2.0% | cl.p. | 100.6 |
| BCH-32 | 9.0% | Δn | 0.1107 |
| CC-3-V | 19.5% | $n_e$ | 1.6004 |
| CC-3-V1 | 10.0% | $n_o$ | 1.4897 |
| CCP-3-1 | 7.0% | Δε | 5.8 |
| CCP-V-1 | 14.0% | $\varepsilon_{\parallel}$ | 8.7 |
| CCPC-33 | 1.0% | $\varepsilon_{\perp}$ | 2.9 |
| CLP-3-T | 2.5% | $\gamma_1$ | 98 |
| CLU-3-F | 11.5% | $K_1$ | 17.3 |
| PCH-302 | 10.0% | $K_3$ | 18.7 |
| PGUQU-3-F | 3.0% | | |
| PGUQU-4-F | 4.5% | | |
| PGUQU-5-F | 6.0% | | |

EXAMPLE 46

The following liquid-crystalline medium is formulated:

| | | | |
|---|---|---|---|
| APUQU-3-F | 2.0% | cl.p. | 101 |
| BCH-32 | 2.5% | Δn | 0.1108 |
| CC-3-V | 22.5% | $n_e$ | 1.5998 |
| CC-3-V1 | 6.5% | $n_o$ | 1.4890 |
| CCP-3-1 | 7.0% | Δε | 5.8 |
| CCP-3-3 | 4.0% | $\varepsilon_{\parallel}$ | 8.7 |
| CCP-V-1 | 13.0% | $\varepsilon_{\perp}$ | 2.9 |
| CCP-V2-1 | 1.5% | $\gamma_1$ | 103 |
| CCPC-33 | 3.0% | $K_1$ | 17.5 |
| CLP-3-T | 6.5% | $K_3$ | 18.9 |
| CLU-3-F | 4.5% | | |
| PCH-302 | 10.0% | | |
| PGU-2-F | 3.5% | | |
| PGU-3-F | 3.5% | | |
| PGUQU-3-F | 3.0% | | |
| PGUQU-4-F | 4.0% | | |
| PGUQU-5-F | 3.0% | | |

EXAMPLE 47

The following liquid-crystalline medium is formulated:

| | | | |
|---|---|---|---|
| APUQU-3-F | 2.0% | cl.p. | 100.7 |
| BCH-32 | 2.5% | Δn | 0.1108 |
| CC-3-V | 22.0% | $n_e$ | 1.6003 |
| CC-3-V1 | 7.0% | $n_o$ | 1.4895 |
| CCP-3-1 | 7.0% | Δε | 5.8 |
| CCP-3-3 | 5.0% | $\varepsilon_{\parallel}$ | 8.7 |
| CCP-V-1 | 13.0% | $\varepsilon_{\perp}$ | 2.9 |
| CCP-V2-1 | 0.5% | $\gamma_1$ | 104 |
| CCPC-33 | 3.0% | $K_1$ | 17.5 |
| CLP-3-T | 6.5% | $K_3$ | 18.8 |
| CLU-3-F | 4.0% | | |
| PCH-302 | 10.0% | | |
| PGU-2-F | 5.0% | | |
| PGU-3-F | 2.5% | | |
| PGUQU-4-F | 5.0% | | |
| PGUQU-5-F | 5.0% | | |

EXAMPLE 48

The following liquid-crystalline medium is formulated:

| | | | |
|---|---|---|---|
| BCH-32 | 9.0% | cl.p. | 99.7 |
| CC-3-V | 31.5% | Δn | 0.1104 |
| CCG-V-F | 4.0% | $n_e$ | 1.6017 |
| CCP-3-1 | 5.0% | $n_o$ | 1.4913 |
| CCP-3-3 | 5.0% | Δε | 5.8 |
| CCP-V-1 | 9.5% | $\varepsilon_{\parallel}$ | 8.6 |
| CCPC-33 | 3.0% | $\varepsilon_{\perp}$ | 2.9 |
| CDUQU-3-F | 1.0% | $\gamma_1$ | 91 |
| CLU-3-F | 13.0% | $K_1$ | 16.4 |
| DGUQU-4-F | 1.0% | $K_3$ | 17.4 |
| PGU-2-F | 2.5% | | |
| PGUQU-3-F | 3.5% | | |
| PGUQU-4-F | 4.0% | | |
| PGUQU-5-F | 3.0% | | |
| PP-1-2V1 | 5.0% | | |

EXAMPLE 49

The following liquid-crystalline medium is formulated:

| | | | |
|---|---|---|---|
| APUQU-3-F | 2.5% | cl.p. | 100.3 |
| BCH-32 | 4.0% | Δn | 0.1119 |
| CC-3-V | 22.0% | $n_e$ | 1.6012 |
| CC-3-V1 | 8.0% | $n_o$ | 1.4893 |
| CCP-3-1 | 7.0% | Δε | 5.9 |
| CCP-3-3 | 5.0% | $\varepsilon_{\parallel}$ | 8.8 |
| CCP-V-1 | 12.0% | $\varepsilon_{\perp}$ | 3.0 |
| CCP-V2-1 | 1.0% | $\gamma_1$ | 99 |
| CCPC-33 | 2.5% | $K_1$ | 17.5 |
| CLP-3-T | 6.0% | $K_3$ | 18.5 |
| CLU-3-F | 2.0% | | |

-continued

| | |
|---|---|
| PCH-302 | 10.0% |
| PGU-2-F | 7.0% |
| PGUQU-3-F | 3.0% |
| PGUQU-4-F | 5.0% |
| PGUQU-5-F | 3.0% |

EXAMPLE 50

The following liquid-crystalline medium is formulated:

| | | | |
|---|---|---|---|
| APUQU-3-F | 2.0% | cl.p. | 100.4 |
| BCH-32 | 4.0% | Δn | 0.1113 |
| CC-3-V | 22.5% | $n_e$ | 1.6008 |
| CC-3-V1 | 8.0% | $n_o$ | 1.4895 |
| CCP-3-1 | 7.0% | Δε | 5.8 |
| CCP-3-3 | 5.0% | $ε_{\|\|}$ | 8.8 |
| CCP-V-1 | 12.0% | $ε_{\perp}$ | 2.9 |
| CCP-V2-1 | 0.5% | $γ_1$ | 99 |
| CCPC-33 | 2.5% | $K_1$ | 17.6 |
| CLP-3-T | 6.5% | $K_3$ | 18.7 |
| CLU-3-F | 2.0% | | |
| PCH-302 | 10.0% | | |
| PGU-2-F | 6.0% | | |
| PGUQU-3-F | 3.0% | | |
| PGUQU-4-F | 5.0% | | |
| PGUQU-5-F | 4.0% | | |

EXAMPLE 51

The following liquid-crystalline medium is formulated:

| | | | |
|---|---|---|---|
| BCH-32 | 8.0% | cl.p. | 103.6 |
| BCH-5F.F.F | 2.5% | Δn | 0.1116 |
| CBC-33 | 0.5% | $n_e$ | 1.5988 |
| CC-3-V | 34.0% | $n_o$ | 1.4872 |
| CC-3-V1 | 1.0% | Δε | 5.8 |
| CCP-3-1 | 10.0% | $ε_{\|\|}$ | 8.6 |
| CCP-30CF3 | 8.0% | $ε_{\perp}$ | 2.8 |
| CCP-V-1 | 0.5% | $γ_1$ | 97 |
| CCPC-33 | 2.0% | $K_1$ | 17.8 |
| CCPC-35 | 4.0% | $K_3$ | 18.5 |
| CLU-3-F | 9.0% | | |
| PGUQU-3-F | 8.0% | | |
| PGUQU-4-F | 4.0% | | |
| PGUQU-5-F | 2.0% | | |
| PP-1-2V1 | 6.5% | | |

EXAMPLE 52

The following liquid-crystalline medium is formulated:

| | | | |
|---|---|---|---|
| CC-3-V | 26.0% | cl.p. | 97 |
| CC-3-V1 | 10.0% | Δn | 0.1111 |
| CCGU-3-F | 1.0% | $n_e$ | 1.5966 |
| CCP-3F.F.F | 1.0% | $n_o$ | 1.4855 |
| CCP-30CF3 | 7.0% | Δε | 5.7 |
| CCP-40CF3 | 1.5% | $ε_{\|\|}$ | 8.5 |
| CCP-50CF3 | 4.0% | $ε_{\perp}$ | 2.8 |
| CCP-V-1 | 12.0% | $γ_1$ | 85 |
| CLP-3-T | 7.0% | $K_1$ | 18.2 |
| PGP-2-3 | 3.0% | $K_3$ | 18.2 |
| PGP-2-5 | 4.0% | | |
| PGUQU-3-F | 7.0% | | |
| PGUQU-4-F | 3.0% | | |
| PP-1-2V1 | 3.5% | | |
| CLU-3-F | 10.0% | | |

EXAMPLE 53

The following liquid-crystalline medium is formulated:

| | | | |
|---|---|---|---|
| CC-3-V | 25.5% | cl.p. | 97.5 |
| CC-3-V1 | 6.0% | Δn | 0.1106 |
| CCGU-3-F | 6.0% | $n_e$ | 1.5977 |
| CCP-3F.F.F | 1.0% | $n_o$ | 1.4871 |
| CCP-30CF3 | 8.0% | Δε | 5.9 |
| CCP-40CF3 | 5.0% | $ε_{\|\|}$ | 8.7 |
| CCP-50CF3 | 2.5% | $ε_{\perp}$ | 2.8 |
| CCP-V-1 | 15.0% | $γ_1$ | 86 |
| PGP-2-3 | 2.0% | $K_1$ | 16.8 |
| PGUQU-3-F | 5.0% | $K_3$ | 18.3 |
| PGUQU-4-F | 5.0% | | |
| PP-1-2V1 | 9.0% | | |
| CLU-3-F | 10.0% | | |

EXAMPLE 54

The following liquid-crystalline medium is formulated:

| | | | |
|---|---|---|---|
| PCH-302 | 1.0% | cl.p. | 97 |
| PP-1-2V1 | 2.5% | Δn | 0.1112 |
| PGU-2-F | 1.5% | $n_e$ | 1.5989 |
| PGUQU-3-F | 8.0% | $n_o$ | 1.4877 |
| PGUQU-4-F | 0.5% | Δε | 5.5 |
| CLU-3-F | 20.0% | $ε_{\|\|}$ | 8.6 |
| CCP-3-1 | 7.0% | $ε_{\perp}$ | 3.1 |
| BCH-32 | 12.0% | $γ_1$ | 87 |
| CC-3-V | 26.0% | $K_1$ | 18.0 |
| CC-3-V1 | 8.0% | $K_3$ | 17.0 |
| CCP-30CF3 | 8.0% | | |
| CPY-3-O2 | 5.5% | | |

EXAMPLE 55

The following liquid-crystalline medium is formulated:

| | | | |
|---|---|---|---|
| CC-3-V | 9.0% | cl.p. | 91 |
| CCH-34 | 10.0% | Δn | 0.1129 |
| PCH-302 | 13.5% | $n_e$ | 1.6060 |
| PCH-53 | 5.0% | $n_o$ | 1.4931 |
| CCP-3-1 | 7.0% | Δε | 5.4 |
| CCP-3-3 | 3.0% | $ε_{\|\|}$ | 8.5 |
| BCH-32 | 12.0% | $ε_{\perp}$ | 3.0 |
| CCPC-33 | 2.0% | $γ_1$ | 100 |
| CCPC-34 | 2.0% | $K_1$ | 18.2 |
| BCH-3F.F | 5.0% | $K_3$ | 15.7 |
| PGU-2-F | 8.0% | | |
| PGUQU-3-F | 3.5% | | |
| CLU-3-F | 20.0% | | |

EXAMPLE 56

The following liquid-crystalline medium is formulated:

| | | | |
|---|---|---|---|
| CC-3-V | 49.5% | cl.p. | 79 |
| CCP-V-1 | 10.0% | Δn | 0.0989 |
| PGP-2-2V | 2.0% | $n_e$ | 1.5847 |
| PUQU-3-F | 3.0% | $n_o$ | 1.4858 |
| PPGU-3-F | 0.5% | Δε | 2.4 |
| CPY-3-O2 | 9.0% | $ε_{\|\|}$ | 6.7 |
| B(S)-2O-O4 | 4.0% | $ε_{\perp}$ | 4.3 |
| B(S)-2O-O5 | 4.0% | $γ_1$ | 60 |
| CLU-3-F | 14.0% | $K_1$ | 13.8 |
| PGUQU-3-F | 4.0% | $K_3$ | 14.5 |

-continued

| | |
|---|---|
| LTS bulk [h, −20° C.]: | 840 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure[s] of all applications, patents and publications, cited herein and of corresponding EP Patent Application No. 20168884.3, filed Apr. 9, 2020. is [are] incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid-crystalline medium, comprising one or more compounds of formula I, and one or more compounds of the formula XXXa, or one or more compounds of the formula XXXIVa, and having a positive dielectric anisotropy,

I

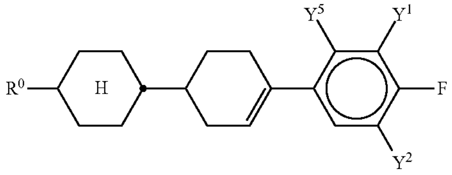

XXXa

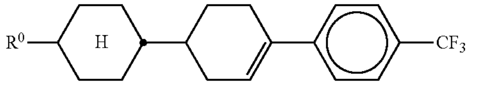

XXXIVa

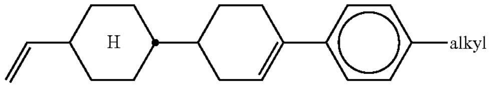

wherein $R^0$ is a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another by

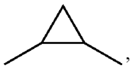, , 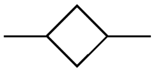,

-continued

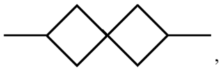, 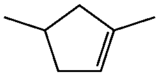, 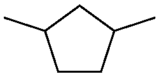,

—C≡C—, —$CF_2O$—, —$OCF_2$—, —CH═CH—, —O—, —CO—O— or —O—CO— in such a way that O atoms are not linked directly to one another, one of $Y^1$ and $Y^2$ is H, F or Cl, and the other one of $Y^1$ and $Y^2$ being different from H is F or Cl, $Y^5$ is H or $CH_3$, and alkyl denotes a straight-chain alkyl radical having 1-6 C atoms.

2. The liquid-crystalline medium according to claim 1, wherein the one or more compounds of formula I are selected from compounds of the following formulae

I1

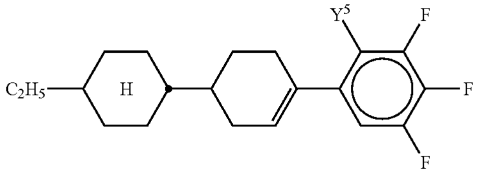

I2

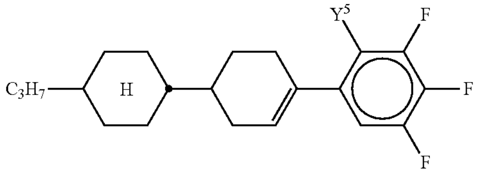

I3

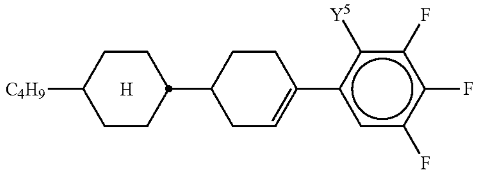

I4

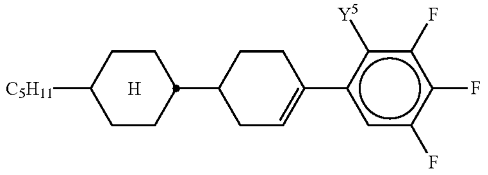

I5

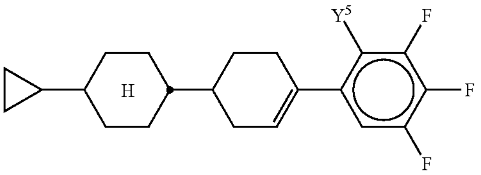

I6

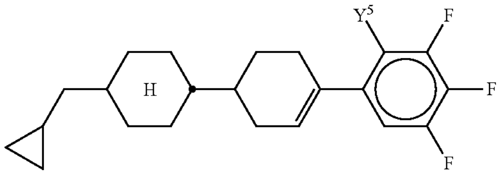

-continued

I7

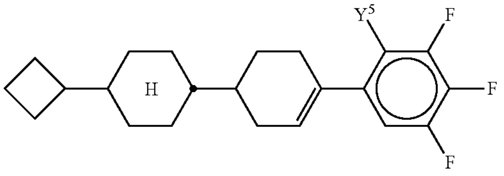

I8

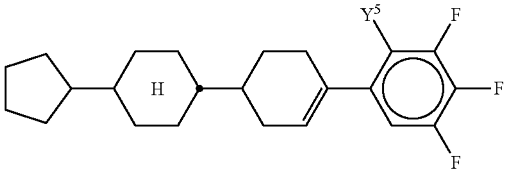

I9

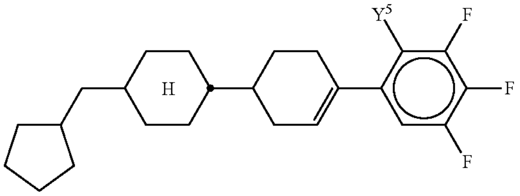

wherein $Y^5$ is H or $CH_3$.

3. The liquid-crystalline medium according to claim 1, further comprising one or more compounds selected from compounds of the following formulae

Z1

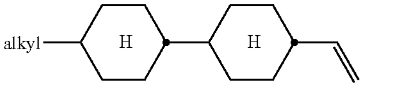

Z2

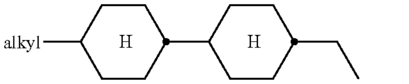

Z3

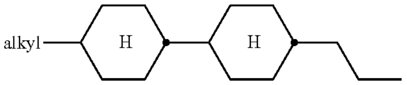

wherein “alkyl” is $C_{1-6}$-alkyl.

4. The liquid-crystalline medium according to claim 1, further comprising one or more compounds selected from compounds of the following formulae

Z1-1

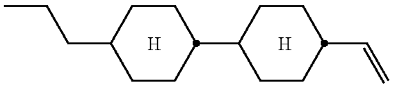

Z1-2

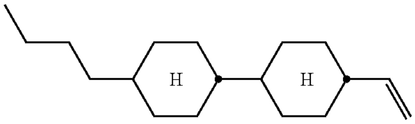

-continued

Z1-3

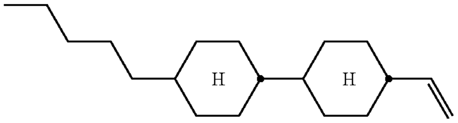

Z2-1

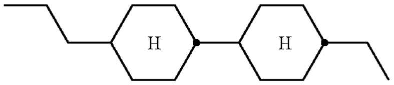

Z2-2

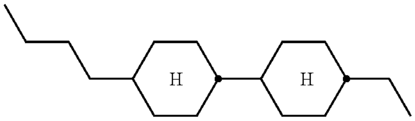

Z2-3

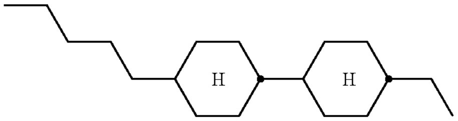

Z3-1

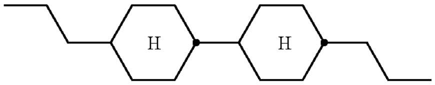

Z3-2

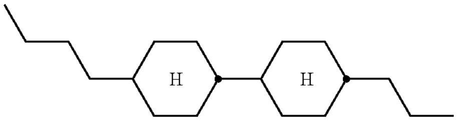

Z3-3

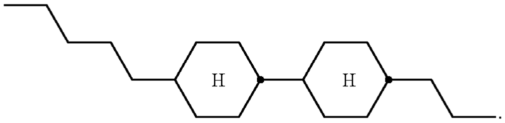

5. The liquid-crystalline medium according to claim 1, further comprising one or more compounds selected from compounds of the following formulae

Y

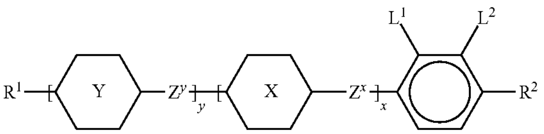

B

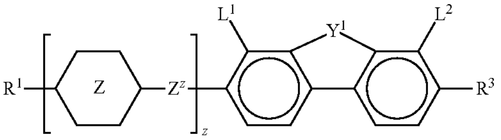

in which the individual radicals, on each occurrence identically or differently, and each, independently of one another, have the following meaning:

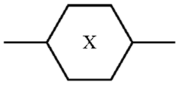

is

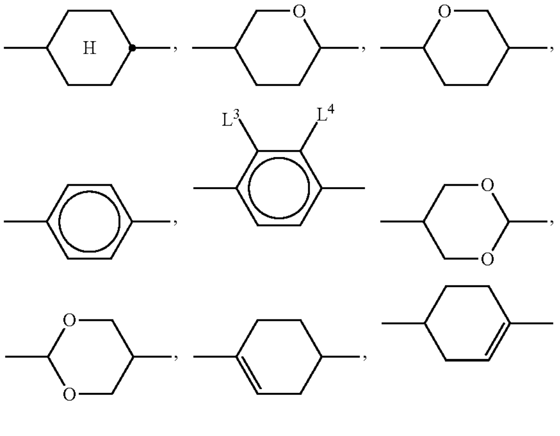

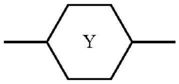

is

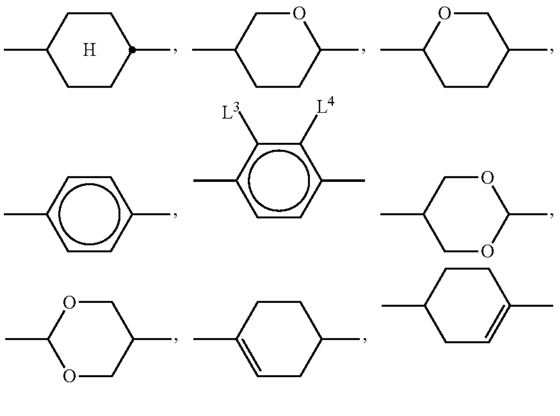

is

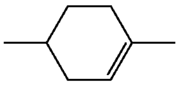

or

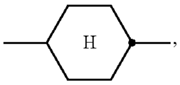, $R^1$, $R^2$ are a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

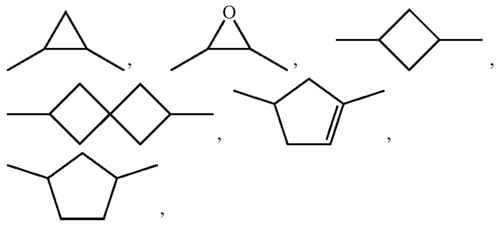

—C≡C—, —$CF_2O$—, —$OCF_2$—, —CH═CH—, —O—, —CO—O— or —O—CO— in such a way that O atoms are not linked directly to one another, $R^3$ has one of the meanings given for $R^1$ or $X^1$, $X^1$ fluorinated alkyl or alkoxy with 1, 2 or 3 C atoms, $Z^x$, $Z^y$ are —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$—, or a single bond, $Z^z$ is $CH_2O$ or a single bond, $Y^1$ is O or S, $L^{1-4}$ are H, F or Cl, x, y are 0, 1 or 2, with x+y≤3, and z is 0or 1, wherein in formula B the

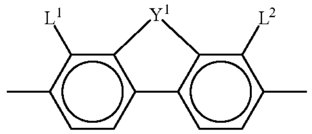

group is optionally substituted by a methyl or methoxy group, and wherein the compounds of formula Y contain at least one substituent $L^{1-4}$ that is F or Cl.

6. The liquid-crystalline medium according to claim 1, further comprising one or more compounds selected from compound of the following formulae

Y1

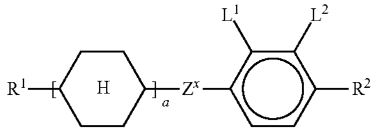

Y2

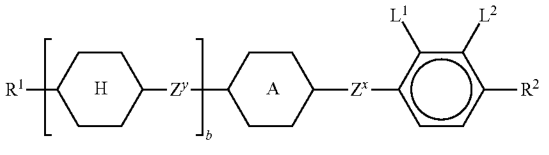

wherein $R^1$, $R^2$ are, each independently, a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

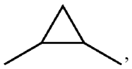, 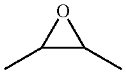, 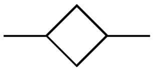, 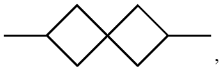, 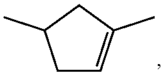, 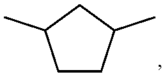,

—C≡C—, —$CF_2O$—, —$OCF_2$—, —CH═CH—, —O—, —CO—O— or —O—CO— in such a way that O atoms are not linked directly to one another, $Z^x$, $Z^y$ are, each independently, —$CH_2CH_2$—, —CH═CH—, —$CF_2O$—, —$OCF_2$—, —$CH_2O$—, —$OCH_2$—, —CO—O—, —O—CO—, —$C_2F_4$—, —CF═CF—, —CH═CH—$CH_2O$—, or a single bond, $L^{1-2}$ are, each independently, H, F or Cl, x, y are, each independently, 0, 1 or 2, with x+y≤3, a denotes 1 or 2, b denotes 0 or 1,

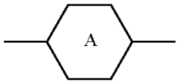

denotes

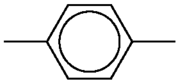 or 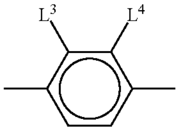

$L^3$, $L^4$ denote, each independently, F or Cl.

7. The liquid-crystalline medium according claim 1, further comprising one or more compounds selected from compounds of the following formulae

Y3

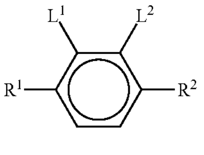

Y4

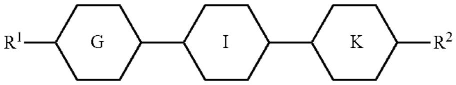

wherein $R^1$, $R^2$ are, each independently, a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

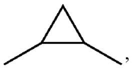, 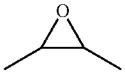, 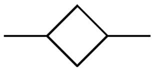, 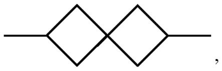, 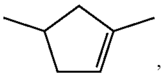, 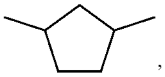,

—C≡C—, —$CF_2O$—, —$OCF_2$—, —CH═CH—, —O—, —CO—O— or —O—CO— in such a way that O atoms are not linked directly to one another, $L^{1-2}$ are, each independently, H, F or Cl,

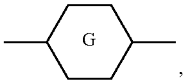, 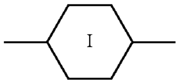 and 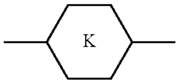

each, independently of one another, denote

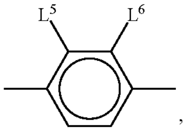, 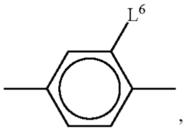, 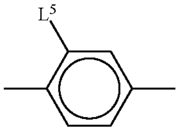 or 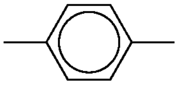

in which $L^5$ denotes F or Cl, and $L^6$ denotes F, Cl, $OCF_3$, $CF_3$, $CH_3$, $CH_2F$ or $CHF_2$.

8. The liquid-crystalline medium according to claim 1, further comprising one or more compounds selected from the compounds of the following formulae

B1

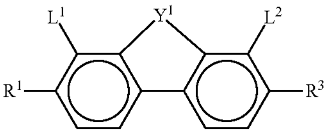

B2

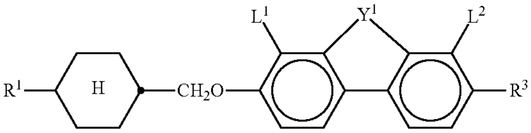

B3

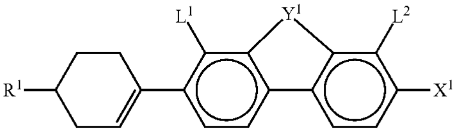

wherein $R^1$ is a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

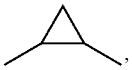, 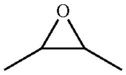, 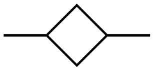,
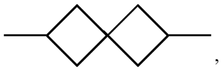, 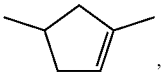,
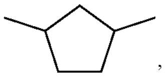,

—C≡C—, —$CF_2O$—, —$OCF_2$—, —CH═CH—, —O—, —CO—O— or —O—CO— in such a way that O atoms are not linked directly to one another, $R^3$ has one of the meanings given for $R^1$ or $X^1$, $X^1$ fluorinated alkyl or alkoxy with 1, 2 or 3 C atoms, $Y^1$ is O or S, $L^{1-2}$ are, each independently, H, F or Cl.

9. The liquid-crystalline medium according to claim 1, further comprising one or more compounds selected from compounds of the following formulae

B1-1

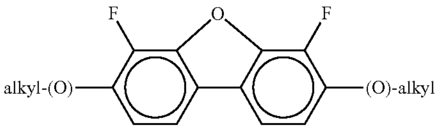

B1-2

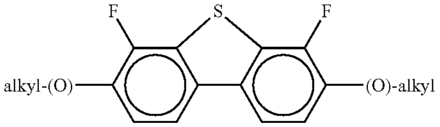

B2-1

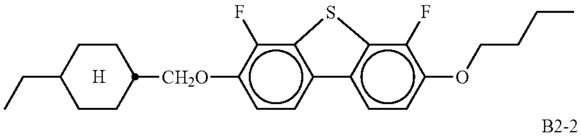

B2-2

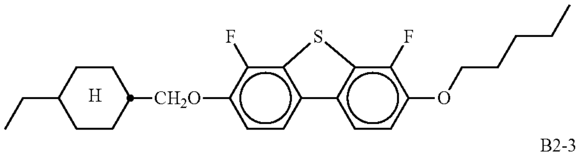

B2-3

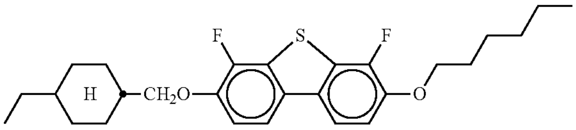

B3-1

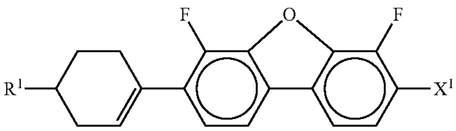

-continued

B3-2

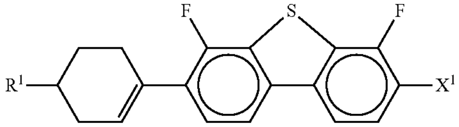

wherein $R^1$ is a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

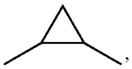, 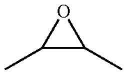, 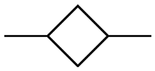,
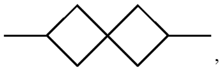, 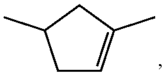,
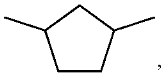,

—C≡C—, —$CF_2O$—, —$OCF_2$—, —CH═CH—, —O—, —CO—O— or —O—CO— in such a way that O atoms are not linked directly to one another, $X^1$ fluorinated alkyl or alkoxy with 1, 2 or 3 C atoms, alkyl denotes a straight-chain alkyl radical having 1-6 C atoms, and (O) denotes an oxygen atom or a single bond.

10. The liquid-crystalline medium according to claim 1, further comprising one or more compounds selected from compounds of the following formulae

II

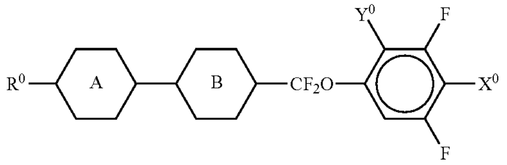

III

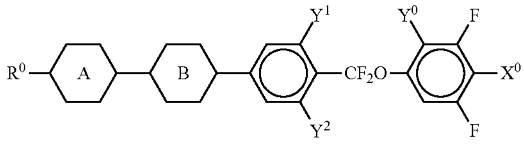

wherein

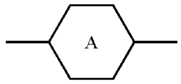 is

,

-continued

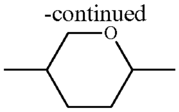
,

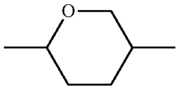
,

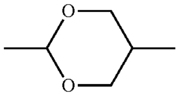
,

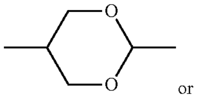
or

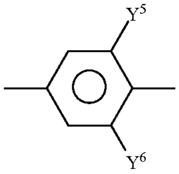
,

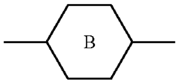
is

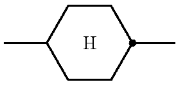
,

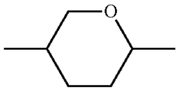
,

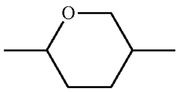
,

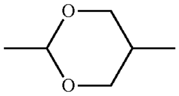
,

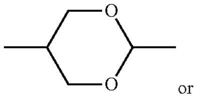
or

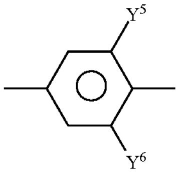
, $R^0$ is a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another by

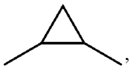
,
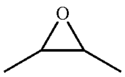
,
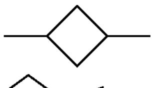
,
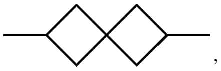
,
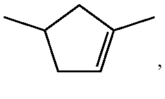
,

-continued

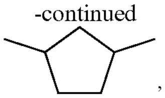
,

—C≡C—, —$CF_2O$—, —$OCF_2$—, —CH═CH—, —O—, —CO—O— or —O—CO— in such a way that O atoms are not linked directly to one another, $X^0$ is F, Cl, CN, $SF_5$, SCN, NCS, or a halogenated alkyl radical or a halogenated alkoxy radical having 1 to 6 C atoms, or a halogenated alkenyl radical or a halogenated alkenyloxy radical having 2 to 6 C atoms, $Y^{1-6}$ are, each independently, H or F, and $Y^0$ is H or $CH_3$.

11. The liquid-crystalline medium according to claim 1, further comprising one or more compounds selected from compounds of the following formulae

IV

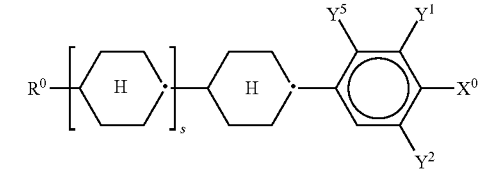

V

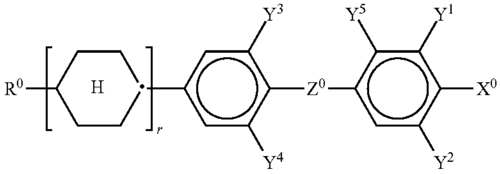

VI

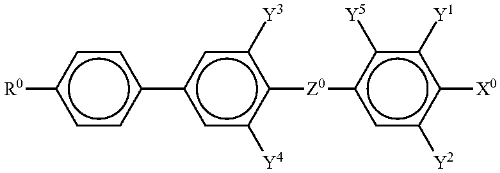

VII

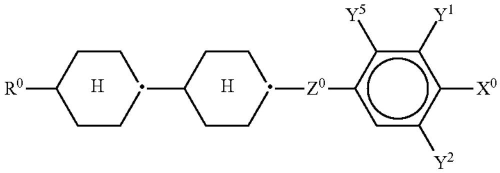

VIII

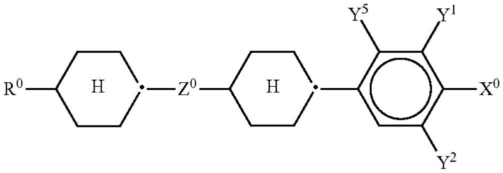

in which $R^0$ is a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

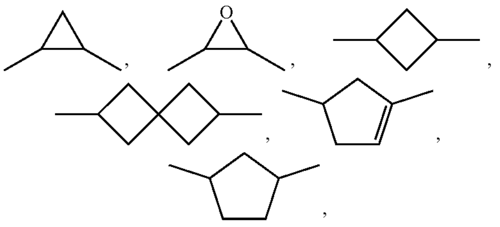

—C≡C—, —$CF_2O$—, —$OCF_2$—, —CH═CH—, —O—, —CO—O— or —O—CO— in such a way that O atoms are not linked directly to one another, $Y^{1-4}$ are each independently H, F or Cl, wherein at least one of $Y^1$ and $Y^2$ is F or Cl, $Y^5$ is H or $CH_3$, $Z^0$ denotes —$C_2H_4$—, —$(CH_2)_4$—, —CH═CH—, —CF═CF—, —$C_2F_4$—, —$CH_2CF_2$—, —$CF_2CH_2$—, —$CH_2O$—, —$OCH_2$—, —COO— or —$OCF_2$—, and in formulae V and VI also a single bond, and in formulae V and VIII also —$CF_2O$—, r denotes 0 or 1, and s denotes 0 or 1.

12. The liquid-crystalline medium according to claim 1, further comprising one or more compounds selected from compounds of the following formulae IVa1

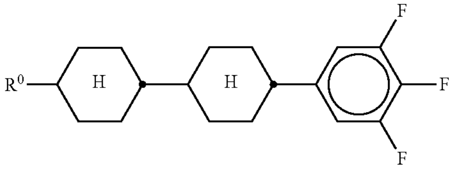

IVc1

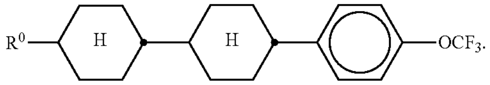

in which $R^0$ is a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

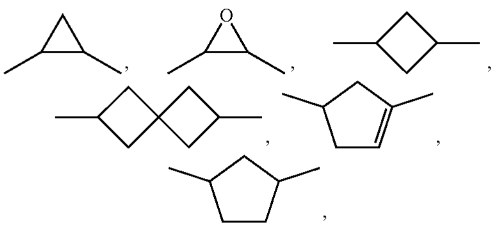

—C≡C—, —$CF_2O$—, —$OCF_2$—, —CH═CH—, —O—, —CO—O— or —O—CO— in such a way that O atoms are not linked directly to one another.

13. The liquid-crystalline medium according to claim 1, further comprising one or more compounds selected from compounds of the following formulae

IX

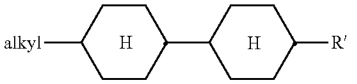

X

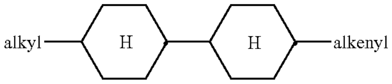

XI

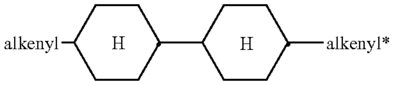

XII

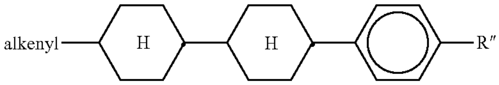

XIII

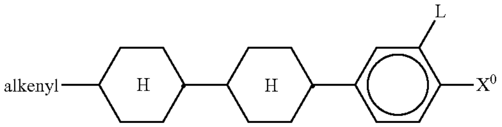

in which $X^0$ is F, Cl, CN, $SF_5$, SCN, NCS, or a halogenated alkyl radical or a halogenated alkoxy radical having 1 to 6 C atoms, or a halogenated alkenyl radical or a halogenated alkenyloxy radical having 2 to 6 C atoms, L denotes H or F, alkyl denotes $C_{1-6}$-alkyl, R' denotes methyl, $C_{4-6}$-alkyl or $C_{1-6}$-alkoxy, wherein, if R' is methyl or $C_{4-6}$-alkyl, then alkyl in formula IX is not ethyl or propyl, R" denotes $C_{1-6}$-alkyl, $C_{1-6}$-alkoxy or $C_{2-6}$-alkenyl, and alkenyl and alkenyl* each, independently of one another, denote $C_{2-6}$-alkenyl, and in formula X alkenyl denotes $C_{3-6}$ alkenyl.

14. The liquid-crystalline medium according to claim 1, further comprising one or more compounds of formula XIV

XIV

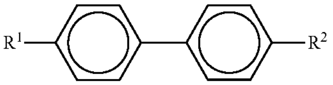

in which $R^1$ and $R^2$ each, independently of one another, denote n-alkyl, alkoxy, oxaalkyl or fluoroalkyl, each having 1 to 6 C atoms, or alkenyl having 2 to 6 C atoms.

15. The liquid-crystalline medium according to claim 1, further comprising one or more compounds of formula XVI

XVI

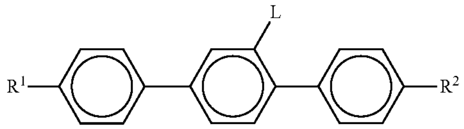

in which $R^1$, $R^2$ are a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

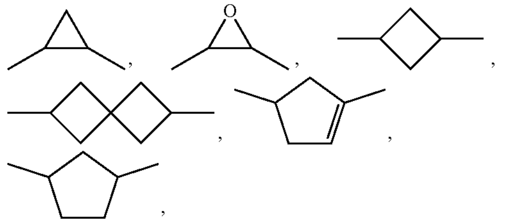

—C≡C—, —$CF_2$O—, —O$CF_2$—, —CH═CH—, —O—, —CO—O— or —O—CO— in such a way that O atoms are not linked directly to one another, and L denotes H or F.

16. The liquid-crystalline medium according to claim 1, further comprising one or more compounds selected from compounds of the following formulae XVIIa

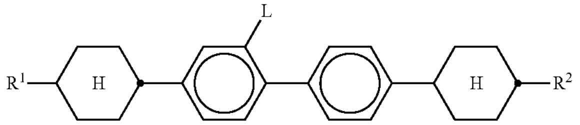

XVIIb

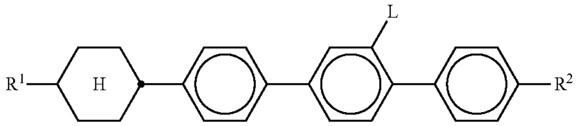

XVIIc

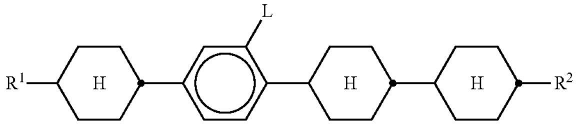

in which $R^1$, $R^2$ are a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

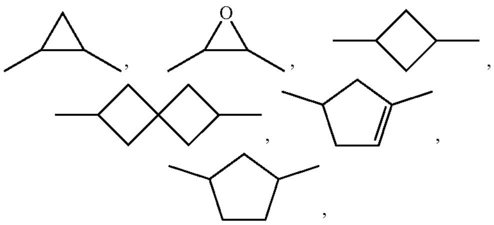

—C≡C—, —$CF_2$O—, —O$CF_2$—, —CH═CH—, —O—, —CO—O— or —O—CO— in such a way that O atoms are not linked directly to one another, and L denotes H or F.

17. The liquid-crystalline medium according to claim 1, further comprising one or more compounds selected from compounds of the following formulae

XVIII

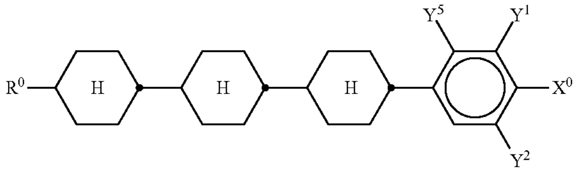

XIX

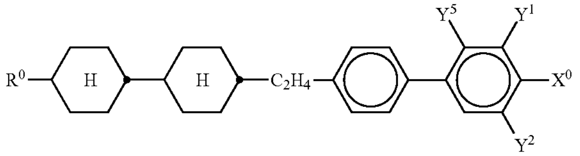

XX

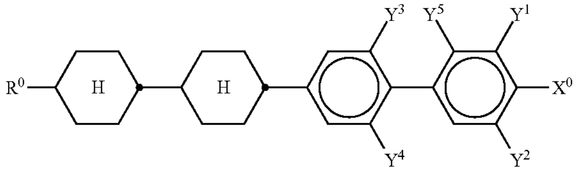

XXI

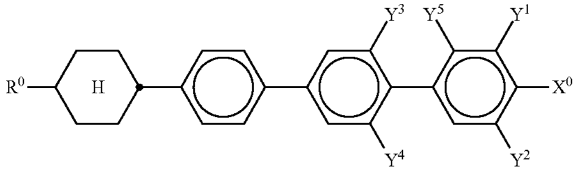

XXII

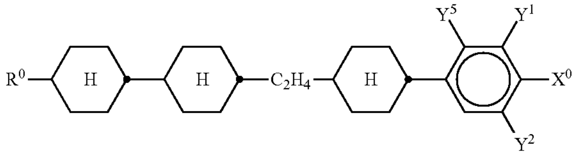

XXIII

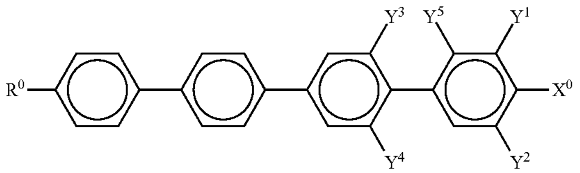

in which $R^0$ is a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

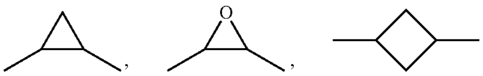

-continued

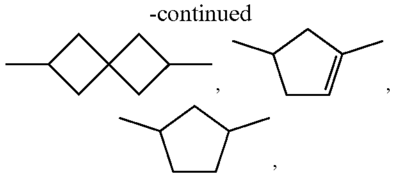

—C≡C—, —$CF_2O$—, —$OCF_2$—, —CH═CH—, —O—, —CO—O— or —O—CO— in such a way that O atoms are not linked directly to one another, $X^0$ is F, Cl, CN, $SF_5$, SCN, NCS, or a halogenated alkyl radical or a halogenated alkoxy radical having 1 to 6 C atoms, or a halogenated alkenyl radical or a halogenated alkenyloxy radical having 2 to 6 C atoms, and $Y^{1-5}$ are, each independently, H or F.

18. The liquid-crystalline medium according to claim 1, further comprising one or more compounds selected from compounds of the following formulae

XXVII

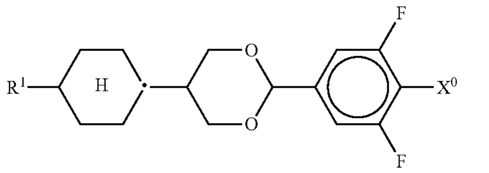

XXVIII

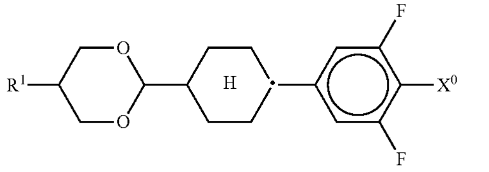

XXIX

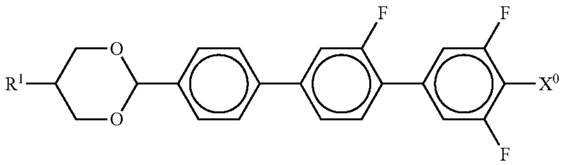

in which $R^1$ is a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

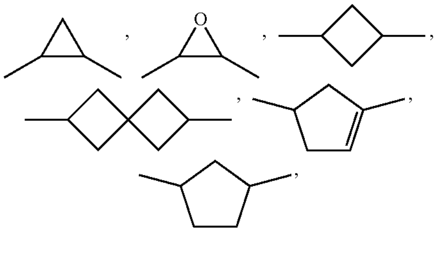

—C≡C—, —$CF_2O$—, —$OCF_2$—, —CH═CH—, —O—, —CO—O— or —O—CO— in such a way that O atoms are not linked directly to one another, and $X^0$ is F, Cl, CN, $SF_5$, SCN, NCS, or a halogenated alkyl radical or a halogenated alkoxy radical having 1 to 6 C atoms, or a halogenated alkenyl radical or a halogenated alkenyloxy radical having 2 to 6 C atoms.

19. The liquid-crystalline medium according to claim 1, further comprising one or more compounds selected from compounds of the following formulae

XXXI

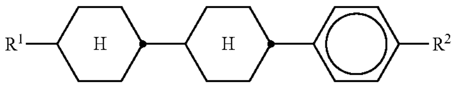

XXXII

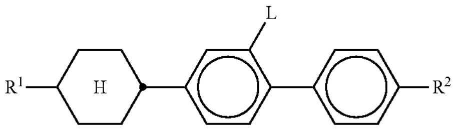

XXXIII

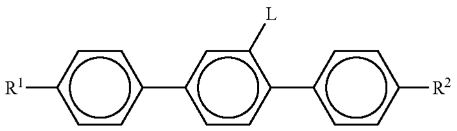

XXXIV

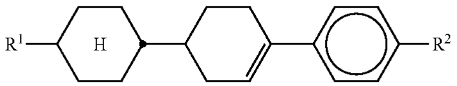

in which $R^1$, $R^2$ are, each independently, a straight chain alkyl or alkoxy radical that is unsubstituted or halogenated and has 1 to 15 C atoms or a branched or cyclic alkyl or alkoxy radical that is unsubstituted or halogenated and has 3 to 15 C atoms, in which one or more $CH_2$ groups may each be replaced, independently of one another, by

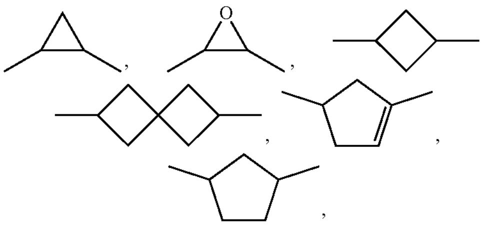

—C≡C—, —$CF_2O$—, —$OCF_2$—, —CH═CH—, —O—, —CO—O— or —O—CO— in such a way that O atoms are not linked directly to one another, and L denotes H or F.

20. The liquid-crystalline medium according to claim 1, further comprising one or more polymerizable compounds.

21. The liquid-crystalline medium according to claim 1, further comprising one or more polymerizable compounds, which are of formula M $$R^a - B^1 - (Z^b - B^2)_m - R^b \qquad M$$

in which the individual radicals, on each occurrence identically or differently, and each, independently of one another, have the following meaning:

$R^a$ and $R^b$ are P, P—Sp—, H, F, Cl, Br, I, —CN, —$NO_2$, —NCO, —NCS, —OCN, —SCN, $SF_5$ or a straight-chain alkyl having 1 to 25 C atoms or a branched alkyl having 3 to 25 C atoms, in which one or more non-adjacent $CH_2$ groups may each be replaced, independently of one another, by —C($R^0$)═C($R^{00}$)—, —C≡C—, —N($R^{00}$)—, —O—, —S—, —CO—, —CO—O—, —O—CO—, or —O—CO—O— in such a way that O and/or S atoms are not linked directly to one another, and in which one or more H atoms may be replaced by F, Cl, Br, I, CN, P or P—Sp—, where, if $B^1$ and/or $B^2$ contain a saturated C atom, $R^a$ and/or $R^b$may also denote a radical which is spiro-linked to this saturated C atom, wherein at least one of the radicals Ra and $R^b$ denotes or contains a group P or P—Sp—, P is a polymerisable group, Sp is a spacer group or a single bond, $B^1$ and $B^2$ are an aromatic, heteroaromatic, alicyclic or heterocyclic group, which may contain fused rings, and which is unsubstituted or mono- or polysubstituted by L, $Z^b$ is —O—, —S—, —CO—, —CO—O—, —OCO—, —O—CO—O—, —$OCH_2$—, —$CH_2O$—, —$SCH_2$—, —$CH_2S$-, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)n_1$—, —CH═CH—, —CF═CF—, —C═C—, —CH═CH—COO—, —OCO—CH═CH—, $CR^0R^{00}$ or a single bond, $R^0$ and $R^{00}$ denote H or alkyl having 1 to 12 C atoms, m denotes 0, 1, 2, 3 or 4, n1 denotes 1, 2, 3 or 4, L is P, P—Sp—, OH, $CH_2OH$, F, Cl, Br, I, —CN, —$NO_2$, —NCO, —NCS, —OCN, —SCN, —C(═O)N$(R^x)_2$, —C(═O)$Y^1$, —C(═O)$R^x$, —N$(R^x)_2$, optionally substituted silyl, optionally substituted aryl having 6 to 20 C atoms, or a straight-chain alkyl, alkoxy, alkylcarbonyl, alkoxycarbonyl, alkylcarbonyloxy or alkoxycarbonyloxy having 1 to 25 C atoms, or a branched alkyl, alkoxy, alkylcarbonyl, alkoxycarbonyl, alkylcarbonyloxy or alkoxycarbonyloxy having 3 to 25 C atoms, in which one or more H atoms may be replaced by F, Cl, P or P—Sp—, $Y^1$ denotes halogen, $R^x$ denotes P, P—Sp—, H, halogen, or a straight-chain alkyl having 1 to 25 C atoms, or a branched or cyclic alkyl having 3 to 25 C atoms, in which one or more non-adjacent $CH_2$ groups may be replaced by —O—, —S—, —CO—, —CO—O—, —O—CO—, or -O—CO-O- in such a way that O and/or S atoms are not linked directly to one another, and in which one or more H atoms may be replaced by F, Cl, P or P—Sp—, an optionally substituted aryl or aryloxy group having 6 to 40 C atoms, or an optionally substituted heteroaryl or heteroaryloxy group having 2 to 40 C atoms.

22. The liquid-crystalline medium according to claim 1, further comprising one or more polymerizable compounds, wherein the polymerizable compounds are polymerized.

23. A process for preparing the liquid-crystalline medium according to claim 1, comprising mixing together one or more compounds of formula I and one or more compounds of the formula XXXa or one or more compounds of the formula XXXIVa, and optionally one or more polymerizable compounds.

24. A shutter glass, LC window or 3D application, comprising a liquid-crystalline medium according to claim 1.

25. An electro-optical liquid-crystal display containing the liquid-crystalline medium according to claim 1.

26. An electro-optical liquid-crystal display containing the liquid-crystalline medium according to claim 1, wherein the display is a TN, PS-TN, STN, TN-TFT, OCB, IPS, PS-IPS, FFS, HB-FFS, XB-FFS, PS-HB-FFS, PS-XB-FFS, SA-HB-FFS, SA-XB-FS, polymer stabilised SA-HB-FFS, polymer stabilised SA-XB-FFS, positive VA or positive PS-VA display.

* * * * *